US008069096B1

(12) United States Patent
Ballaro et al.

(10) Patent No.: US 8,069,096 B1
(45) Date of Patent: Nov. 29, 2011

(54) MULTI-CONSTITUENT ATTRIBUTION OF A VENDOR'S PRODUCT CATALOG

(75) Inventors: Charles A. Ballaro, Apex, NC (US); Alexey Lef, Chennai (IN); David W. Frink, Raleigh, NC (US)

(73) Assignee: SciQuest Inc., Cary, NC (US)

(*) Notice: Subject to any disclaimer, the term of this patent is extended or adjusted under 35 U.S.C. 154(b) by 0 days.

(21) Appl. No.: 12/286,508

(22) Filed: Sep. 29, 2008

Related U.S. Application Data

(63) Continuation-in-part of application No. 12/283,280, filed on Sep. 9, 2008.

(60) Provisional application No. 61/130,028, filed on May 27, 2008.

(51) Int. Cl.
*G06Q 30/00* (2006.01)

(52) U.S. Cl. .................................................... 705/27.2

(58) Field of Classification Search .................... 705/26, 705/27, 27.2
See application file for complete search history.

(56) References Cited

U.S. PATENT DOCUMENTS

| | | | | |
|---|---|---|---|---|
| 5,861,906 | A | 1/1999 | Dunn et al. | |
| 5,970,475 | A | 10/1999 | Barnes et al. | 705/27 |
| 6,003,006 | A | 12/1999 | Colella et al. | 705/2 |
| 6,016,499 | A | 1/2000 | Ferguson | |
| 6,134,549 | A | 10/2000 | Regnier et al. | |
| 6,144,726 | A | 11/2000 | Cross | 379/112 |
| 6,175,836 | B1 | 1/2001 | Aldred | |
| 6,493,742 | B1 | 12/2002 | Holland et al. | |
| 6,505,172 | B1 | 1/2003 | Johnson et al. | |
| 6,513,038 | B1 | 1/2003 | Hasegawa et al. | |
| 6,564,213 | B1 | 5/2003 | Ortega et al. | |
| 6,687,693 | B2 | 2/2004 | Cereghini et al. | |
| 6,850,900 | B1 | 2/2005 | Hare et al. | 705/26 |
| 6,892,185 | B1 * | 5/2005 | Van Etten et al. | 705/27 |
| 6,920,430 | B1 | 7/2005 | Berton et al. | 705/26 |
| 6,961,734 | B2 * | 11/2005 | Kauffman | 707/103 Z |
| 7,082,408 | B1 * | 7/2006 | Baumann et al. | 705/26 |
| 7,117,165 | B1 | 10/2006 | Adams et al. | 705/26 |
| 7,124,107 | B1 | 10/2006 | Pishevar et al. | 705/37 |
| 7,359,871 | B1 | 4/2008 | Paasche et al. | 705/26 |

(Continued)

FOREIGN PATENT DOCUMENTS

JP 2002-175217 6/2002

(Continued)

OTHER PUBLICATIONS

International Search Report for PCT/US2003/038346 dated Jan. 3, 2005.

(Continued)

*Primary Examiner* — Jeffrey A Smith
*Assistant Examiner* — Brandy Zukanovich
(74) *Attorney, Agent, or Firm* — Morgan, Lewis & Bockius LLP

(57) ABSTRACT

A single instance, multi-tenant procurement system, includes an access module to provide access to a plurality of end users associated with an organization to their respective accounts, each account being customized by a super user of the organization, a search engine to execute searches for products offered by one or more suppliers, a transaction module to process and track one or more requisitions generated by the plurality of end users, a business rules module to apply business rules established between the organization and the one or more suppliers to process the requisitions, and a data repository to store data generated on the system.

37 Claims, 138 Drawing Sheets

U.S. PATENT DOCUMENTS

| | | | | |
|---|---|---|---|---|
| 7,366,684 | B1 | 4/2008 | Douglas | 705/26 |
| 7,640,193 | B2 | 12/2009 | Crespo et al. | 705/26 |
| 7,647,247 | B2 | 1/2010 | Abraham et al. | 705/26 |
| 2001/0034733 | A1 | 10/2001 | Prompt et al. | |
| 2001/0042023 | A1 | 11/2001 | Anderson et al. | 705/26 |
| 2002/0007287 | A1 | 1/2002 | Straube et al. | |
| 2002/0052801 | A1 | 5/2002 | Norton et al. | 705/26 |
| 2002/0055888 | A1 | 5/2002 | Beran et al. | 705/26 |
| 2002/0065736 | A1 | 5/2002 | Willner et al. | |
| 2002/0077939 | A1 | 6/2002 | Nicastro et al. | 705/29 |
| 2002/0078039 | A1 | 6/2002 | Cereghini et al. | |
| 2002/0111879 | A1 | 8/2002 | Melero et al. | 705/26 |
| 2002/0120714 | A1 | 8/2002 | Agapiev | |
| 2002/0143726 | A1 | 10/2002 | Planalp et al. | |
| 2002/0161861 | A1 | 10/2002 | Greuel | |
| 2002/0174089 | A1 | 11/2002 | Tenorio | 70/1 |
| 2002/0178120 | A1* | 11/2002 | Reid et al. | 705/59 |
| 2003/0040935 | A1 | 2/2003 | Magee | 705/1 |
| 2003/0120641 | A1* | 6/2003 | Pelletier | 707/3 |
| 2003/0130910 | A1 | 7/2003 | Pickover et al. | 705/27 |
| 2003/0135582 | A1 | 7/2003 | Allen et al. | |
| 2003/0144924 | A1 | 7/2003 | McGee | |
| 2003/0220843 | A1 | 11/2003 | Lam et al. | 705/26 |
| 2003/0225650 | A1* | 12/2003 | Wilson et al. | 705/36 |
| 2004/0034595 | A1 | 2/2004 | Kugeman et al. | 705/40 |
| 2004/0059645 | A1* | 3/2004 | Wirth, Jr. | 705/27 |
| 2004/0103042 | A1* | 5/2004 | Ryu et al. | 705/26 |
| 2004/0117290 | A1 | 6/2004 | Shacham | 705/37 |
| 2004/0117355 | A1* | 6/2004 | Lef et al. | 707/3 |
| 2004/0177114 | A1 | 9/2004 | Friedman et al. | |
| 2004/0210526 | A1 | 10/2004 | Brown | 705/40 |
| 2004/0267629 | A1 | 12/2004 | Herrmann et al. | 705/26 |
| 2004/0267630 | A1* | 12/2004 | Au et al. | 705/26 |
| 2004/0267676 | A1 | 12/2004 | Feng et al. | 705/400 |
| 2005/0060245 | A1 | 3/2005 | Hoffman et al. | 705/28 |
| 2005/0075979 | A1 | 4/2005 | Leavitt et al. | 705/40 |
| 2005/0086122 | A1 | 4/2005 | Cirulli et al. | 705/26 |
| 2005/0165659 | A1 | 7/2005 | Gruber | 705/26 |
| 2005/0177507 | A1 | 8/2005 | Bandych et al. | 705/40 |
| 2005/0240493 | A1 | 10/2005 | Johnson et al. | 705/27 |
| 2005/0246216 | A1* | 11/2005 | Rosen et al. | 705/8 |
| 2005/0262088 | A1 | 11/2005 | Solis et al. | |
| 2006/0224412 | A1 | 10/2006 | Frank et al. | 705/1 |
| 2006/0235789 | A1 | 10/2006 | Koch | 705/39 |
| 2006/0259427 | A1 | 11/2006 | Randell et al. | 705/40 |
| 2006/0287954 | A1 | 12/2006 | DeWitt et al. | 705/40 |
| 2007/0016514 | A1 | 1/2007 | Al-Abdulqader et al. | 705/37 |
| 2007/0038566 | A1 | 2/2007 | Shestakov et al. | 705/44 |
| 2007/0100842 | A1* | 5/2007 | Wykes et al. | 707/100 |
| 2007/0143665 | A1 | 6/2007 | Machiraju et al. | 715/513 |
| 2007/0299736 | A1 | 12/2007 | Perrochon et al. | 705/26 |
| 2008/0162164 | A1 | 7/2008 | Segler et al. | 705/1 |
| 2008/0195506 | A1 | 8/2008 | Koretz et al. | 705/27 |
| 2009/0157548 | A1 | 6/2009 | Gong | 705/44 |
| 2009/0222279 | A1 | 9/2009 | Reiz | 705/1 |
| 2010/0023452 | A1 | 1/2010 | Brown | 705/40 |
| 2010/0030675 | A1 | 2/2010 | Hanan et al. | 705/34 |

FOREIGN PATENT DOCUMENTS

| | | |
|---|---|---|
| WO | WO 01/42882 A2 | 6/2001 |

OTHER PUBLICATIONS

Office Action for U.S. Appl. No. 10/318,814, dated Oct. 5, 2004.
Notice of Allowability for U.S. Appl. No. 10/318,814, Apr. 27, 2005.
Notice of Allowance, U.S. Appl. No. 12/283,280, Jan. 28, 2011, 11 pgs.
Office Action, Canadian Patent Application 2513715, Aug. 31, 2009, 4 pgs.
Office Action, European Patent Application 03787246.2, Mar. 22, 2007, 5 pgs.
Office Action, U.S. Appl. No. 12/283,274, Dec. 22, 2010, 13 pgs.
Office Action, U.S. Appl. No. 12/283,277, Sep. 29, 2010, 9 pgs.
Office Action, U.S. Appl. No. 12/283,278, Jun. 9, 2010, 9 pgs.
Office Action, U.S. Appl. No. 12/283,278, Jan. 22, 2010, 7 pgs.
Office Action, U.S. Appl. No. 12/283,280, Aug. 19, 2009, 15 pgs.
Office Action, U.S. Appl. No. 12/283,280, Jan. 28, 2009, 14 pgs.
Office Action, U.S. Appl. No. 12/286,506, Jul. 28, 2010, 15 pgs.
Office Action, U.S. Appl. No. 12/286,506, Sep. 30, 2009, 13 pgs.
Supplementary European Search Report, EP Application 03787246, Aug. 16, 2006, 2 pgs.
Watson, Tailor catalogs to capture savings, Purchasing, Dec. 13, 2007, vol. 136, Iss. 15, 2 pgs.
Notice of Allowance, U.S. Appl. No. 12/283,275, Mar. 16, 2011, 14 pgs.
Notice of Allowance, U.S. Appl. No. 12/283,280, Mar. 24, 2011, 6 pgs.
Office Action, U.S. Appl. No. 12/007,815, May 13, 2011, 18 pgs.
Final Office Action, U.S. Appl. No. 12/283,277, May 2, 2011, 10 pgs.
Office Action, U.S. Appl. No. 12/283,282, Apr. 13, 2011, 17 pgs.
Office Action, U.S. Appl. No. 12/286,506, Mar. 14, 2011, 15 pgs.
Office Action, U.S. Appl. No. 12/286,507, May 13, 2011 24 pgs.

* cited by examiner

| | | | | | | | |
|---|---|---|---|---|---|---|---|
| 3:34 PM | NEIL | PUNCHOUT ACCESS REMOVED | PUNCHOUT ACCESS | GATEWAY, INC. | | | |
| 3:34 PM | NEIL | PUNCHOUT ACCESS ADDED | PUNCHOUT ACCESS | XEROX | | | |
| 3:34 PM | NEIL | PUNCHOUT ACCESS ADDED | PUNCHOUT ACCESS | FISCHER SCIENTIFIC | | | |
| 3:34 PM | NEIL | PUNCHOUT ACCESS ADDED | PUNCHOUT ACCESS | WEST PRESS | | | |
| 3:34 PM | NEIL | PUNCHOUT ACCESS ADDED | PUNCHOUT ACCESS | IKON OFFICE PRODUCTS | | | |
| 7:49 AM | CHRISTINE | MODIFIED | PERMISSIONS : CART/REQUISITION | MODIFY PO CLAUSES IN PR/PO | VALUE | FALSE (INHERITED) | FALSE |
| 7:49 AM | CHRISTINE | MODIFIED | PERMISSIONS : CART/REQUISITION | WITHDRAW PR | VALUE | FALSE (INHERITED) | FALSE |
| 7:49 AM | CHRISTINE | MODIFIED | PERMISSIONS : CART/REQUISITION | BYPASS REVIEW | VALUE | FALSE (INHERITED) | FALSE |
| 7:49 AM | CHRISTINE | MODIFIED | PERMISSIONS : CART/REQUISITION | ALLOW EDITING OF TAX, SHIPPING, AND HANDLING | VALUE | FALSE (INHERITED) | FALSE |
| 7:49 AM | CHRISTINE | MODIFIED | PERMISSIONS : CART/REQUISITION | LINE-LEVEL EXTERNAL ATTACHMENTS | VALUE | FALSE (INHERITED) | FALSE |
| 7:49 AM | CHRISTINE | MODIFIED | PERMISSIONS : CART/REQUISITION | VIEW SENSITIVE CREDIT CARD DETAILS | VALUE | FALSE (INHERITED) | FALSE |
| 7:49 AM | CHRISTINE | MODIFIED | PERMISSIONS : CART/REQUISITION | SELECT CREDIT CARD FROM PROFILE | VALUE | FALSE (INHERITED) | FALSE |
| 7:49 AM | CHRISTINE | MODIFIED | PERMISSIONS : CART/REQUISITION | MANUALLY OVERRIDE PRICING | VALUE | FALSE (INHERITED) | FALSE |
| 7:49 AM | CHRISTINE | MODIFIED | PERMISSIONS : CART/REQUISITION | EDIT CREDIT CARD | VALUE | FALSE (INHERITED) | FALSE |
| 7:49 AM | CHRISTINE | MODIFIED | PERMISSIONS : CART/REQUISITION | EDIT PO NUMBER | VALUE | FALSE (INHERITED) | FALSE |
| 7:49 AM | CHRISTINE | MODIFIED | PERMISSIONS : CART/REQUISITION | EDIT USER'S CART ASSIGNEES | VALUE | FALSE (INHERITED) | FALSE |
| 7:49 AM | CHRISTINE | MODIFIED | PERMISSIONS : CART/REQUISITION | ASSIGN CARD TO ANOTHER USER | VALUE | FALSE (INHERITED) | FALSE |
| 7:49 AM | CHRISTINE | MODIFIED | PERMISSIONS : CART/REQUISITION | DO NOT PERMIT PLACE ORDER | VALUE | FALSE (INHERITED) | FALSE |

RESULTS PER PAGE 20 ☐ ◁PAGE 1 ☐ OF 11▷

GRAINGER, INC. ORGANIZATION PRICE USD NO CONTRACT ORGANIZATION EDIT...

| VERSION | NOTE | DATE AVAILABLE | REVIEWED BY... | DATE REVIEWED | DATE EFFECTIVE | COMMENTS | STATUS | SELECT |
|---|---|---|---|---|---|---|---|---|
| 1 | GRAINGER_WEET_102410.CSV WAS T...MORE... | 6:15 PM | | | | | NOT REVIEWED | ☐ |
| 0 | | 7:05 PM | | | | | IMPLICITLY APPROVED | ☐ |

MATRIX TECHNOLOGIES ORGANIZATION PRICE USD NO CONTRACT ORGANIZATION EDIT...

| VERSION | NOTE | DATE AVAILABLE | REVIEWED BY... | DATE REVIEWED | DATE EFFECTIVE | COMMENTS | STATUS | SELECT |
|---|---|---|---|---|---|---|---|---|
| 1 | | 12:29 PM | | | | PRICING UPDATE | NOT REVIEWED | ☐ |
| 0 | | 11:19 PM | | | | | IMPLICITLY APPROVED | ☐ |

OFFICE MAX ORGANIZATION PRICE USD NO CONTRACT ORGANIZATION EDIT...

| VERSION | NOTE | DATE AVAILABLE | REVIEWED BY... | DATE REVIEWED | DATE EFFECTIVE | COMMENTS | STATUS | SELECT |
|---|---|---|---|---|---|---|---|---|
| 1 | OFFICE_MAX_CONTRACT_WEET_10239... MORE... | 11:27 AM | | | | | NOT REVIEWED | ☐ |
| 0 | | 11:19 PM | | | | | IMPLICITLY APPROVED | ☐ |

SCIQUEST, INC ORGANIZATION PRICE USD NO CONTRACT ORGANIZATION EDIT...

| VERSION | NOTE | DATE AVAILABLE | REVIEWED BY... | DATE REVIEWED | DATE EFFECTIVE | COMMENTS | STATUS | SELECT |
|---|---|---|---|---|---|---|---|---|
| 6 | | 11:28 AM | | | | | NOT REVIEWED | ☐ |
| 5 | | 7:46 AM | | | | IMPORTING NON-ERRORED ROWS | NOT REVIEWED | ☐ |
| 4 | | 7:39 AM | | | | | NOT REVIEWED | ☐ |
| 3 | | 10:20 AM | | | | | NOT REVIEWED | ☐ |
| 2 | | 11:40 AM | | | | | NOT REVIEWED | ☐ |
| 1 | | 11:40 AM | | | | | NOT REVIEWED | ☐ |
| 0 | | 7:44 AM | | | | | NOT REVIEWED | ☐ |

*FIG. 9F (cont)*

INITIAL FAVORITES ENTRY

ACTIVE FOLDERS | EDIT FOLDERS

10100

LEGEND | ?

UNCHECK ALL

DETAILS | ADD TO ACTIVE CART

| FOLDER NAME/ PRODUCT NICKNAME | SUPPLIER | CATALOG NO. | QTY. | PRICE ESTIMATE | SELECT |
|---|---|---|---|---|---|
| MY FAVORITES ADD NON-CATALOG ITEM... | | | | | ☐ |
| 2-FLUORO-3-(TRIFLUOROMETHYL) BENZYL ALCOHOL, 96%, 0.25g | LANCASTER SYNTHESIS | 12306-0.25g | 1 | 9.99 USD | ☐ |
| AA CONTRACT TEST-BUFFER ASL, LYSIS BUFFER FOR USE WITH QIAAMP DNA STOOL MINI KIT ( CAT NO. 51504), 560 mL | QIAGEN, INC. | 19082 | UNAVAILABLE | | |
| AA CONTRACT TEST-CONTRACTED PRODUCT... | VWR SCIENTIFIC PRODUCTS | 3384-0448 | 2 | 450.00 USD | ☐ |
| AA CONTRACT TEST- SECOND CONTRACTED ITEM... | VWR SCIENTIFIC PRODUCTS | CONTRACT-2 | 1 | 1,000.00 USD | ☐ |
| AIRPORE TAPE SHEETS, MICROPOROUS TAPE SHEETS FOR COVERING96-WELL BLOCKS: 25 SHEETS PER PACK, AIRPORE MICROPOROUS TAPE SHEETS ARE IDEAL FOR BACTERIAL CULTIVATION IN BLOCKS, AS THEY PROMOTE GAS EXCHANGE DURING CULTURING | FISHER SCIENTIFIC | NC9942890 CHECK AVAILABILITY... | 1 | 37.00 USD | ☐ |
| BENZYLQUISQUALIC ACID | FAVORITE DESCRIPTION WHEN INITIALLY ADDED TO FAVORITES BY | B-1073 1mg | UNAVAILABLE | | |
| BOTTLE, DROP-DISPENSING, TEF30ML | | 16354-320 | 1 | 37.99 USD | ☐ |
| BUFFER ASL, LYSIS BUFFER FOR USE WITH QIAAMP DNA STOOL MINI KIT (CAT NO. 51504), 560 mL | INDUSTRIES | 19082 | 1 | 8.88 EUR | ☐ |
| CAD- HISPEED PLASMID MAXI KIT (25), FOR ULTRAFAST PURIFICATION OF UP TO 750μg PLASMID OR COSMID DNA | INDUSTRIES | 111 | 1 | 13.45 USD | ☐ |
| HISPEED PLASMID MAXI KIT (25). FOR ULTRAFAST PURIFICATIONOF UP TO 750μg PLASMID OR COSMID DNA | INDUSTRIES | 111 | 1 | 13.45 USD | ☐ |

FIG. 64

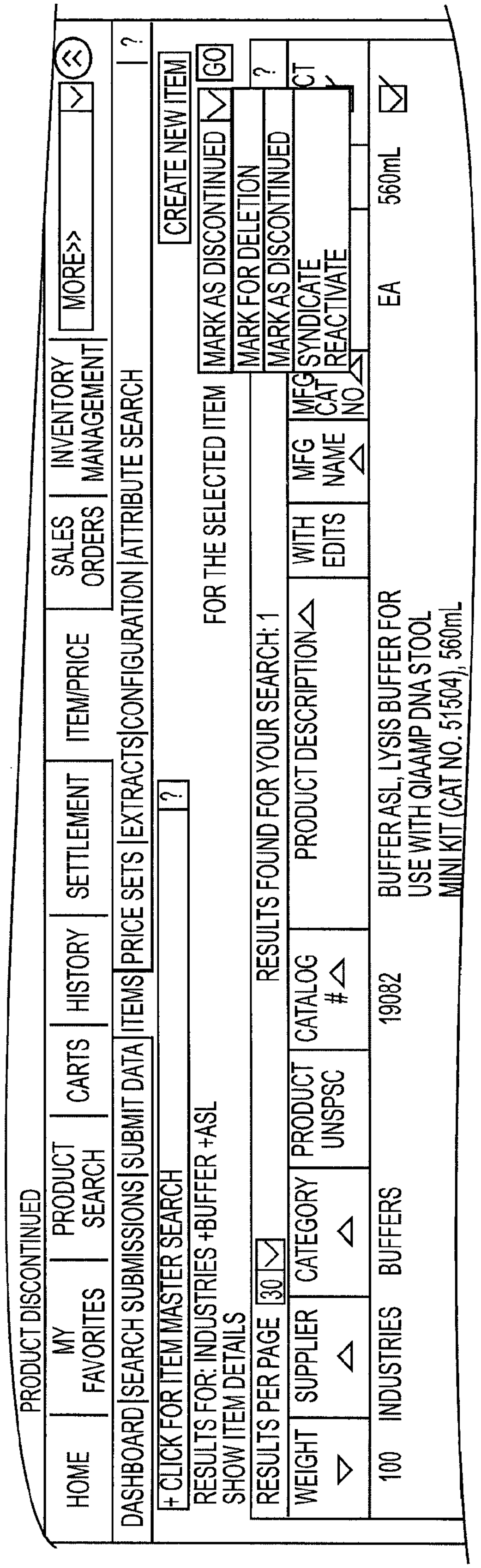
FIG. 64 (CONT'D-1)

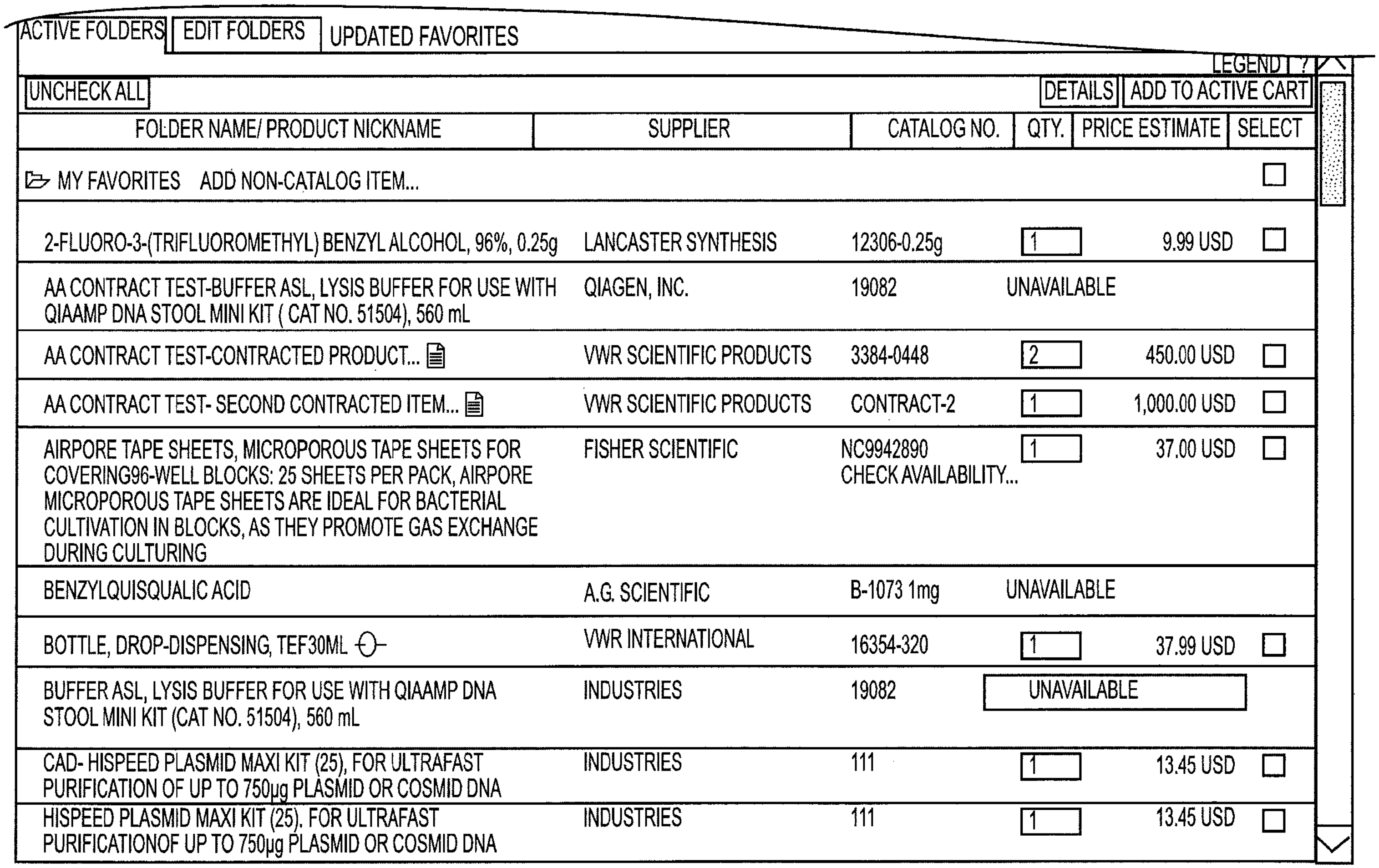
FIG. 64 (CONT'D-2)

MULTI-CONSTITUENT ATTRIBUTION OF A VENDOR'S PRODUCT CATALOG

RELATED APPLICATIONS

This application is a continuation-in-part of U.S. patent application Ser. No. 12/283,280, "Form Management in an Electronic Procurement System," filed on Sep. 9, 2008, which is hereby incorporated entirely herein by reference.

This application claims the benefit and priority of U.S. Provisional Patent Application Ser. No. 61/130,028, filed on May 27, 2008, which is hereby incorporated entirely herein by reference.

This application is related to U.S. patent application Ser. No. 10/318,814, filed Dec. 13, 2002, now U.S. Pat. No. 6,944, 613 entitled "Method and System for Creating a Database and Searching the Database for Allowing Multiple Customized Views, issued on Sep. 13, 2005, which is hereby incorporated entirely herein by reference.

This application is related to U.S. patent application Ser. No. 12/283,276, "Taxonomy and Data Structure for an Electronic Procurement System" filed on Sep. 9, 2008, which is hereby incorporated entirely herein by reference.

This application is related to U.S. patent application Ser. No. 12/283,275, "Shopping Cart Management in an Electronic Procurement System" filed on Sep. 9, 2008, which is hereby incorporated entirely herein by reference.

This application is related to U.S. patent application Ser. No. 12/283,274, "Workflow and Material Management in an Electronic Procurement System" filed on Sep. 9, 2008, which is hereby incorporated entirely herein by reference.

This application is related to U.S. patent application Ser. No. 12/283,279, "Multi-Currency Normalization In An Electronic Procurement System" filed on Sep. 9, 2008, which is hereby incorporated entirely herein by reference.

See CIP reference above.

This application is related to U.S. patent application Ser. No. 12/283,277, "Identifying and Resolving Discrepancies Between Purchase Documents and Invoices" filed on Sep. 9, 2008, which is hereby incorporated entirely herein by reference.

This application is related to U.S. patent application Ser. No. 12/283,278, "Providing Substitute Items When An Ordered Item Is Unavailable" filed on Sep. 9, 2008, which is hereby incorporated entirely herein by reference.

This application is related to U.S. patent application Ser. No. 12/283,281, "Prioritizing Order And Receipt Of Items Between Users" filed on Sep. 9, 2008, which is hereby incorporated entirely herein by reference.

This application is related to U.S. patent application Ser. No. 12/283,282, "Invoice Workflow" filed on Sep. 9, 2008, which is hereby incorporated entirely herein by reference.

Reference to this application removed.

This application is related to U.S. patent application Ser. No. 12/286,506, "SKU Based Contract Management in an Electronic Procurement System" filed on the same date as this application, which is hereby incorporated entirely herein by reference.

This application is related to U.S. patent application Ser. No. 12/286,507, "Purchase Requisition Importation in an Electronic Procurement System" filed on the same date as this application, which is hereby incorporated entirely herein by reference.

FIELD OF INVENTION

The present invention relates generally to the field of procurement and, in particular, to a system and method for creating custom item attributes, defining the custom item attributes using one or more sub-attributes, and assigning the custom item attributes to one or more items, catalogs, and/or suppliers, over a network using a single instance system that supports multi-tenants in a multi-business to multi-consumer type environment.

BACKGROUND OF INVENTION

Current e-commerce systems and methods provide consumers and businesses the ability to browse product lines and consummate sales transactions. However, current e-commerce systems do not allow for easy customization of the needed functionality to facilitate the transaction. While current systems can be customized for a specific business or customer, the customization is a time consuming and complicated task. These customizations must generally be hard coded into the application by the developers, thereby incurring increases in costs, delay in implementation, and loss of productivity. In the field of procurement, for example, an organization in need of a product or service generally has contractual relationships with multiple vendors to provide the desired product or service. The contractual relationship may define such terms as price, lot size, form of delivery, amount of discount, and other business rules. These rules may become complex as one term may influence other terms, such as different levels of discounts based on the number of items ordered.

Procurement systems also generally require order authorization from a procurement officer of the organization or someone in charge of reviewing the orders for compliance with internal policies of the organization, in addition to the contractual relationships with the vendors. These orders must be processed and tracked as the orders progress through the approval process such that the individuals placing orders are notified of whether the order was approved or denied, as well as for internal audit purposes.

Furthermore, procurement systems also do not currently provide features that would allow users to create custom item attributes, define the custom item attributes using one or more sub-attributes, and assign the custom item attributes to one or more items, catalogs, and/or suppliers. Therefore, there is a need for a system and method that can provide an efficient and simple procurement process that is easily customizable for multiple organizations and multiple vendors with simple and complex business terms, and can also provide a single point-of-access for both businesses and consumers to interface, interact, and implement and execute transactions, in accordance with existing or newly defined relationships, using a custom and configurable methodology for realizing their requirements.

SUMMARY OF THE INVENTION

Accordingly, the present invention is directed to a procurement system and method over a network using a single instance multi-tenant architecture that substantially obviates one or more problems due to limitations and disadvantages of the related art.

An object of the present invention is to provide a system and method that can provide an efficient and simple procurement process that is easily customizable for multiple organizations and multiple vendors with simple and complex business terms, and can also provide a single point-of-access for both businesses and consumers to interface, interact, and implement and execute transactions, in accordance with existing or newly defined relationships, using a custom and configurable methodology for realizing their requirements.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a single instance, multi-tenant procurement system includes a server system hosting an electronic procurement system, comprising: an access module for receiving a user request for access to the system and granting access to the system; a catalog module for receiving a user request to add a new item to a database and new item data from the user, wherein the catalog module stores the new item data in the database for access by users of the electronic procurement system.

In another aspect, a server system hosting an electronic procurement system comprises: an access module for receiving a user request for access to the system and granting access to the system; a catalog module for receiving a user request to add a new supplier to a database and new supplier data from the user, wherein the catalog module stores the new supplier data in the database for access by users of the electronic procurement system.

In another aspect, a client system communicating with an electronic procurement system comprises: a client interface for sending a request for access to the system and receiving access to the system, wherein the client interface sends a request to add a new item to a database, and wherein the client interface sends new item data to the system for storage in the database for access by users of the electronic procurement system.

In another aspect, a client system communicating with an electronic procurement system comprises: a client interface for sending a request for access to the system and receiving access to the system, wherein the client interface sends a request to add a new supplier to a database, and wherein the client interface sends new supplier data to the system for storage in the database for access by users of the electronic procurement system.

In another aspect, a server hosting an electronic procurement system comprises: an access module for receiving a user request for access to the system and granting access to the system; a form management module for receiving a user request to create a custom form for accessing a database, wherein the database stores data associated with items; and a manage privileges module for checking user privileges to determine if a user may create the custom form.

In another aspect, a client system communicating with an electronic procurement system comprises: a client interface for sending a request for access to the system and receiving access to the system, wherein the client interface sends a request to create a custom form for accessing a database that stores items.

In another aspect, a server system hosting an electronic procurement system comprises: an access module for receiving a user request for access to the system and granting access to the system; and a catalog module for receiving a user request to create a custom search field or attribute for searching a database.

In another aspect, a client system communicating with an electronic procurement system comprises: a client interface for sending a request for access to the system and receiving access to the system, wherein the client interface sends a user request to create a custom search field or attribute for searching a database.

In another aspect, a server system hosting an electronic procurement system comprises: an access module for receiving a user request for access to the system and granting access to the system; a contract management module for managing a procurement contract between at least one organization and at least one supplier, wherein the contract management module associates the procurement contract with a group, and wherein the contract management module updates at least the group if amendments are made to the procurement contract or contractual events occur.

In another aspect, a client system communicating with an electronic procurement system comprises: a client interface for sending a request for access to the system and receiving access to the system, wherein the client interface receives data for managing a procurement contract between at least one organization and at least one supplier, wherein the client interface sends data for associating the procurement contract with a group, and wherein a user receives updates using a client interface if amendments are made to the procurement contract or contractual events occur.

In another aspect, a server system, comprises: one or more processors; memory; one or more programs stored in the memory, the one or more programs comprising instructions to: at a server system hosting an electronic procurement system: receive a user request for access to the system; grant access to a user; receive a user request to create a custom item attribute; and receive a user request to define the custom item attribute according to a sub-attribute.

In another aspect, server system, comprises: one or more processors; memory; one or more programs stored in the memory, the one or more programs comprising instructions to: at a client system communicating with an electronic procurement system: sending a user request for access to the system; receiving access to the system; sending a user request to create a custom item attribute; and sending a user request to define the custom item attribute according to a sub-attribute.

In another aspect, a computer-implemented method includes the steps of, at a server system hosting an electronic procurement system: receiving a user request for access to the system; granting access to the system; receiving a user request to add a new item to a database; and receiving new item data from the user and storing the new item data in the database for access by users of the electronic procurement system.

In yet another aspect, a computer-implemented method includes the steps of, at a server system hosting an electronic procurement system: receiving a request for access to the system; granting access to the system; receiving a request to add a new supplier to a database; and receiving new supplier data and storing the new supplier data in the database for access by users of the electronic procurement system.

In yet another aspect, a computer-implemented method includes the steps of, at a client system communicating with an electronic procurement system: sending a request for access to the system; receiving access to the system; and sending a request to add a new item to a database and sending new item data to the system for storage in the database for access by users of the electronic procurement system.

In yet another aspect, a computer-implemented method includes the steps of, at a client system communicating with an electronic procurement system: sending a request for access to the system; receiving access to the system; and sending a request to add a new supplier to a database and sending new supplier data to the system for storage in the database for access by users of the electronic procurement system.

In yet another aspect, a computer-implemented method includes the steps of, at a server hosting an electronic procurement system: receiving a user request for access to the system; granting access to the system; receiving a user request to create a custom form for accessing a database, wherein the database stores data associated with items; and checking user privileges to determine if a user may create the custom form.

In yet another aspect, a computer-implemented method includes the steps of, at a client system communicating with an electronic procurement system: sending a request for access to the system; receiving access to the system; and sending a request to create a custom form for accessing a database that stores items.

In yet another aspect, a computer-implemented method includes the steps of, at a server system hosting an electronic procurement system: receiving a user request for access to the system; granting access to the system; and receiving a user request to create a custom search field or attribute for searching a database.

In yet another aspect, a computer-implemented method includes the steps of, at a client system communicating with an electronic procurement system: sending a user request for access to the system; receiving access to the system; and sending a user request to create a custom search field or attribute for searching a database.

In yet another aspect, a computer-implemented method includes the steps of, at a server system hosting an electronic procurement system: receiving a user request for access to the system; granting access to the system; managing a procurement contract between at least one organization and at least one supplier; associating the procurement contract with a group; and updating at least the group if amendments are made to the procurement contract or contractual events occur.

In yet another aspect, a computer-implemented method includes the steps of, at a client system communicating with an electronic procurement system: sending a request for access to the system; receiving access to the system; managing a procurement contract between at least one organization and at least one supplier; associating the procurement contract with a group; and receiving updates if amendments are made to the procurement contract or contractual events occur.

In yet another aspect, a computer-implemented method includes the steps of, at a server system hosting an electronic procurement system: receiving a user request for access to the system; granting access to a user; receiving a user request to create a custom item attribute; and receiving a user request to define the custom item attribute according to a sub-attribute.

In yet another aspect, a computer-implemented method includes the steps of, at a client system communicating with an electronic procurement system: sending a user request for access to the system; receiving access to the system; sending a user request to create a custom item attribute; and sending a user request to define the custom item attribute according to a sub-attribute.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings:

FIG. 64 illustrates an exemplary update favorite(s) process flow in accordance with the present invention;

DETAILED DESCRIPTION

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on any type of client-server compatible system containing any type of client, network, server, and database elements.

The terms module, engine, and application are used interchangeably herein.

Figure 1:
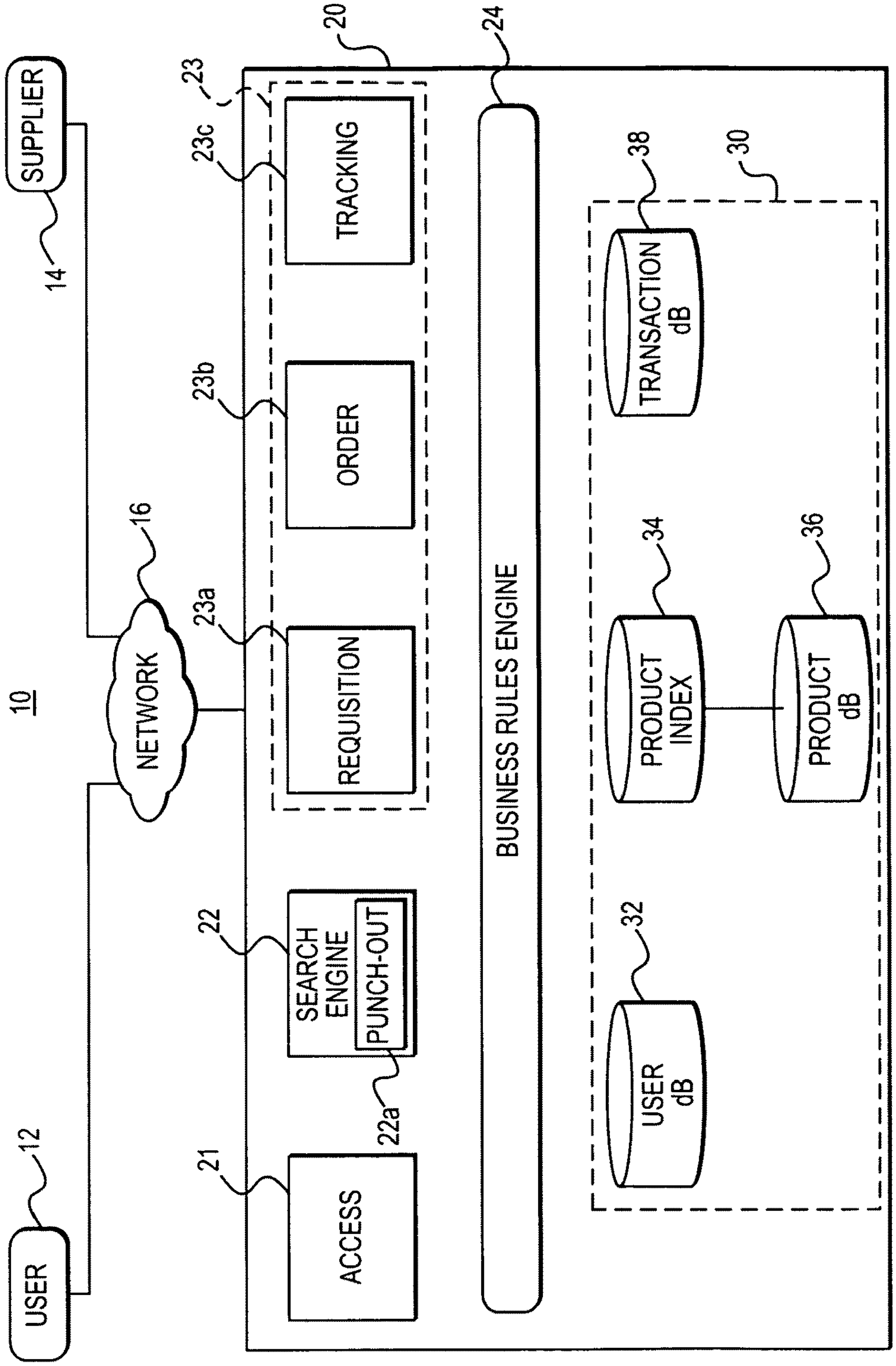
FIG. 1 is a block diagram illustrating an exemplary embodiment of an eProcurement system in accordance with the present invention.

FIG. 1 is a block diagram illustrating an exemplary embodiment of an eProcurement system in accordance with the present invention. The term "eProcurement architecture" used herein refers to a system and method that facilitates customized searching, data modeling, and order processing over an electronic network, using a client-server type architecture, where multi-tenants (e.g., end users/consumers, supplier users, etc.) can realize each of their specific business requirements with respect to the process of initiating and consummating transactions. In general, the eProcurement architecture of the present invention facilitates transactions between end users and suppliers. The end users may be individual users or members of an organization, such as a company or institution. For example, the end users may be any member of the organization authorized for performing procurement operations for the organization or the end user may be an individual of a sole proprietorship.

In a multi-person organization, procurement operations of the organization are setup in a multi-level structure with a group of individuals who make requests for requisitions and an authorizing entity (e.g., manager) who approve such requests based on the organization's procurement policies. There may be a plurality of individuals assigned as the authorizing entity, and the authorizing entity may itself include multiple levels of authority with each higher level having more control over the procurement operations. The procurement policies may define the levels of authority, such as who can order what, and include one or more contractual relationships between the organization and one or more suppliers. By way of example only, the procurement policy may define that the lowest level end user of a particular department can only order certain products or services while a higher level end user can order or authorize orders of broader categories of products and/or services. In another example, the procurement policy may require that certain products or services be ordered exclusively from a supplier with an exclusive contract with the organization. As another example, the procurement policy may require that a particular product be ordered in a predetermined lot size due to a contractual discount negotiated from a particular supplier. The eProcurement architecture of the present invention facilitates transactions between multiple end users of any level of any organization with multiple suppliers taking into account the procurement policies associated with each end user and supplier on a single platform (i.e., single instance, multi-tenant architecture).

As shown in FIG. 1, the eProcurement system 10 of the present invention includes end users 12, supplier users 14, and the procurement module 20 connected over a data communications network 16. The procurement module 20 includes access module 21, search engine 22, transaction module 23, business rules engine 24, and data repository 30. The data repository 30 may include one or more databases to store user data 32, hosted product index 34, product data 36, and transaction data 38.

The access module 21 allows the end users and suppliers to set up and gain access to their respective accounts in the eProcurement system 10. For example, the access module 21 may include registration/account setup procedures to create a new account on the eProcurement system 10. The access module 21 may also include authentication procedures (e.g., login ID and password) to determine the identity of the user and the user's profile (e.g., associated organization, level of access, etc.) before granting access to the procurement module 20. Once granted access, the user may configure the account for customized access. If the user is a "super user" (i.e., a user with higher levels of access, such as a procurement supervisor of an organization), the super user may set conditions for access of other users from his organization. If the user is a supplier, the supplier user may create or update the supplier account or provide/update product/service information (e.g., product catalog).

The search engine 22 allows the user to search through the hosted product index 34 to find a product and/or service provided by the one or more suppliers. In general, the search engine 22 searches through the hosted product index 34, which contains tokenized data of all the products from all the suppliers stored in the product database 36. The search results of the search are processed by the business rules engine 24 and displayed to the user based on the business rules set for the user and the user's organization. The search engine 22 includes a punch-out module 22*a* that allows the user to "punch-out" to an unhosted supplier catalog for products/services not available through the eProcurement system 10. The user can only access those punch-out suppliers configured for him/her according to the business rules engine 24.

The transaction module 23 includes one or more of requisition module 23*a*, order module 23*b*, and tracking module 23*c* to facilitate a transaction with one or more suppliers. The requisition module 23*a* processes items selected by the user from the search engine 22 and creates a requisition. If authorization is required, the requisition module 23*a* notifies the designated authorizing entity of the requisition to obtain authorization. If the requisition is denied, the requisition module 23*a* sends a notification back to the user of the decision. If the requisition is approved, the user is notified and the requisition either a) is sent to order module 23*b*, or b) is marked as "complete" based on the business rules engine 24 because not all requisitions are necessarily converted to orders. The order module 23*b* converts the requisition into a purchase order according to the business rules in the business rules engine 24. The order module 23*b* sends the purchase order to the appropriate supplier in the proper format(s) designated for that supplier. Once the purchase order has been sent, the tracking module 23 receives confirmation of the purchase orders from the suppliers and keeps track of the purchase orders through the fulfillment process.

In general, a user (i.e., end user, super user, supplier user, etc.) gains access to the procurement module 20 through the access module 21. The access module 21 may include security measures, such as authentication (e.g., providing user ID and password), to identify the user by accessing the user data stored in the user database 32. User accounts may also be created through the access module 21. For example, a user (generally a super user) creates an account on the eProcurement system 10 by registering through the access module 21. The account may also be created by a system administrator of the eProcurement system 10 off-line who gives access to the user via emailing a registration link to the access module 21. Once an account has been created, the user may access the eProcurement system 10 through the access module 21.

Figure 2:
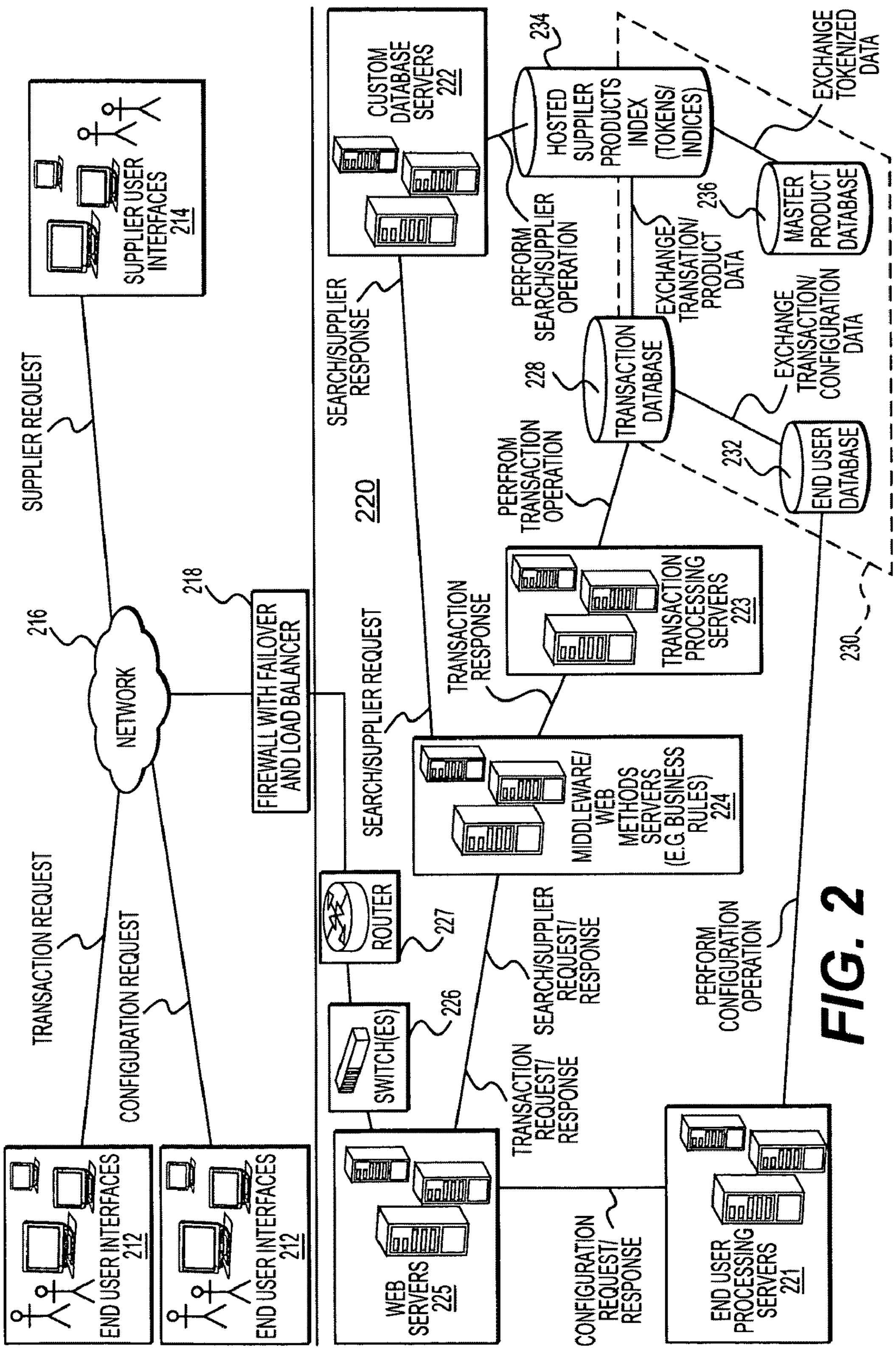
FIG. 2 illustrates an exemplary embodiment of an eProcurement architecture in accordance with the present invention.

FIG. 2 illustrates an exemplary embodiment of an eProcurement architecture in accordance with the present invention. As shown in FIG. 2, the eProcurement architecture of the present invention may include one or more end user/consumer interfaces 212 and supplier user interfaces 214, which may connect to one or more servers 220 over a wired or wireless network 216. These one or more servers 220 may be for user processing (e.g., end user processing servers 221), product database hosting (e.g., custom database servers 222), transaction processing (e.g., transaction processing servers 223), middleware/web methods (e.g., middleware/web methods servers (e.g., business rules) 224—e.g., for implementing business rules between end users and supplier users), and communication processing (e.g., web servers 225), such as streaming data/media, file hosting (e.g., FTP—File Transfer Protocol—server), web serving (e.g., HTTP/HTTPS, WWW, CGI—Common Gateway Interface, ASP—Active Server Pages, Servlets, JSP—Java Server Pages, etc.), facsimile transmission, proxy, telnet, chat, list, mail (e.g., SMTP—Simple Mail Transfer Protocol), news (e.g., NNTP—Network News Transfer Protocol), groupware, and other communication/data processing purposes. These one or more servers 220 may be hosted behind or outside a firewall 218 with or without failover and/or load balancers. These one or more servers 220 may be hosted over the Internet, within the same Intranet and/or subnet, on different Intranets and/or subnets, or in any other inter-networked configuration of network 216. The servers 220 may be implemented on Microsoft™ Windows NT/2000/XPT™/XP Professional/

Server™/Vista™ (e.g., Microsoft™ Internet Information Services (IIS)), Apache, Unix™, z/OS™, z/VMT™, Linux™, VMS, Netscape Enterprise Server™, iPlanet™ Web Server, Sun Java System Web Server, Oracle™ Server, SQL Server™ (e.g., Microsoft™, Sybase™, MySQL™ etc.), Terradata server applications, or any other compatible server technology.

End user interfaces 212 and supplier user interfaces 214 may be implemented on Internet web browsers such as Microsoft Internet Explorer™, Netscape Navigator™, Mozilla™ Firefox™, Opera, Satori, Blazer, or any other Internet web browser capable of sending and receiving data using the Hypertext Transfer Protocol (HTTP). The data may be transferred over an encrypted and authenticated communication layer (i.e., using secure HTTP, or as more commonly known, HTTPS). End user interfaces 212 and supplier user interfaces 214 may be implemented using a combination of HTML (Hypertext Markup Language), Macromedia Flash™, XML (Extensible Markup Language), CGI (Client Gateway Interface), ASP (Active Server Pages), JSP™ (JavaServer Pages), PHP (Hypertext Preprocessor), Java, C/C++, Visual Basic™, Visual Basic Script, Perl™, TclTFk, SQL (Structured Query Language), and any other relevant markup/programming/scripting/query language or development environment.

Communication from the end user interfaces 212 and supplier user interfaces 214 to the server or plurality of servers 220, via the firewall 218 with failover and load balancer, may be implemented over wired communication protocols through network 216. For example, at the Wide Area Network (WAN) level or at the Local Area Network (LAN) level, routed Internet Protocol (IP) packets may be transported using the IEEE 802.3 Ethernet standard, for example, on the data link network layer. However, any network standard may be used, whether for packet encapsulation, path determination and logical addressing, or physical addressing, at any layer of these layers without departing from the scope of the invention. Also, the packet data may be transported over interconnected hubs (not shown), switches 226, routers 227, and other network elements. At the WAN level, protocols such as Packet over Synchronous Optical Network (SONET) or Synchronous Digital Hierarchy (SDH), Asynchronous Transfer Mode (ATM) over SONET, Multi-protocol Label Switching (MPLS), packet over Frame Relay, or other analogous protocols may be used to deliver data over longer distances. Interconnect repeaters, multiplexers (e.g., add/drop), and cross connects may be used to facilitate and ensure accurate transmission over the long-haul from point-to-point.

Communication from the end user interface 212 and supplier user interfaces 214 to the server or plurality of servers 220, via the firewall 218 with failover and load balancer, may also be implemented over wireless communication protocols over network 216. For example, at the LAN level (i.e., WiFi), standards such as 802.11a, 802.11b, 802.11g, and 802.11n may be used to deliver data from point-to-point. Similarly, at the Metropolitan Area Network (MAN)/WAN level, standards such as 802.16e (i.e., WirelessMAN), WiMax, Universal Mobile Telecommunications System (UMTS) over Wideband Code Division Multiple Access (W-CDMA), GSM, GPRS, or EDGE may also be used to deliver data from point-to-point. As with the wired networks, other standards and protocols may be used without departing from the scope of the invention.

The eProcurement architecture of the present invention includes a data repository 230. The data repository 230 may be implemented using one or more databases to store end user data 232, hosted product index 234, master product data 236, and transaction data 238, in accordance with business rules (implemented via, for example, a business rules engine 24). The data repository 230 may be implemented using any type of data storage device without departing from the scope of the present invention. Moreover, the data repository 230 may be managed by any database platform (e.g., Oracle, Microsoft Access, IBM DB2, etc.) without departing from the scope of the present invention.

End user interfaces 212 and supplier user interfaces 214 may also allow an implemented feature that enables the setting of user configuration preferences. This feature allows a super user, with enhanced administrative capabilities, to have full access to the features of end user and supplier user interfaces. Some of these features may include: sending an email notification of a specific requisition order, and a corresponding link for accessing the same; full access to the features of the end user and supplier user interfaces; the capability to approve or reject a full order or a specific order item requested by an end user; the capability to take ownership and/or control of a specific requisition order, which may be organized according to a product or supplier category; the capability to expedite or accelerate an order through to specific steps along the ordering process, including the final review step; and, the capability to invoke and view a summary and history of each end user's latest order activity.

Moreover, a super user, for example, may design and/or otherwise configure and customize the style, type, layout, and level of data that is displayed on the respective end user interface 212 and supplier interface 214 for their respective organizations. A super user is also able to invoke a setup feature to choose which end users may have access to specific suppliers. Furthermore, a super user may also determine what information is required from the end users and supplier users of their respective organization, and determine the level of access at which an end user may access a specific supplier within the hosted supplier products catalog. This capability enables a super user to configure, for example, whether an end user can view specific products from specific suppliers, the currencies given for product/item pricing, and place orders. Moreover, the end user interface of the present invention allows for features of the present invention to be configured as permission driven. As such, certain features may be accessible to each end user, based on the end user's precedence within the organization, which likely affects his/her corresponding permission level. In addition, each feature is configurable to each end user based on a set of variable options. These variable options may include the ability to set a specific layout/view, a preferred number of search results, a preferred list of products, or a preferred list of suppliers. Also, each feature may include a help function that allows an end user to resolve inquiries or difficulties relating to the feature. The end user interface implementation is usually account login-based and, as described in further detail above, may encompass multiple server types (e.g., running a Linux OS), a redundant firewall and load balancer, and a priority-based software programming architecture (e.g., implemented in JAVA and JSP).

Figure 3:
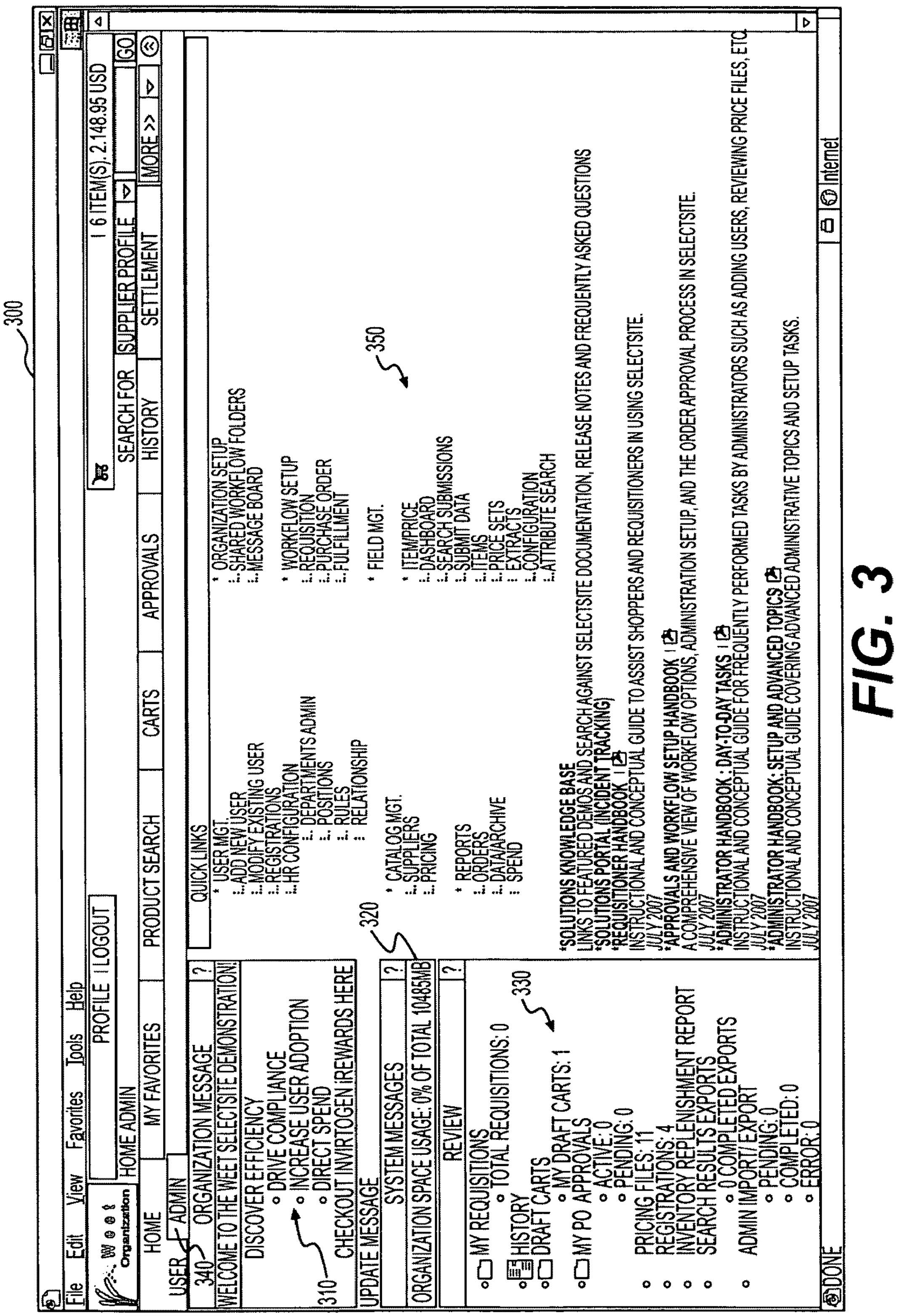
FIG. 3 illustrates an exemplary user interface in accordance with the present invention.

FIG. 3 illustrates an exemplary user interface in accordance with the present invention. For purposes of example only, an end user interface is used to describe various aspects of the present invention. As shown in FIG. 3, user interface 300 provides customized information for the user. For example, the user is a member of a fictitious group named Weet Organization. The user interface 300 includes one or more of an organizational message area 310, any system message area 320, and task items area 330. In the example shown, the user is a super user and therefore, the "Admin" tab 340 is active. Had the user been an end user, the "User" tab would be active and the "Admin" tab 340 either would not be displayed or would be inactive. All of these areas and information displayed therein may be customized through the access module 21. Any configuration definitions are then stored in the user database 32 and invoked upon access/login.

FIG. 3 illustrates an exemplary embodiment of the configuration tools available to a super user. In general, the eProcurement system 10 of the present invention provides a super user the tools needed to configure every aspect of the eProcurement process of an organization for complete customization, thereby effectuating a single instance multi-tenant architecture. That is, the eProcurement system 10 establishes a centralized system that is customizable for each user and/or organization, thereby providing a robust and yet an efficient eProcurement system. More specifically, configuration tool 350 allows a super user to customize the configuration of the eProcurement system 10 specifically for an organization and its users. While exemplary configuration tools are shown, other tools may be included without departing from the scope of the present invention.

Figure 4A:
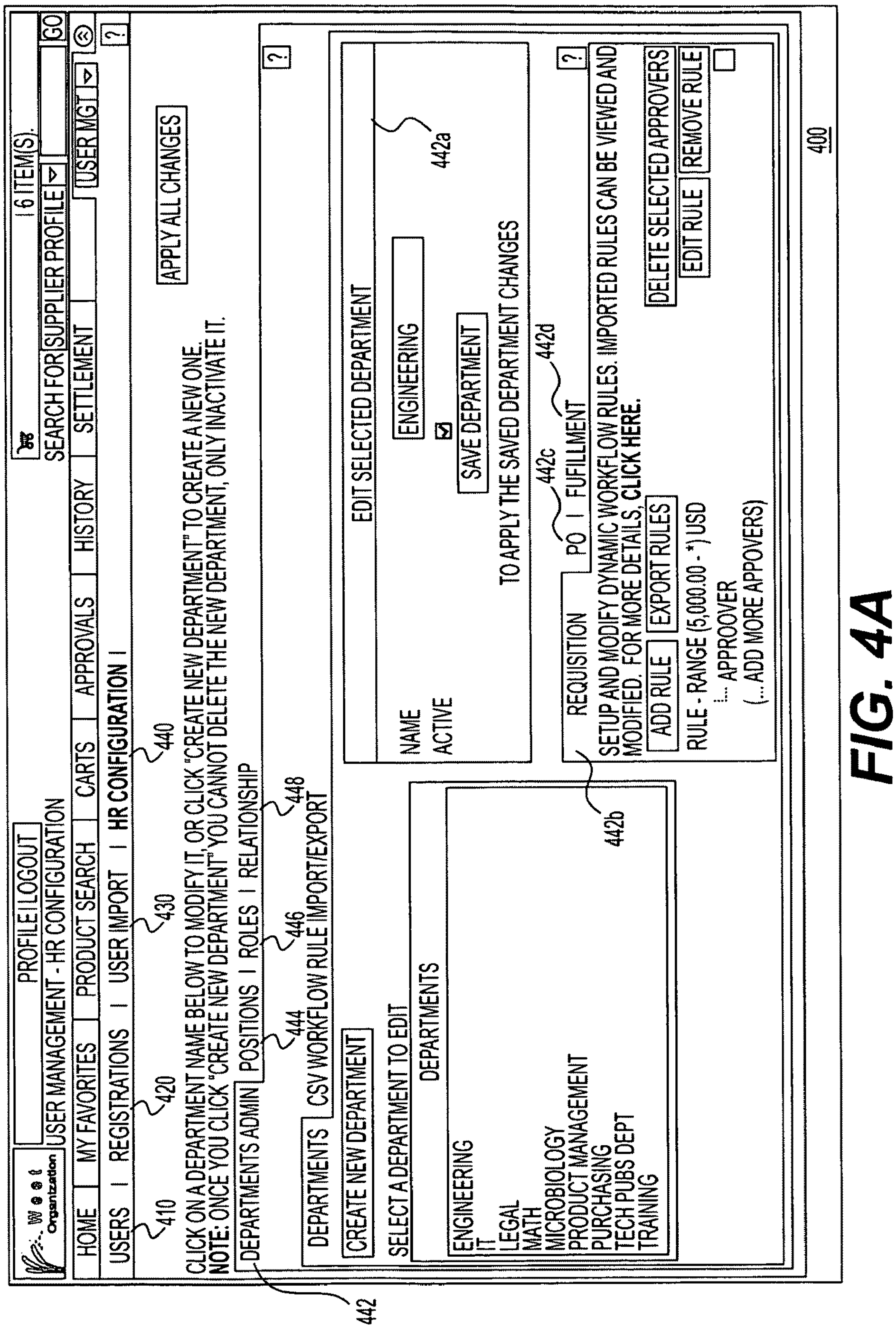
FIGS. 4A-4T illustrate exemplary user management tools in accordance with the present invention.
Figure 4B:
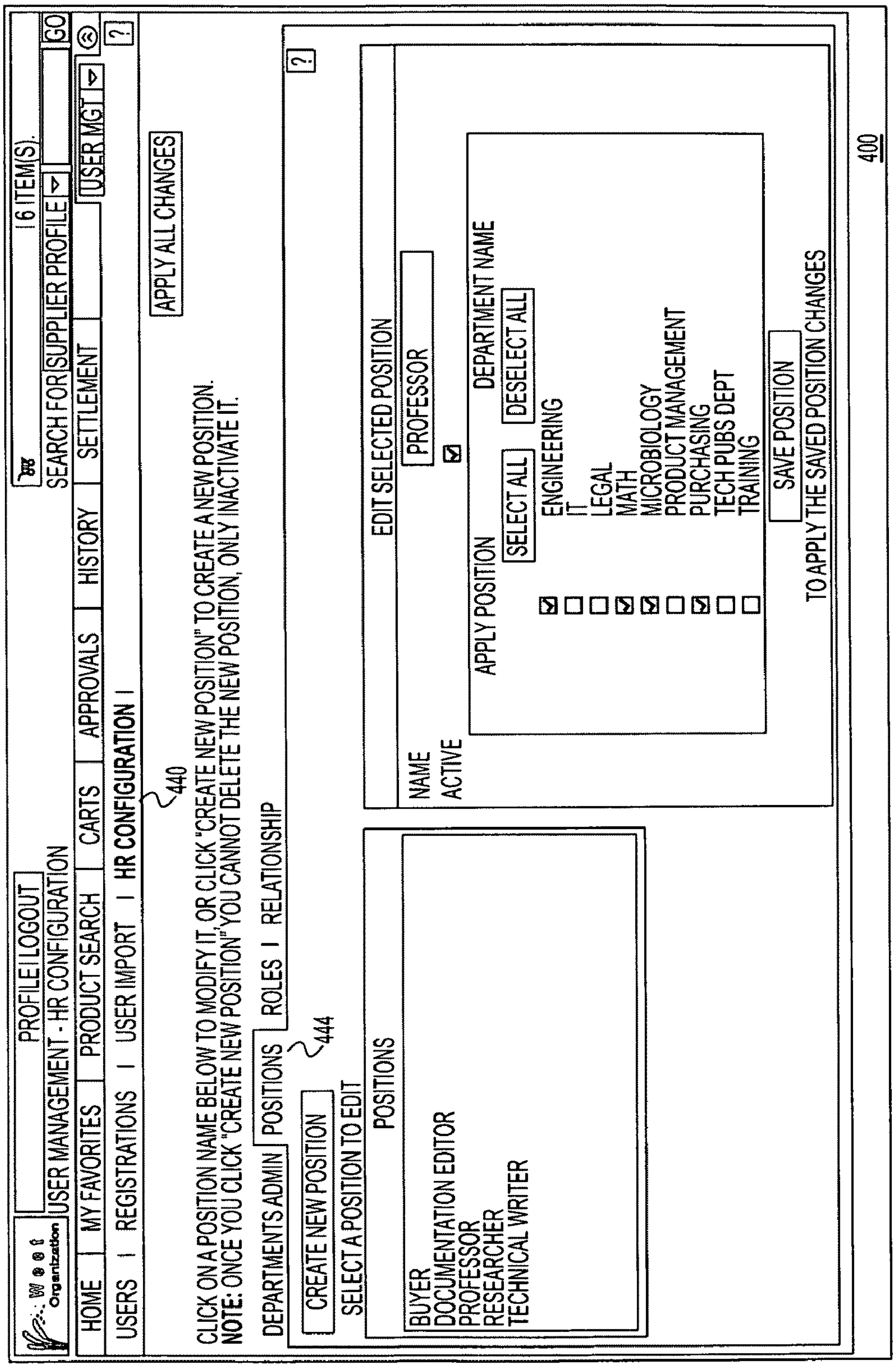
Figure 4C:
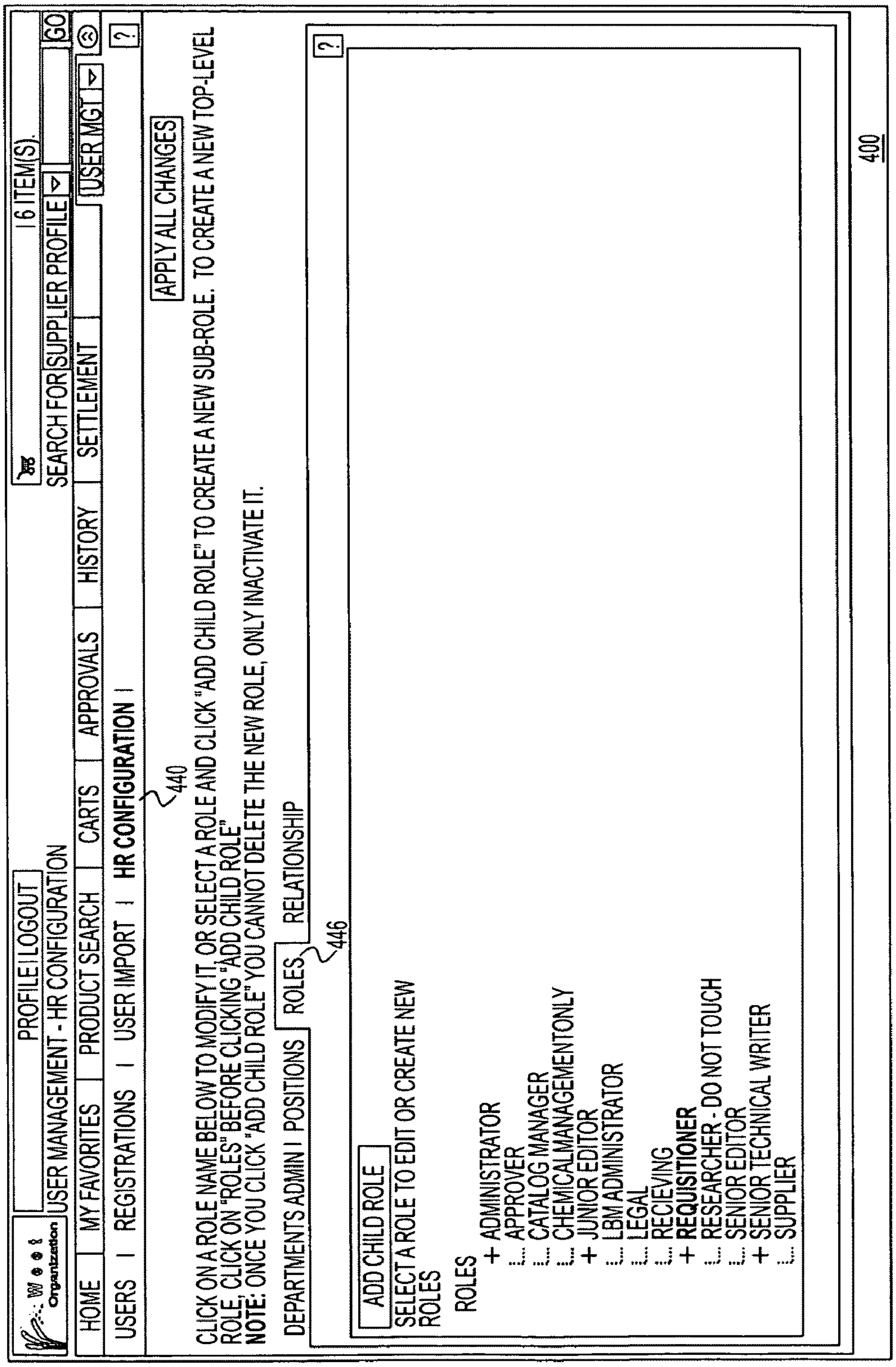
Figure 4D:
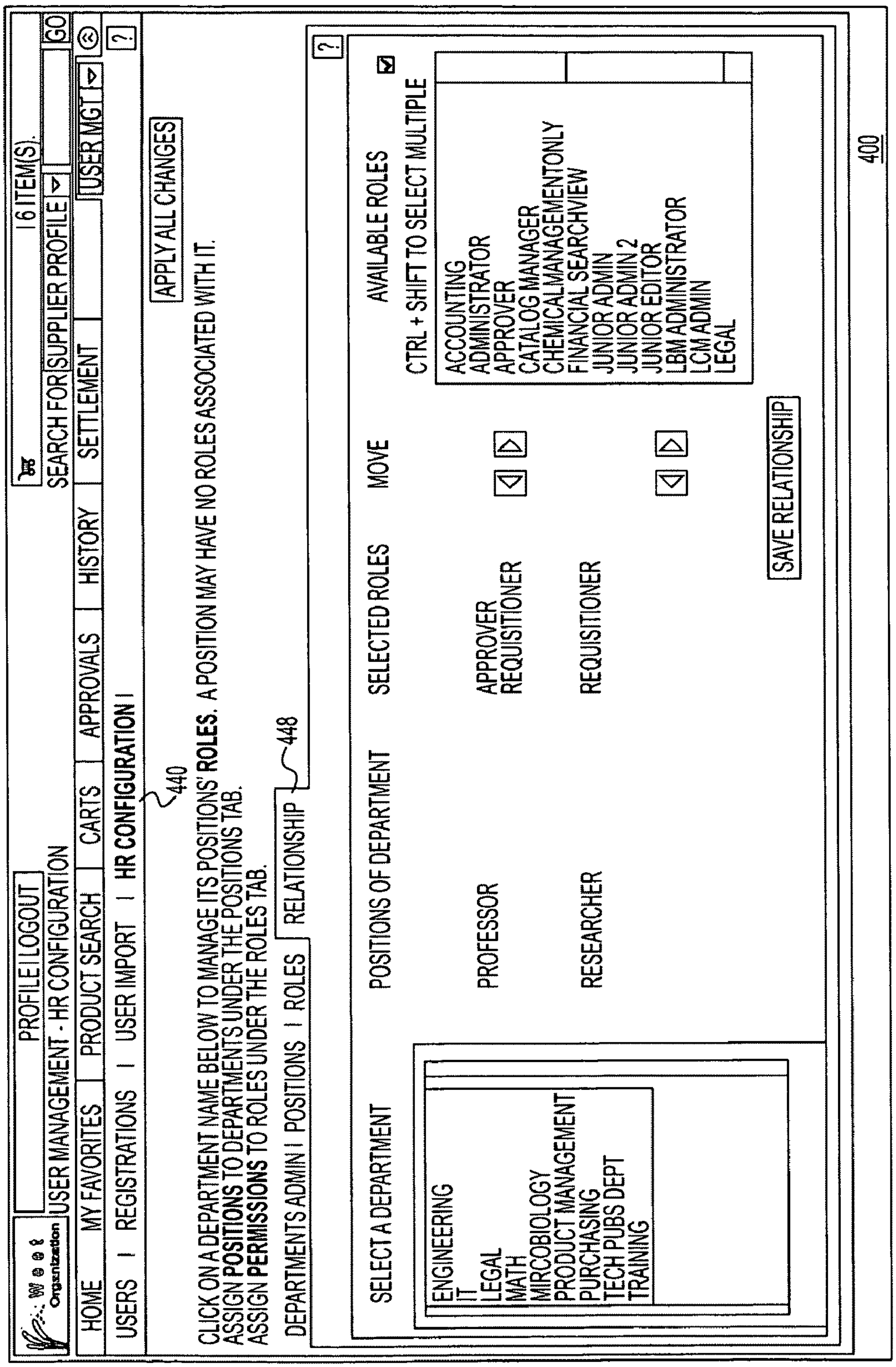

FIG. 4A illustrates an exemplary user management tool 400 to create or modify user access, manage user registration, and define the organizational structure. For example, FIG. 4A illustrates a user access human resources (HR) configuration tool 440. In particular, HR configuration tool 440 allows the super user to establish and describe the organization. For example, the HR configuration tool 440 may be used to define various departments of the organization (442), various positions of the organization (444), various roles of the users in the organization (446), and relationships between the roles, positions, and departments defined for the organization (448). As shown in FIG. 4A, the various departments of the organization that require procurement services may be "Engineering," "IT," "Legal," "Math," etc. As shown in FIG. 4B, there may be various positions within the organization, such as "Buyer," "Documentation Editor," "Professor, "Researcher," etc. As shown in FIG. 4C, the HR configuration tool 440 is used to define various roles of the users within the organization, such as "Administrator," "Approver," "Catalog Manager," etc. As shown in FIG. 4D, the HR configuration tool 440 is used to define the relationship between the department, position, and role of the users. For example, a "Professor" in "Engineering" may be designated as an "Approver" and "Requisitioner" for the organization while a "Researcher" of "Engineering" may only be a "Requisitioner." In this manner, the HR configuration tool 440 provides a simple yet efficient mechanism to define the organization for which the eProcurement system 10 is to be utilized.

Figure 4E:
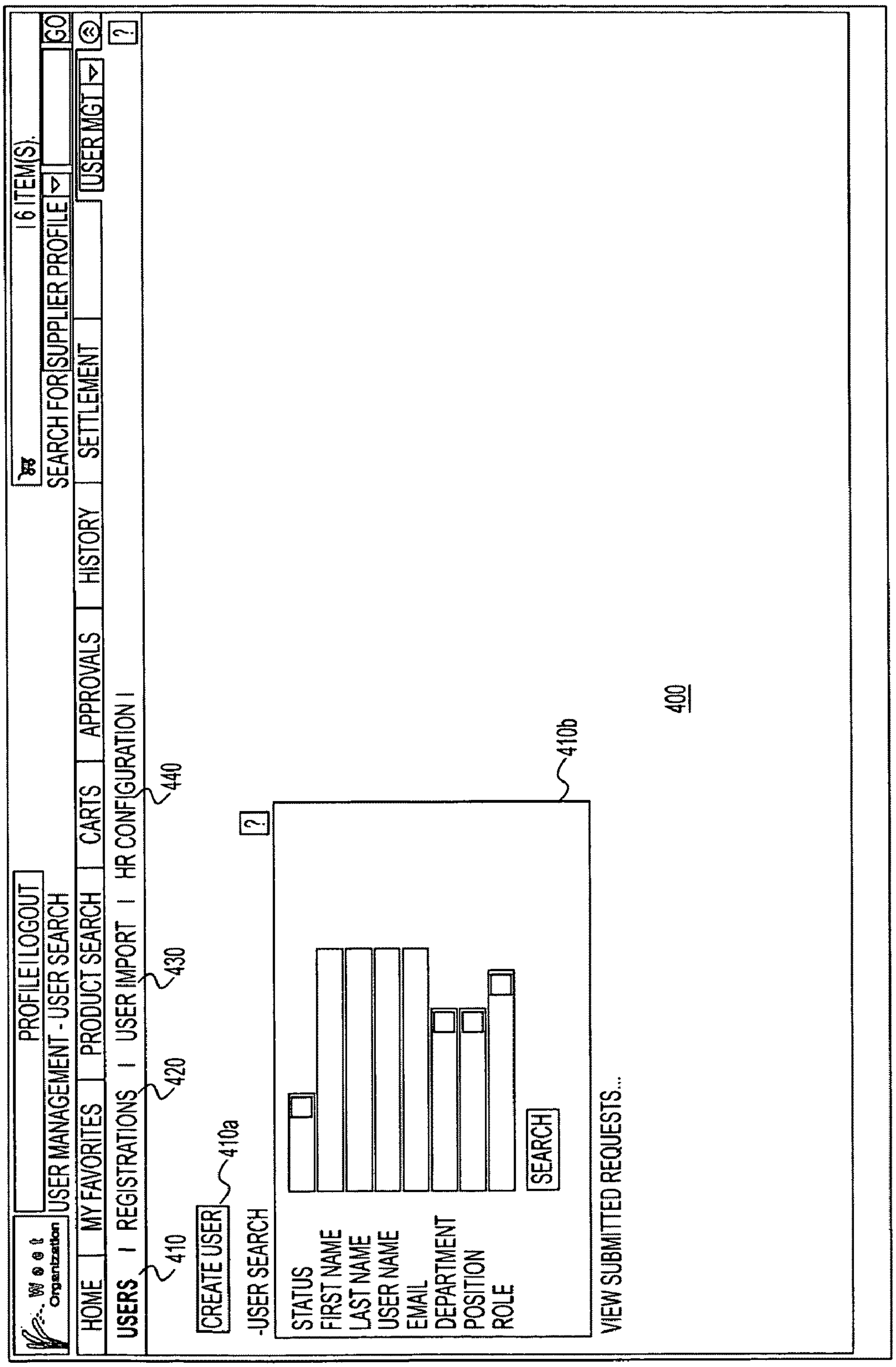
Figure 4F:
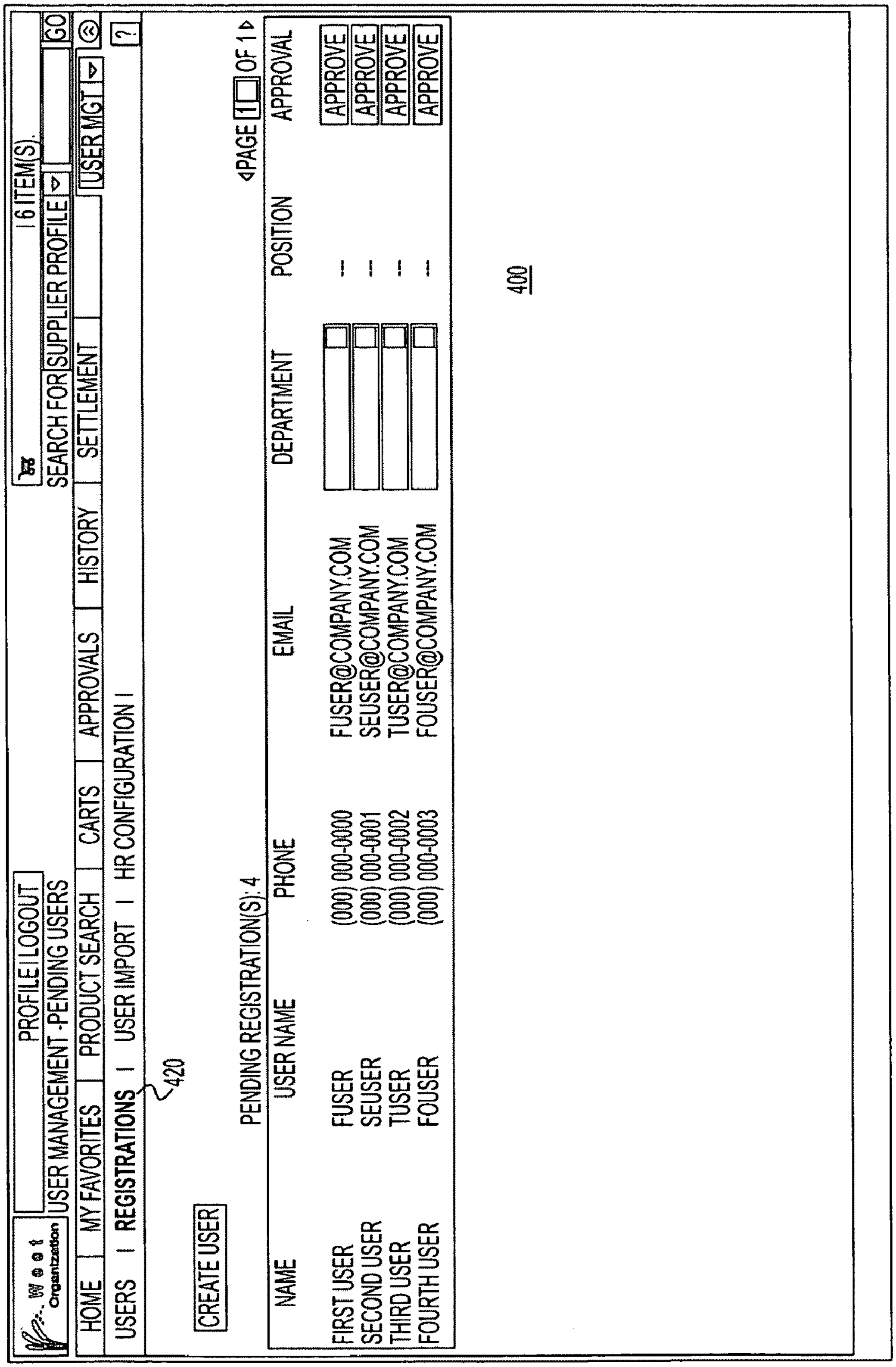

Once the organization has been defined through the HR configuration tool 440, user access tool 410 may be used to create or modify a user's access to the eProcurement system 10 for the user's organization. As shown in FIG. 4E, the user access tool 410 may be used to create a new user access account (410*a*) or the user database 32 may be searched (410*b*) for an existing user in the eProcurement system 10. To create a user access account, the user access tool 410 requires entry of the user's personal information (e.g., name, phone number(s), email address) and authentication information (e.g., login ID and password). In addition, the user's department and position information as created through the HR configuration tool 440 is also provided. In an exemplary embodiment, the department and position information created through the HR configuration tool 440 are shown in a drop-down menu for easy selection and entry. To simplify the creation of an account, existing user files may be imported into the user database through the user import 430. Once a user access account has been created, the newly created accounts are activated through the user registration monitor 420. As shown in FIG. 4F, a list of new user access requests is presented in the user registration monitor 420. A designated approver for the organization then reviews and approves the user access account to be activated for the user.

Figure 4G:
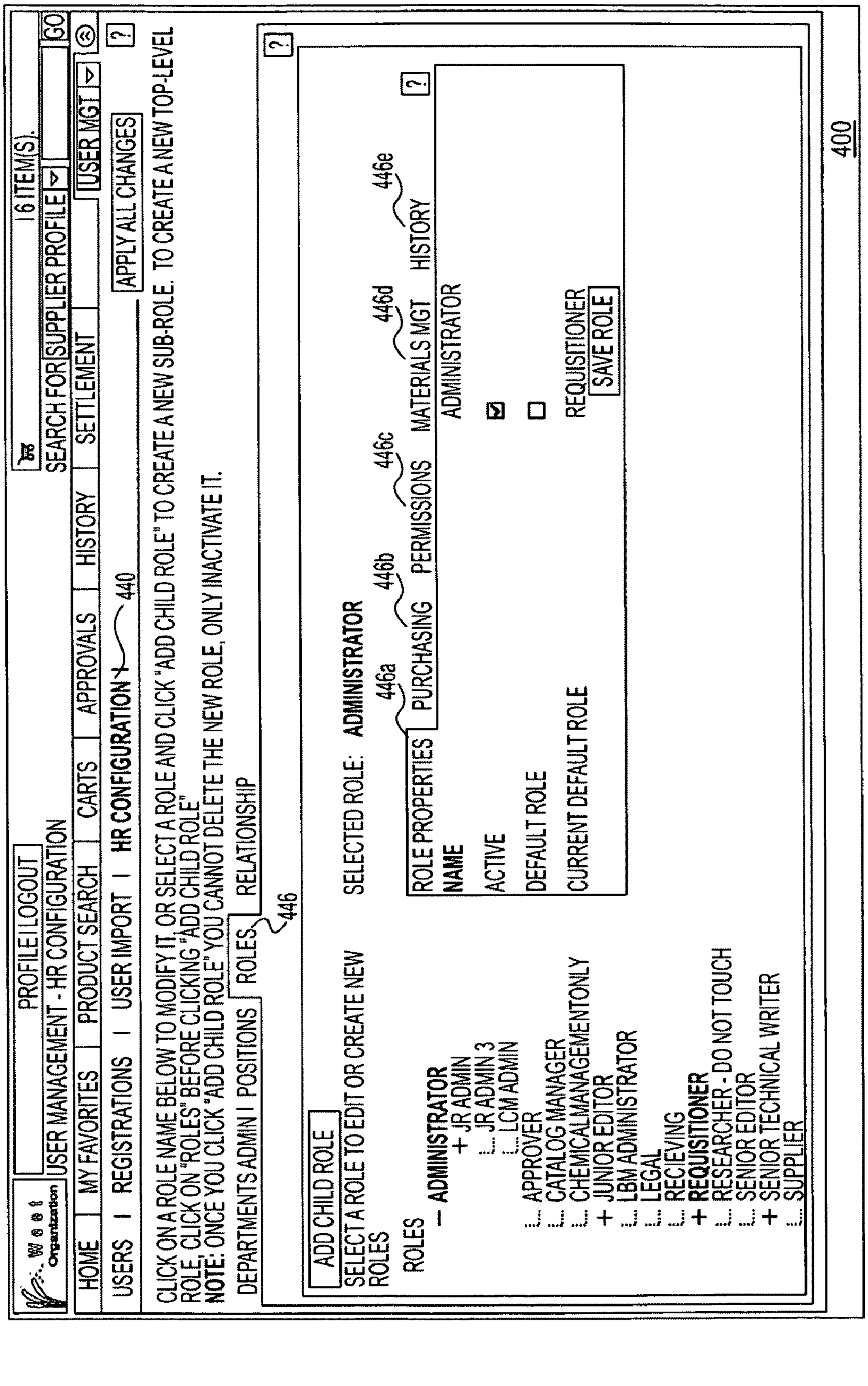

In accordance with an exemplary embodiment of the present invention, every aspect of the organization may be defined and customized in the eProcurement system 10. For example, as shown in FIG. 4A, once a "Department" has been created for an organization, the created department may be activated (442*a*). Moreover, each department may be defined with business rules related to the department's requisition (442*b*), purchase orders (442*c*), and fulfillment (442*d*). For example, FIG. 4A shows that the "Engineering" department has been designated as an active department with the "Requisition" and "Purchase Order" rules including a list of approvers for the Engineering department. As shown in FIG. 4B, a created position may be designated for a created department. For example, FIG. 4B shows that the organization has the "Professor" position for the "Engineering," "Math," "Microbiology," and "Purchasing" departments. FIG. 4G illustrates an exemplary embodiment of the HR configuration tool 440 for defining roles of the organization.

Figure 4H:
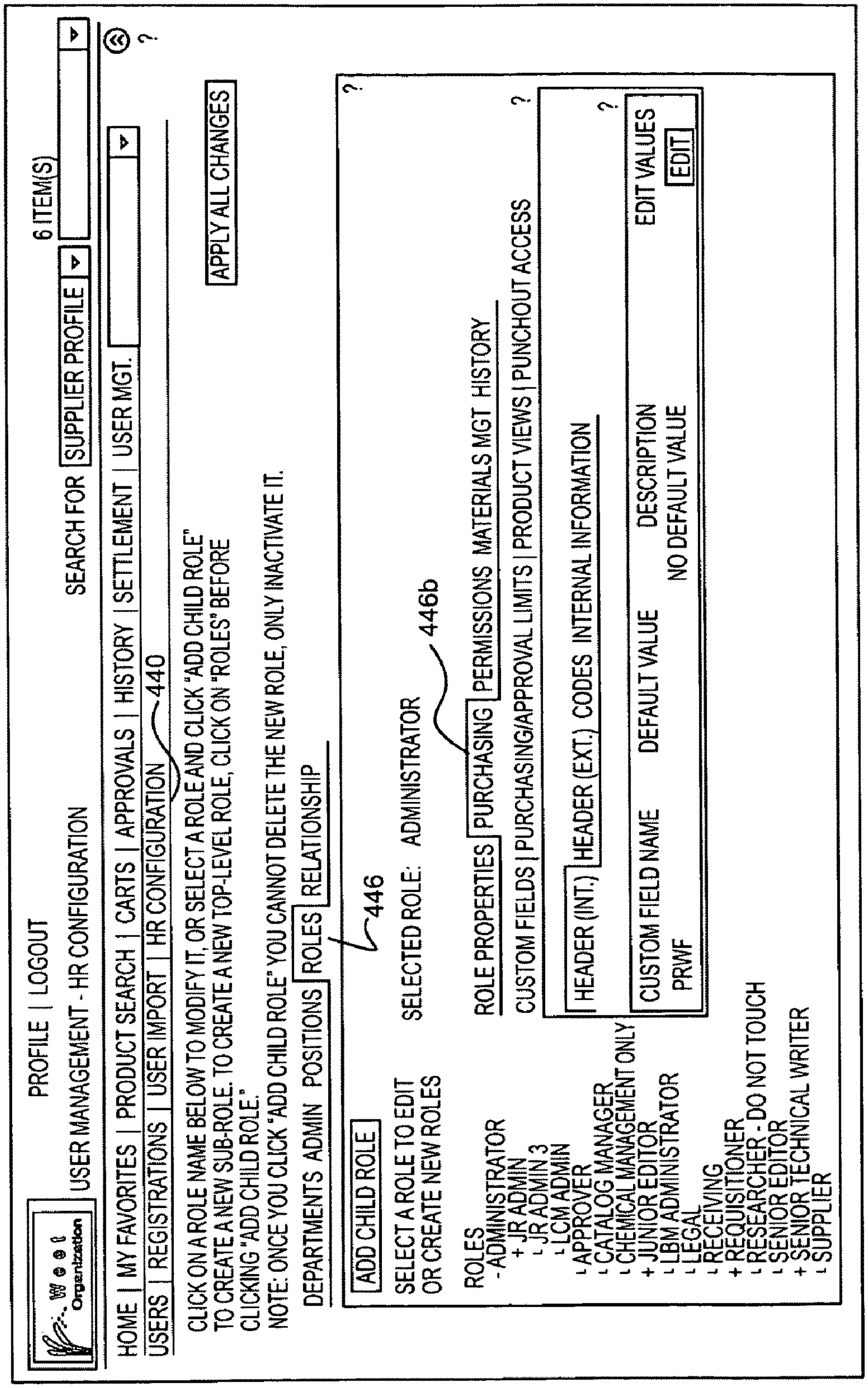
Figure 4I:
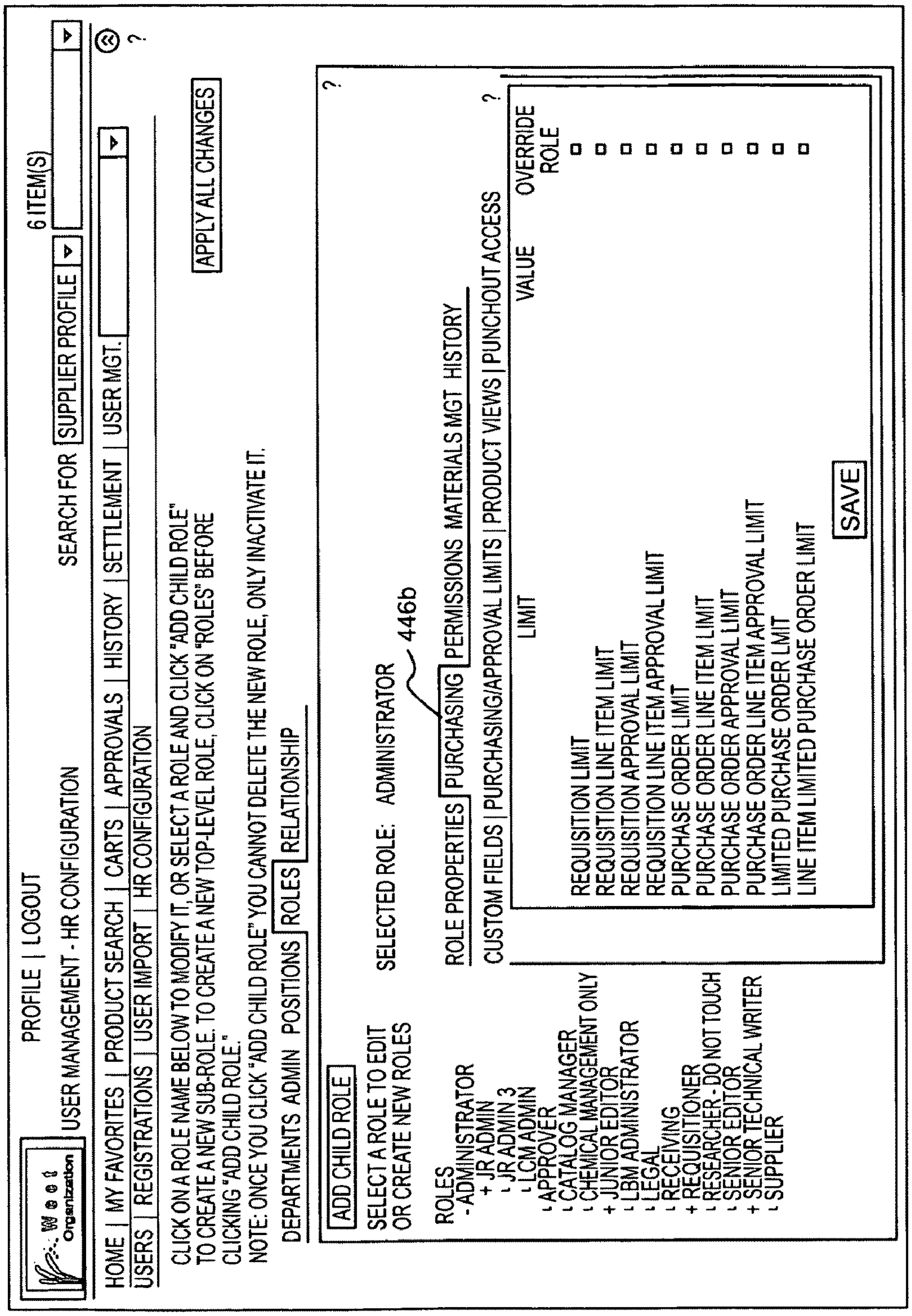
Figure 4J:
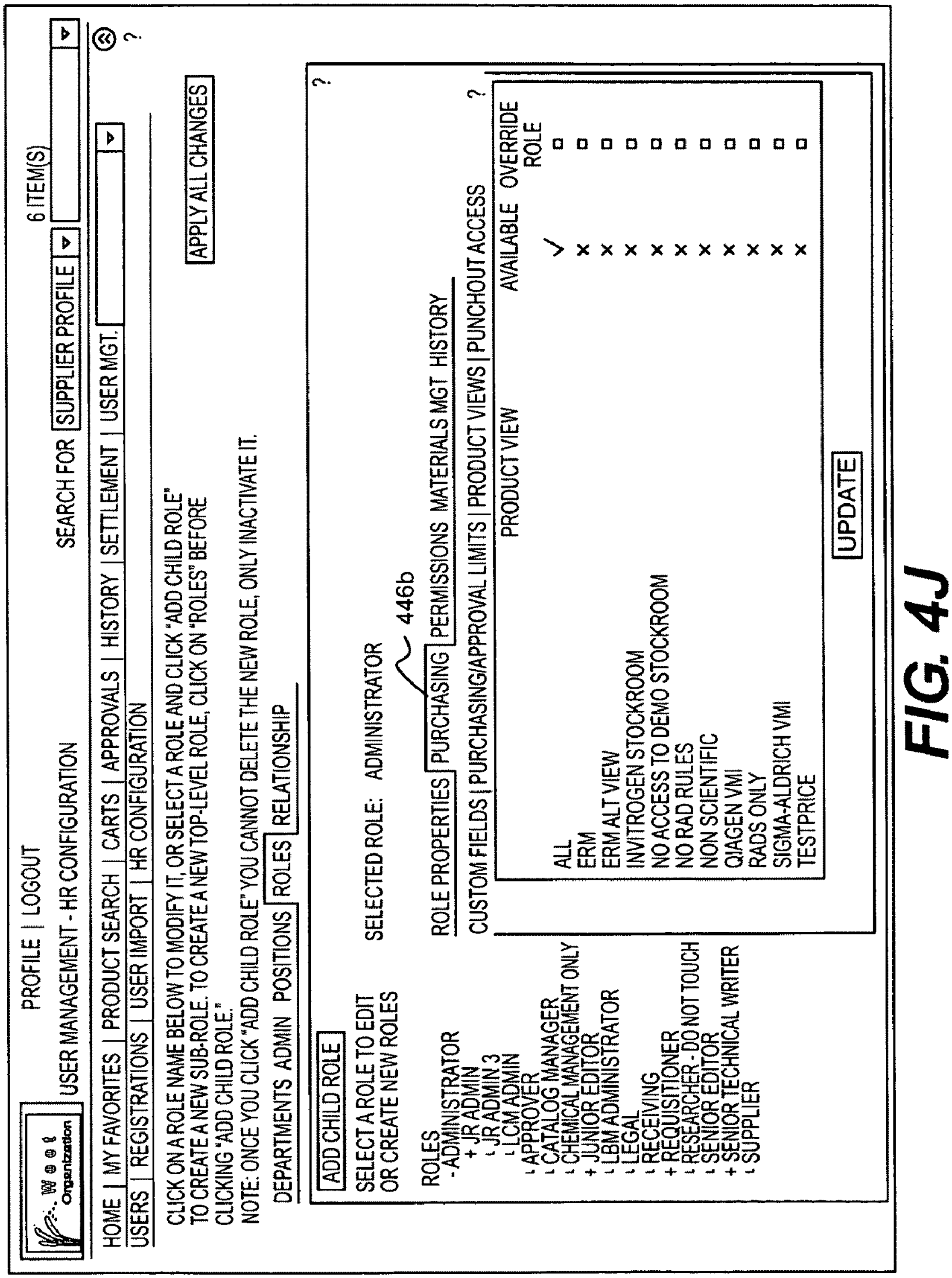
Figure 4K:
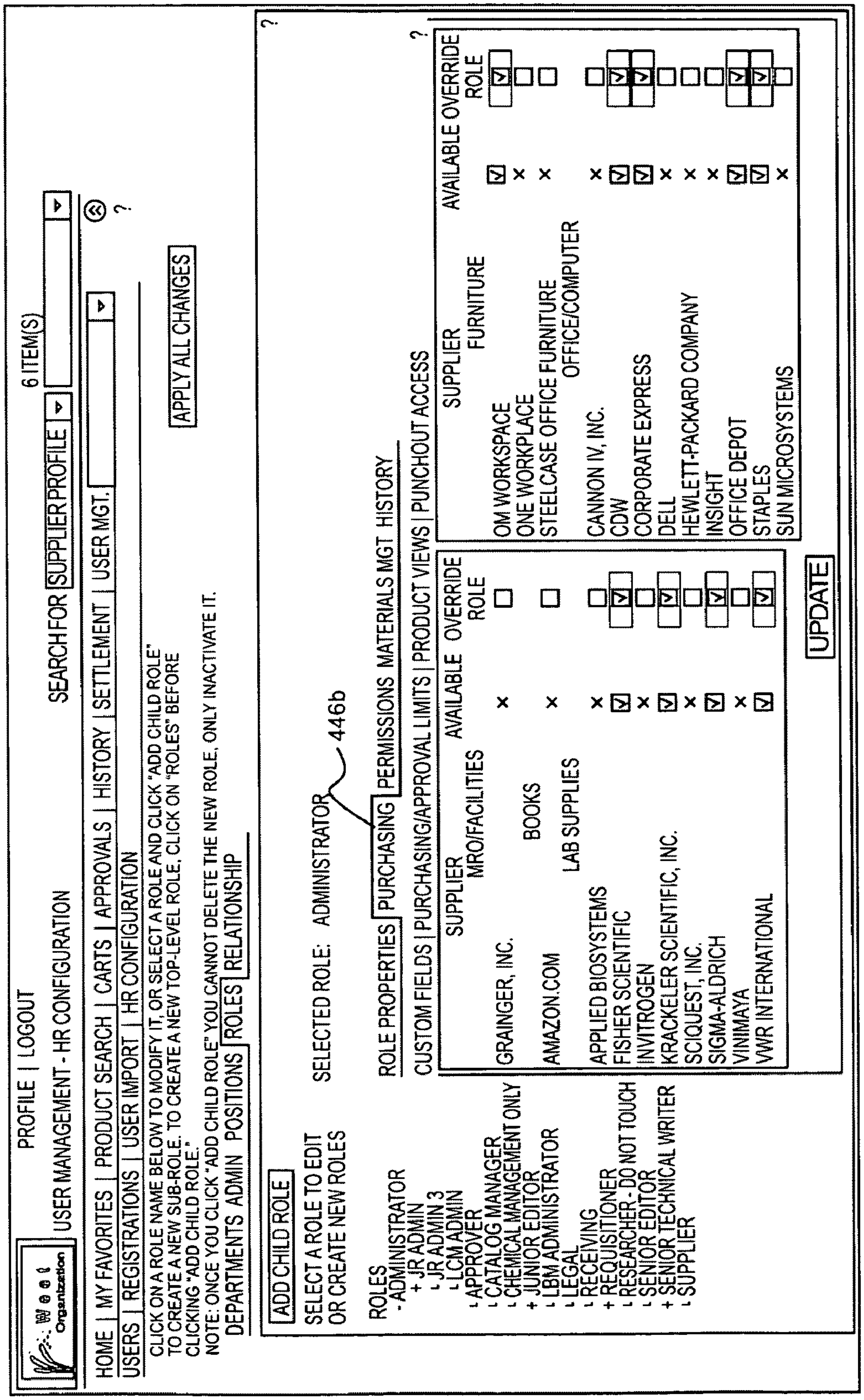
Figure 4L:
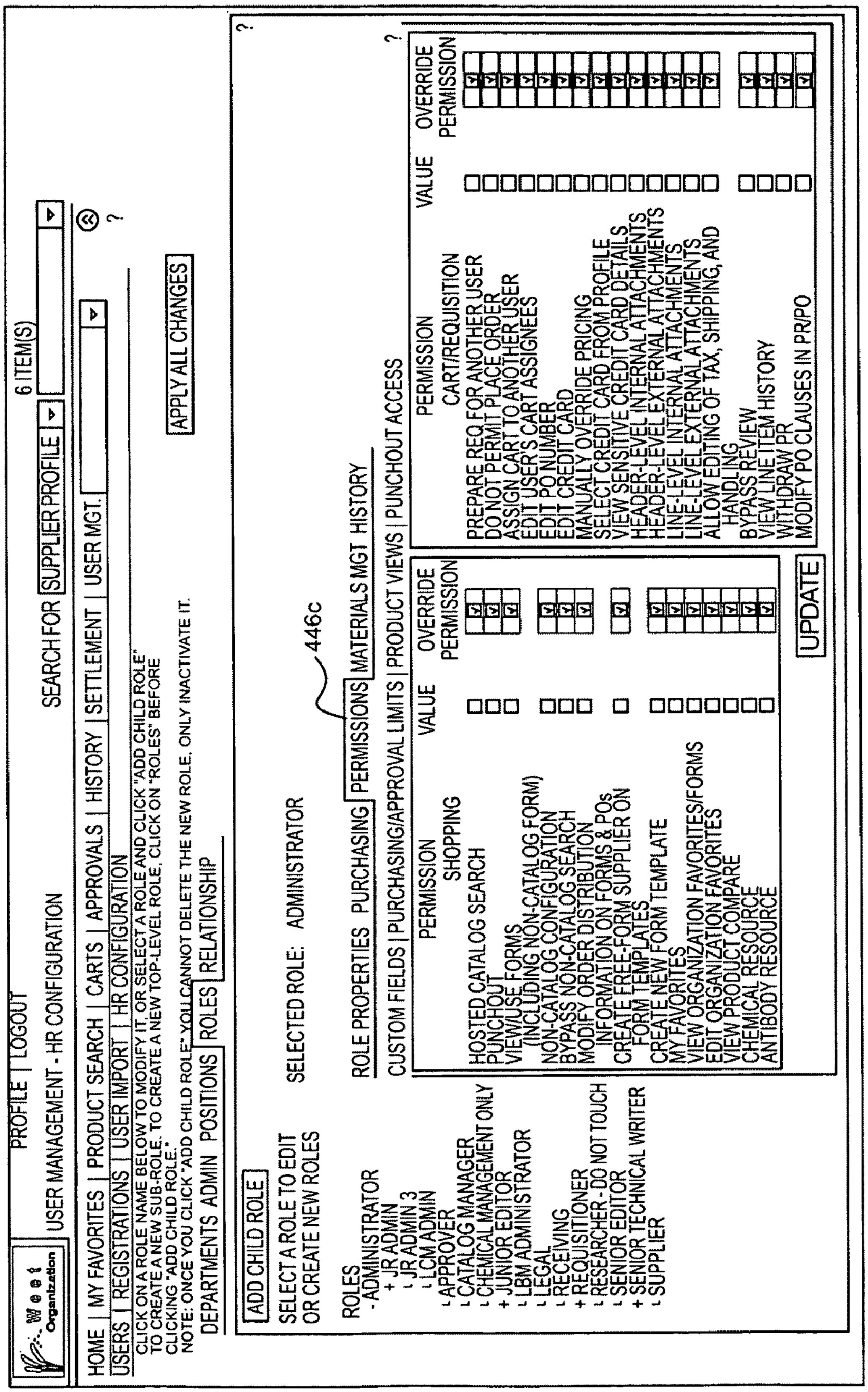
Figure 4M:
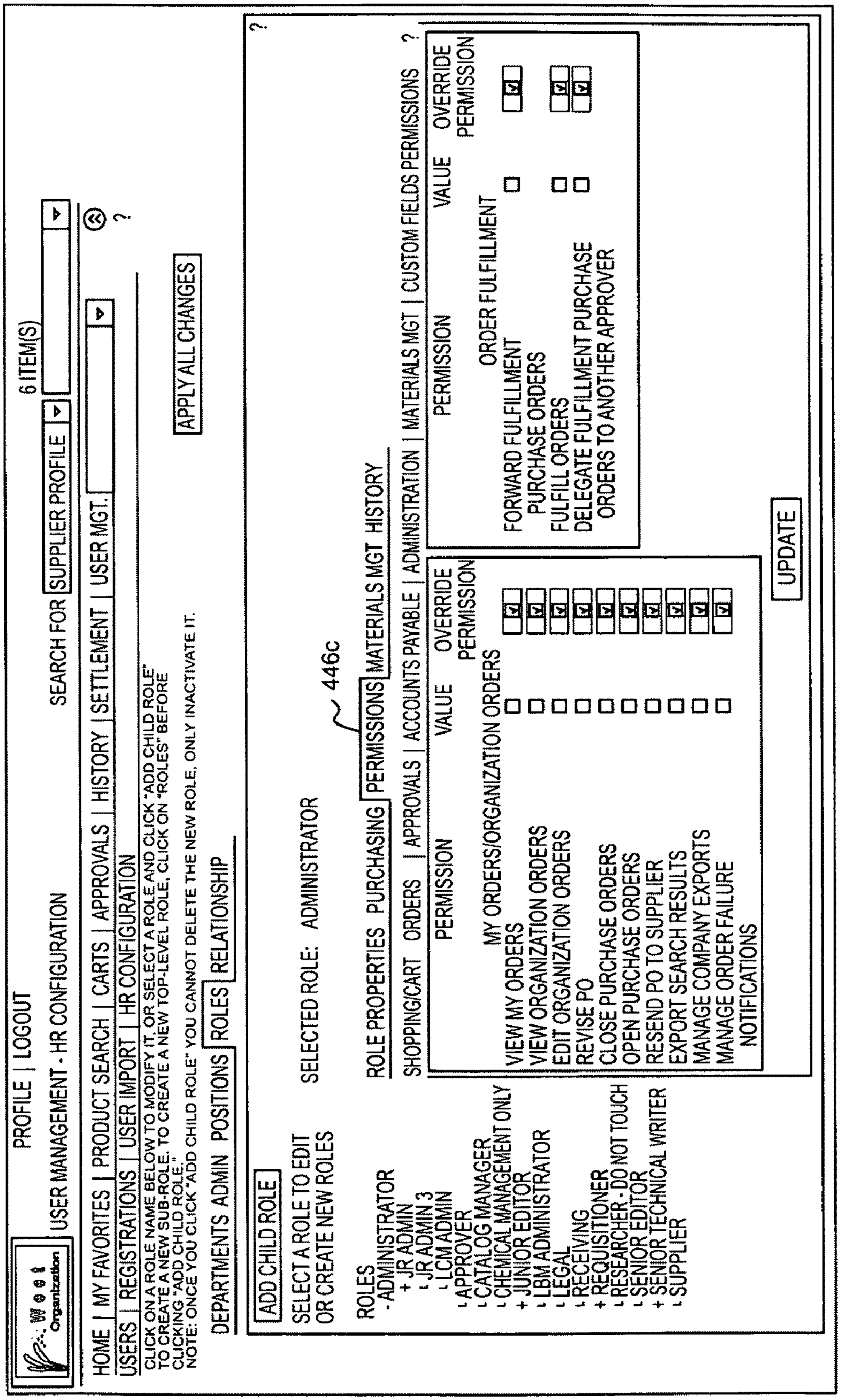
Figure 4N:
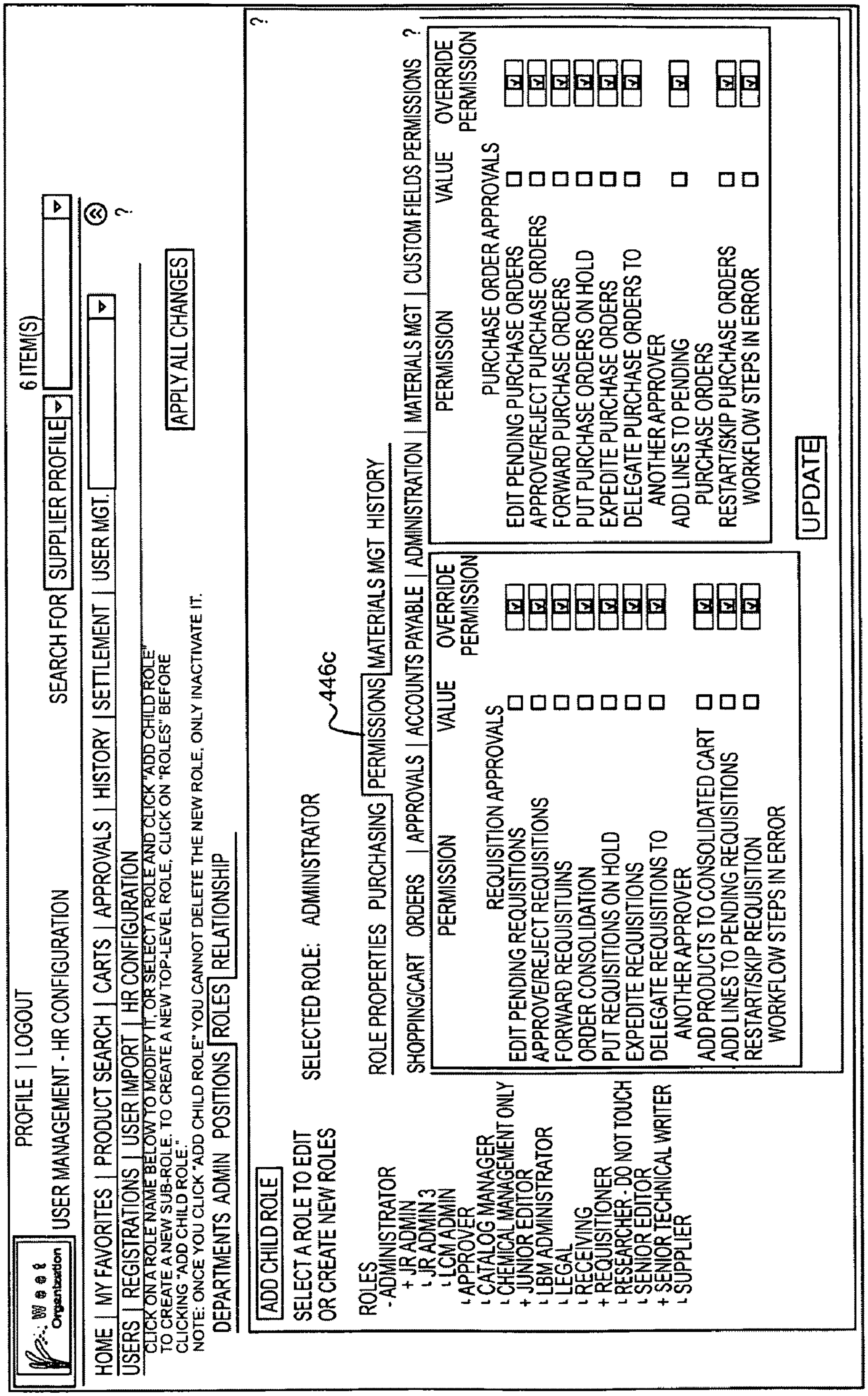
Figure 4P:
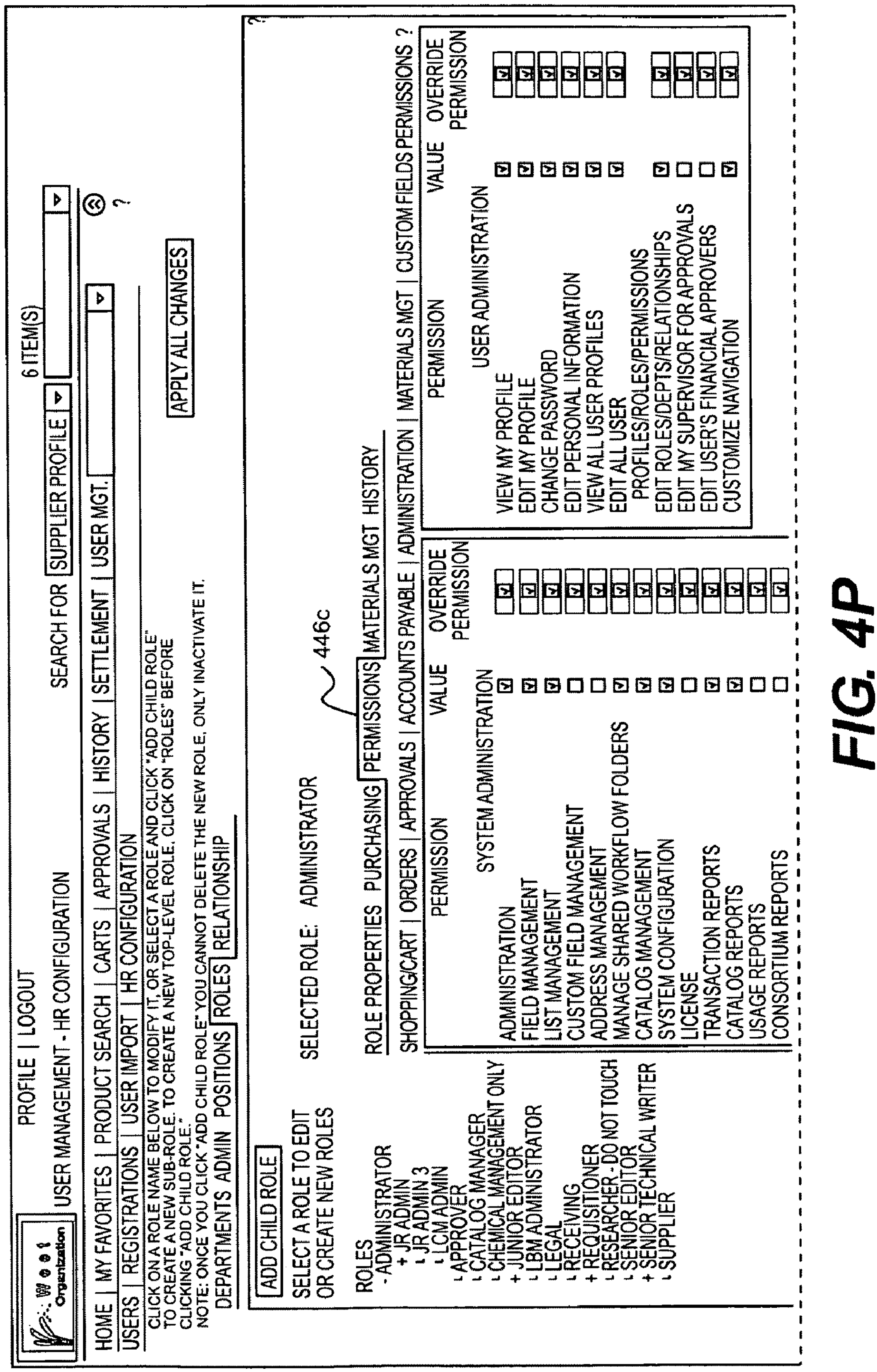
Figure 4P:
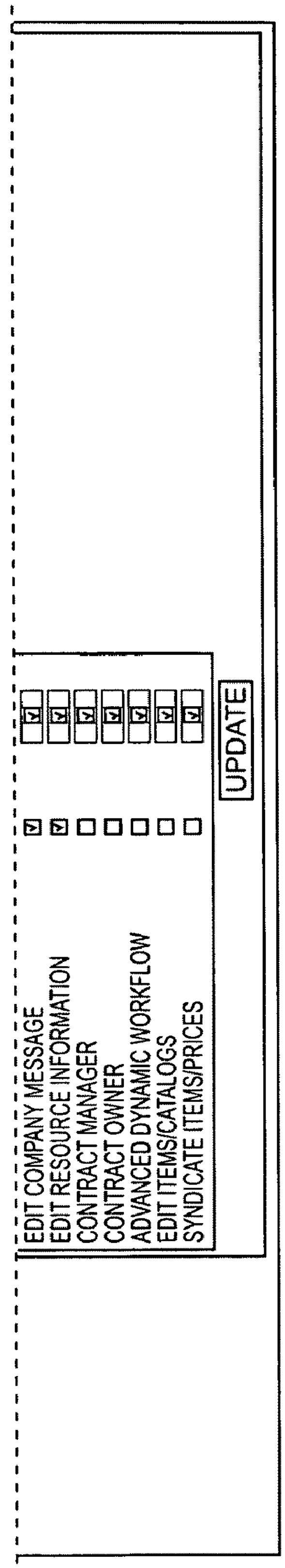
Figure 4Q:
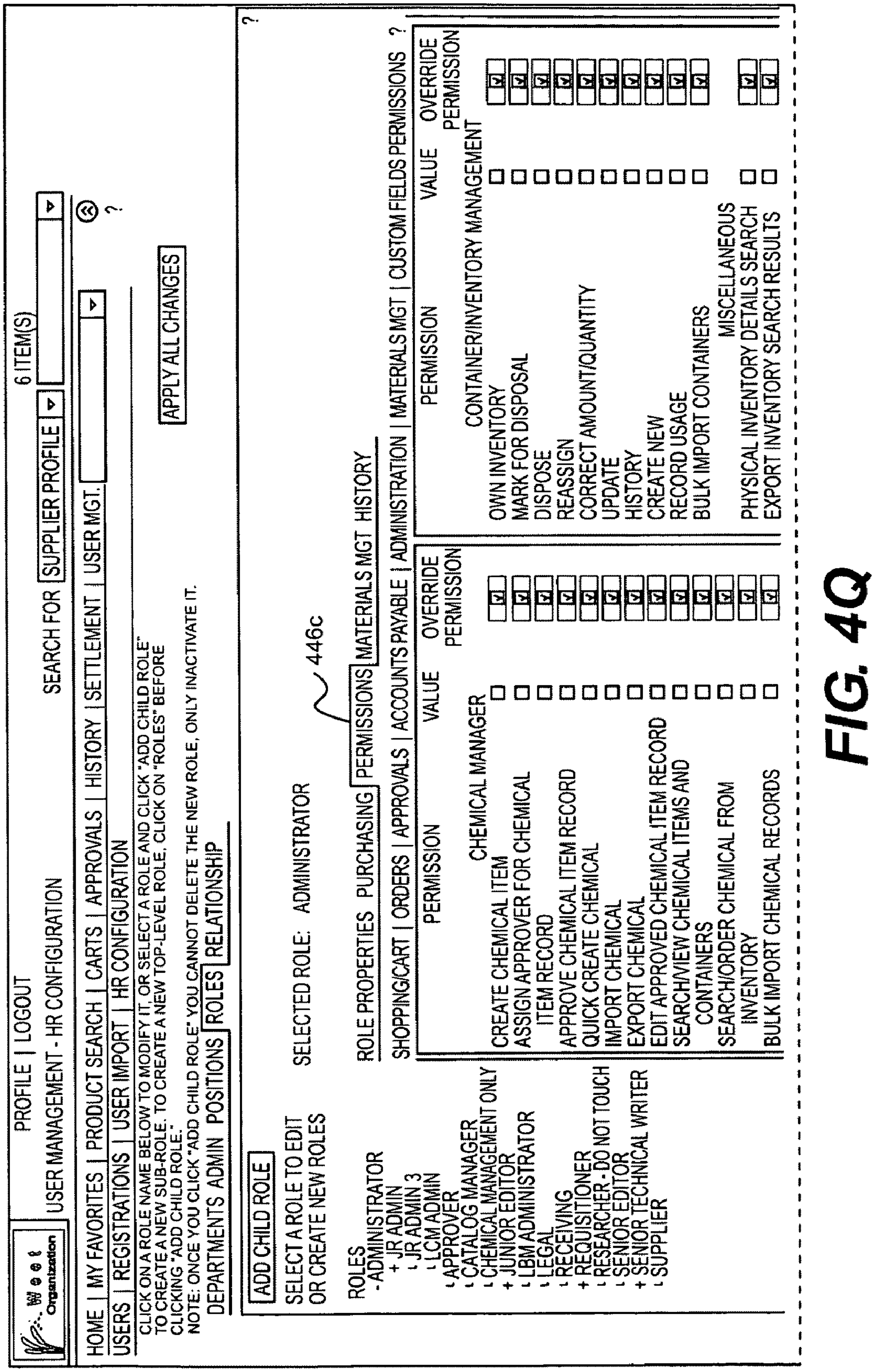
Figure 4Q:
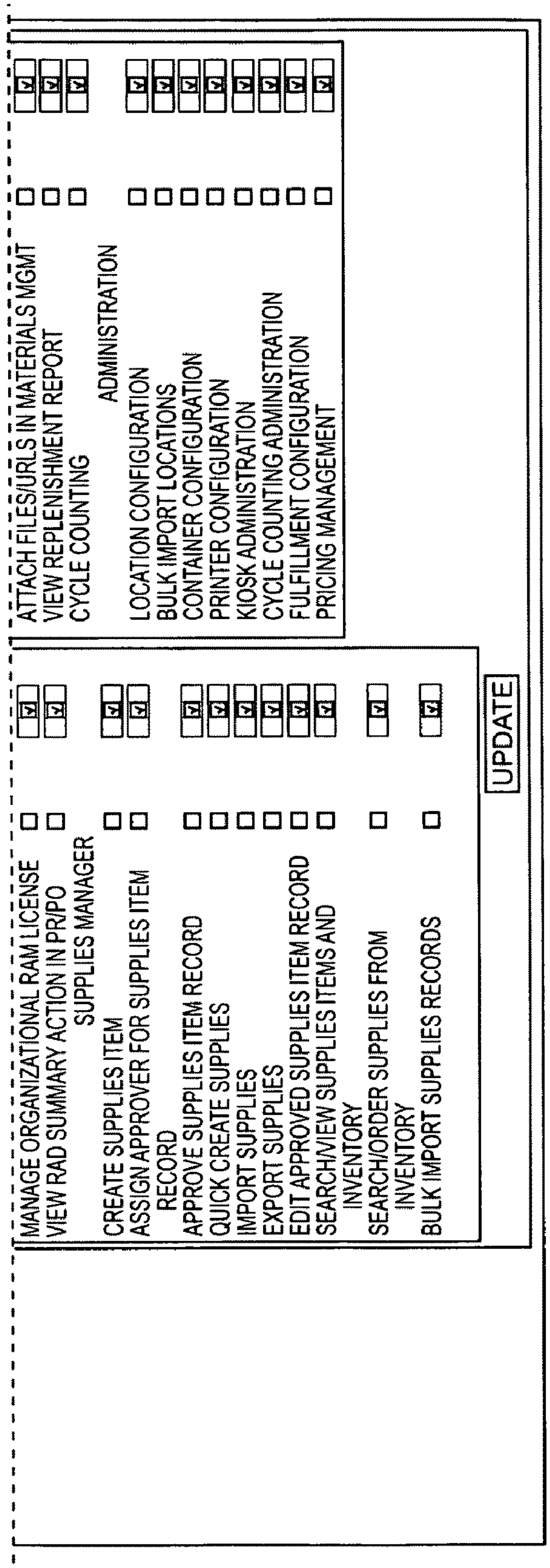
Figure 4R:
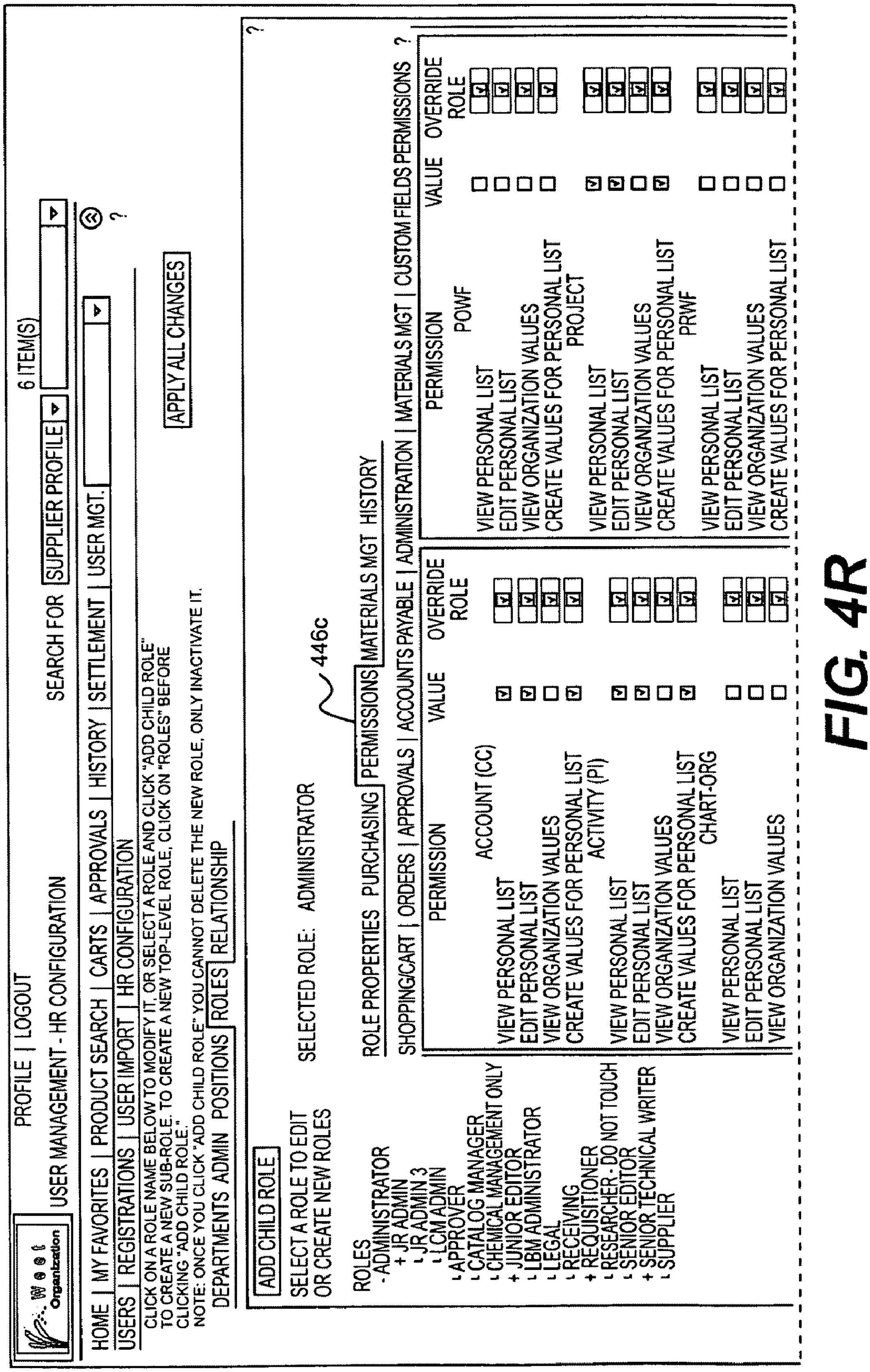
Figure 4R:
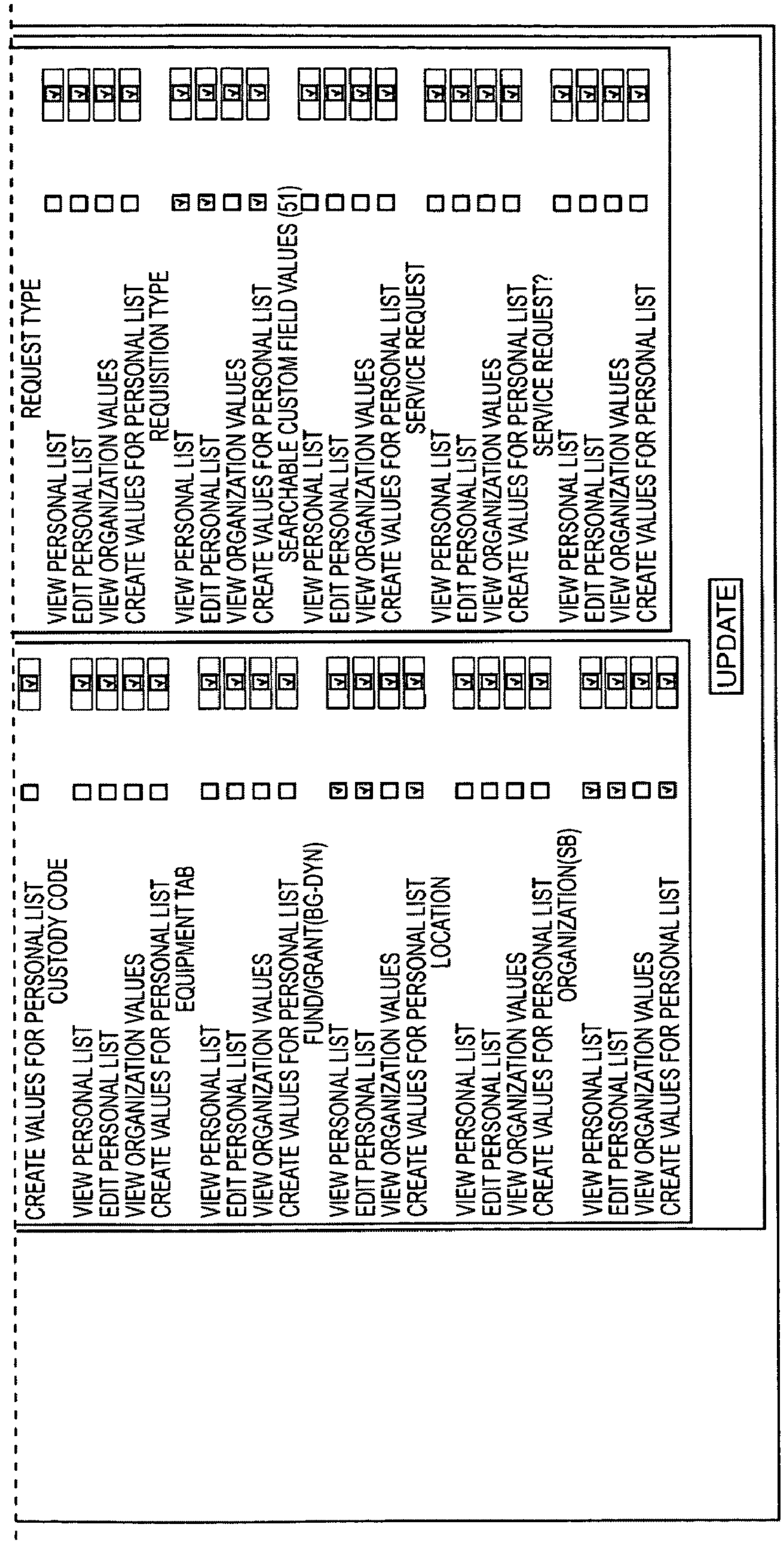
Figure 4S:
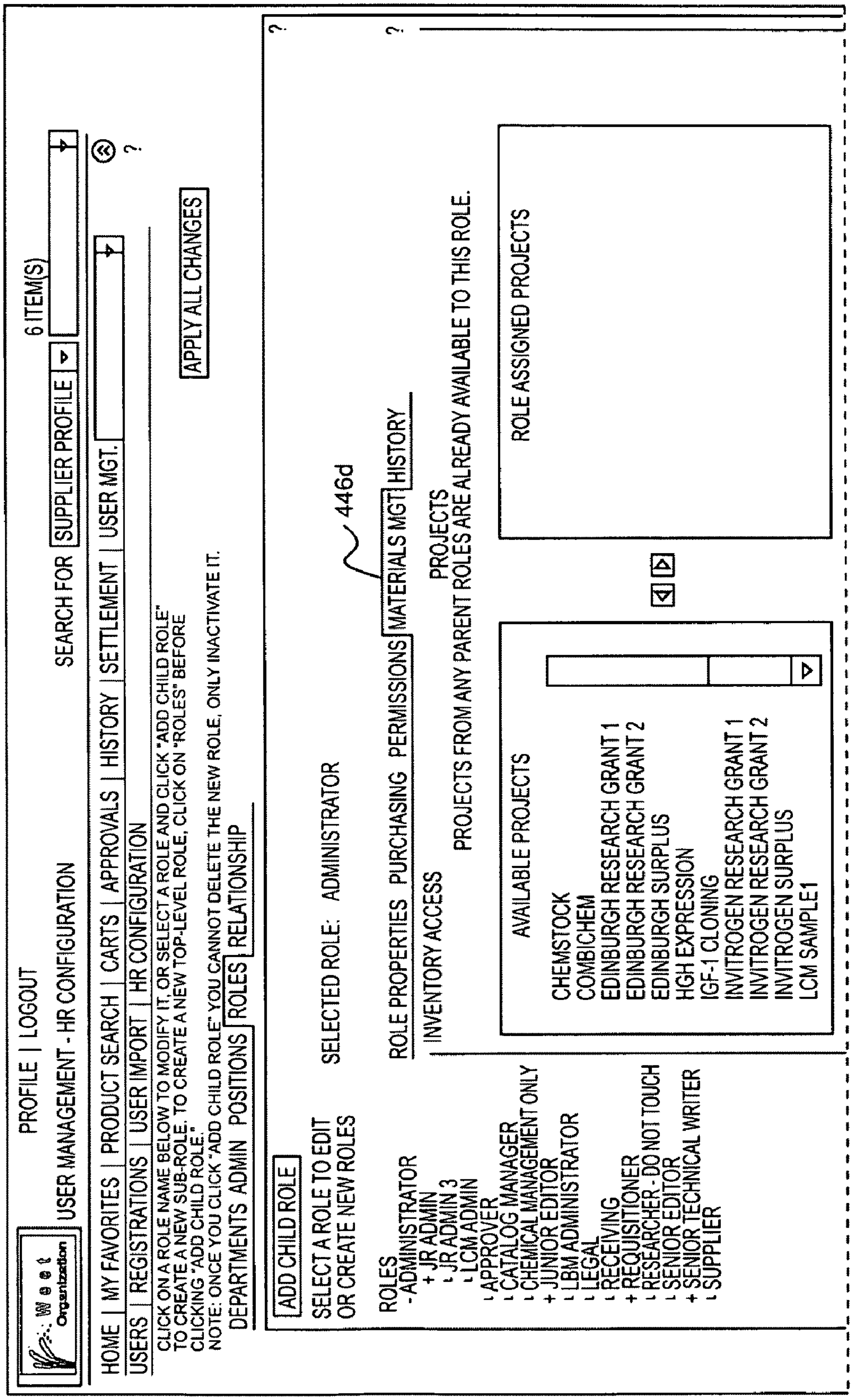
Figure 4S:
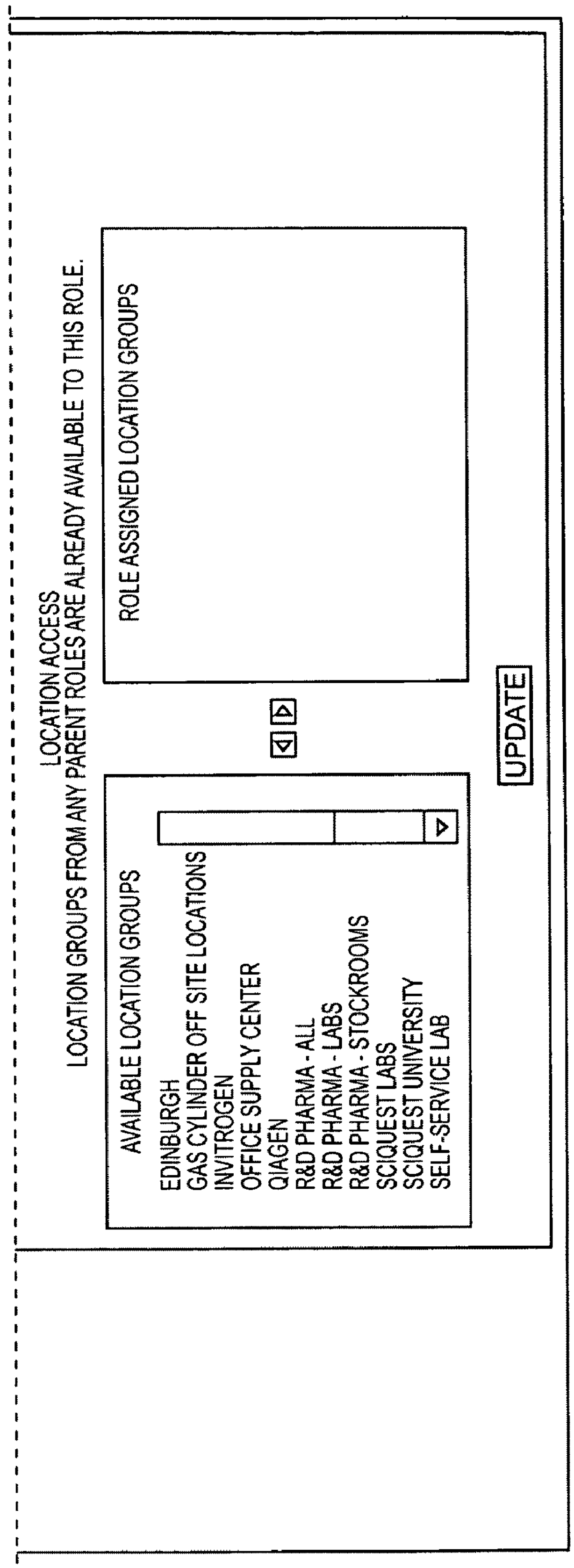
Figure 4T:
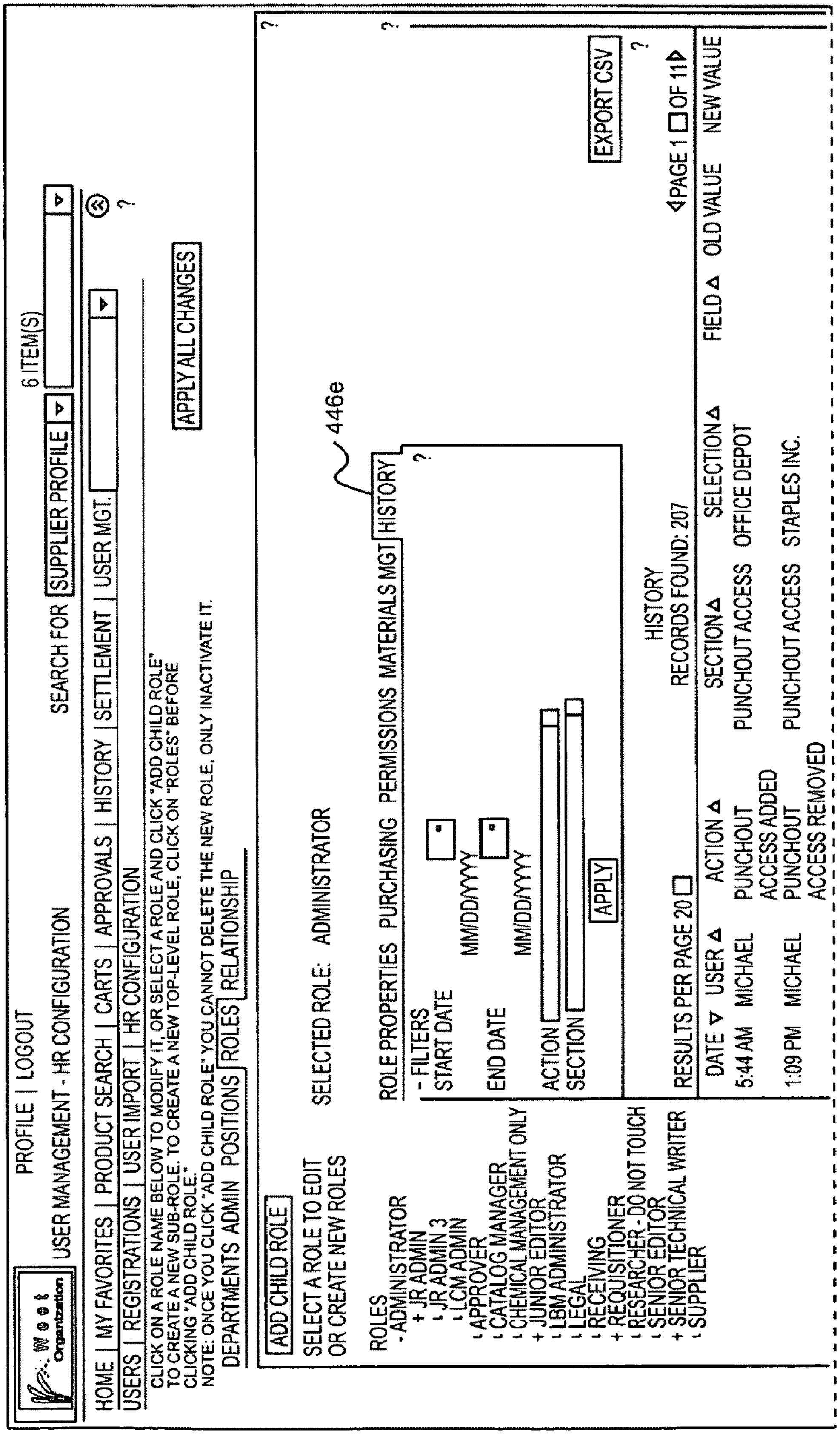

For each role, the roles configuration tool 446 is used to define the role properties (446*a*), purchasing properties (446*b*), access permissions (446*c*), materials management rules (446*d*), and history of modifications to these definitions (446*e*). For example, for the role of "Administrator," the role properties 446*a* (FIG. 4G) may include whether the designated role is active in the organization and the purchasing properties 446*b* may include definitions of any internal and external purchasing codes and information (e.g., "PRWF") (FIG. 4H), purchasing/approval limits (FIG. 4I), allowed product views (FIG. 4J), and allowed punch-out access (FIG. 4K). The access permissions 446*c* may be defined for the roles including shopping cart permissions (FIG. 4L), orders (FIG. 4M), approvals (FIG. 4N), accounts payable (FIG. 4O), administration (FIG. 4P), management of materials (FIG. 4Q), and custom fields permissions (FIG. 4R). The materials management 446*d* defines the available projects and location of groups to the various roles (FIG. 4S). The history section 446*e* keeps track of a history of all the actions (e.g., modified, created, product view added, product view removed, punch-out access added, punch-out access removed, project added, project removed, location added, location removed, etc.) and the sections to which the actions were applied (e.g., role properties, product views, punch-out access, materials management, permissions, purchasing/approval limits, custom field permission definitions, etc.) including the old value of the parameter and the new value of the parameter (FIG. 4T).

Figure 5A:
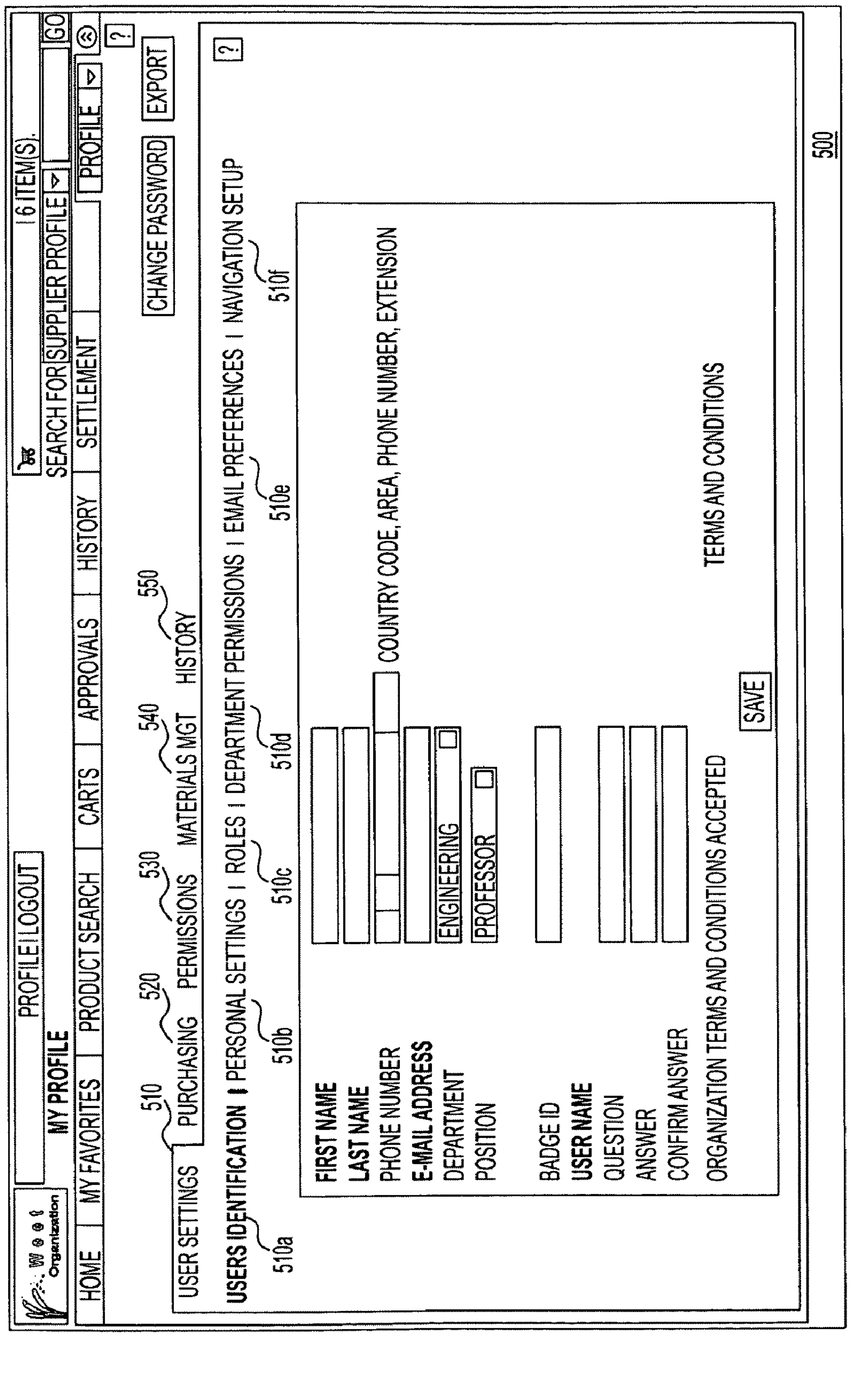
FIG. 5A illustrates an exemplary user setting tool in accordance with the present invention.

Once the internal organizational structure and descriptions of key positions of users in the organization have been defined using the user management tool 400, specific users and their level of access may be defined. As discussed above, the level of access of a user may be assigned globally based on their positions and/or roles in the organization. In addition, the eProcurement architecture of the present invention allows customization down to specific individuals all within the single instance, multi-tenant environment. For example, FIG. 5A illustrates an exemplary user profile tool 500 for defining a user's account in the eProcurement system of the present invention. As shown, the user profile tool 500 includes one or more of a user setting tool 510 (comprising a user identification tool 510*a* for entering user identification data), user purchasing tool 520, user permissions tool 530, user materials management tool 540, and user setting history tool 550. These tools provide customization of the user's account for various levels of access to the eProcurement system of the present invention all within the single instance, multi-tenant environment.

Figure 5B:
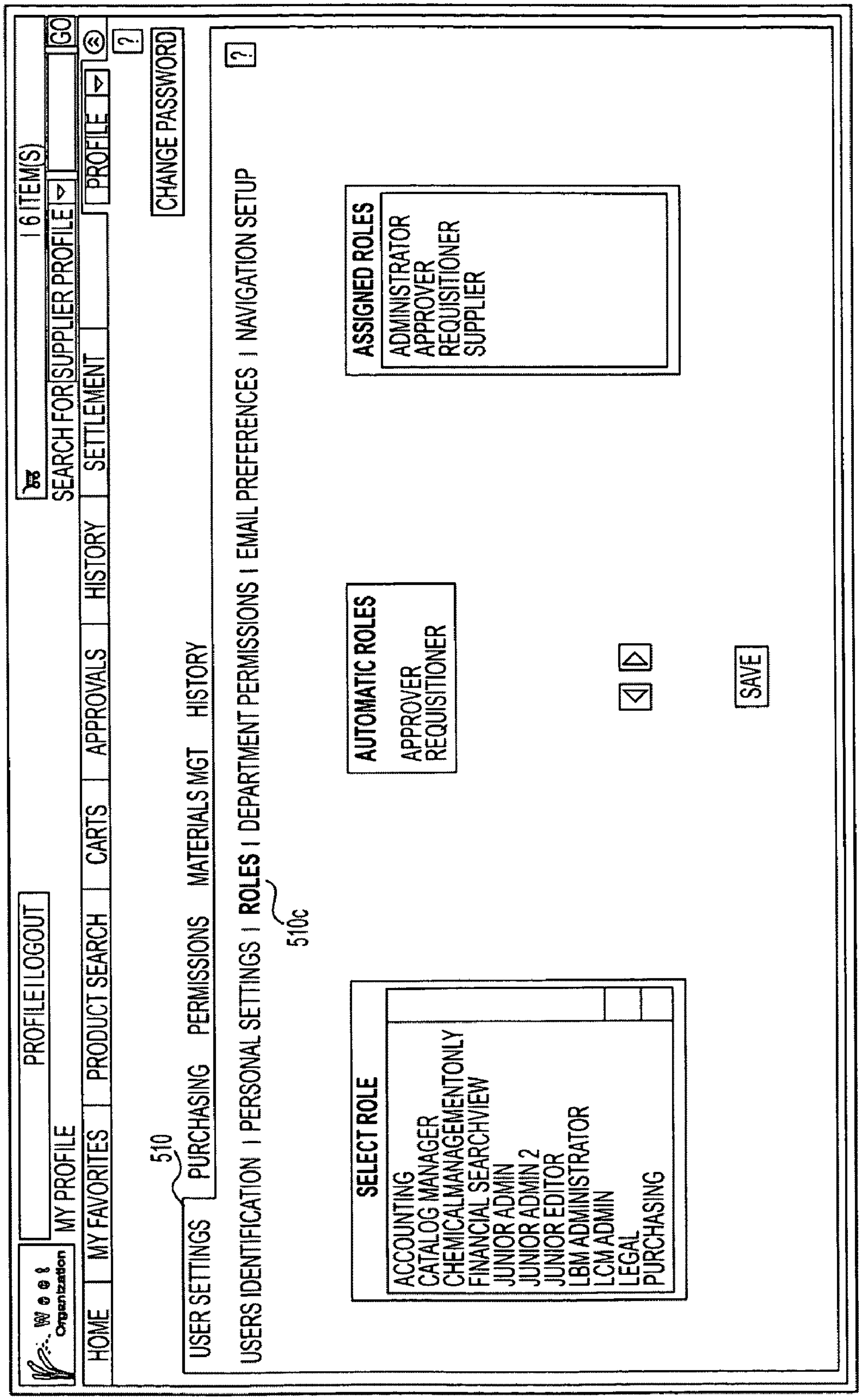
FIG. 5B illustrates an exemplary roles selection tool in accordance with the present invention.
Figure 5C:
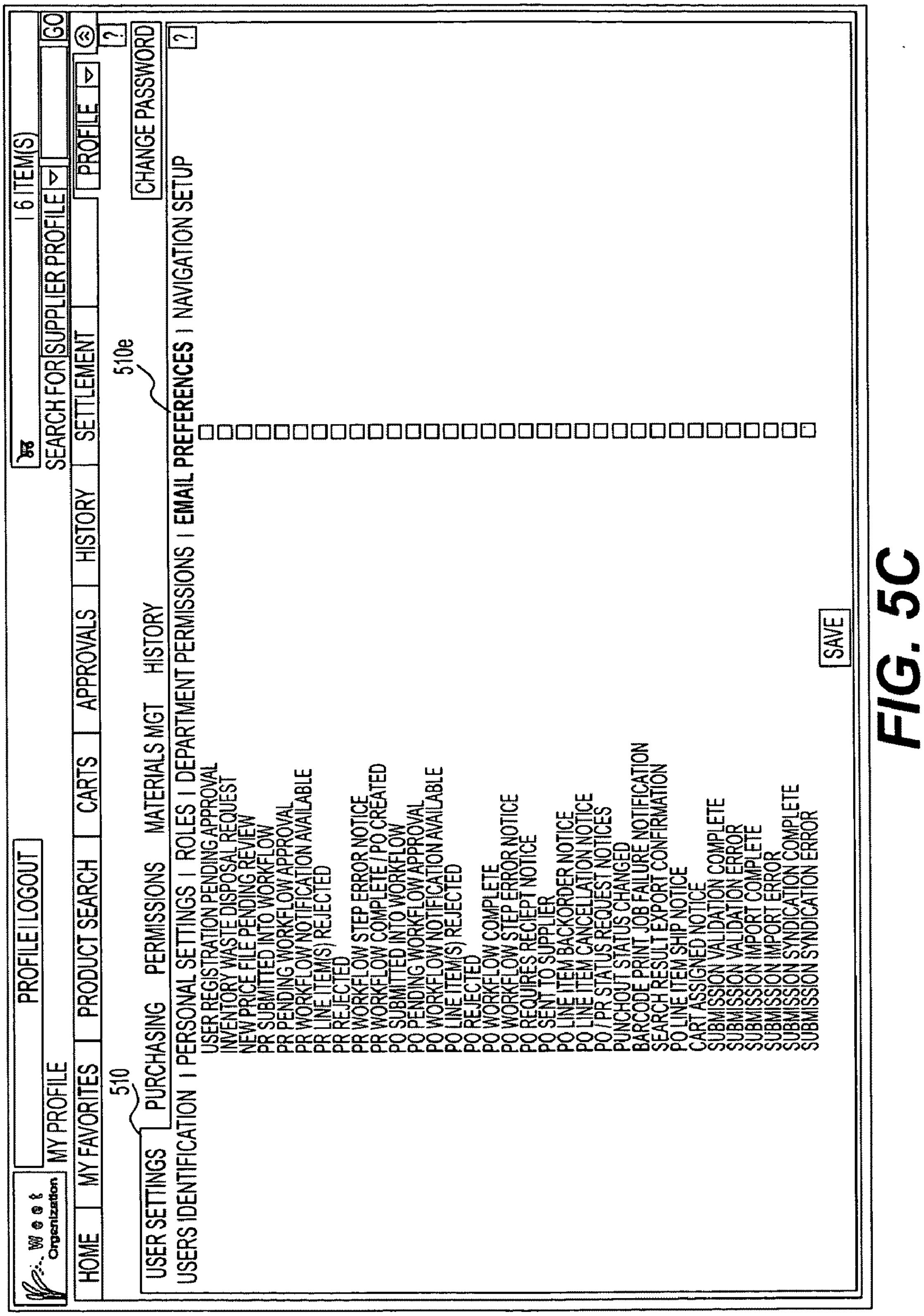
FIG. 5C illustrates an exemplary email preference tool in accordance with the present invention.
Figure 5D:
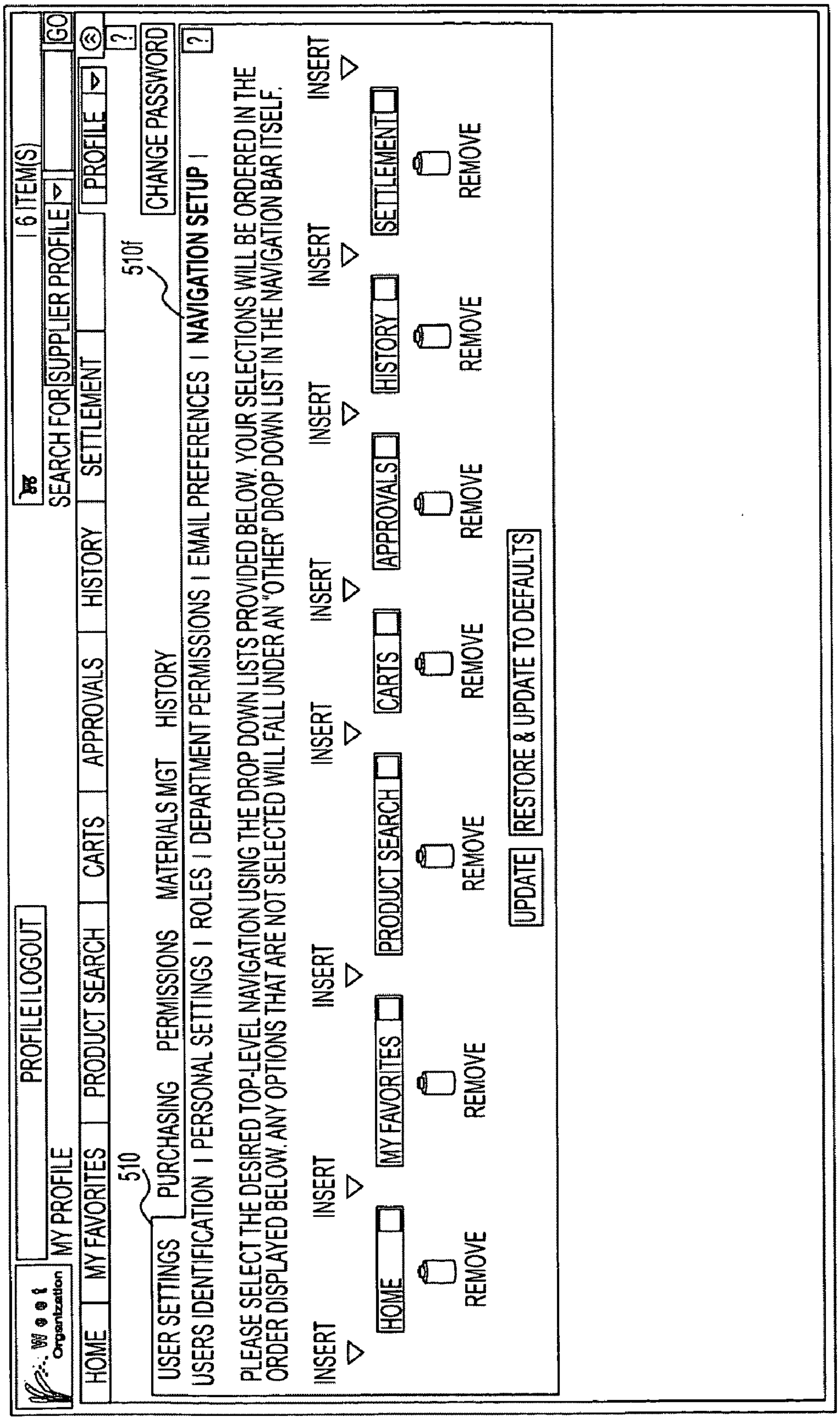
FIG. 5D illustrates an exemplary navigation setup tool in accordance with the present invention.

For example, as shown in FIG. 5A, an exemplary user setting tool 510 of the present invention shows that the user is a "Professor" in the "Engineering" department. As discussed above, users in this department and position have default levels of access defined by a super user using the user management tool 400. However, because a user may have additional roles assigned to the user that are beyond the normal scope of the user's position, the eProcurement system of the present invention allows a super user to modify the user's level of access on an individual level. For example, FIG. 5B illustrates an exemplary roles selection tool 510*c* to modify the roles assigned to the selected user. Through the roles selection tool 510*c*, a super user may be able to specifically tailor the roles of a user down to the individual level to provide customized access to the eProcurement system of the present invention. Similarly, the user's departmental permissions may be modified using the department permissions tool 510*d*. Various aspects of the user's account may also be customized, such as the user's personal settings 510*b*, email preferences 510*e*, and navigation setup 510*f*. As with the user management tool 400 and the roles/permissions tools 510*c* and 510*d*, all customizations may be performed by simply activating/deactivating a function available on the eProcurement system of the present invention. For example, FIG. 5C illustrates an exemplary email preference tool 510*e*, which lists all of the action notifications that may be received via email. A user only has to activate/deactivate a preference by selecting the notifications the user wishes to receive via email. Similarly, FIG. 5D illustrates an exemplary navigation setup tool 510*f*. As shown, a user simply selects the navigation tools to be displayed (or removed) from the top-level navigation bar.

Figure 5E:
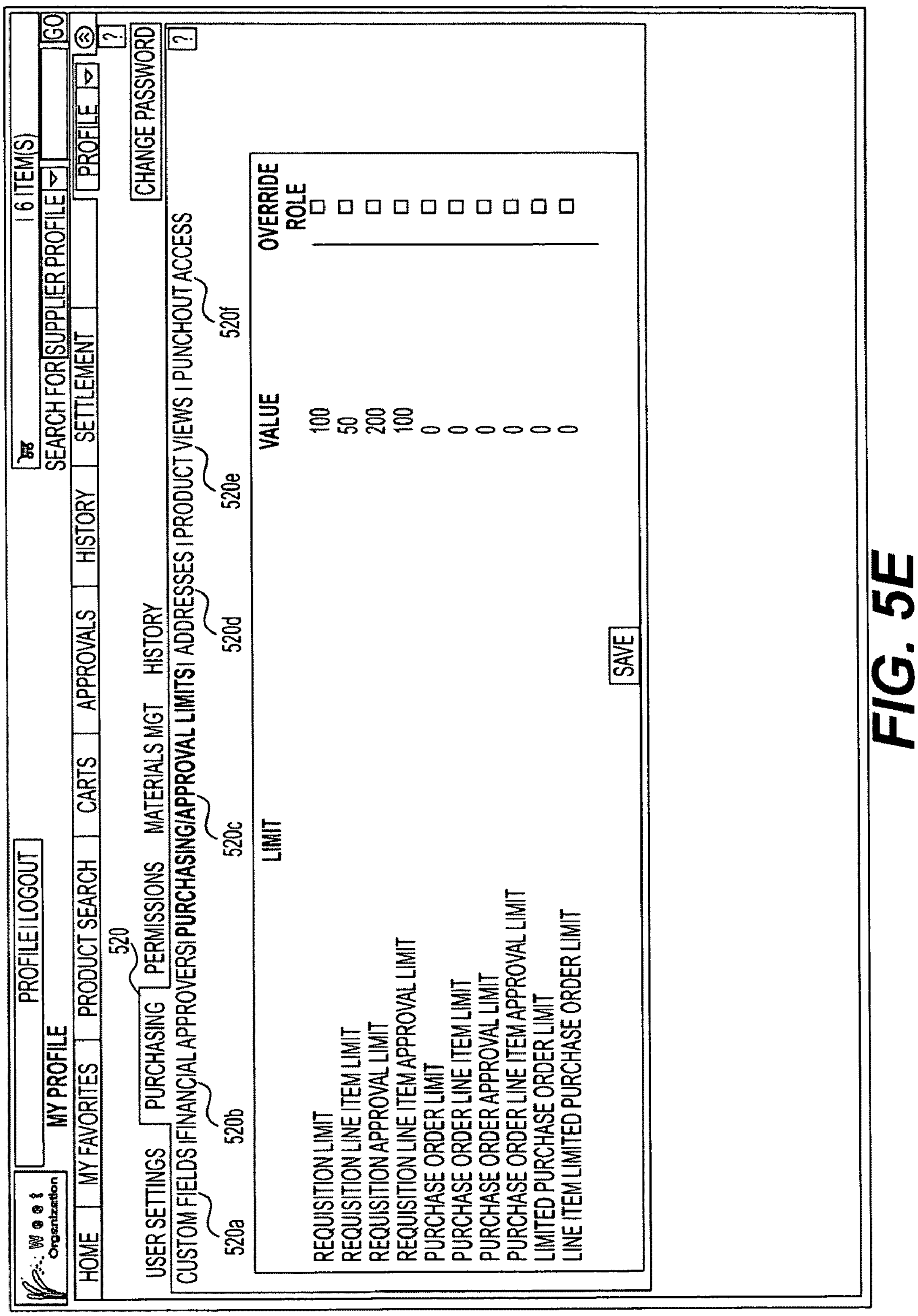
FIG. 5E illustrates an exemplary user purchasing tool in accordance with the present invention.
Figure 5F:
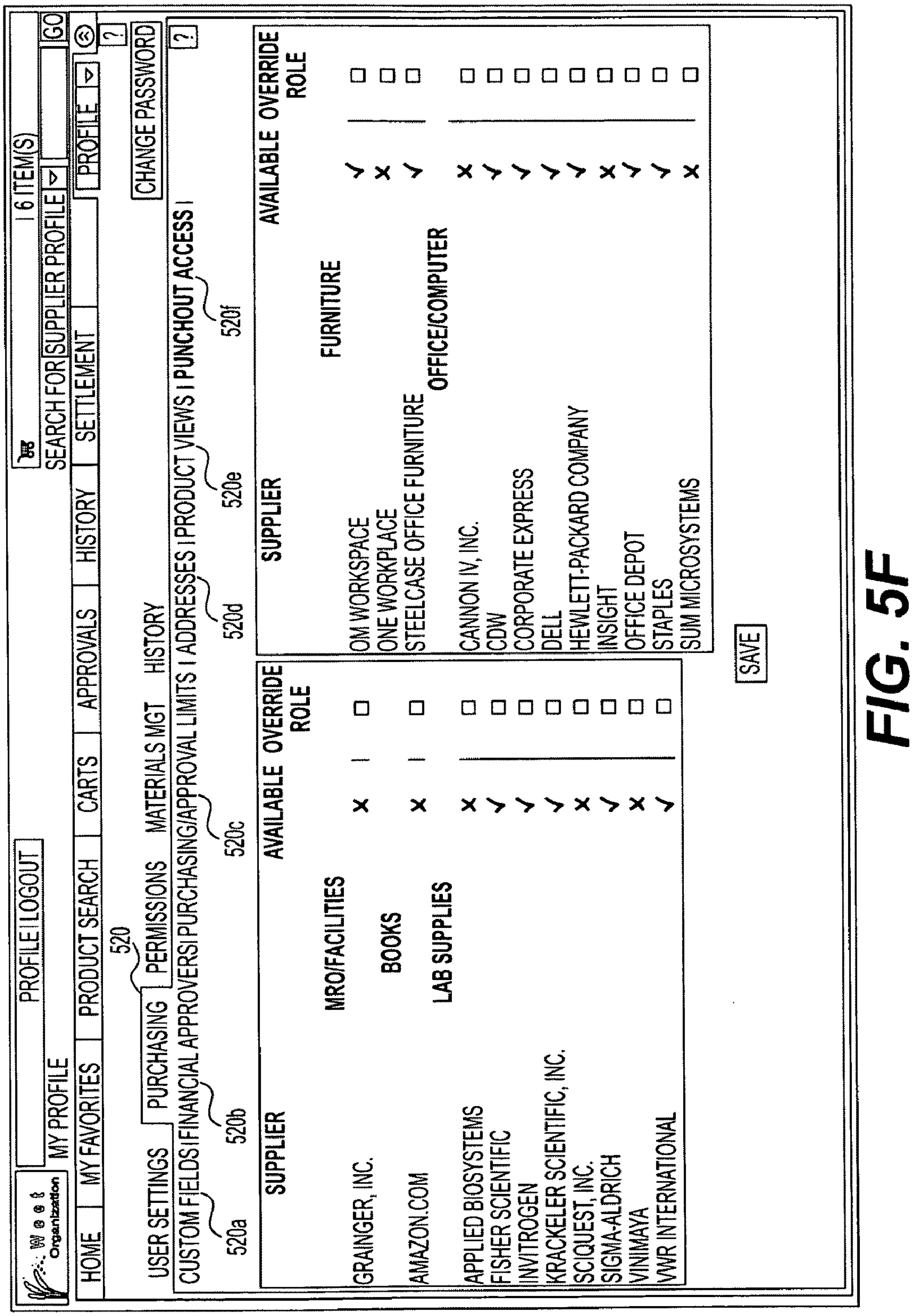
FIG. 5F illustrates an exemplary punch-out access tool in accordance with the present invention.

The user purchasing tool 520 shown in FIG. 5E allows a super user to define the purchasing activities of the user. For example, as shown in FIG. 5E, user purchasing tool 520 includes one or more of the custom fields tool 520*a*, financial approvers tool 520*b*, purchasing/approval limits tool 520*c*, shipping/billing address tool 520*d*, product views tool 520*e*, and punch-out access tool 520*f*. The custom fields tool 520*a* is similar to the purchasing properties tool 446*b* (FIG. 4H) to define the internal and external codes needed to make a purchase (e.g., product code). The financial approvers tool 520*b* designates purchase approvers for the user. Default, preferred, and additional approvers may be designated through the financial approvers tool 520*b* as well as removing approvers for the user. The purchasing/approval limits tool 520*c* designates the limits of purchases and/or approvals of purchases allowed for the user. FIG. 5E illustrates an exemplary view of the purchasing/approval limits tool 520*c*. As shown, the limit values of various activities related to purchases may be defined for the user. The shipping/billing address tool 520*d* designates the shipping/billing address associated with the user. The product views tool 520*e* designates the type of products the user is allowed to view. The punch-out access tool 520*f* designates the punch-out catalogs that are allowed to be accessed by the user. For example, FIG. 5F illustrates an exemplary punch-out access tool 520*f*. As discussed above, these settings may be designated as a default based on the department/position/role assigned to the user. However, these tools may be used to customize the default settings for the specific individual user in accordance with the present invention.

Figure 5G:
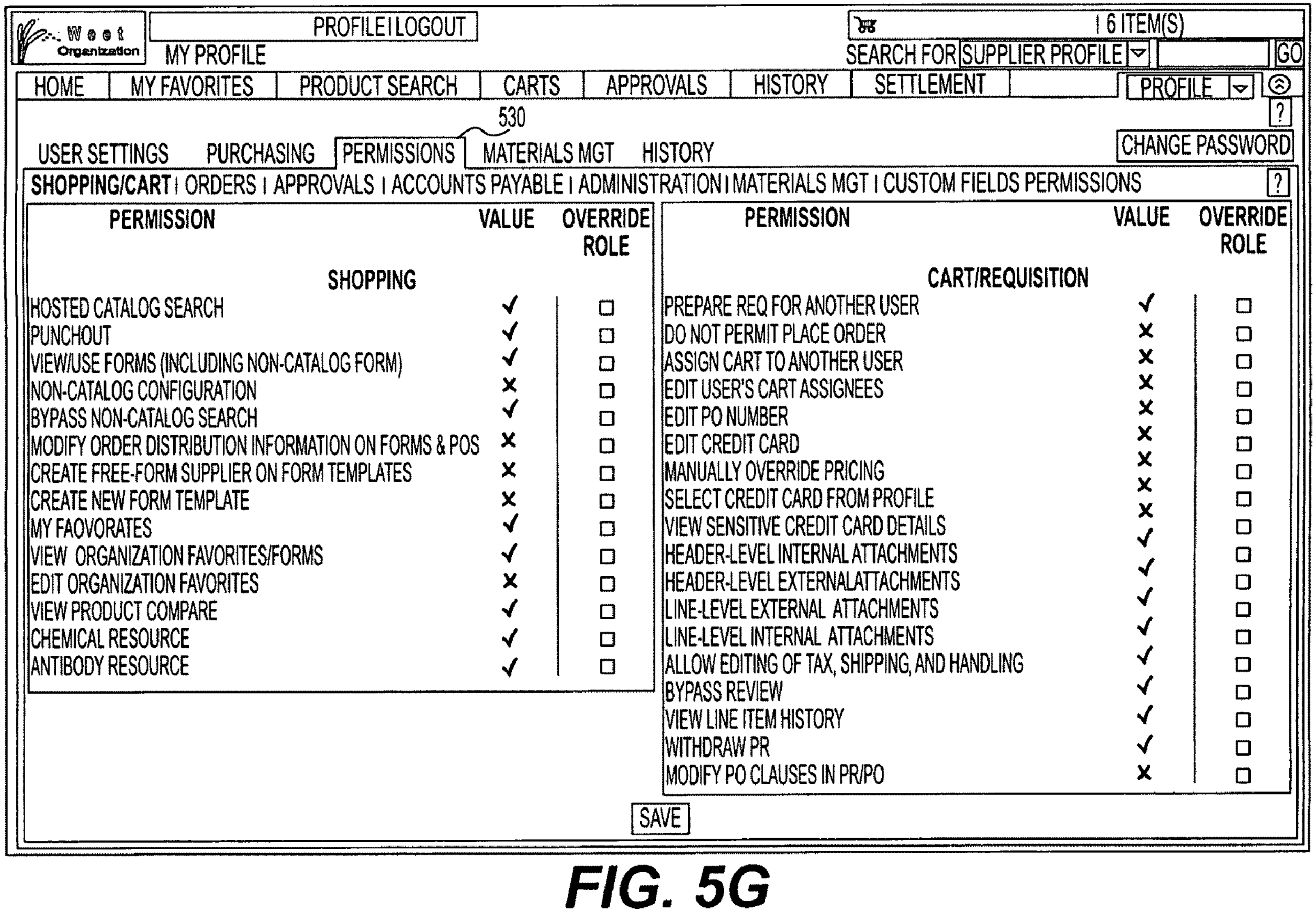
FIGS. 5G-5M illustrate exemplary user permission tools in accordance with the present invention.
Figure 5H:
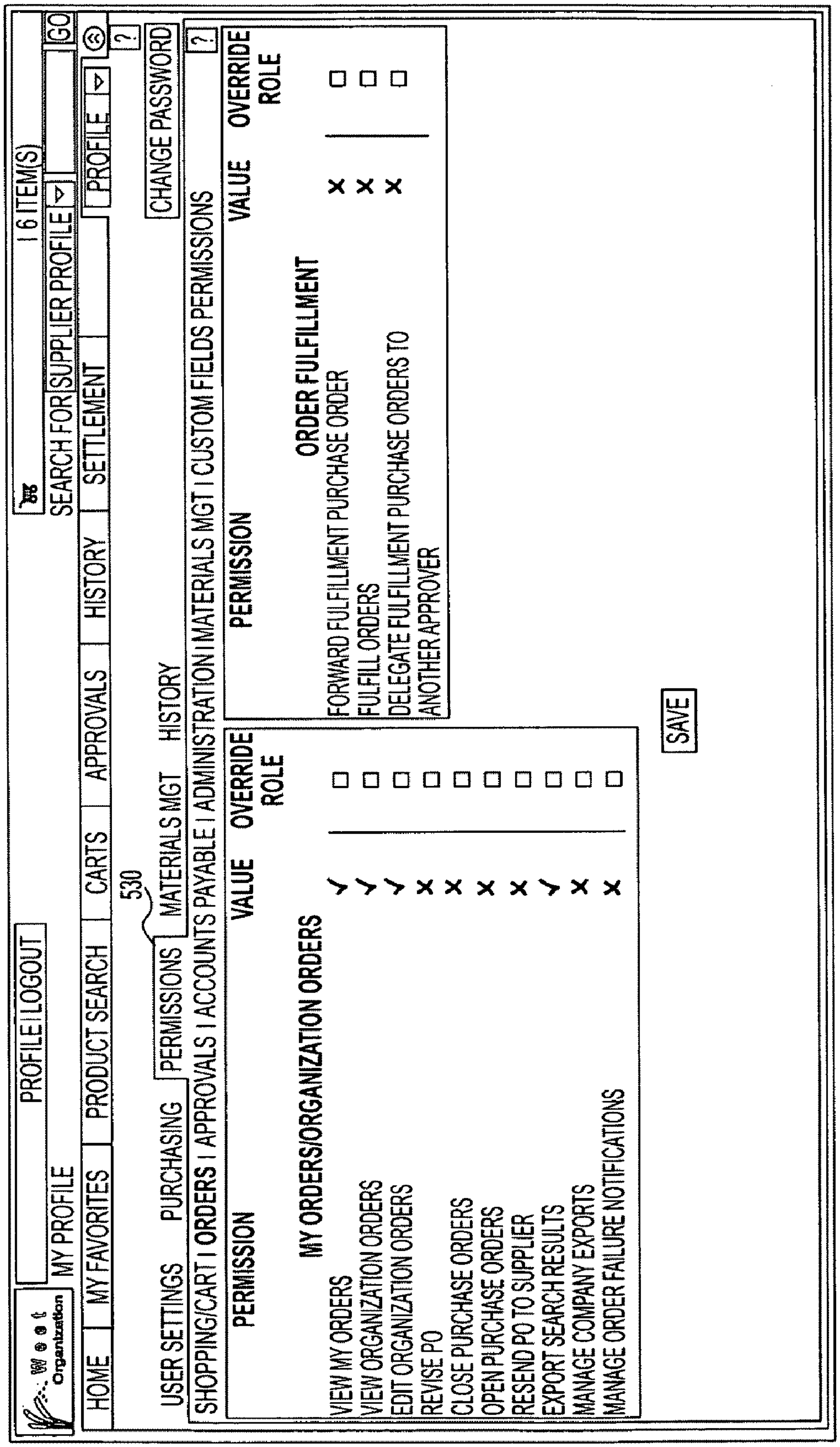
Figure 5I:
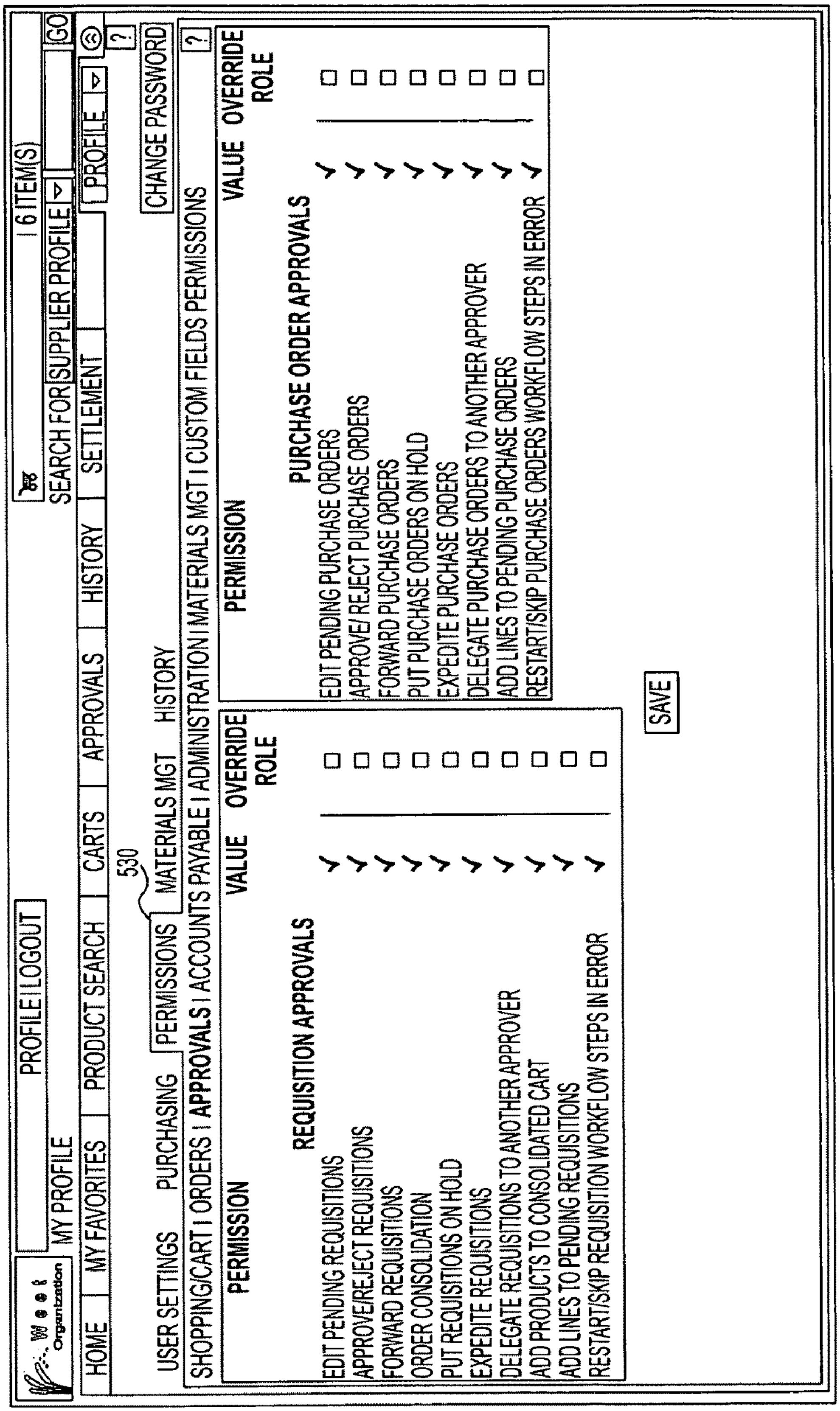
Figure 5J:
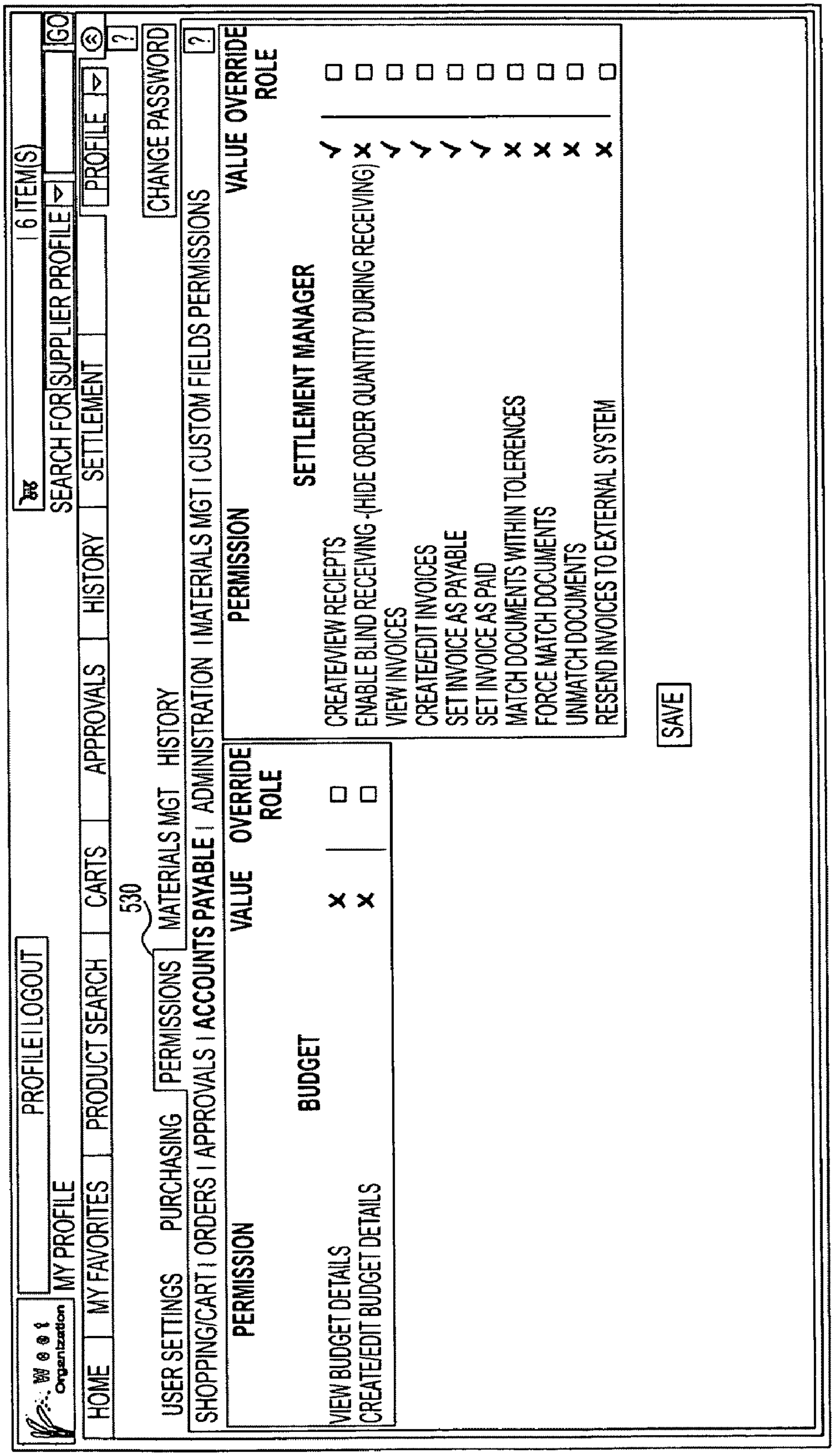
Figure 5K:
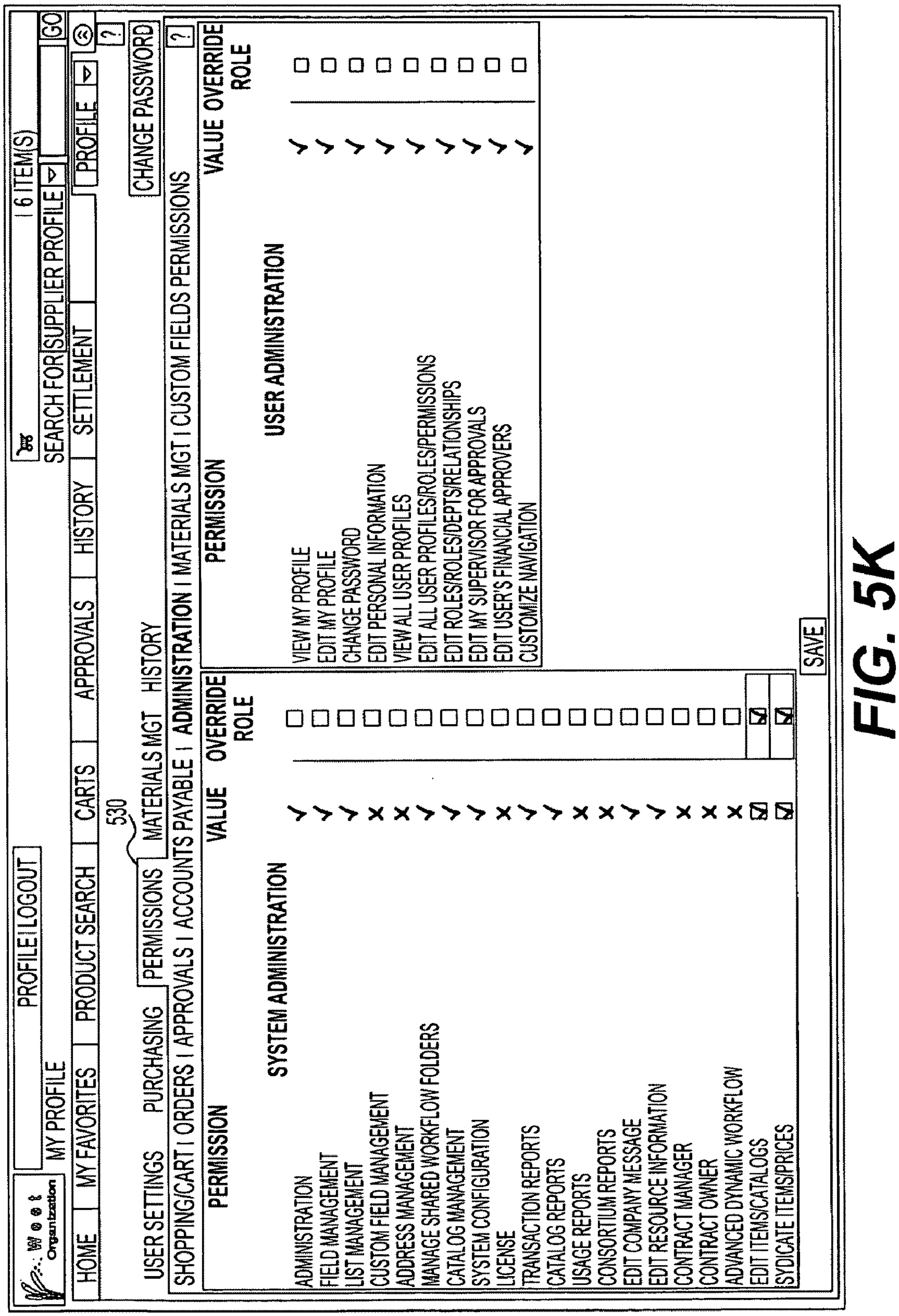
Figure 5L:
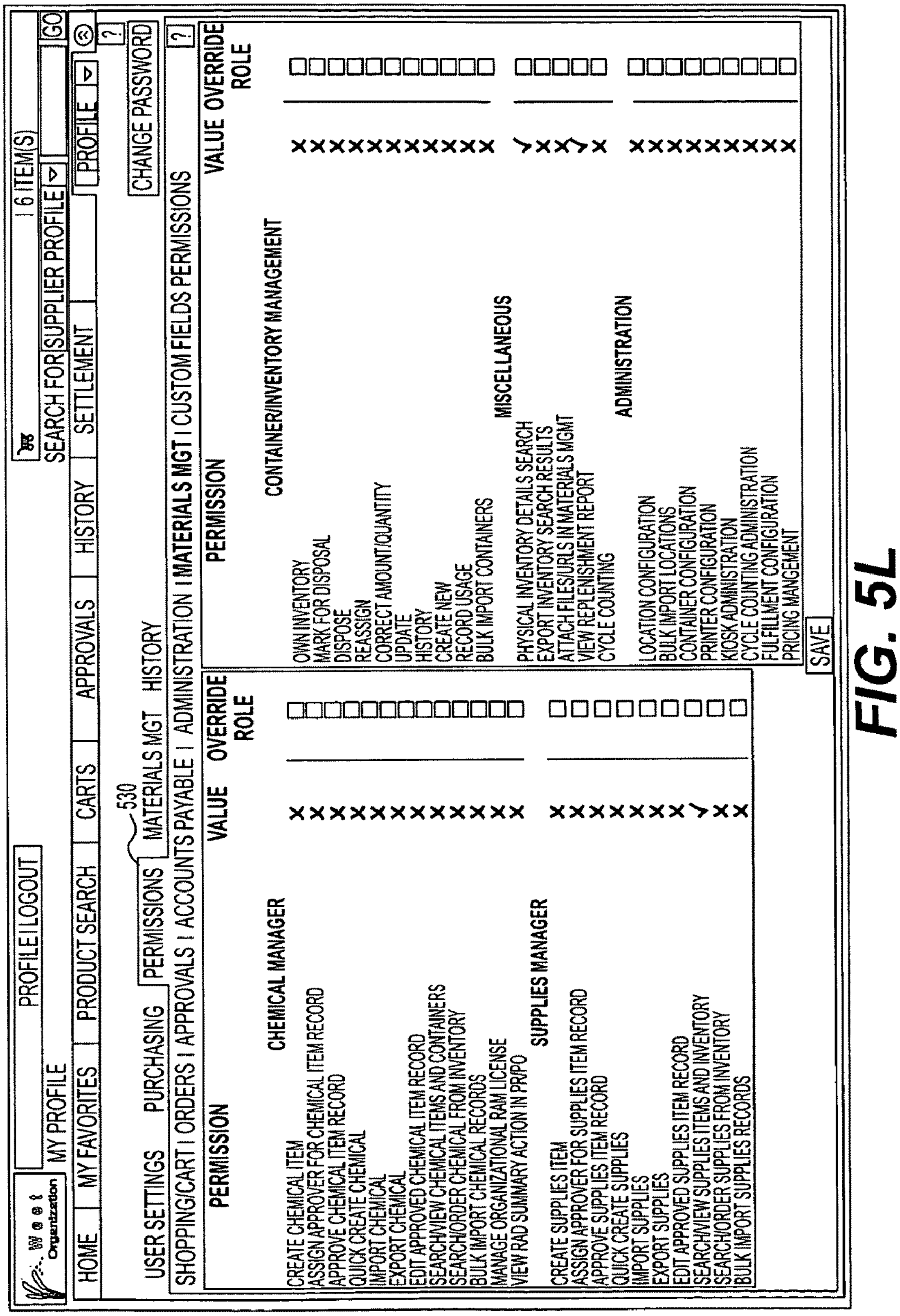
Figure 5M:
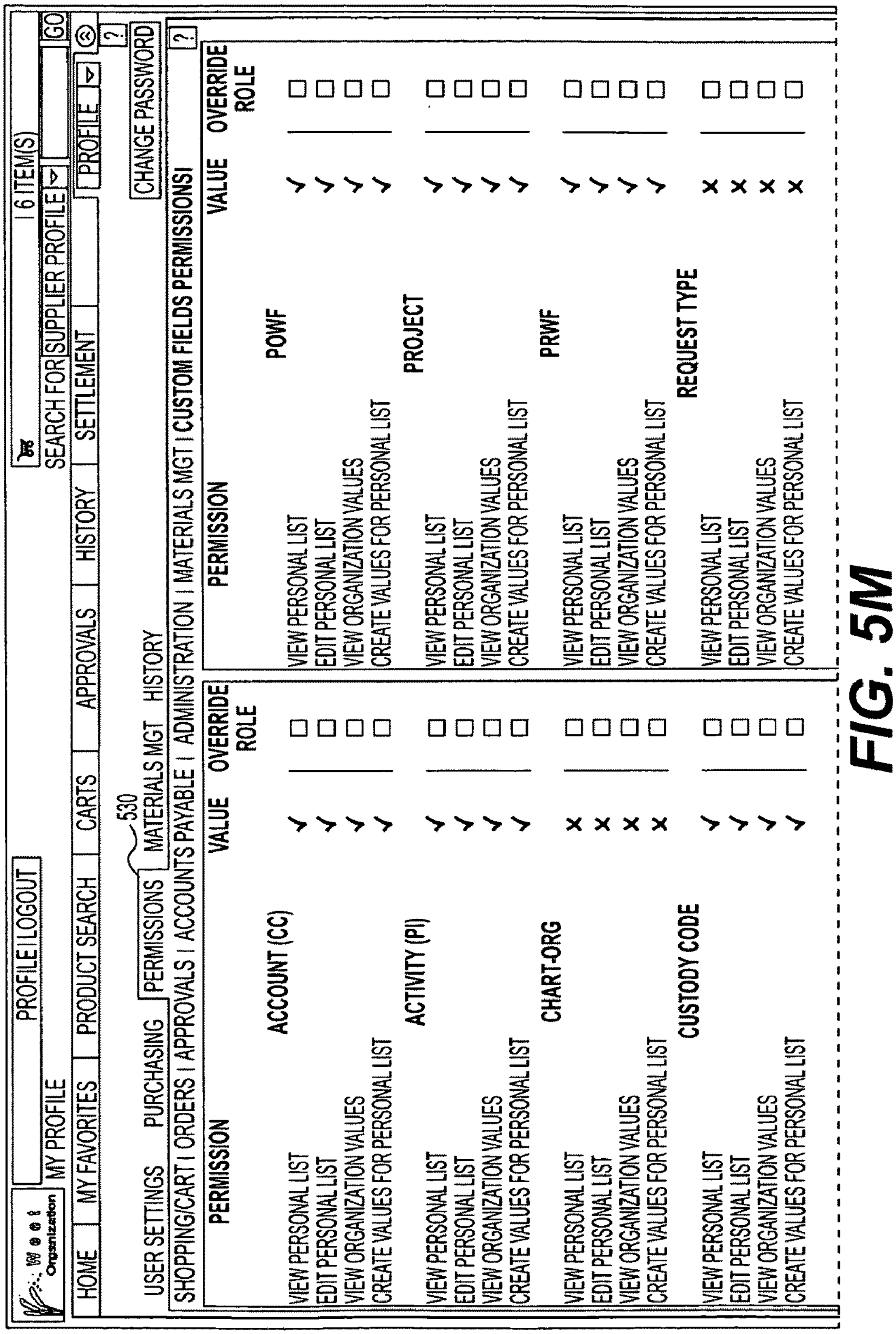
Figure 5M:
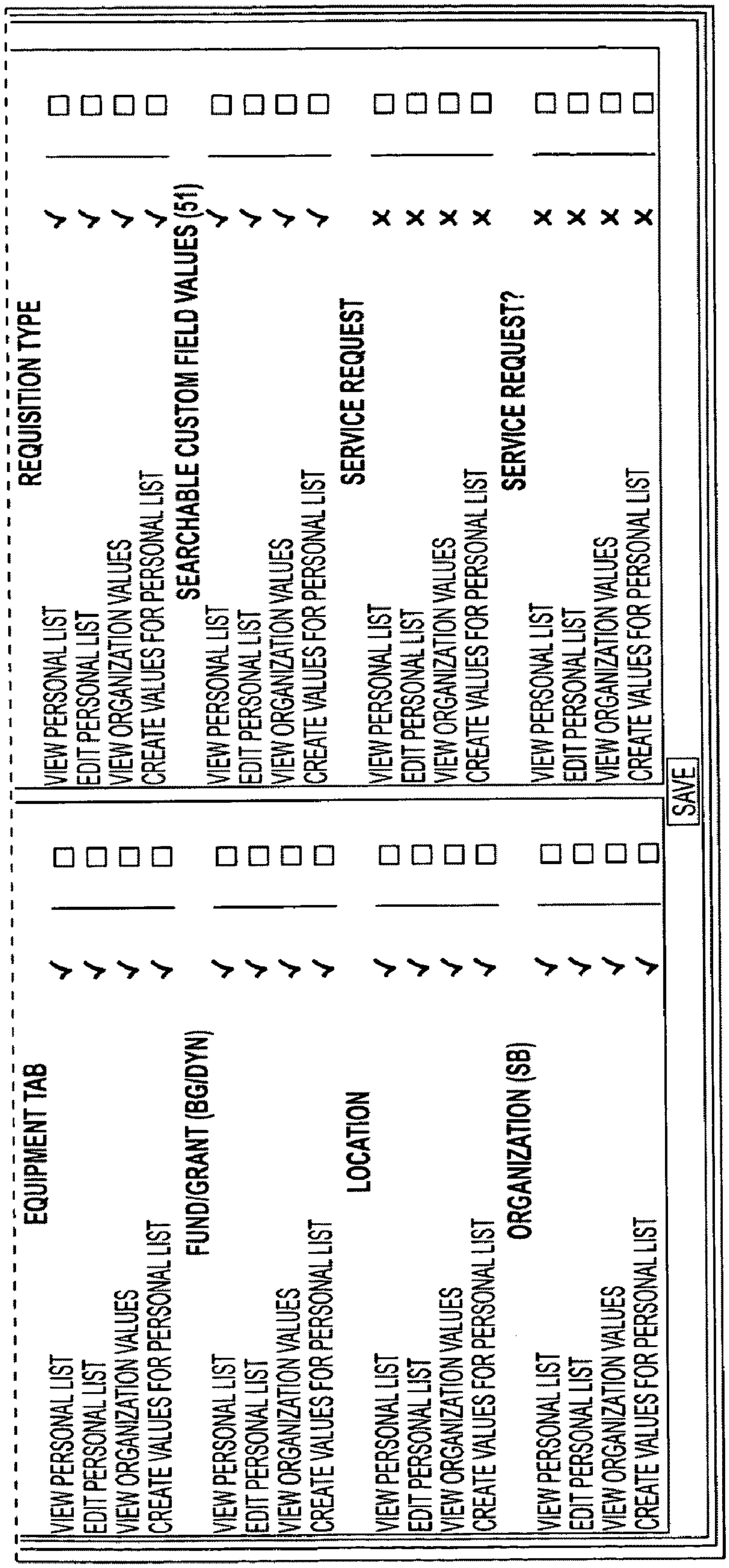
Figure 5N:
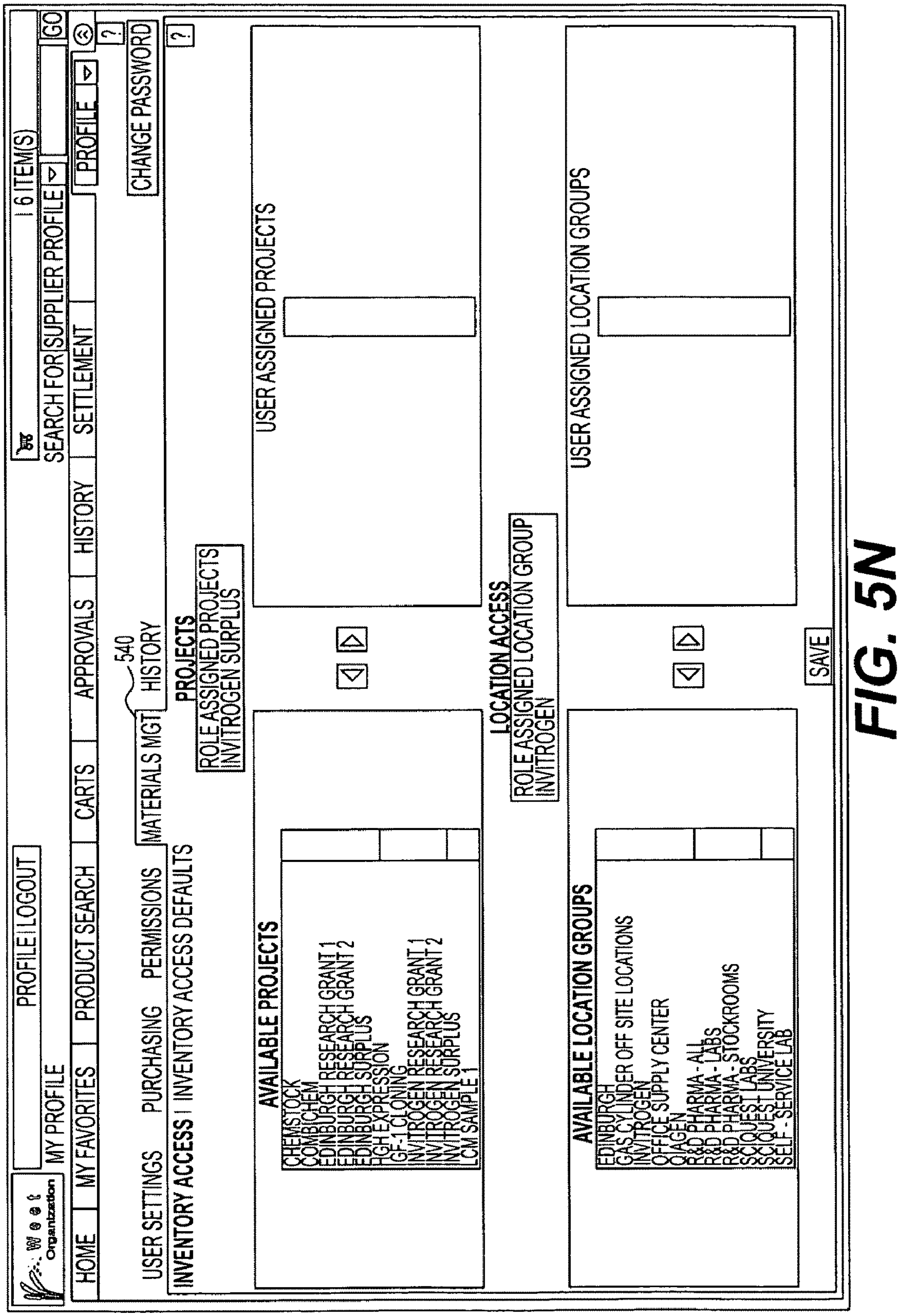
FIGS. 5N-5O illustrate exemplary materials management tools in accordance with the present invention.
Figure 5O:
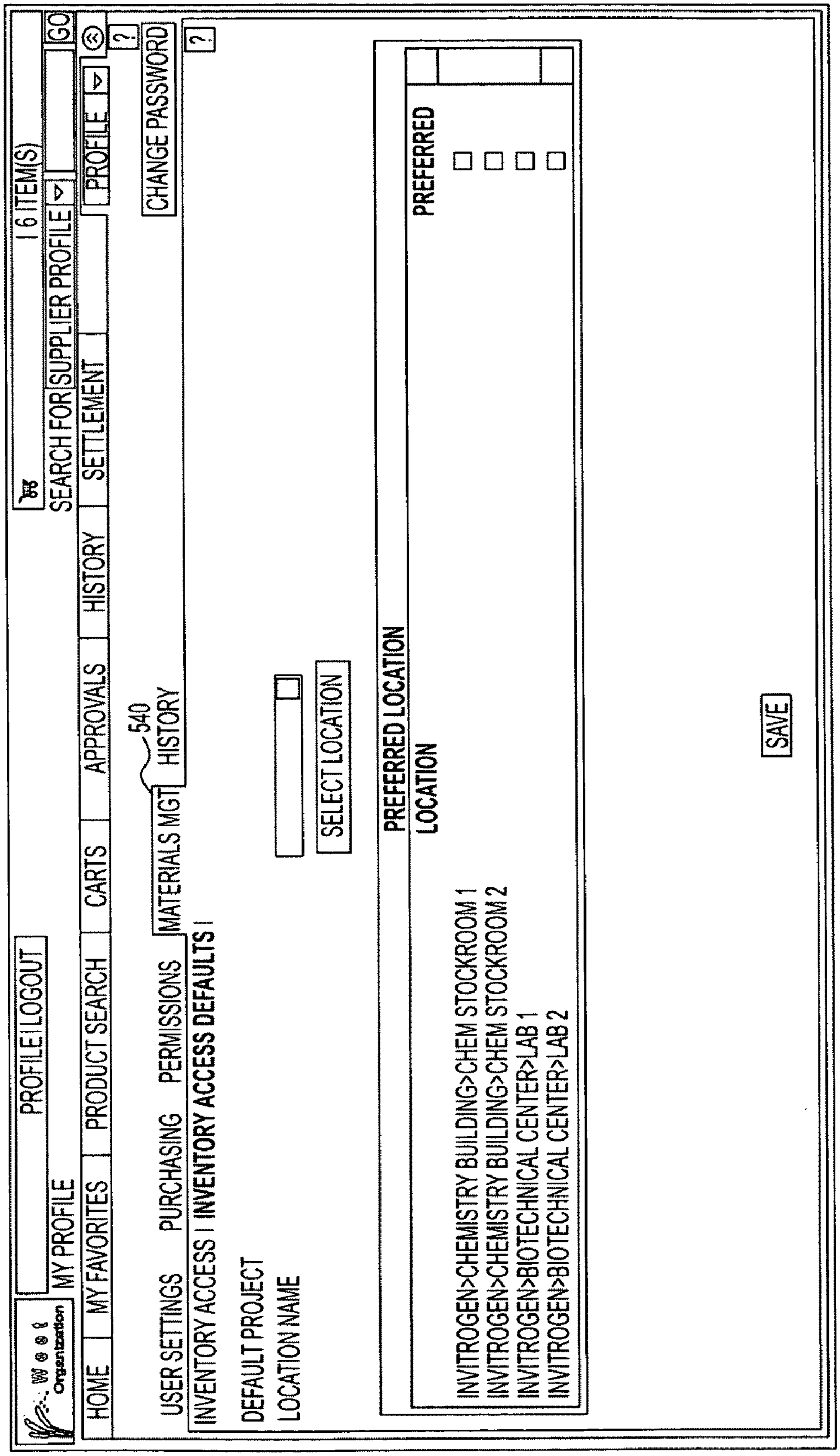

In a similar fashion, the user permissions tool 530 includes one or more of tools to customize the user's access to the shopping cart (FIG. 5G), order processing (FIG. 5H), approval processing (FIG. 5I), accounts payable processing (FIG. 5J), administration permissions (FIG. 5K), materials management (FIG. 5L), and custom fields permissions (FIG. 5M). The materials management tool 540 designates inventory locations based on projects and groups (FIG. 5N) as well as default/preferred access locations (FIG. 5O). As discussed above, the history tool 550 keeps track of all actions/changes made to the various parameters.

Figure 6A:
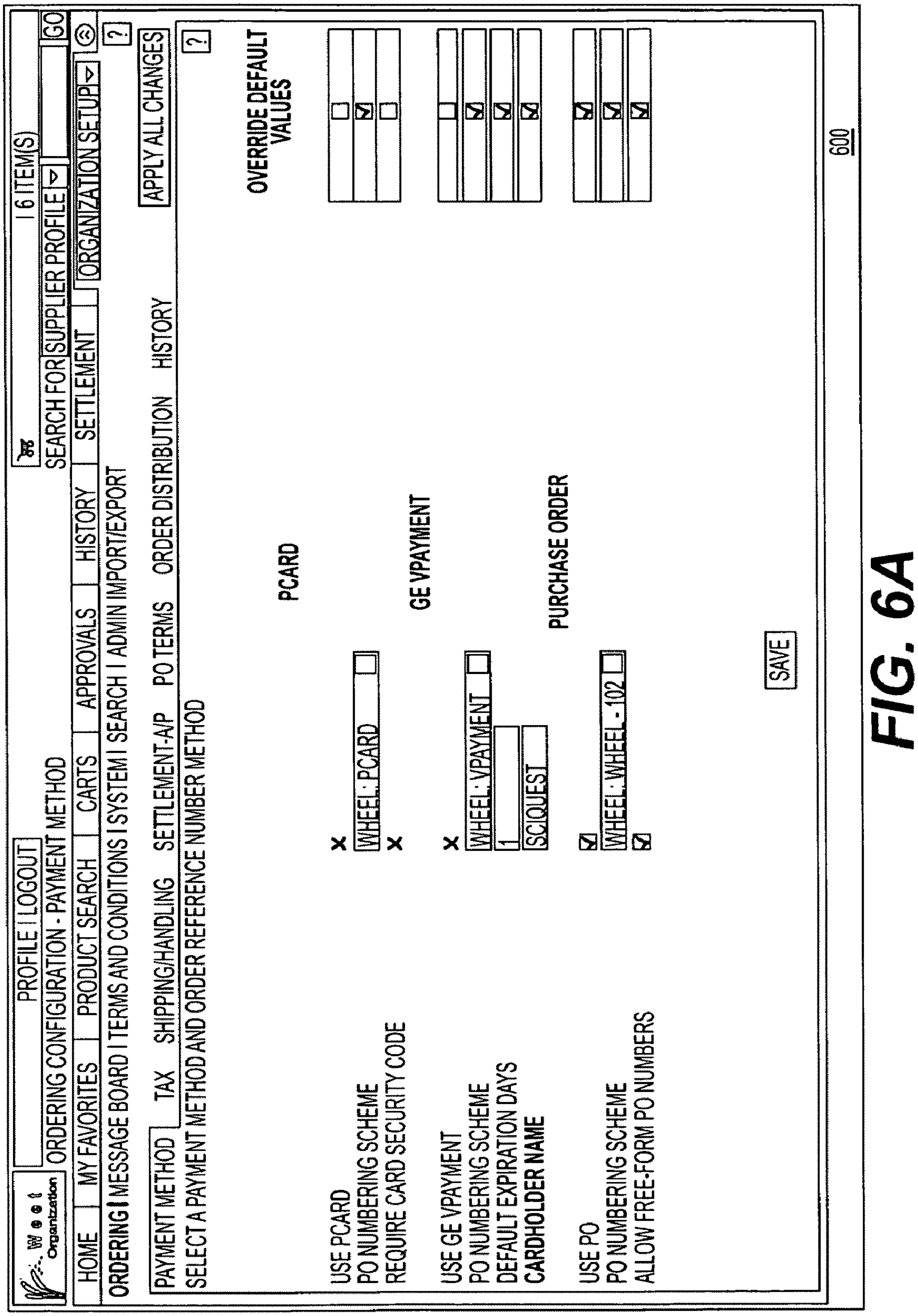
FIGS. 6A-6J illustrate exemplary organization setup tools in accordance with the present invention.
Figure 6B:
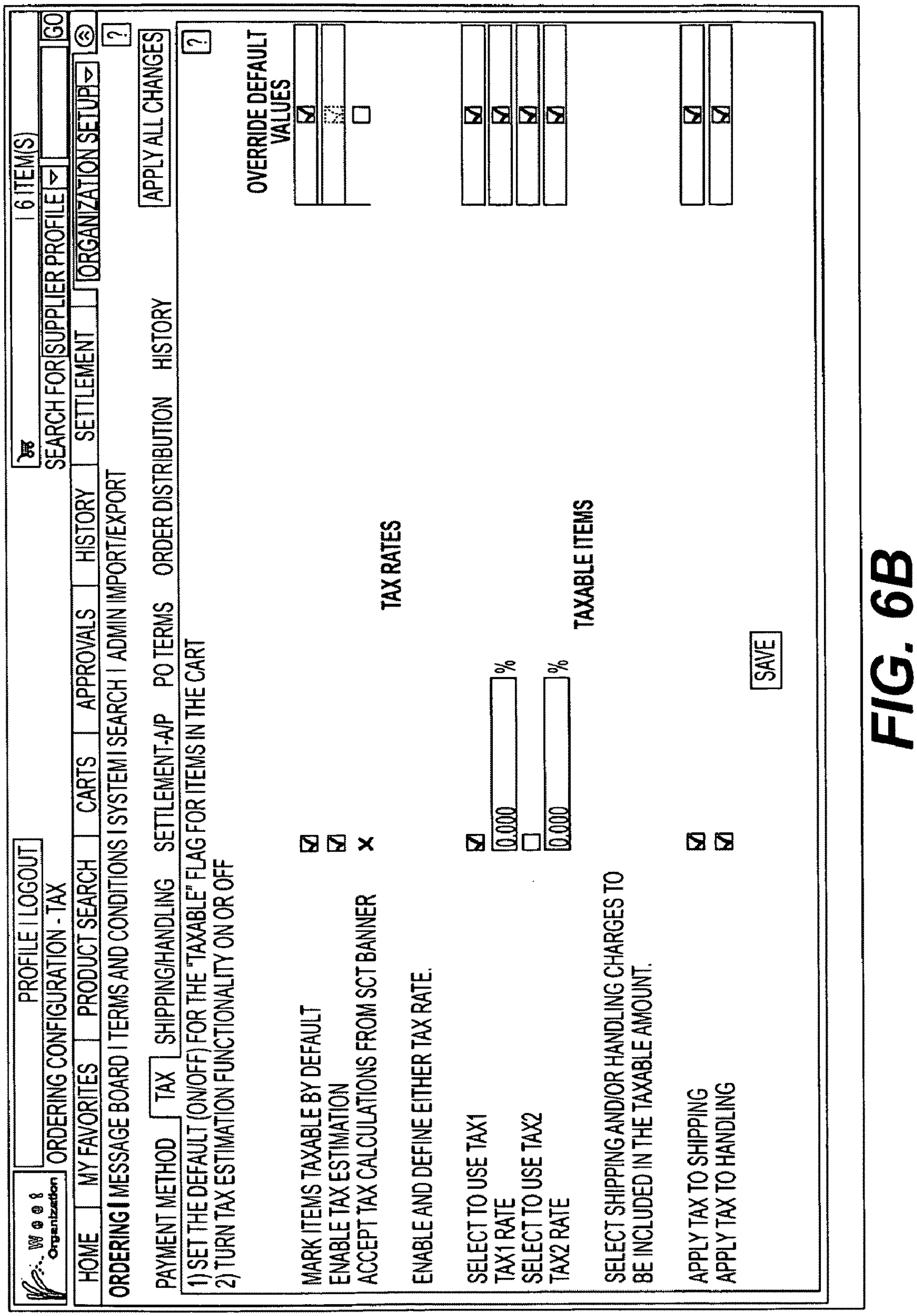
Figure 6C:
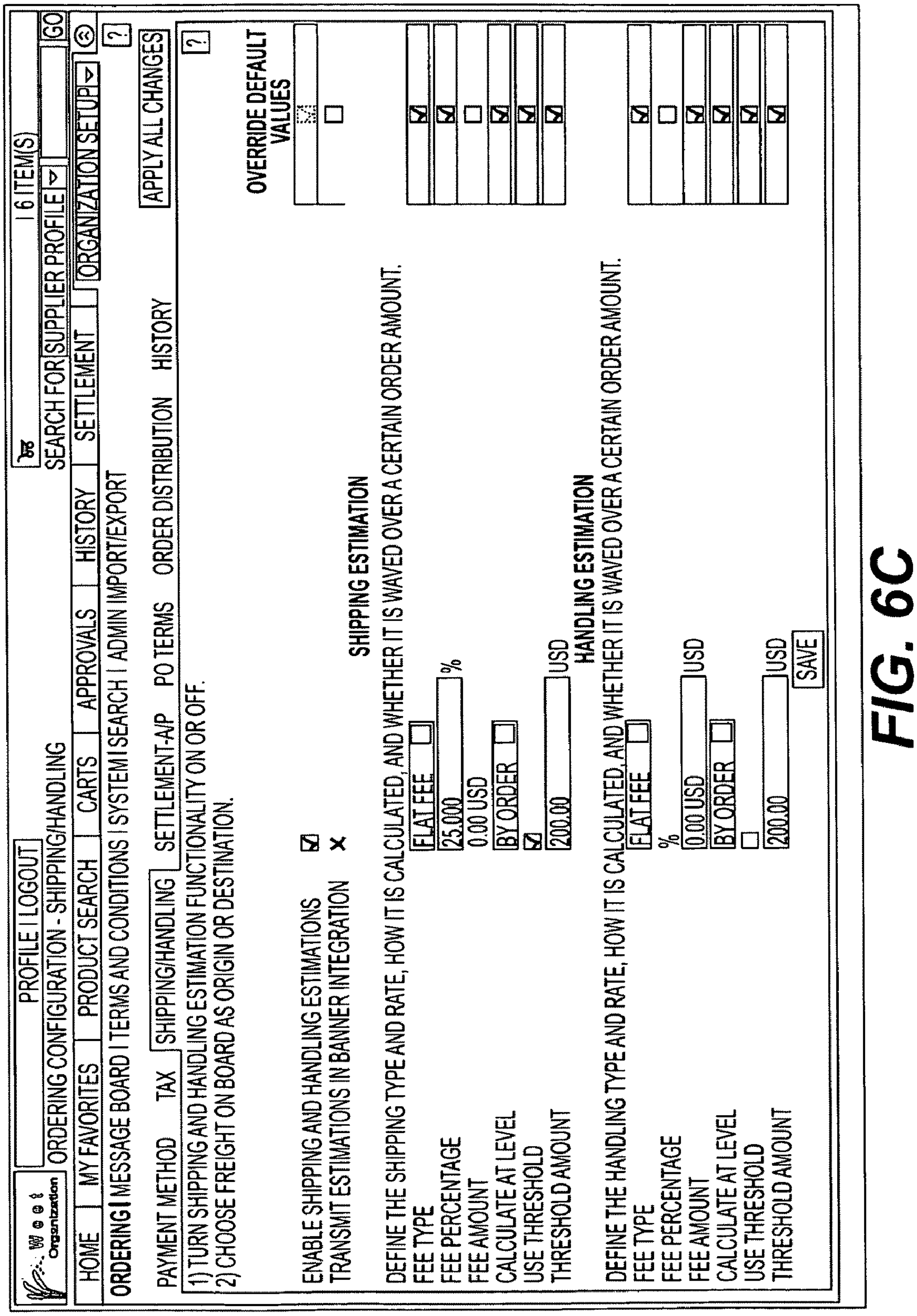
Figure 6D:
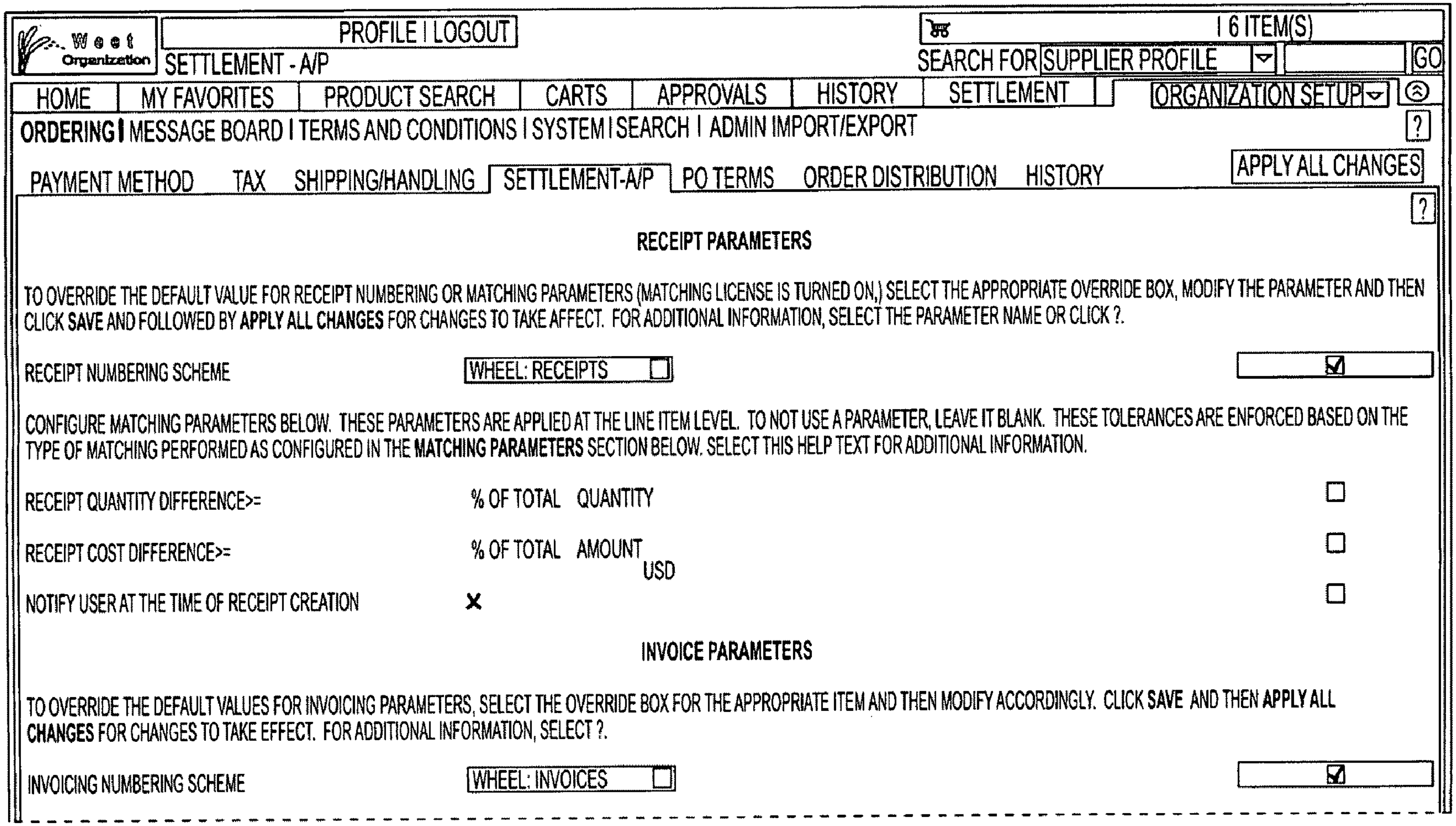
Figure 6D:
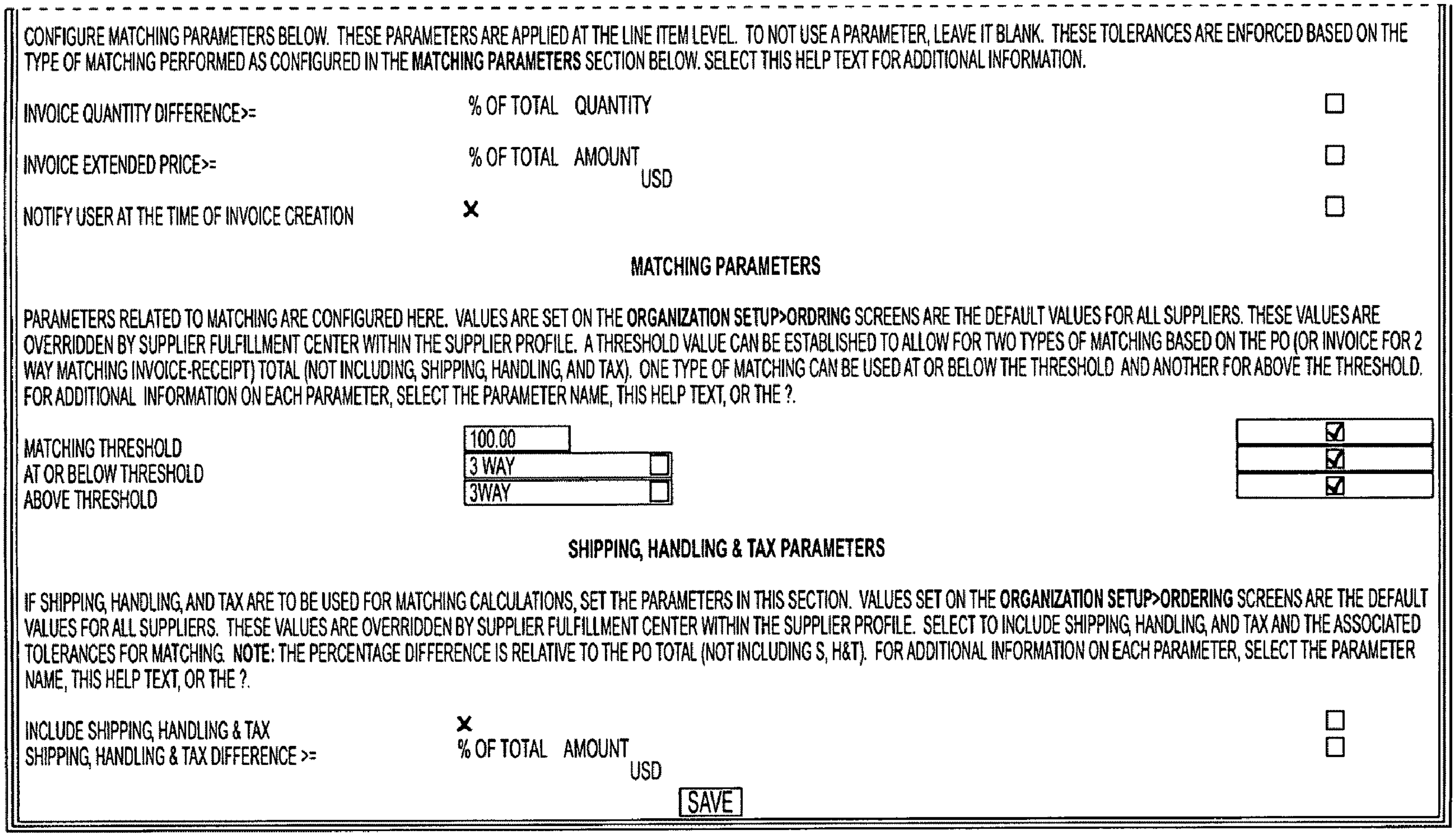
Figure 6E:
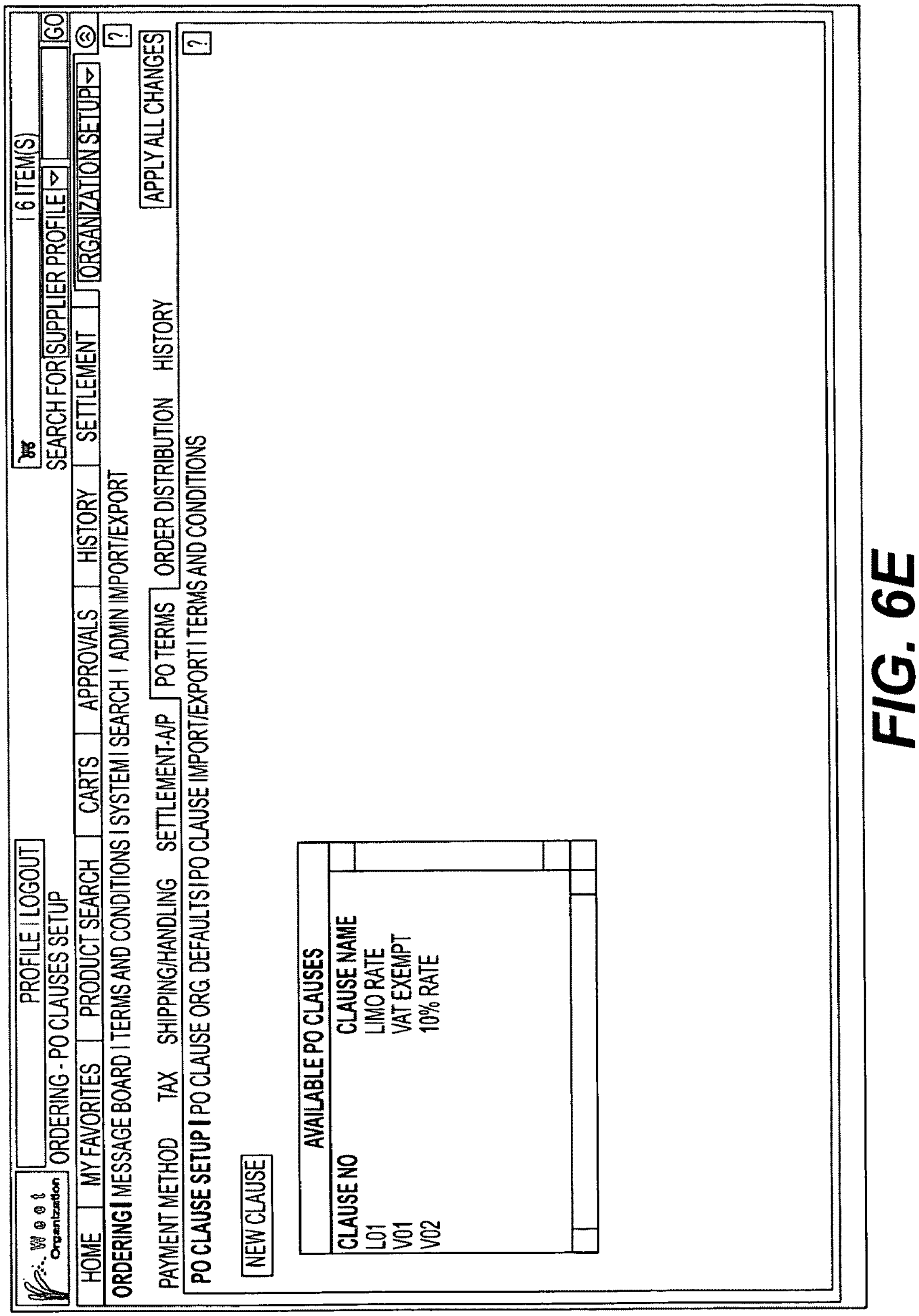
Figure 6F:
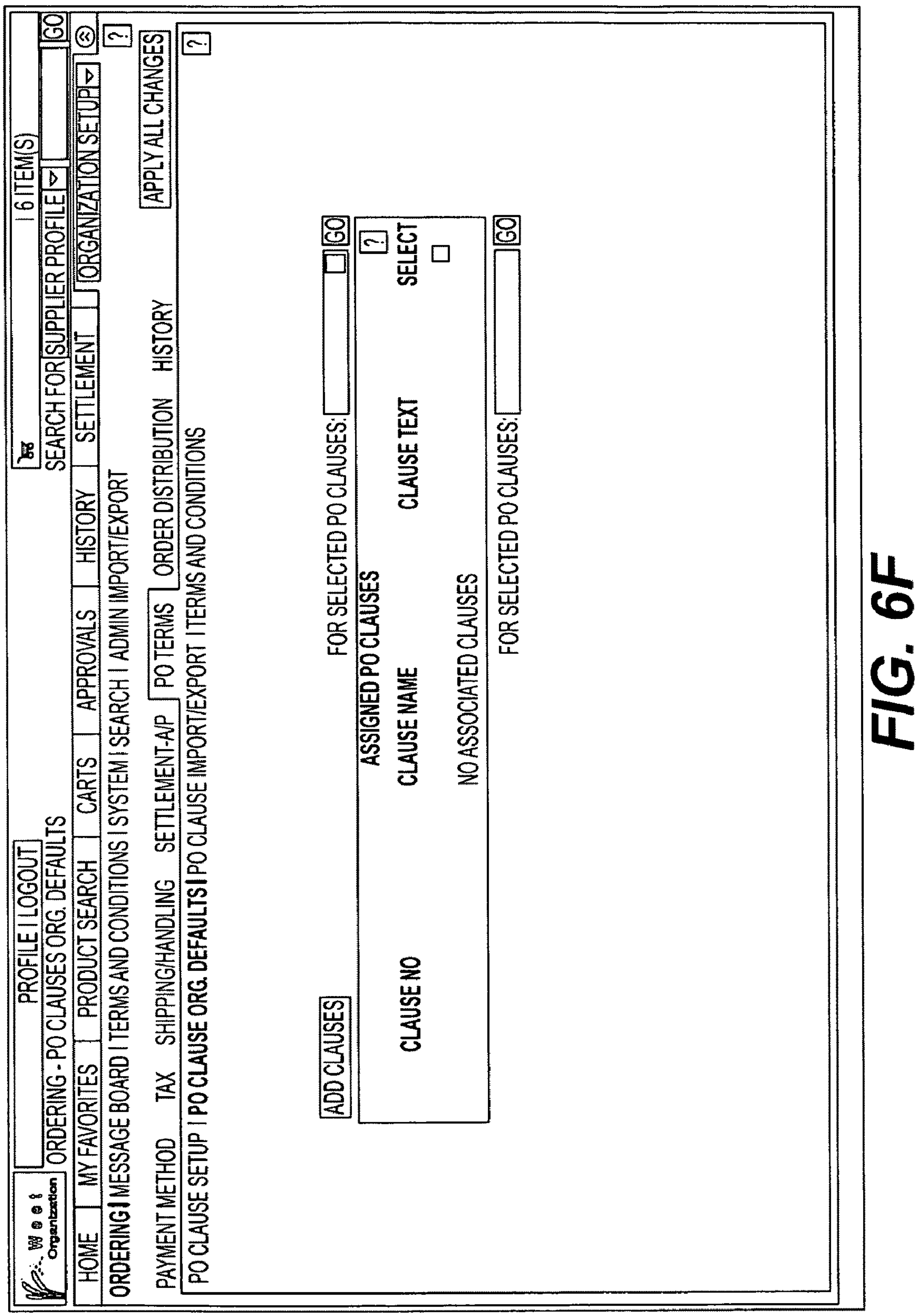
Figure 6G:
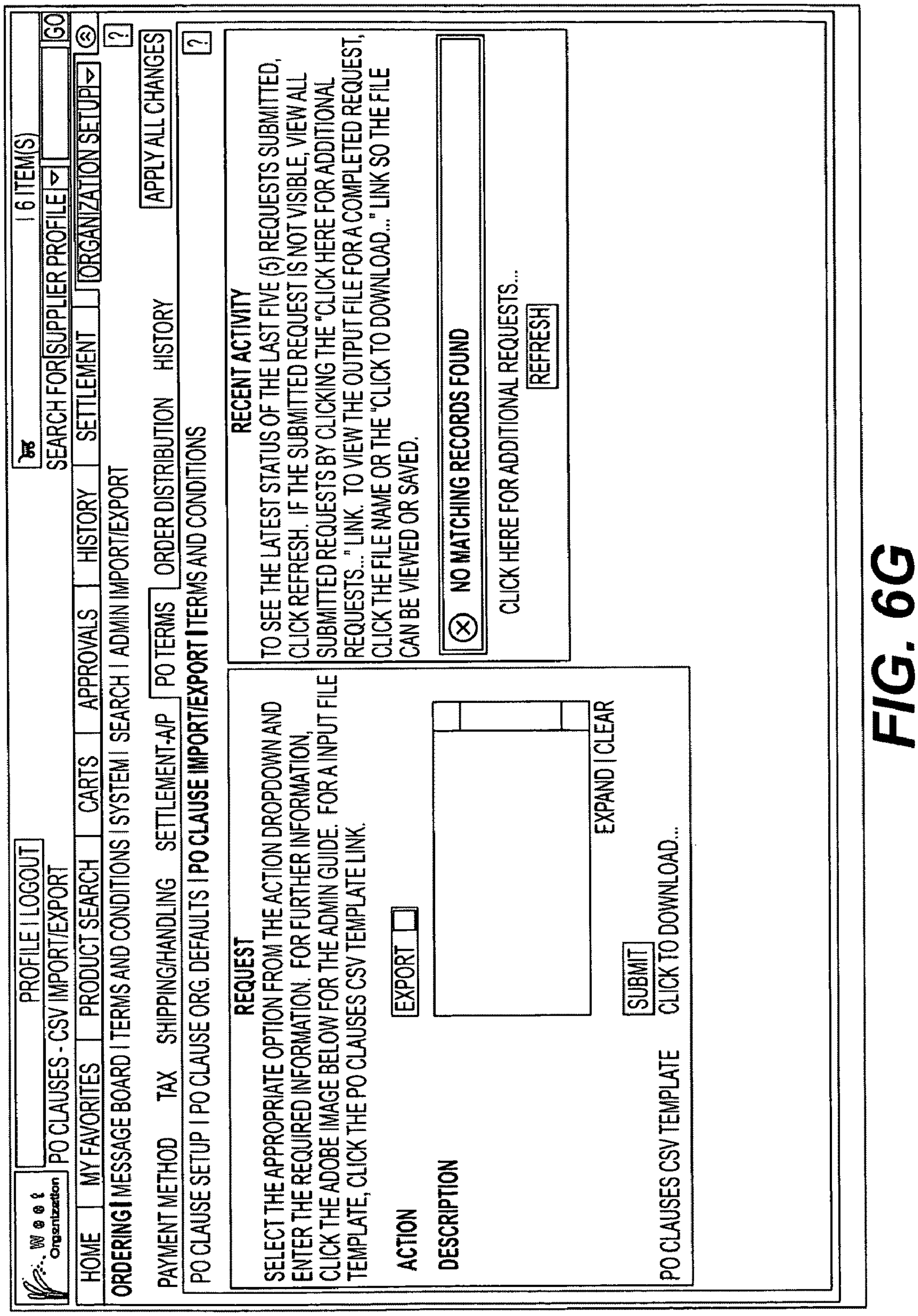
Figure 6H:
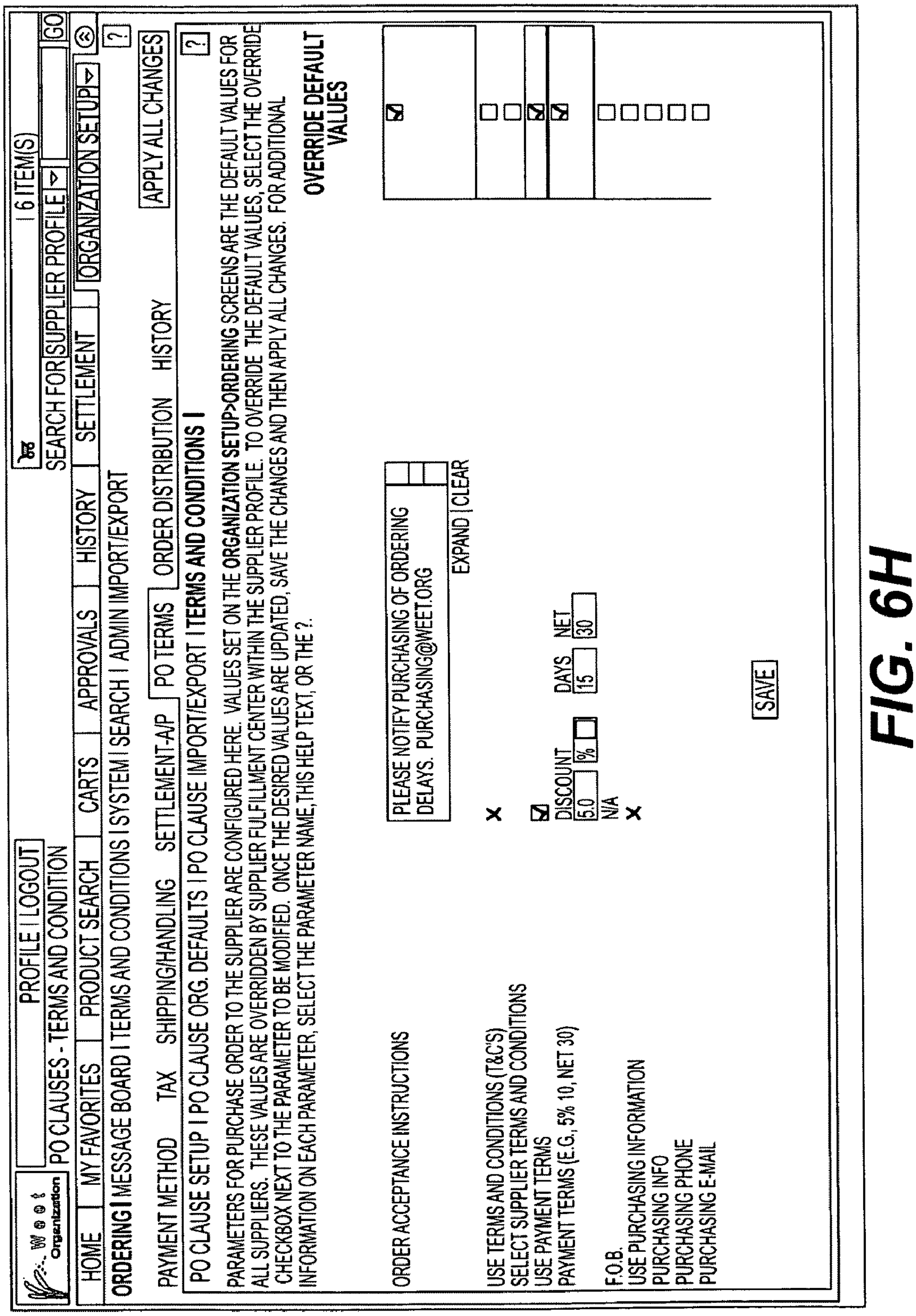
Figure 6I:
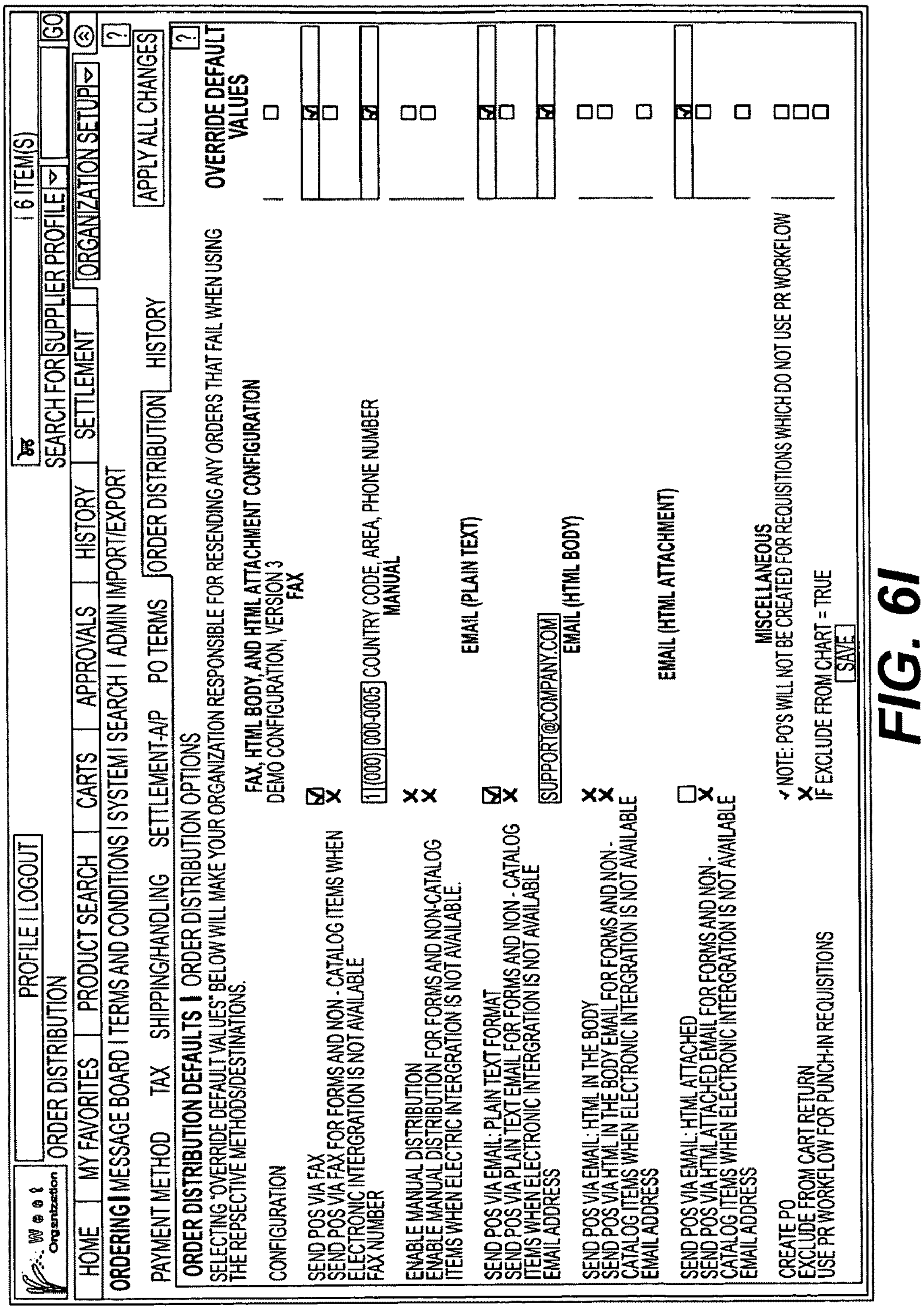
Figure 6J:
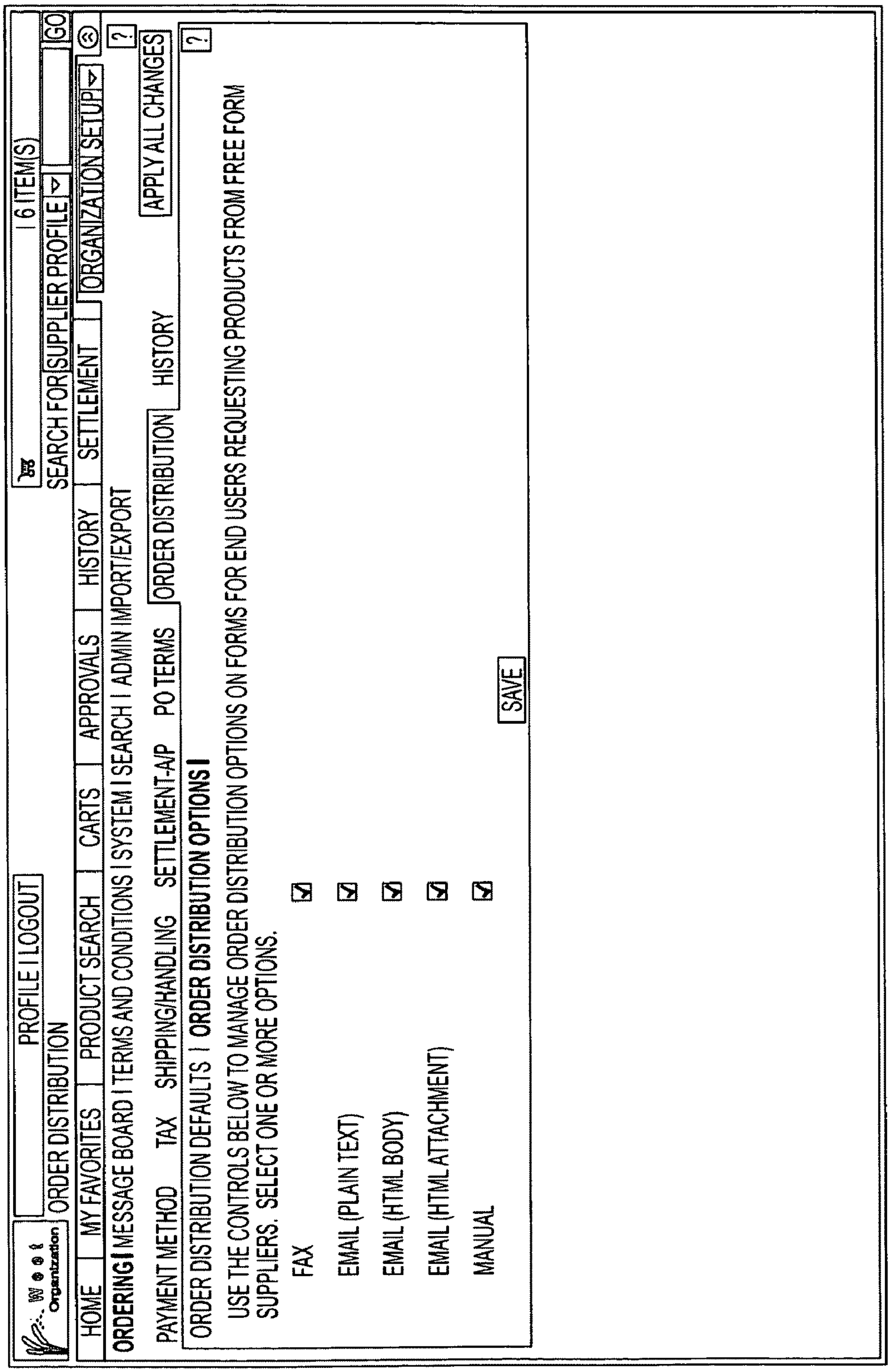

FIG. 6A illustrates an exemplary organization setup tool 600 for designating business rules such as method of payment (FIG. 6A), tax (FIG. 6B), shipping/handling (FIG. 6C), settlement (FIG. 6D), purchase order terms (FIGS. 6E-G), order distribution process (FIGS. 6I-J), and history of all actions effectuated through the organization setup tool. By organizing all of the terms and conditions of an order for each organization in a single instance, multi-tenant architecture, each requisition effectuated on the eProcurement system of the present invention is processed efficiently.

Figure 7:
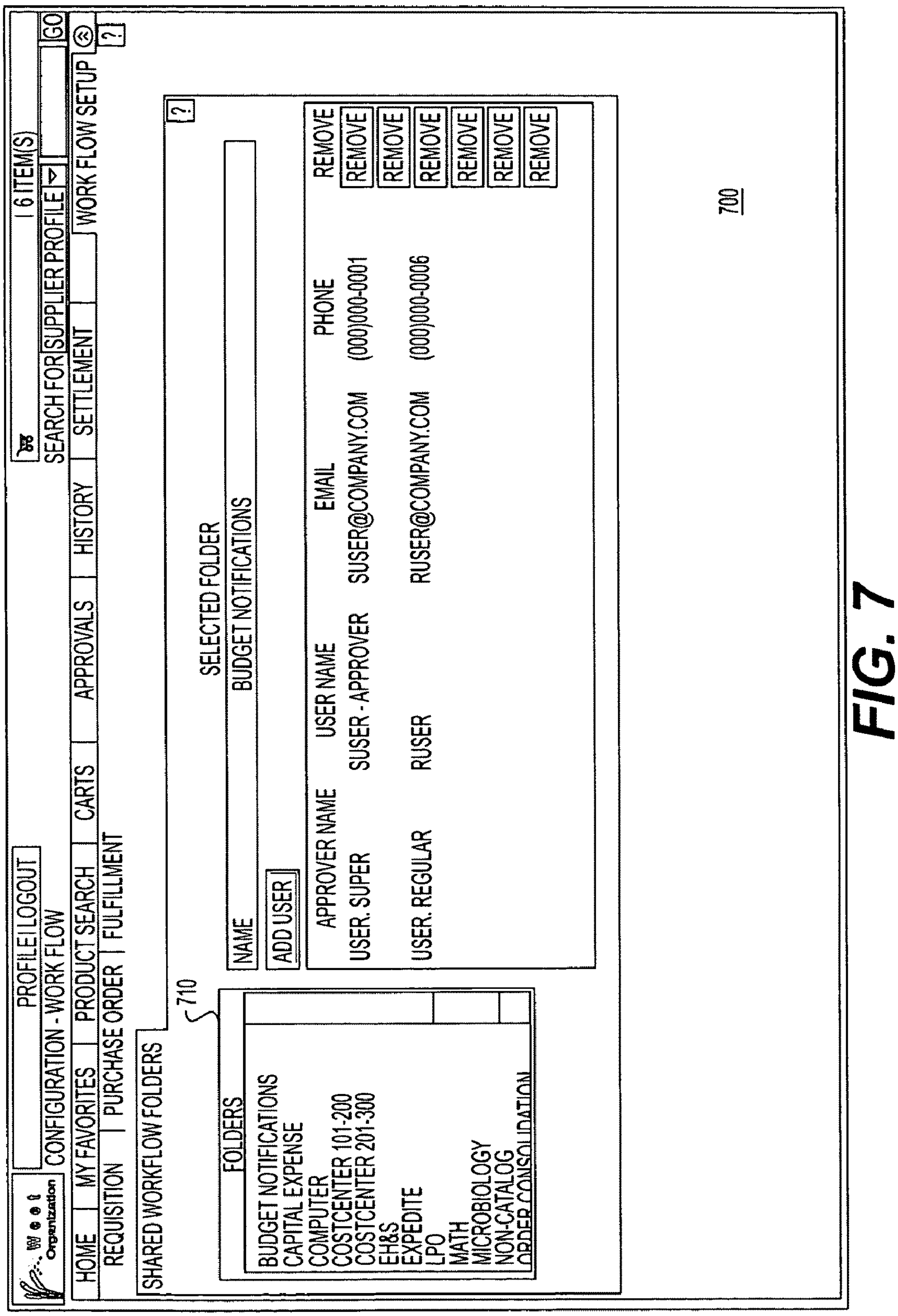
FIG. 7 illustrates an exemplary workflow setup tool in accordance with the present invention.

FIG. 7 illustrates an exemplary workflow setup tool 700 to define the workflow process of a requisition, purchase order, and fulfillment. As shown in FIG. 7, the workflow setup tool 700 in accordance with the present invention creates a shared workflow space 710 and allows for the assignment of users (e.g., individual users, or users of various user roles) to be included in the workflow process.

Other configuration tools include document attachment and setup tool (FIG. 102, document attachment and setup interface) to organize documents related to requisitions, purchase orders, and sales orders for access by the user. The document attachment and setup tool keeps track of the name of the document creator, version number, and any deployment dates, as well as other data related to the document. Moreover, the eProcurement system in accordance with the present invention includes a field management tool (FIG. 100, exemplary field management interface) that allows super users to create, modify, and manage every field/parameter related to the procurement process used on the system. Accordingly, the eProcurement system of the present invention may be custom tailored for each organization/user role/user while maintaining its single instance, multi-tenant environment.

As shown in FIG. 2, end user interfaces 212 and supplier user interfaces 214 according to the present invention provide access to the plurality of modules of the eProcurement system 10 (FIG. 1). As described above, the end user interface 212 is configurable by both end user and super users. Moreover, the end user interface 212 includes one or more features, for example, such as searching and viewing a hosted supplier products catalog, invoking purchase/requisition orders, consummating sales transactions, invoking status queries and viewing the response, and setting end user configuration preferences as described further below. For example, the search and view feature allows for searching via product description, supplier name, manufacturer name, catalog no. (SKU), a filtering capability, and by browsing: catalog/non-catalog items, suppliers, or contracts. A user may invoke any of these search inputs alone or in combination with others. Also, Boolean and fuzzy logic functionality is available for searching and allows a user to devise targeted search strategies that may return more accurate search results. Once a user has invoked a search using any of the inputs described, the user may then view the returned results. The returned results can be filtered by a user based on category or supplier. Also, a user may choose to organize the returned results such that similar results are listed in proximity of one another. For example, a user may organize returned results by weight, supplier, category, catalog number, product description, UOM, product size, price, quantity, and/or currency.

The catalog may be implemented as single instance but multi-tenant (or, as multiple instance, single-tenant), and may further include custom views of items as set by each internal end user and/or organization. An end user may specify favorites within the catalog. Such favorites are available for later viewing or purchasing by the end user. Any updates made to an end user favorite within the catalog will be automatically propagated to the end user's favorite(s) view as well (FIG. 101, an exemplary update favorite(s) process flow). The catalog may allow for supplier classifications and multiple products may be linked to a single supplier. Also, the catalog can be activated or deactivated through a simple click on the end user interface, and specific product categories can be globally manipulated and applied to affect all end users. Each catalog may contain information regarding one or more suppliers, and a master product database is primarily tasked with populating each hosted supplier products catalog. This master product database is a relatively large database with a plurality of attributes related to one or more specific products.

In addition to the hosted supplier products catalog, punch-out catalogs may also be implemented as an alternative and supplement to the hosted supplier products catalog, and are made available, for example, when the hosted supplier products catalog does not yield sufficient or satisfactory results. The punch-out catalogs link to outside/third-party catalogs, are not hosted, and may also contain end user organization-specific prices. Processing modules executed on the custom database servers invoke each punch-out instance. Multiple punch-out catalogs may be accessible by a single end user. An end user can return from a punch-out catalog to the hosted supplier products catalog, and the remainder of the features of the eProcurement architecture, via a submit feature, which will then return to the processing module that initially invoked the punch-out instance. Punch-out catalogs may be configured to display relevant catalogs to an end user, based on the end user organization. An end user can browse punch-out catalogs to search for more accurate results and may, subsequently, invoke a requisition order via the third-party web site and order processing methods. Also, one or more purchase orders can be sent from one or more punch-out catalogs, but each punch-out order session may generate a single purchase order that may ultimately include orders from non-punch-out or hosted catalogs.

Further, with respect to the hosted supplier products catalog, there may be a feature implemented to allow both its searching and viewing. The search/view catalog feature is invoked via a processing module that executes on the custom database servers. Upon the execution of such a search by an end user, search results can be displayed via the end user interface. The catalog search results can be displayed, for example, using a static or dynamic interactive list or table, attachment, graphic, or link. An end user may also have the option of choosing the appropriate supplier(s) from which to place an order. Upon an end user's selection of a particular supplier, the relevant supplier data is then forwarded to the transaction processing feature. The end user may later invoke a status query, via a processing module executed on the custom database servers, on a preexisting order and, subsequently, receive status notifications regarding the order.

The search feature may be implemented using several sub-features such as, for example, customized annotations (with icons) of preferred/contract suppliers, a product/supplier filter, and a product size filter. The search feature is invoked by a processing module that is executed on the custom database servers. The customized annotations (with icons) of preferred/contract suppliers allows certain products to be highlighted within search results. Furthermore, the product/supplier filter of the search feature allows certain products to be displayed, while others are hidden, depending on specific filter criteria chosen by the end user/organization. Such criteria may include, for example, price thresholds, hazard level, approximate delivery date, product size, supplier, and/or currency.

The search architecture is based upon an indexed, tokenized-type implementation. This search architecture may include a search engine and a tokenization feature, both of which are invoked via processing modules executed on the custom database servers. Product elements such as the product name, industry, price, currency, and availability, among others, are primarily used to generate a product search index (e.g., a token). The process of generating a product search index/token is called "tokenization" and may be executed by a tokenization feature invoked via a processing module. The indices/tokens generated as a result of the tokenization feature, which relate to various products of a multitude of suppliers, may be stored within and executed on the hosted supplier products catalog. Searching is executed against "verticals." A vertical is designed similar to a drill-down menu architecture that consists of root nodes and leaf nodes, which are children of their respective roots. Through the use of tokenization and verticals, a layer of abstraction is added that is unique in comparison to typical text-based searching of a large database, like the master product database. This added layer of abstraction allows for better organization of the underlying data. As a consequence, the use of tokens to search verticals, which organize supplier product data and search the hosted supplier products catalog, enables an efficient and methodical search strategy to be executed. Search results returned from searching the hosted supplier products catalog are forwarded back to the search engine and may appear via the end user or supplier user interfaces. For an end user, designated preferred suppliers usually appear first in the search results.

Further contained within the search architecture, a feature to allow the invocation of status queries and viewing of the response may be implemented. This feature allows a plurality of end users to send queries/requests via middleware/web methods, or direct Internet posting techniques, to the product catalog. The feature is itself invoked by a processing module that executes on the custom database servers. Such queries/requests may be intended for finding, buying, or managing products. Such products may be those of preferred contractors that are matched to the end user based on a plurality of criteria like permission, product type, industry, price, quality control metrics, delivery date, warranty types, currency, and/or locale. Each product catalog may contain information regarding one or more specific products. A master product database populates the hosted supplier products catalog with various types of information relating to one or more specific products. The various types of information may include a "stock keeping unit" (SKU) identifier, supplier information, and product category/description/attribute information.

Further also to the search architecture, an in-stock query feature may be implemented to allow an end user, through the middleware/web methods, or direct Internet posting techniques, to determine whether any supplier might have a particular product in-stock, and/or the warehouse/location where that stock is maintained. The feature is itself invoked by a processing module that executes on the custom database servers. Once the in-stock query feature is invoked, relevant suppliers are sent individual queries. Subsequently, each supplier response to an in-stock query is processed and the appropriate end user is notified after the in-stock query receives the supplier response(s), but before returning to the processing module.

Moreover, a quick order feature may also be implemented to enable several other sub-features such as, for example, searching by product category, SKU identifier, currency, or host product category number/supplier part number. The feature is itself invoked by a processing module that executes on the custom database servers. Subsequently, the order feature is initially invoked by an end user that has completed a quick order search. Thus, the quick order feature enables an end user that may have knowledge of specific product attributes to perform an expedited search, retrieve search results, and proceed to ordering.

The search results of a product search exhibit other features of the invention such as those related to the presentation of results. For example, suppliers and categories contained within search results can be displayed using different customizable icons, which may be used to highlight specific suppliers and product categories. Such results can also be ranked according to priority based on whether they are supplied from preferred or contracted suppliers, a preferred category of products from suppliers, or a preferred currency. Non-preferred or non-contracted supplier or currency results may also presented to end users. Moreover, a product comparison chart can be invoked to highlight the differences and similarities among two or more products. The chart can contain static or dynamic presentation attributes based in part on supplier-provided data. For example, the in-stock attribute, a dynamic presentation attribute, can be used to identify whether specific products are actually available in a supplier's inventory, and their corresponding prices and/or currencies. A search result list can be organized by category and/or vendor based on end user preferences. Also, icons can be used to further display and highlight relevant information regarding products such as, for example, whether products are hazardous, toxic, poisonous, or are considered to be controlled substances. A proprietary taxonomy can also be implemented against modeling product categories to enable more efficient searching and, ultimately, user-friendly, organized search results.

Figure 8A:
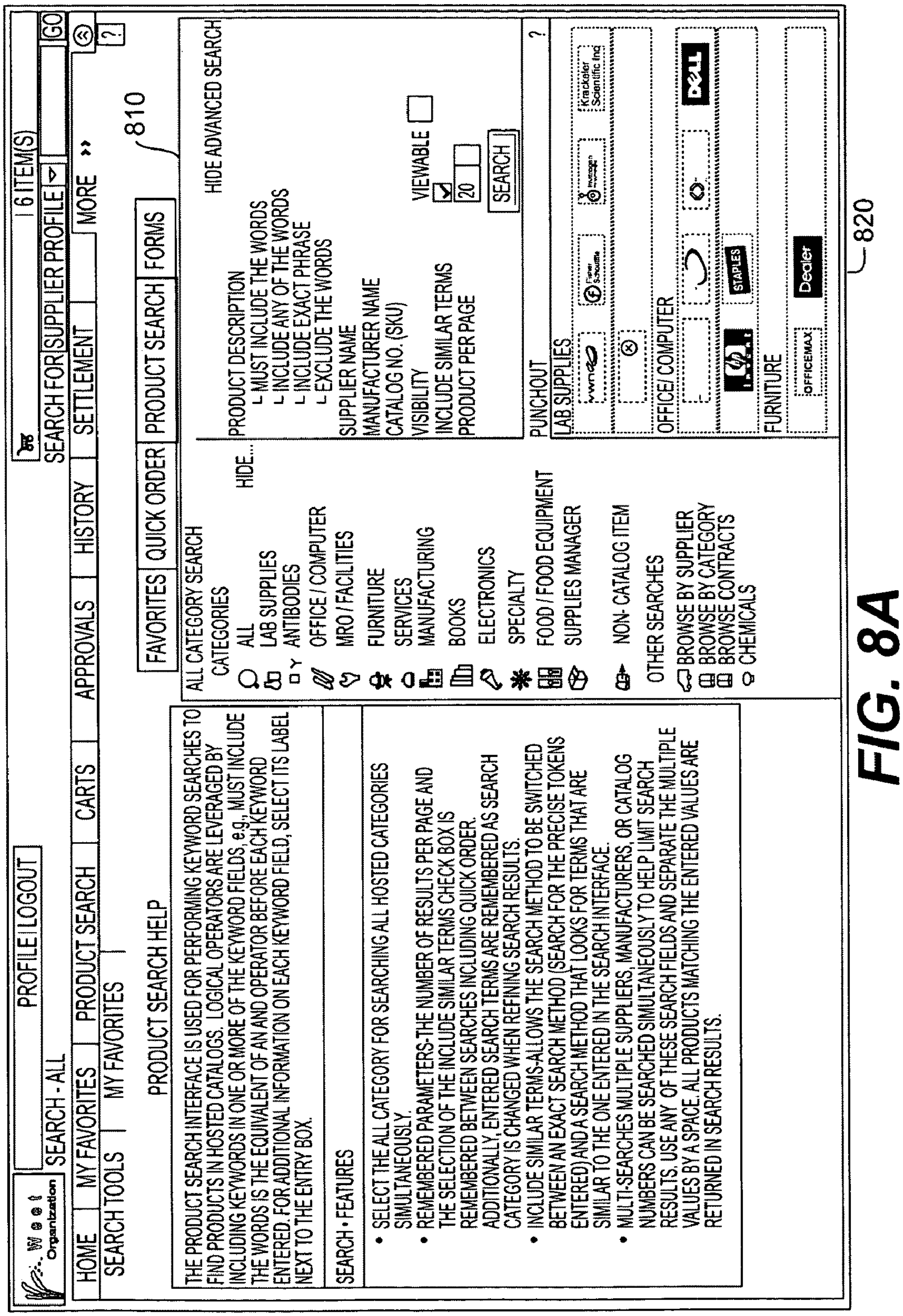
FIGS. 8A-8D illustrate exemplary search engines in accordance with the present invention.
Figure 8B:
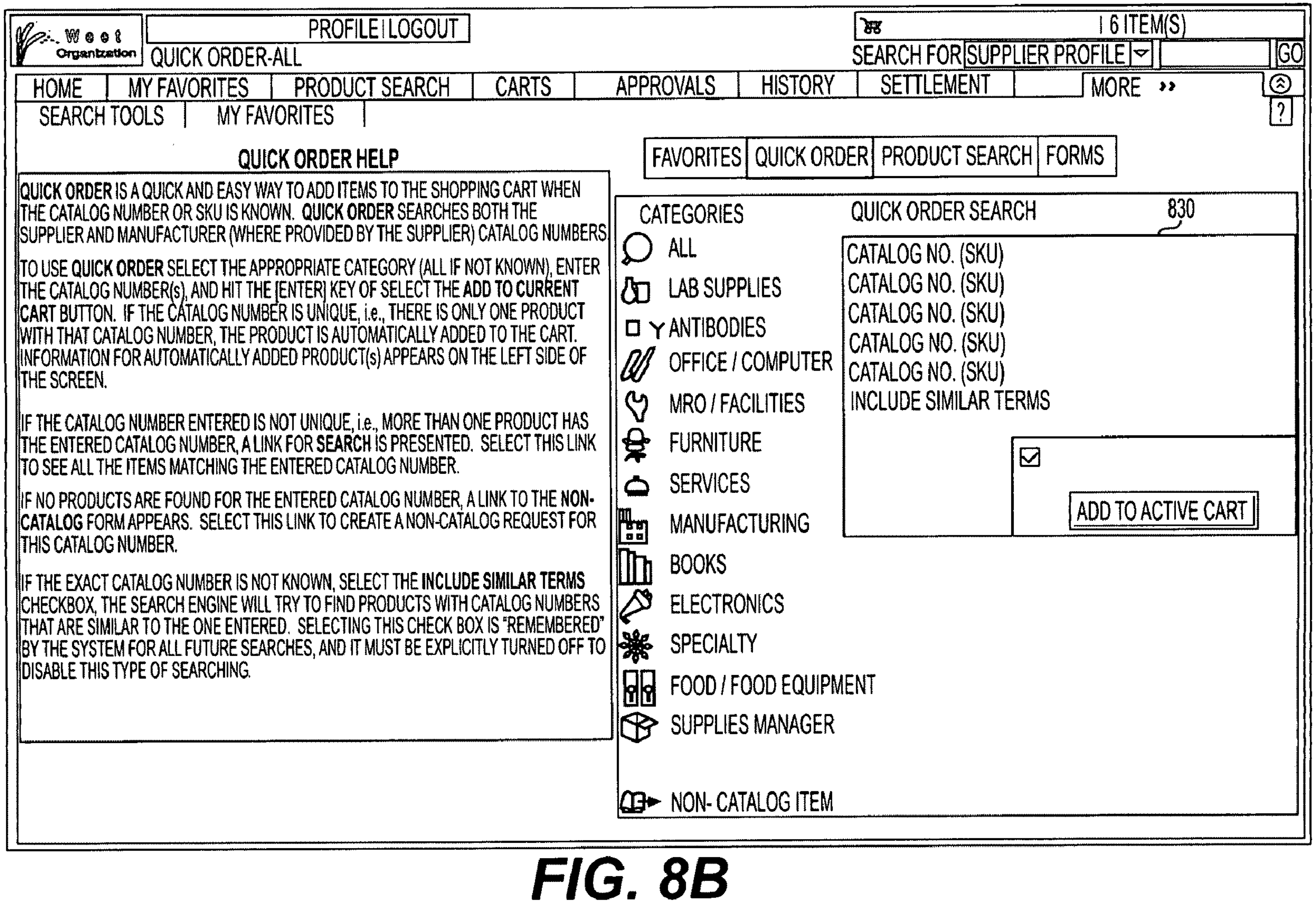
Figure 8C:
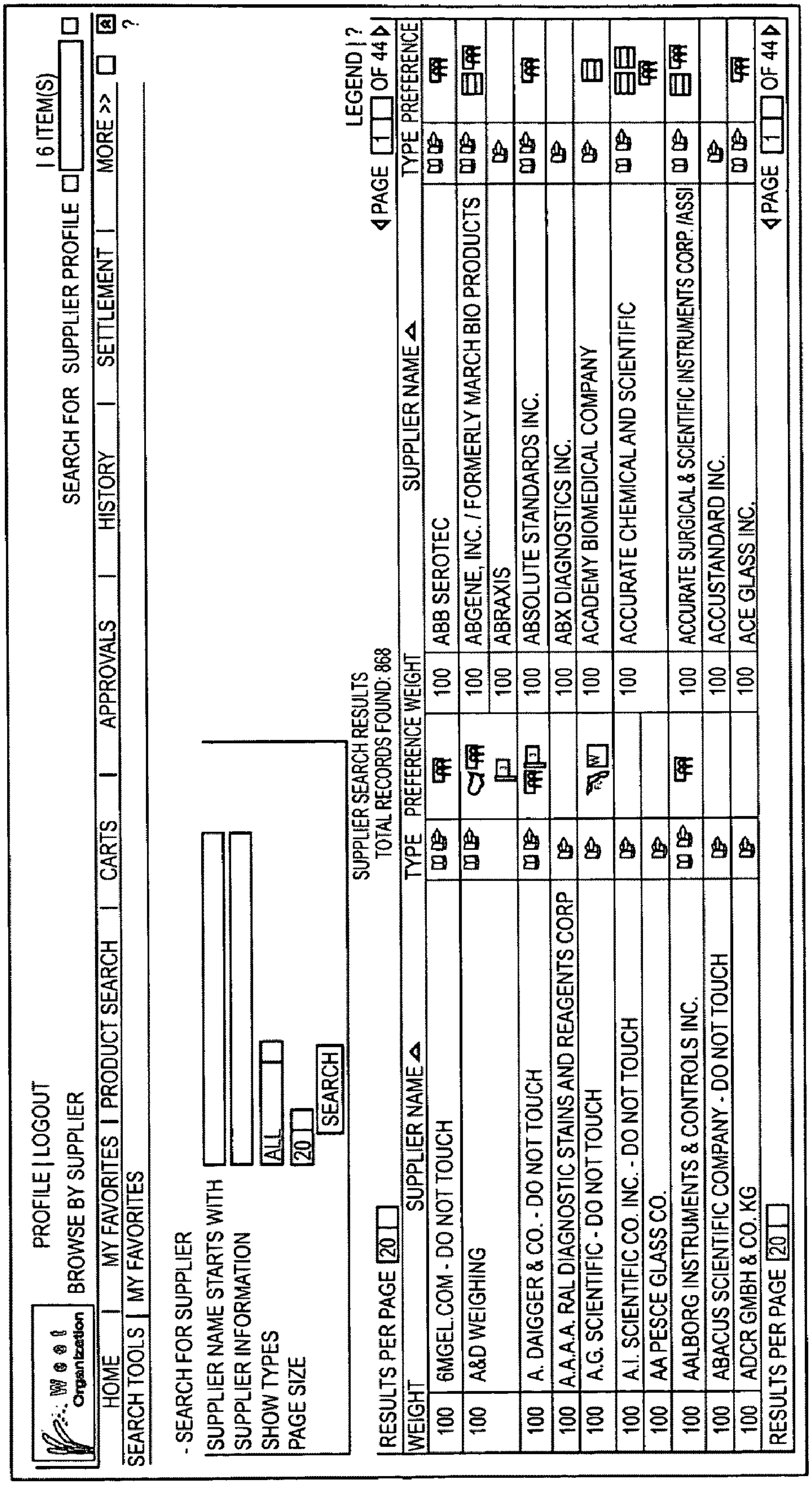
Figure 8D:
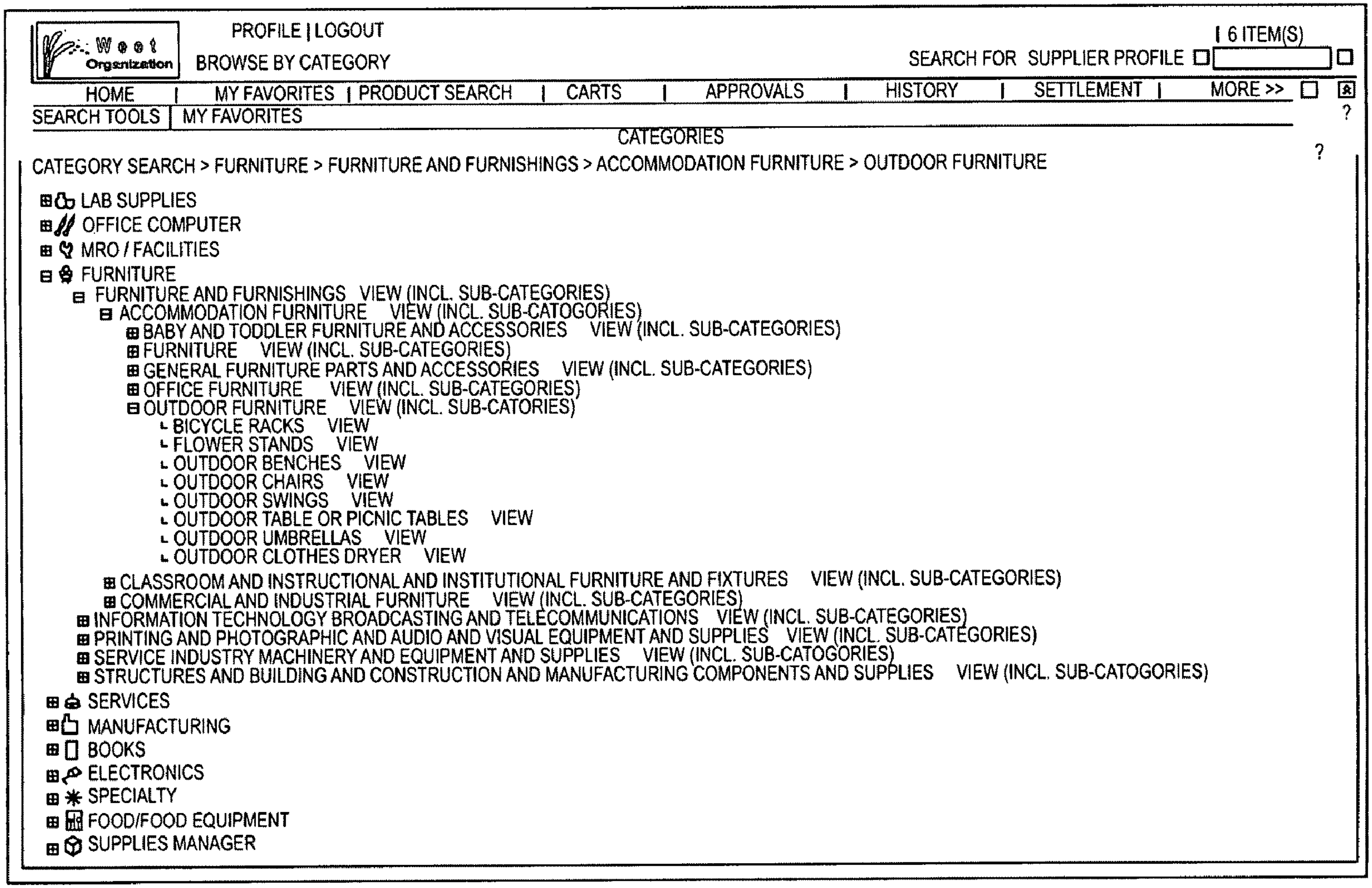

FIGS. 8A-8D illustrate exemplary search engines in accordance with the present invention. For example, FIG. 8A illustrates an exemplary parametric search engine 810 and punch-out catalogs 820. FIG. 8B illustrates an exemplary quick order search engine 830. FIG. 8C illustrates an exemplary browsing engine based on suppliers. FIG. 8D illustrates an exemplary browsing engine based on categories of the products and/or services. Other search engines may be used without departing from the scope of the present invention. Therefore, an eProcurement system in accordance with the present invention couples the configuration tools described above for customizing access to specified suppliers and/or specified types of products based on department, position, roles, and/or permissions of the user for each organization with various search engines in a single instance, multi-tenant architecture.

As shown in FIG. 2, the supplier user interface 214 in accordance with the present invention and further described below is configurable by supplier users and super users, and includes one or more features, for example, such as accessing a supplier hosted products catalog, viewing and responding to purchase orders, consummating sales transactions, viewing and responding to status queries, and setting supplier user configuration preferences. Each individual end user and supplier user may have a different interface from another end user and supplier user, respectively. Furthermore, the supplier end user interface of the present invention may allow a plurality of supplier users to send queries/requests via middleware/web methods server 224 to custom database servers 222, and to a hosted supplier products catalog 234 that is multi-tenant managed. A remote supplier user query/request is sent via the supplier end user interface 214 over the Internet, or other networked connection, and is first received by the web servers 225 after passing through the firewall 218. Then, the web server 225 passes the query/request to the middleware/web methods server 224, where business rules may be enforced. Subsequently, depending on whether the query/request is related to a transaction or a user search, it is either forwarded to the transaction processing servers 223 or custom database servers 222, respectively. For either type of query/request, the hosted supplier products catalog 234 is then readily accessible via processing modules for exchanging transaction/product data, or performing a search/supplier operation. The hosted supplier products catalog 234 can serve as a quasi-link between the end user interface and the supplier interface because it is accessible by both interfaces. Supplier users can access the catalog via the middleware/web methods servers 224, which then forward the supplier access request to the custom database servers 222 and processing modules for execution, in order, for example, to update their own supplier data. End users may be able to search multiple suppliers within the catalog via the end user interface 212, subject to access rules set by a super user. End users may search the catalog for specific end user product requirements via the middleware/web methods servers 224, which forward the end user search request to custom database servers 222 and processing modules for execution. Subsequently, the end user may then invoke requisition and purchase orders via the middleware/web methods servers 224, which forward the end user order to the transaction processing servers 223 for execution.

As described above, to support the product search function, the eProcurement system of the present invention includes a master catalog database of all the products from all the suppliers hosted on the system to implement a single instance, multi-tenant environment. Accordingly, the eProcurement system of the present invention includes a catalog management tool 900. The catalog management tool 900 includes one or more of supplier tool 910, categories tool 920, supplier classification tool 930, category classification tool 940, product views tool 950, pricing tool 960, map attributes tool 970, and consortium management tool 980.

Figure 9A:
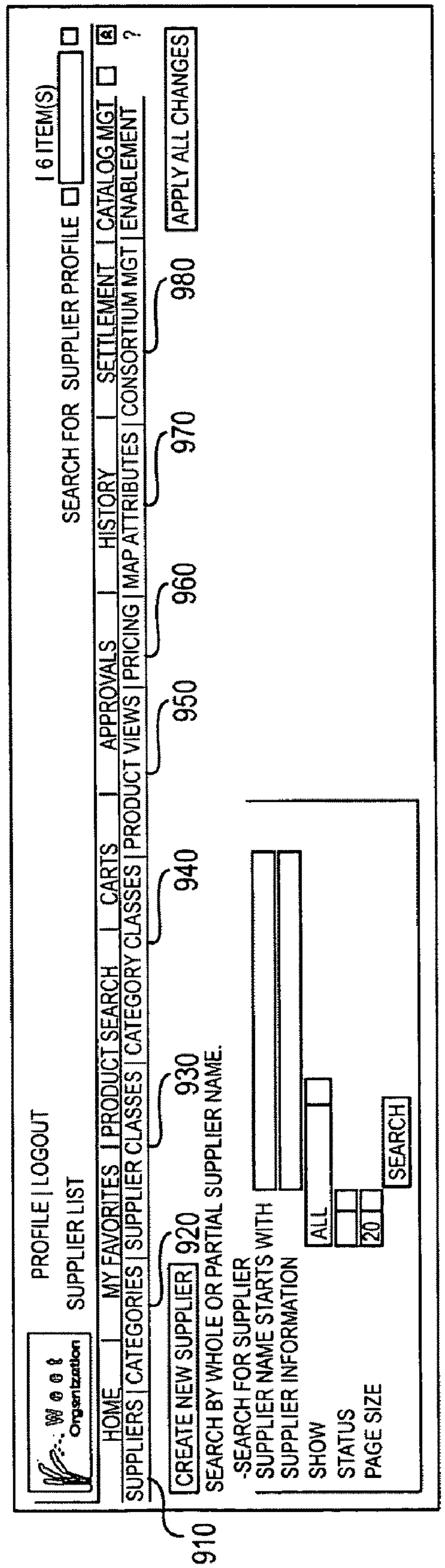
FIGS. 9A-9F illustrate exemplary catalog management tools in accordance with the present invention.
Figure 9B:
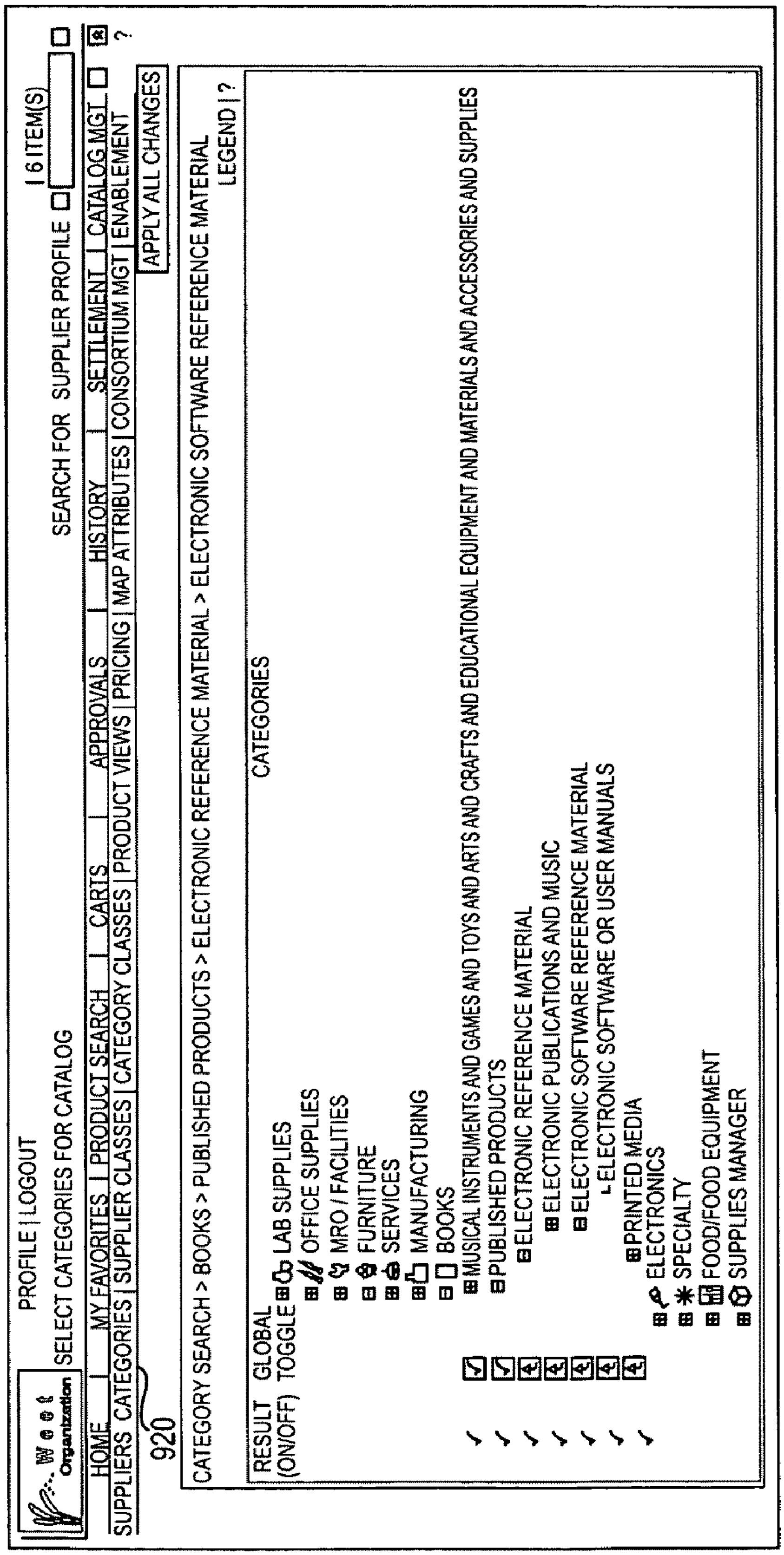
Figure 9C:
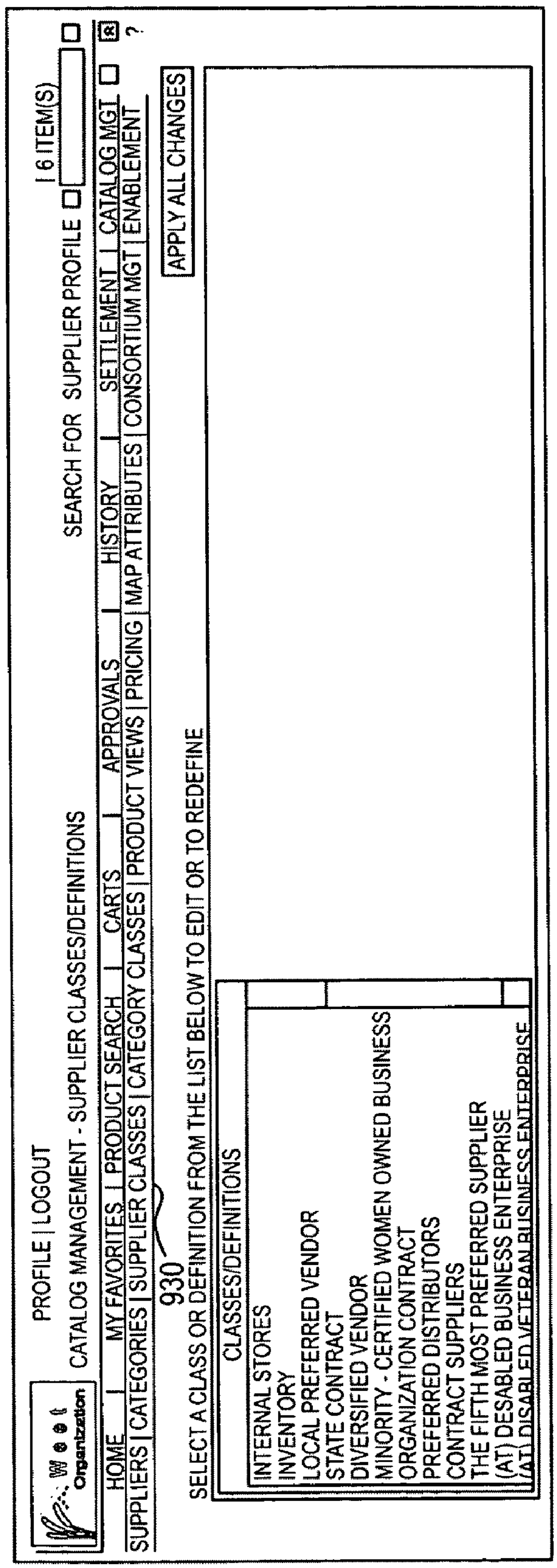
Figure 9D:
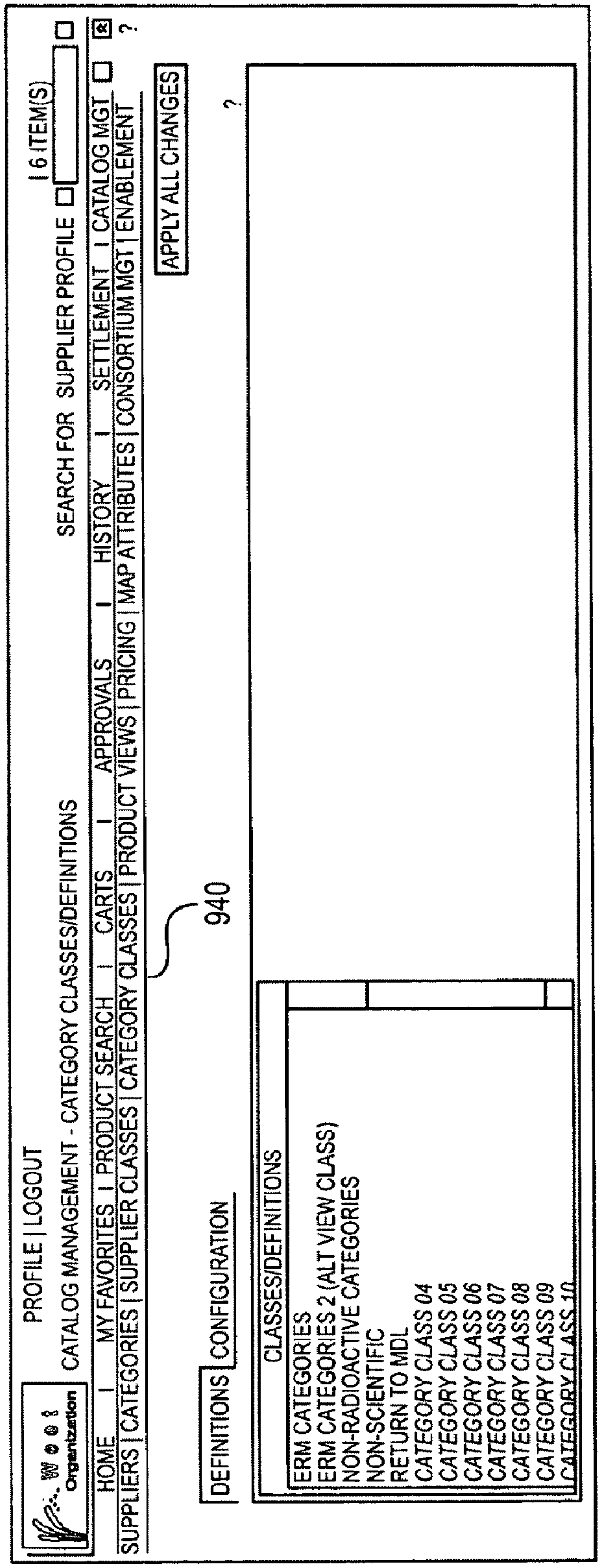
Figure 9E:
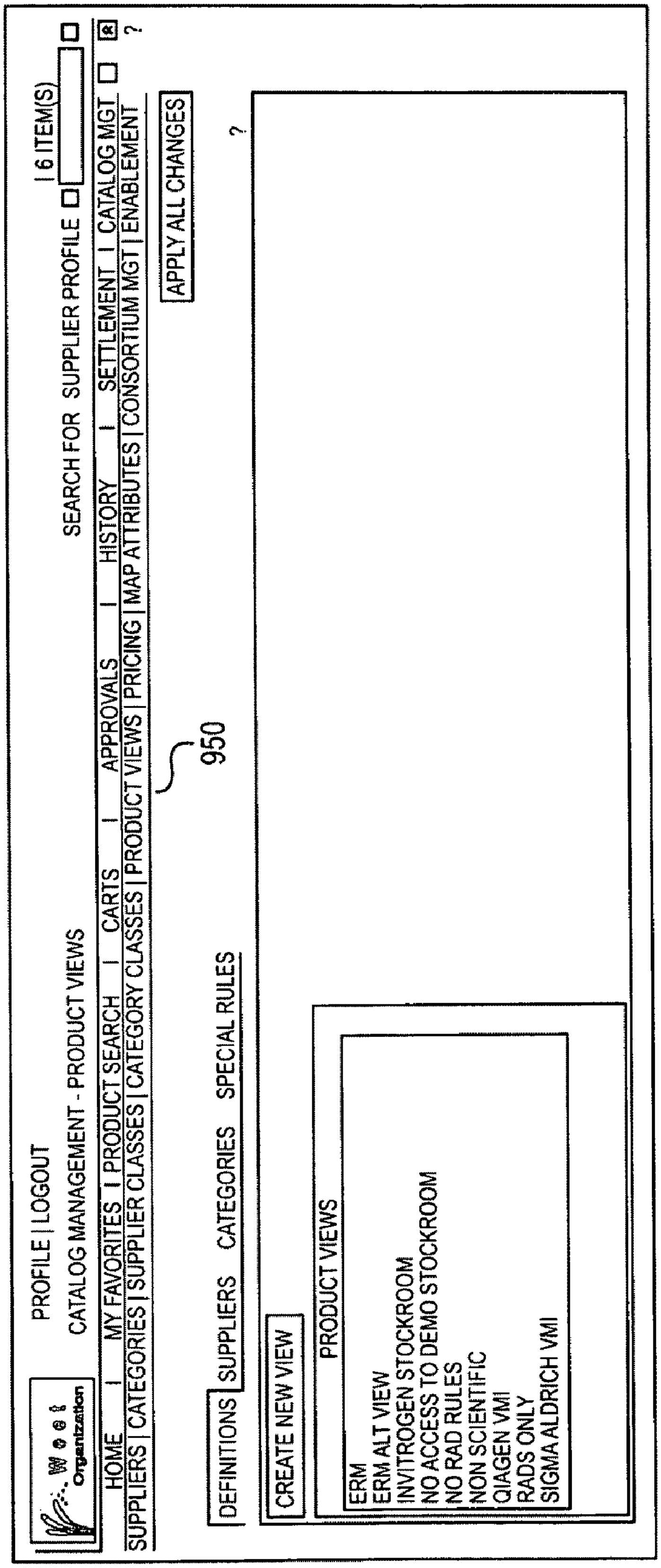

FIG. 9A illustrates an exemplary catalog management tool 900 with an exemplary supplier tool 910 invoked. The supplier tool 910 includes a search engine that searches for existing suppliers hosted in the eProcurement system of the present invention. Furthermore, the supplier tool 910 adds new suppliers not yet hosted in the system. FIG. 9B illustrates an exemplary categories tool 920 that configures all the products offered from the hosted suppliers into defined categories. Classifications for suppliers and product categories within the system of the present invention are defined and managed by the supplier classification tool 930 (FIG. 9C) and category classification tool 940 (FIG. 9D). In particular, new classes of suppliers and product categories may be created, defined, and configured as needed through the supplier classification tool 930 and category classification tool 940. In addition, existing classifications of suppliers and product categories may be modified. The product views tool 950 manages the views of products based on the defined supplier and product categories (FIG. 9E).

Figure 9F:
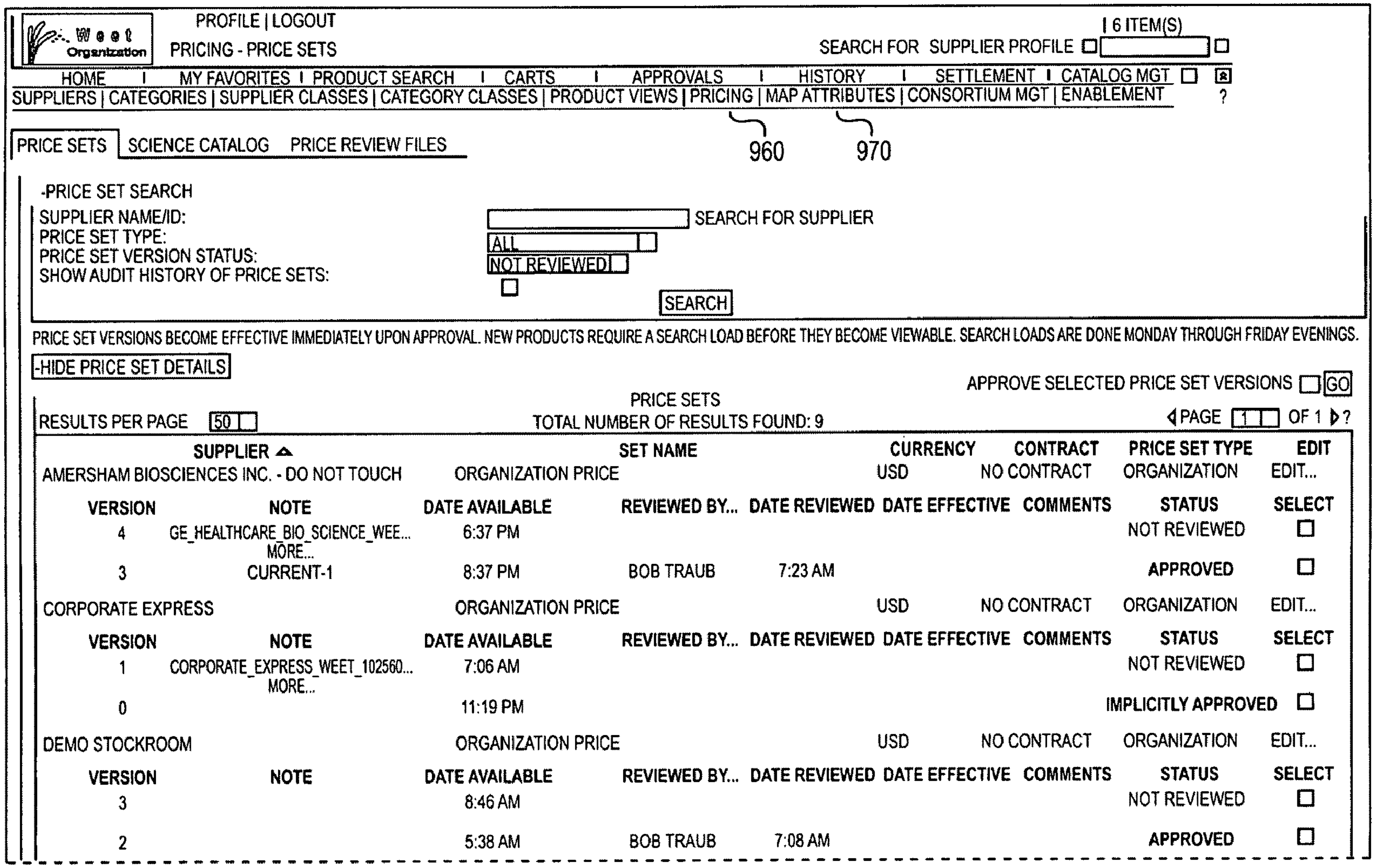

FIG. 9F illustrates an exemplary pricing tool in accordance with the present invention. As shown, pricing tool 960 manages various pricing sets of each hosted supplier for the hosted products (or, the tool 960 may also be applied to non-catalog items, forms, or other non-hosted suppliers or products/items). The pricing set types may include organizational prices, contract prices, list prices, and consortium prices. Other pricing sets may be used without departing from the scope of the invention. The pricing tool 960 tracks versions of each type of pricing sets, status of the pricing sets (e.g., implicitly approved, not reviewed, rejected, approved, etc.), as well as the audit history of each pricing set. Accordingly, the appropriate pricing set may be tracked, managed, and invoked for each organization for each type of product.

Other types of catalog management tool 900 include the map attribute tool 970 and consortium tool 980. The map attribute tool 970 manages various parameters of the procurement activity, such as product codes, parameter format, and unit of measure (UOM). For example, commodity code configuration parameters may be set through the map attribute tool 970 to determine if and how the category taxonomy is to be mapped to, for example, an organization's set of category/commodity values. The commodity codes may be modified as categories, sub-categories, and on down to the product level. The list of values may be set manually or imported/exported from/to an already existing file. As another example, universal product codes (e.g., UN/SPSC) and UOM may also be configured to be mapped to an internal organization codes for automatic conversion when searching, viewing, and ordering products. Further, UOM may be mapped from standard UOM to organization specific UOM. The consortium tool 980 defines various consortiums that an organization may be a member of and offer consortium pricing by designating a supplier as a consortium supplier. Hence, all organizations that are members of the consortium will be offered the consortium pricing set when ordering from the designated supplier.

As shown in FIG. 2, the server technology of the present invention includes a middleware/web methods server 224 that hosts a variety of features related to administrative services management, content management, and application management described above. The middleware/web methods server 224 may, for example, manage business rules (i.e., the relationships) between end users and suppliers based, in part, on contractual terms or other arrangements, as processed according to the price and file management feature. For example, supplier user-side business rules may, for example, designate preferences regarding delivery terms (e.g., restrictions against odd lot sales, FOB preference, carrier preference, etc.), and price and insurance terms (e.g., CIF preference, applicable sales tax, etc.). Similarly, end user-side business rules may, for example, designate preferences regarding preferred suppliers, delivery terms (e.g., FOB preference, default quantity, carrier preference, etc.), and price and insurance terms (e.g., CIF preference, applicable sales tax, etc.). At least one advantage of implementing end user-side and supplier user-side business rules is the capability to generate customized purchase orders in accordance with contractual or default business rules. Such purchase orders are created by the invoke requisition/purchase orders feature, which is invoked via processing modules that are executed on the custom database servers 222. Middleware/web methods server 224 may apply default ordering, sales, delivery, and other terms in the instance where an end user and supplier user do not have existing contractual terms or other arrangements.

Figure 10:
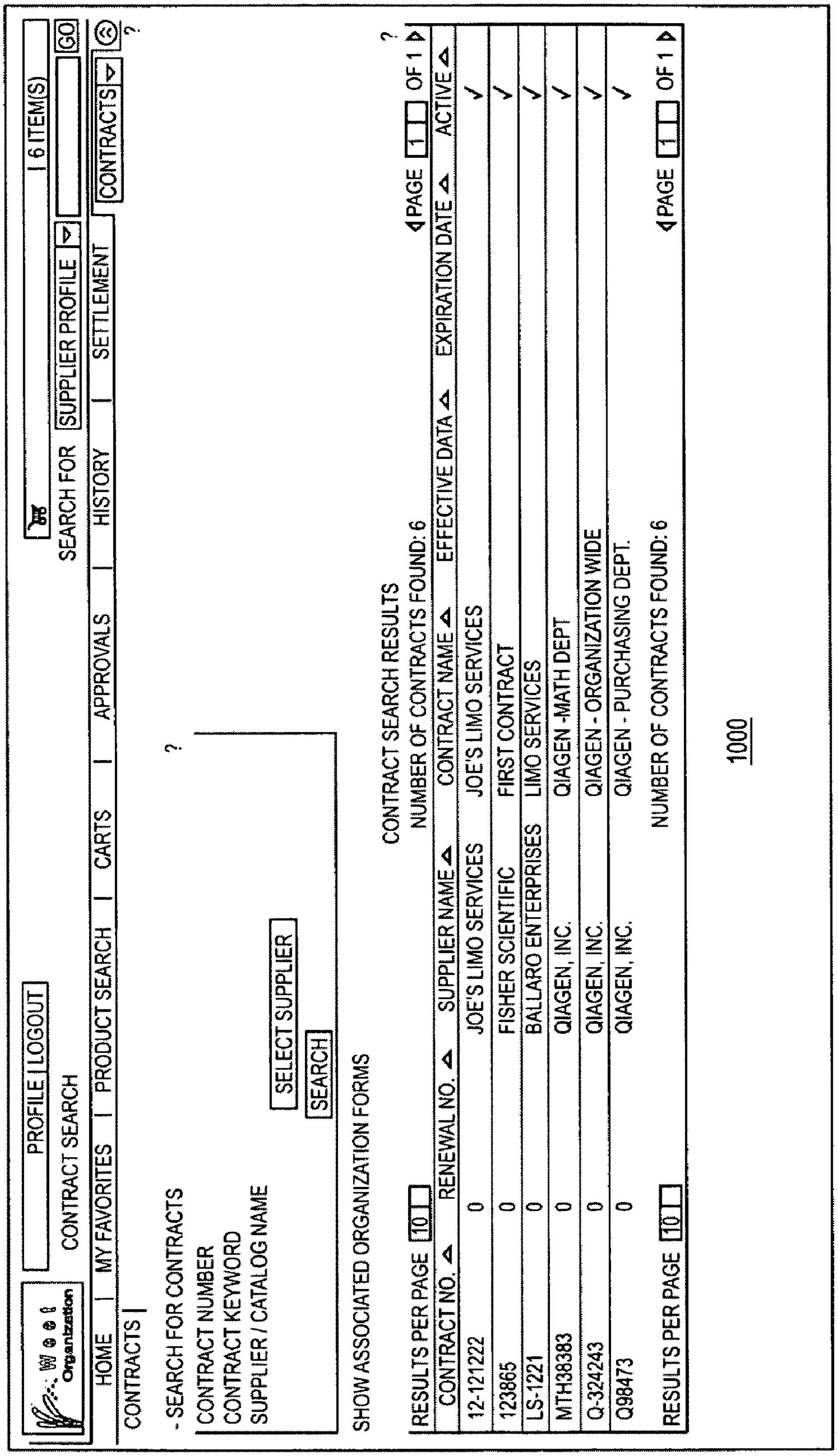
FIG. 10 illustrates an exemplary contracts management tool in accordance with the present invention.

The middleware/web methods server 224, as well as the transaction processing server 223, implements the price and file management feature to access existing contracts between end users and suppliers. The feature is usually implemented as a component of the middleware/web methods server 224, but may also be invoked via transaction processing modules that are executed on the transaction processing servers. Contract management algorithms may also be implemented as a sub-feature of the price and file management feature. For example, the algorithms are usually responsible for accessing, retrieving, and processing data from each respective end user and supplier that might have negotiated a contract. FIG. 10 illustrates an exemplary contracts management tool 1000 that may be used to manage the contracts between an organization and a supplier. The contract data is accessible by the transaction processing servers 223 and transaction database 238. Suppliers are able to submit product prices and other product related data via the price and file management feature. Furthermore, multiple pricing/currency schemes can be created by suppliers for end user organizations and may be based on contractual terms negotiated between end user organizations and suppliers. Individual end users within the same organization, for example, may be assigned different price/currency schemes that may be based on different contractual terms with an individual supplier. A designated end user (e.g., a "contract manager"), akin to a super user, can be assigned the responsibility for managing and choosing the pricing schemes displayed to each individual end user within the organization. The designated end user may also be tasked with ranking the spending thresholds for triggering a new price tier. Individual end users are capable of accessing pricing schemes for supplier products where the end users have been granted access by the designated end user or super user. By default, the lowest supplier pricing scheme available is first displayed to the end user, although other pricing schemes may also be available and accessible.

The following algorithm, for example, may be implemented to determine which pricing scheme should be displayed to an individual end user. First, all pricing schemes for a specific product may be denoted as accessible. A filter-type method may then be used to exclude pricing schemes denoted as inaccessible to the end user organization and, thus, allowing only accessible pricing schemes. Another filter-type method may be used to determine which accessible pricing schemes, if any, are related to contracts negotiated between the end user organization and accessible suppliers. If no pricing schemes are related to any contracts, then a default/general pricing scheme is displayed to the end user. Finally, if at least one pricing scheme is related to any related contracts, then a filter-type method excludes those pricing schemes related to contracts deemed inaccessible to this end user, and permits the accessible pricing schemes to be displayed. The displayed accessible pricing schemes would, however, be subject to the end user spending thresholds, which may be set by a super user. When an end user invokes the generation of a purchase/requisition order, the appropriate pricing scheme is referenced and can be based upon available contractual terms with the appropriate supplier.

An end user organization can manage pricing schemes such that distinct contracts are assigned to specific end users or super users. The feature to manage pricing schemes is invoked via transaction processing modules executed on the transaction processing servers 223. The specific end users or super users have the ability to approve or reject contracts, and set extended dates. Moreover, supplier users have the ability to create multiple pricing/currency schemes that may be based on contractual terms with end user organizations. Whether an individual end user/organization is a constituent of a trade group, department, or other organization, may influence the pricing/currency scheme determination. Supplier users can also have the ability to load single or multiple pricing/currency schemes for end users within the same data sink (e.g., hosted supplier products catalog), which may later be processed by the price and file management feature and assigned to each respective end user. Moreover, end users can designate specific products from supplier pricing/currency schemes as favorites. End user favorites can be dynamically updated with the lowest available supplier pricing scheme.

The transaction processing servers 223 of the present invention may execute transaction processing modules that query, update, and/or create data model instances within the transaction database 238. Moreover, end users can also approve, request to modify, or reject supplier products within hosted catalogs, and can also assign and route specific supplier products to other appropriate end users for review, dependent upon end user specific attributes like title within the organization. For example, certain end users may be able to access hazardous and/or expensive supplier products, while other end users may not be able to do so based on their precedence/role within the end user organization. Similarly, certain end users may also have the ability to make high-volume orders, while others may not. The hosted supplier products catalog 234 may be routinely updated by each supplier user at his/her discretion, or on a monthly, quarterly, or annual basis, and may contain data from suppliers such as, for example, custom product lists and end user organization-specific prices/currencies.

Figure 11A:
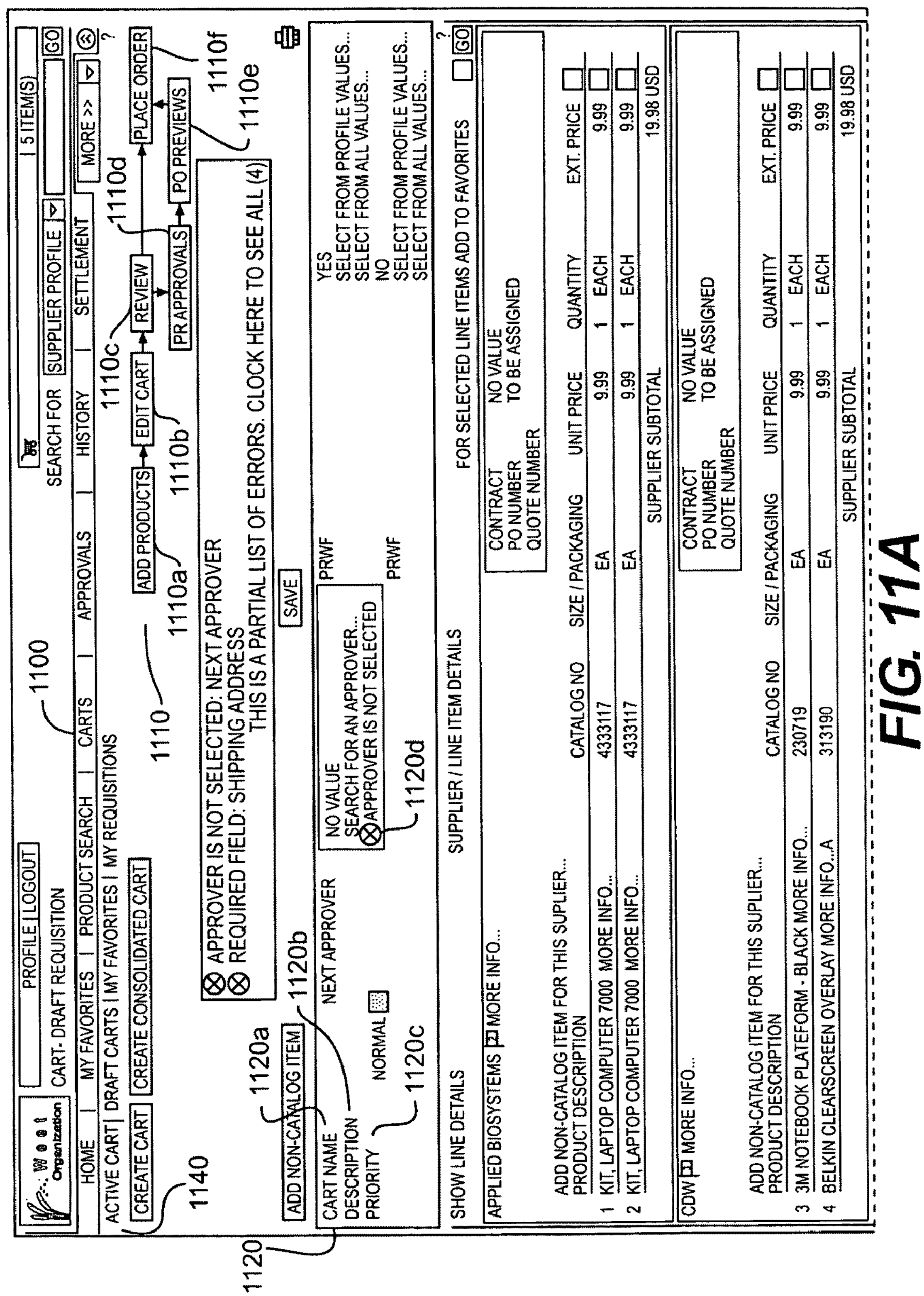
FIGS. 11A-D illustrates an exemplary cart and requisition tool in accordance with the present invention.
Figure 11A:
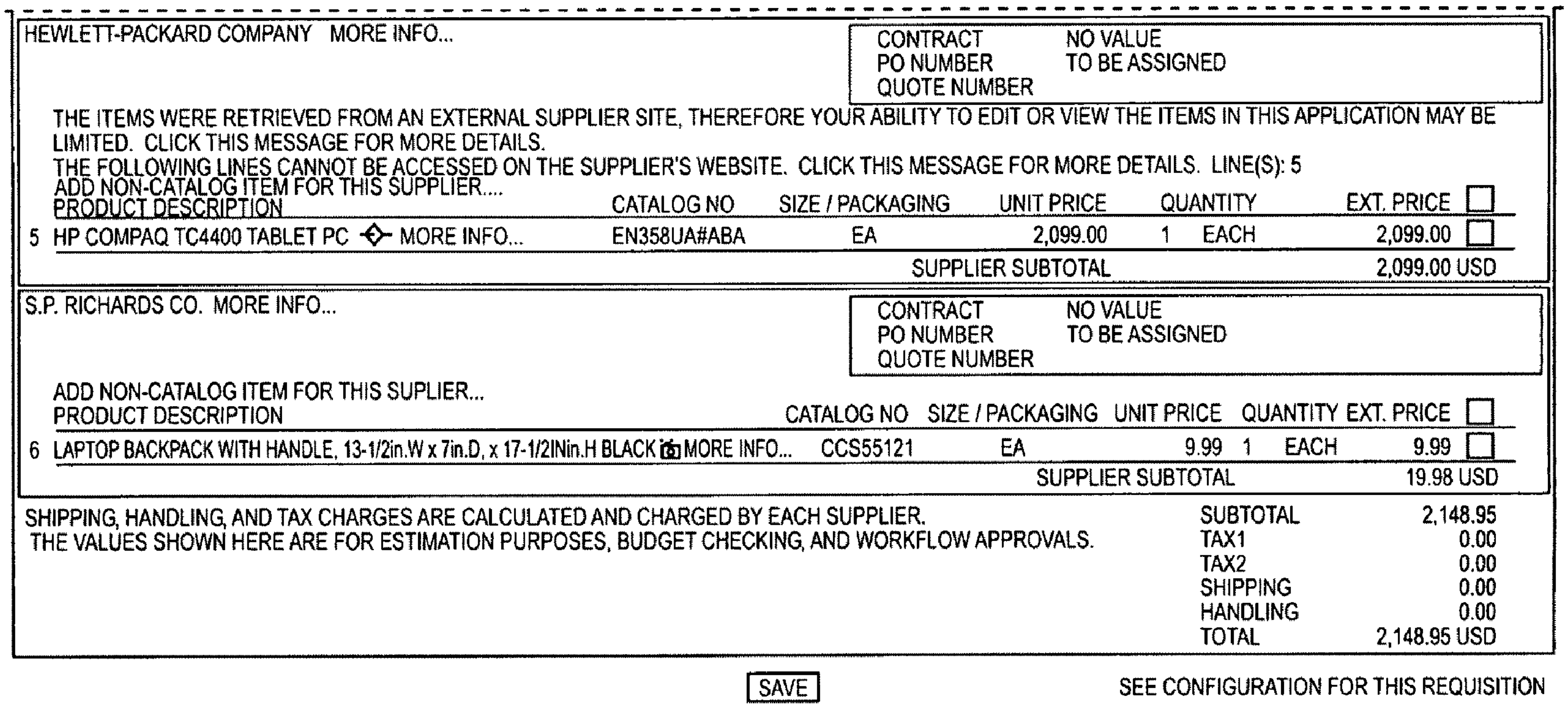

FIG. 11A illustrates an exemplary cart and requisition tool 1100 in accordance with the present invention. As shown in FIG. 11A, the cart and requisition tool 1100 includes an active cart 1140 for tracking the items designated for purchase from the search results described above. In an exemplary embodiment illustrated in FIG. 11A, the active cart 1140 includes requisition workflow tool 1110 that displays a live view of the requisition process for the items in the cart. For example, the requisition workflow tool 1110 displays the status of the requisition from the point at which a product is added 1110*a*, the cart is edited 1110*b*, the requisition is reviewed 1110*c*, and the order is placed 1110*f*. The requisition workflow tool 1110 further displays a purchase requisition approval step 1110*d* as well as a purchase order preview step 1110*e*. Each of the status boxes 1110*a*-1110*f* of the requisition workflow tool 1110 may be invoked to activate the tool that manages the corresponding status. For example, invoking the "Add Products" box 1110*a* (e.g., clicking on the box) activates the search engine to search for additional products to be added to the cart 1140. Invoking the "Edit Cart" box 1110*b* activates the active cart 1140 for editing the products in the cart. Invoking the "Review" box 1110*c* activates a summary of the products included in the requisition, including, for example, accounting codes, billing and shipping addresses, and other customizable data elements that may be configured by the user's organization. Invoking the "PR Approvals" box 1110*d* displays the set of workflow/approval steps an invoked requisition will be processed through prior to order creation. Invoking the "PO Preview" box 1110*e* activates a list of purchase orders that are generated if the invoked requisition is approved. Invoking the "Place Order" box 1110*f* submits the invoked requisition to the steps of the workflow/approval process.

Cart information 1120 such as cart name 1120*a*, description 1120*b*, priority 1120*c*, and assigned approver 1120*d* are also displayed and may be edited. The cart information 1120 further includes supplier and line item details organized alphabetically, for example, according to each supplier's name, and lists each chosen product description, catalog number, size and/or packaging data, unit price, quantity ordered, price, and currency. For each supplier there is also a corresponding supplier subtotal that is calculated according to the total of products chosen by the user.

Figure 11B:
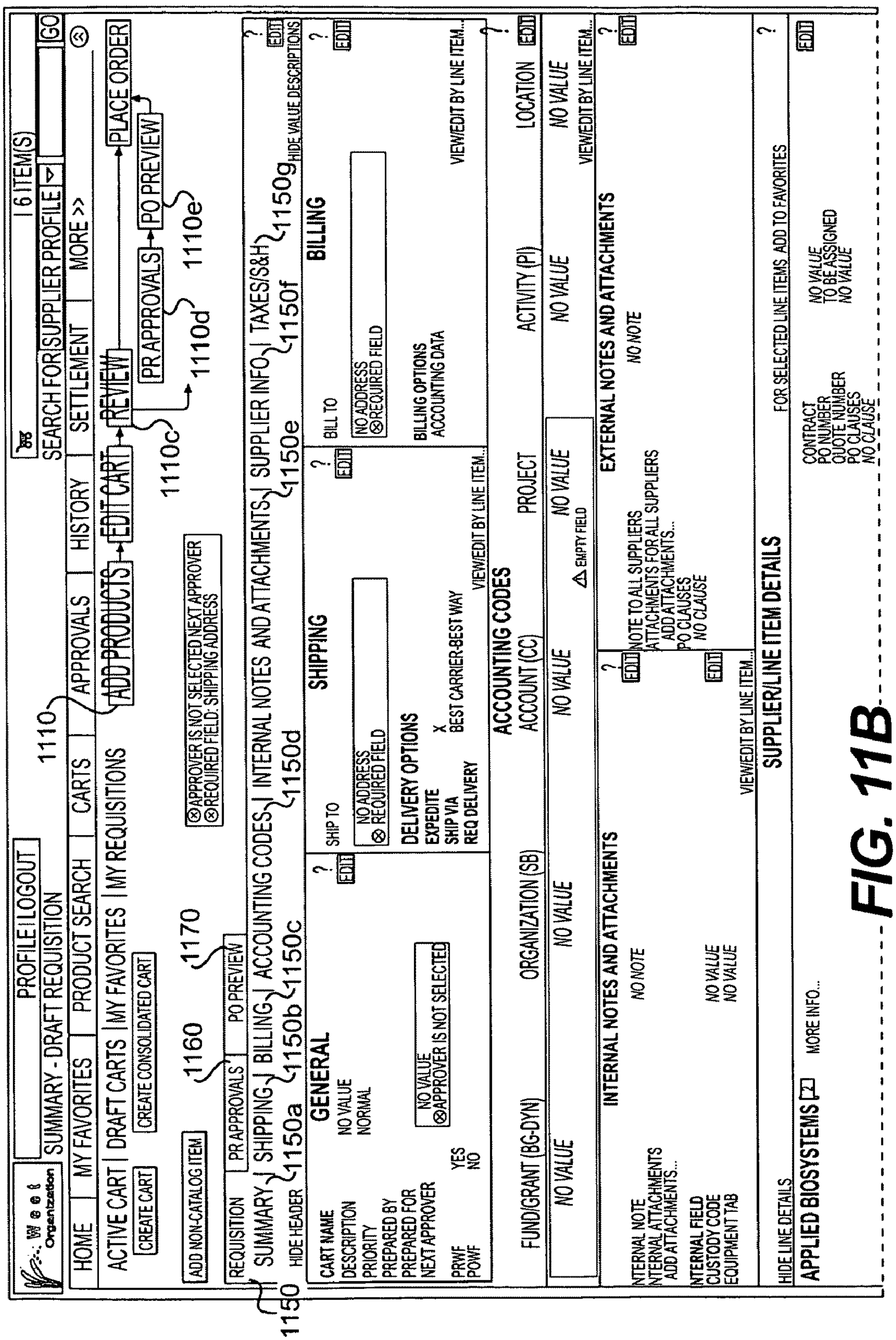
Figure 11B:
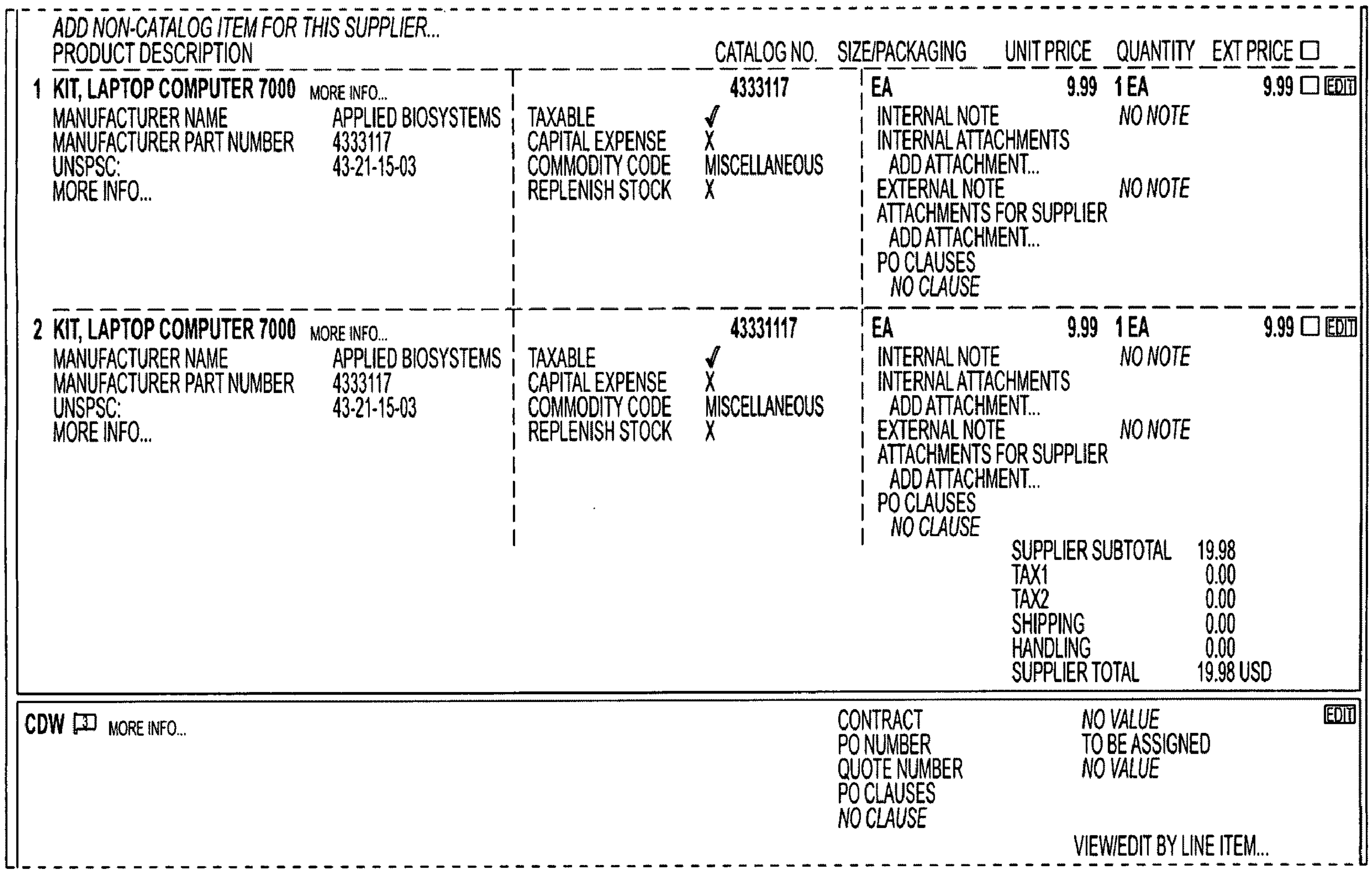
Figure 11B:
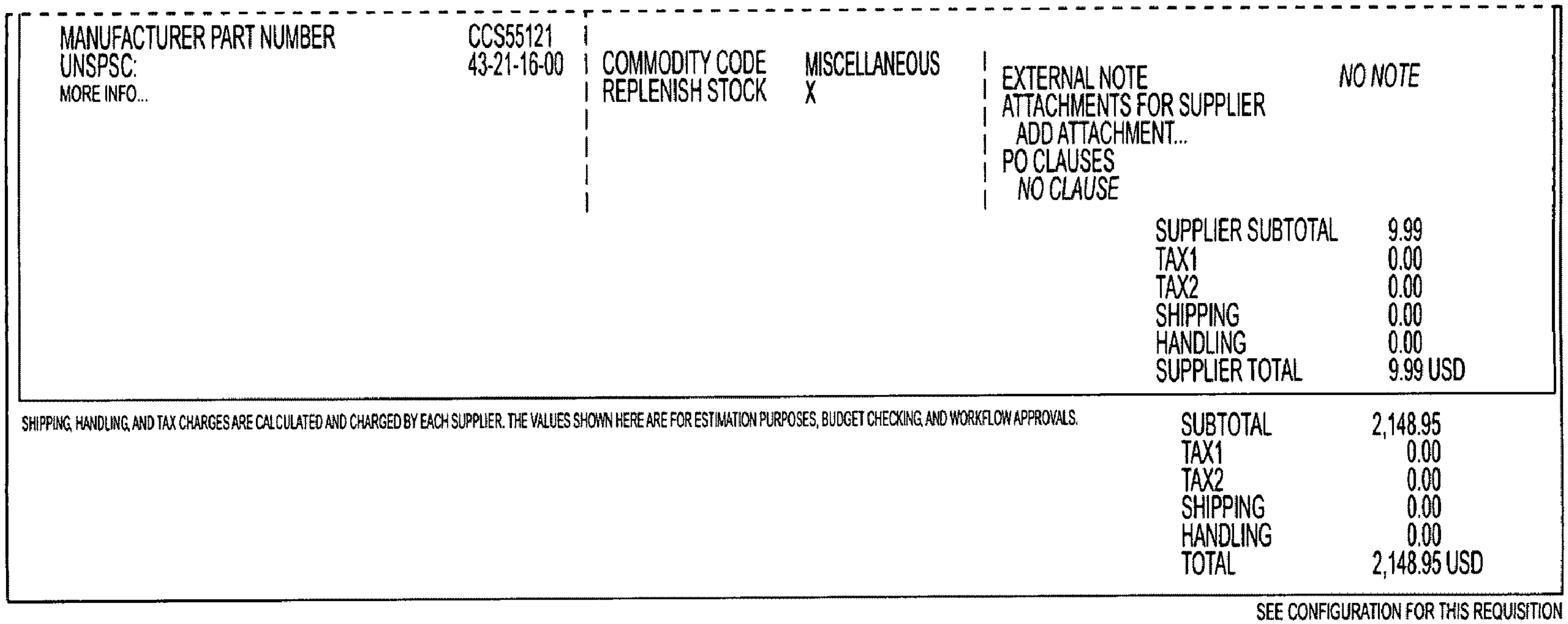

FIG. 11B illustrates further details of the exemplary cart and requisition tool 1100 in accordance with the present invention. As shown, the cart and requisition tool 1100 includes a requisition review tool 1150, purchase request approval tool 1160, and purchase order preview tool 1170. As described above, the various status boxes (e.g., 1110*c*-1110*e*) in the requisition workflow tool 1110 activate the corresponding tool 1150-1170. As shown in FIG. 11B, the requisition review tool 1150 displays information about the requisition being built. For example, as shown, the requisition review tool 1150 includes a summary page 1150*a* that displays all the information regarding the requisition being reviewed, such as the general information, shipping information, billing information, accounting codes, internal/external notes and attachments, as well as supplier/line item details of the products in the cart 1140. All of the information shown in the requisition summary page 1150*a* may be edited by invoking the corresponding tool, such as the shipping/handling tool 1150*b*, billing tool 1150*c*, accounting code tool 1150*d*, notes and attachment tool 1150*e*, supplier information tool 1150*f*, and taxes/S&H pricing tool 1150*g*.

For instance, the shipping/handling tool 1150*b* may be used to set the shipping address of the products in the purchase order as well as designate delivery options, such as "expedite," "shipping method," and "requested delivery date." The billing tool 1150*c* may be used to set the billing address and billing options, such as accounting dates. The accounting tool 1150*d* may be used to designate the accounting information of the requisition, such as any fund/grant contacts, organization information, account numbers, product codes, activity summaries, and location. The notes and attachments tool 1150*e* may be used to designate any internal codes associated with the products in the purchase order, such as custody codes and equipment codes used in the organization. The supplier information tool 1150*f* may be used to assign or modify supplier information for the products in the order, such as contract information with the supplier, purchase order number, quote number, and purchase order clauses. The taxes/S&H tool 1150*g* may be used to define the tax/S&H information related to purchases from a particular supplier, such as tax percentage and/or S&H cost from total purchase price (e.g., 0% tax, free shipping if over $200 purchase, etc.).

Figure 11C:
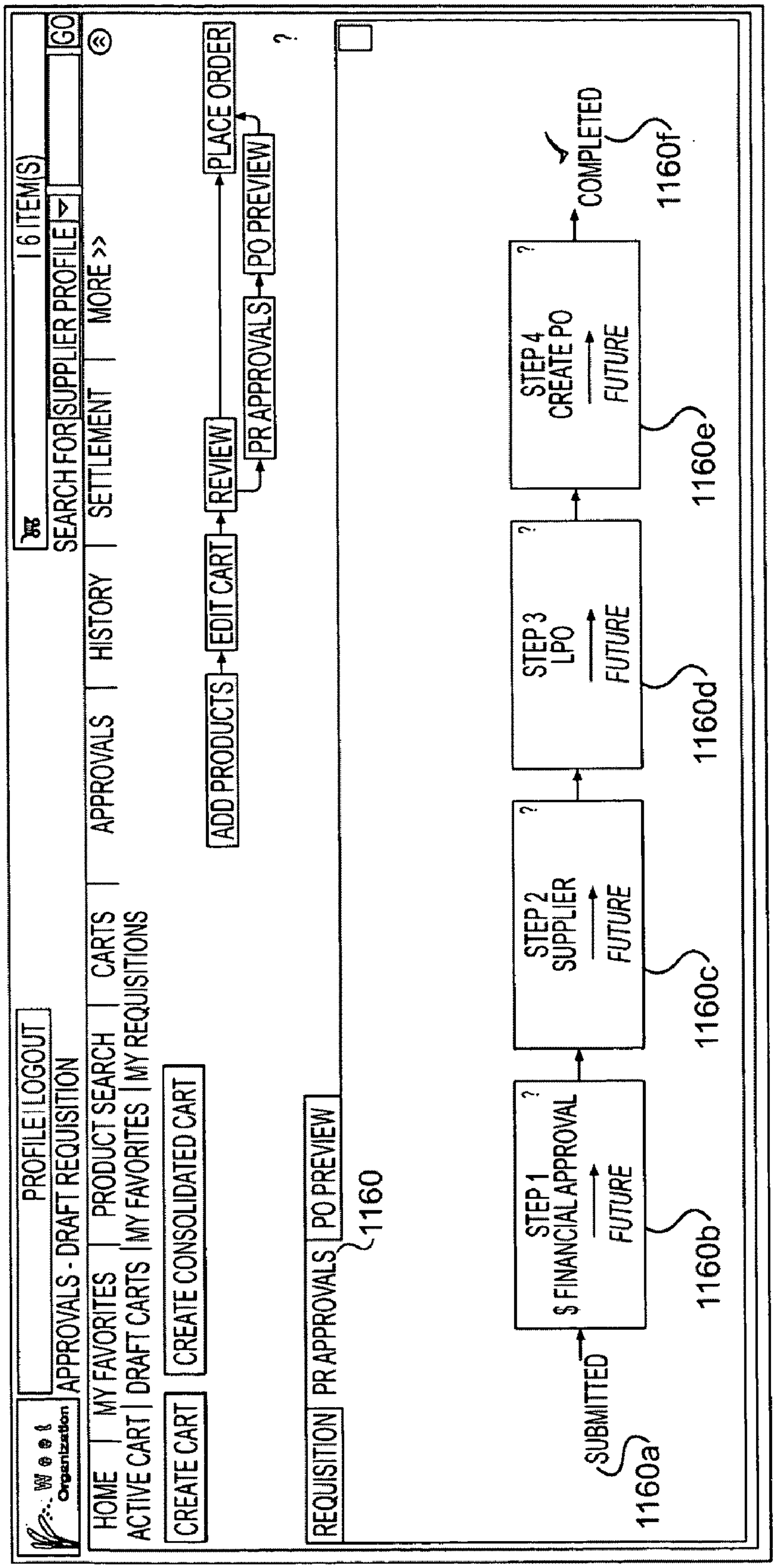

FIG. 11C illustrates an exemplary purchase request approval tool 1160 that corresponds to the purchase requisition approval step 1110*d* in accordance with the present invention. The exemplary purchase request approval tool 1160 graphically portrays the status of the requisition being reviewed (e.g., submission of the purchase requisition 1160*a*, financial approval 1160*b*, supplier approval/processing 1160*c*, LPO 1160*d*, purchase order creation 1160*e*, and completion 1160*f*). As with the requisition workflow tool 1110 (FIG. 11B), each workflow/approval step status box may be invoked to activate a tool, corresponding to each workflow/approval step, to view the reason(s) underlying the workflow engine's invocation of that step. Other intervening or superseding steps may also be portrayed without departing from the scope of the present invention.

Figure 11D:
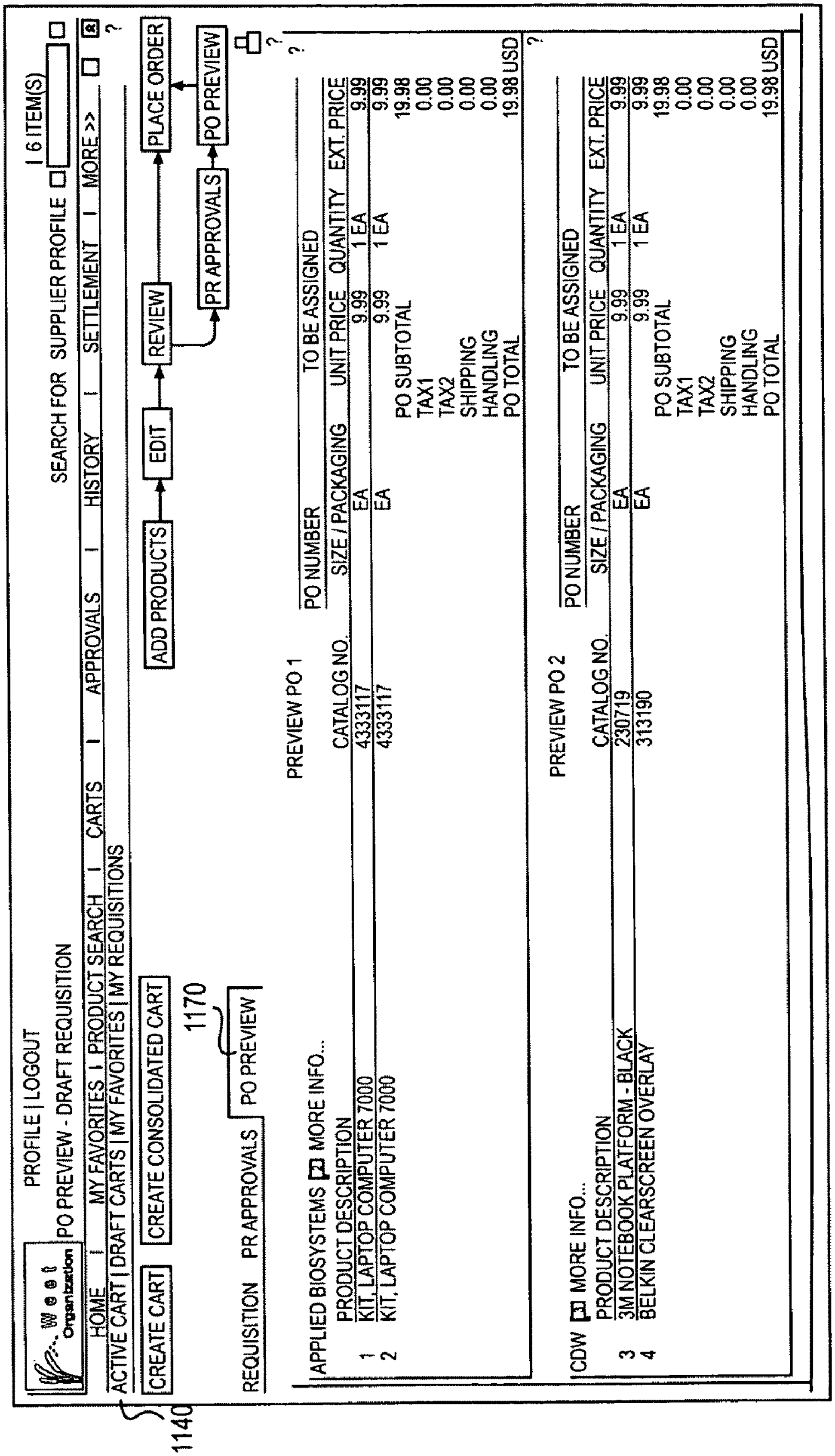

FIG. 11D illustrates an exemplary purchase order preview tool 1170 that corresponds to the purchase order preview step 1110*e* in accordance with the present invention. The purchase order preview tool 1170 permits the user to preview the purchase orders that will be generated from the current active cart 1140. The active cart 1140 corresponding to that user is queried and the preview purchase orders are displayed, as shown, in alphabetical order according to supplier name. Other methods of ordering or retrieving the purchase orders corresponding to the user may also be used without departing from the scope of the present invention.

With reference to FIG. 2, the feature to invoke purchase/requisition orders may be hosted on the middleware/web methods servers 224 and managed by the eProcurement architecture of the present invention such that it is executed consistently with end user and supplier user business rules as described above. From a high-level point-of-view, this feature is implemented based on whether the order information sought to be processed by an end user is internal to the organization or supplier related. If the information is internal, it is processed accordingly via the end user 212, the middleware/web methods servers 224, through to the custom database servers 222, and then to the hosted supplier products catalog 234; otherwise, the information is processed similarly except that the appropriate supplier related databases (e.g., the master product database 236, and the transaction database 238) may also be invoked. During the processing of internal information, the order information sought to be processed may also be directly posted (e.g., locally to an end user).

An auto purchase order feature is available via the middleware/web methods servers 224 and is invoked via transaction processing modules executed on the transaction processing server 223, and can populate entries of a purchase order in accordance with applicable end user and supplier contractual terms. The auto purchase order feature allows for the generation of distribution, and payment, rule-based purchase orders based on the customizations effectuated by a super user of the organization in the manner described above. For example, the feature can automatically insert legal terms (e.g., the right to cure product defects, what constitutes rejection and/or revocation of an order, what may constitute a material defect, the seller's return policy, the buyer's acceptance policy, etc.), as well as other non-legal terms and conditions (e.g., preferred delivery dates, shipping and handling instructions, appropriate contact/authorized personnel, payment and receipt of payment instructions, etc.), based on a contract that may be in place between an end user organization and a supplier. If no contract is in place, then the auto purchase order feature may prompt the user or automatically insert default terms and conditions, whether legal or non-legal. The feature may create receipts for each end user initiated transaction/purchase order and add multiple transactions/purchase orders to a single receipt. For capable suppliers, automated responses can be accepted for display to the end user. Such automated responses may include, for example, order acknowledgement and advanced shipping notice. Also, a document search subfeature allows searching any existing transactions/purchase orders. The auto purchase order feature also supports supplier pricing schemes modeled using the U.S. Dollar as well as all other currency types (e.g., Euro, Yen, Pound, Peso, etc.).

Figure 12:
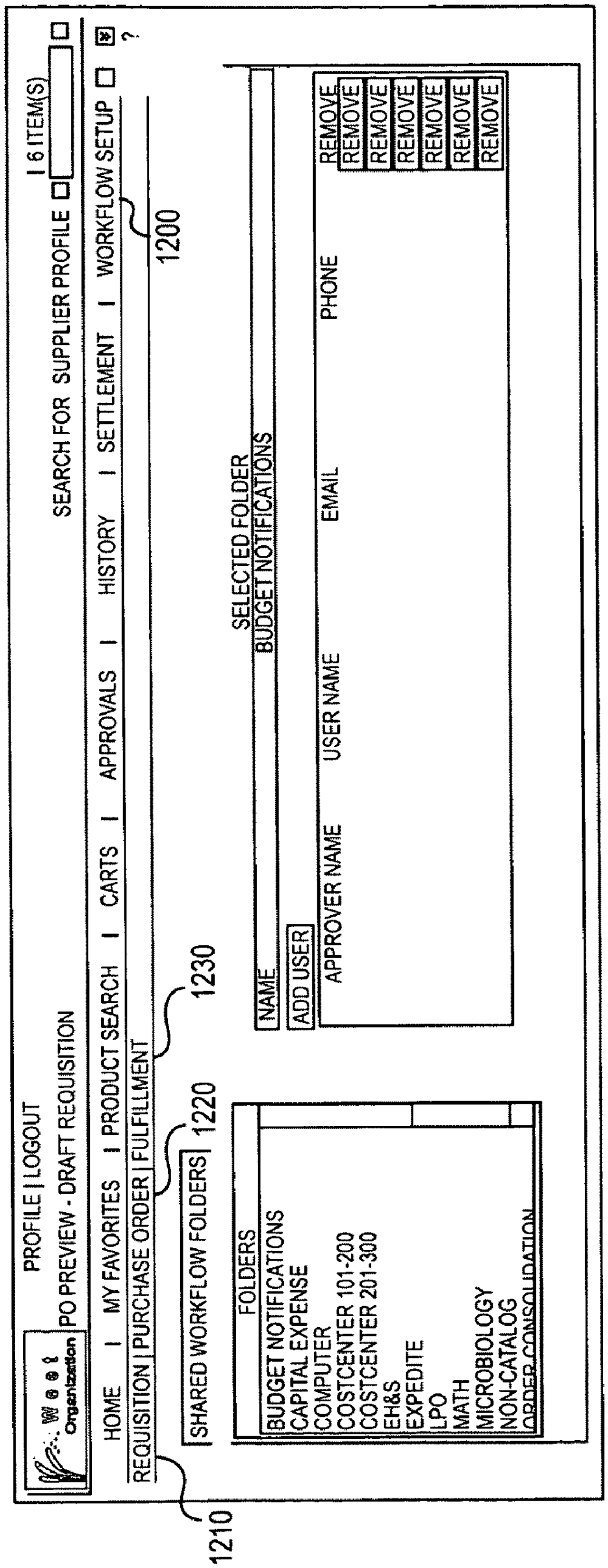
FIG. 12 illustrates an exemplary workflow setup tool in accordance with the present invention.

FIG. 12 illustrates an exemplary workflow setup tool in accordance with the present invention. As shown, the workflow setup tool 1200 includes requisition workflow tool 1210, purchase order setup tool 1220, and fulfillment setup tool 1230. These tools are used to setup various aspects of the workflow process as described above. For example, as shown in FIG. 12, the purchase order setup tool 1220 may be used to designate the names of approvers to review and approve purchase orders for a particular organization. As shown, the approver list may be customized for different departments (e.g., Math), types of products (e.g., non-catalog item), and even for specific users. Similarly, the requisition setup tool 1210 and fulfillment setup tool 1230 may be used to designate approvers for requests and fulfillment processes, respectively. Other workflow parameters may be further defined without departing from the scope of the present invention.

Figure 13:
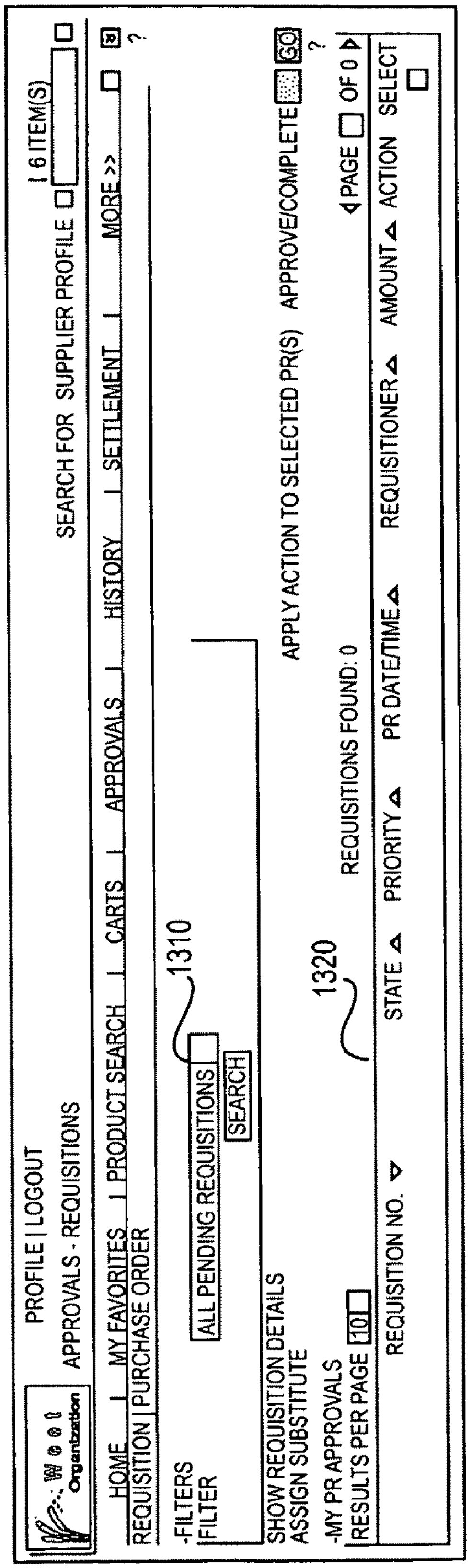
FIG. 13 illustrates an exemplary purchase order approval tool in accordance with the present invention.

FIG. 13 illustrates an exemplary purchase order approval tool in accordance with the present invention. As shown, purchase order search engine 1310 searches through all of the purchase orders generated by the eProcurement system of the present invention for each of the hosted organizations. The results of the search may be filtered based on display criteria such as "Approver" (e.g., user responsible for approving the document), "Approval Queues," "All Pending Requisitions," "Urgent Approvals," "Unassigned Approvals," "Future Approvals," and "Manual Filter" options. The result list of the purchase orders are displayed in the display portion 1320 with such information as P.O. number, status of the P.O., priority level of the P.O., the date/time of the submission for approval, the name of the requester, the designated supplier, the amount, and selectable options. Using the purchase order approval tool, the approvers as well as the requisitioners may monitor the status of the requests and ascertain where the request is in the workflow process. Using the tools described above, the user may drill down to the lowest level of the request to determine what needs to be done to move the request along if it becomes bottlenecked in the process, for example.

At the conclusion of the ordering process, an approval/rejection of orders feature may be implemented also through the middleware/web methods server 224, as well as the transaction processing server 223. The approve/reject order feature is invoked via a transaction processing module that is executed on the transaction processing servers 223. This feature can be managed by the middleware/web methods server 224 such that it is executed consistently with end user and supplier user business rules. For example, one advantage of this feature is its ability to provide notice of an approved or rejected order to an end user or super user.

Figure 14:
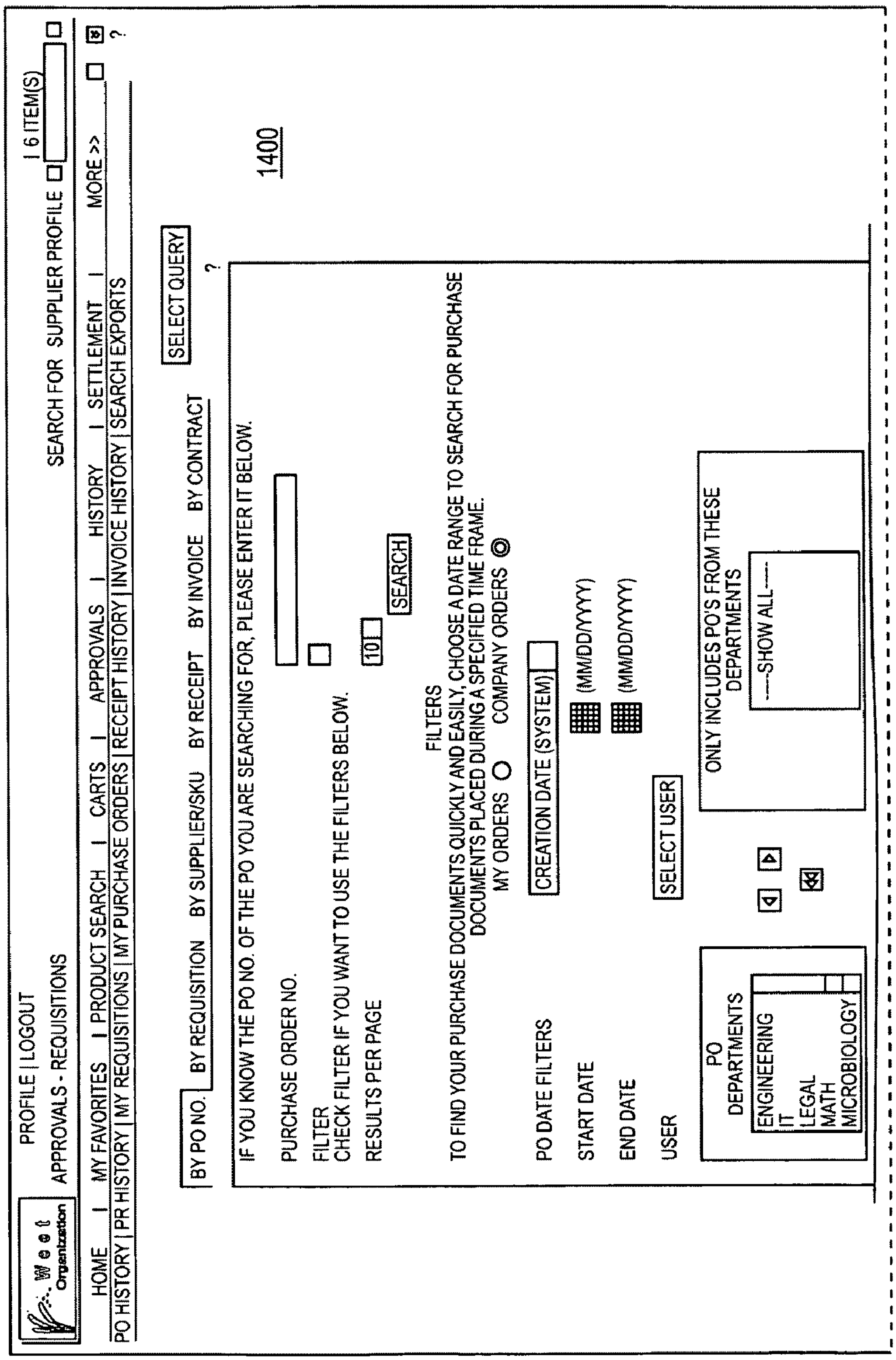
FIG. 14 illustrates an exemplary history tool in accordance with the present invention.
Figure 14:
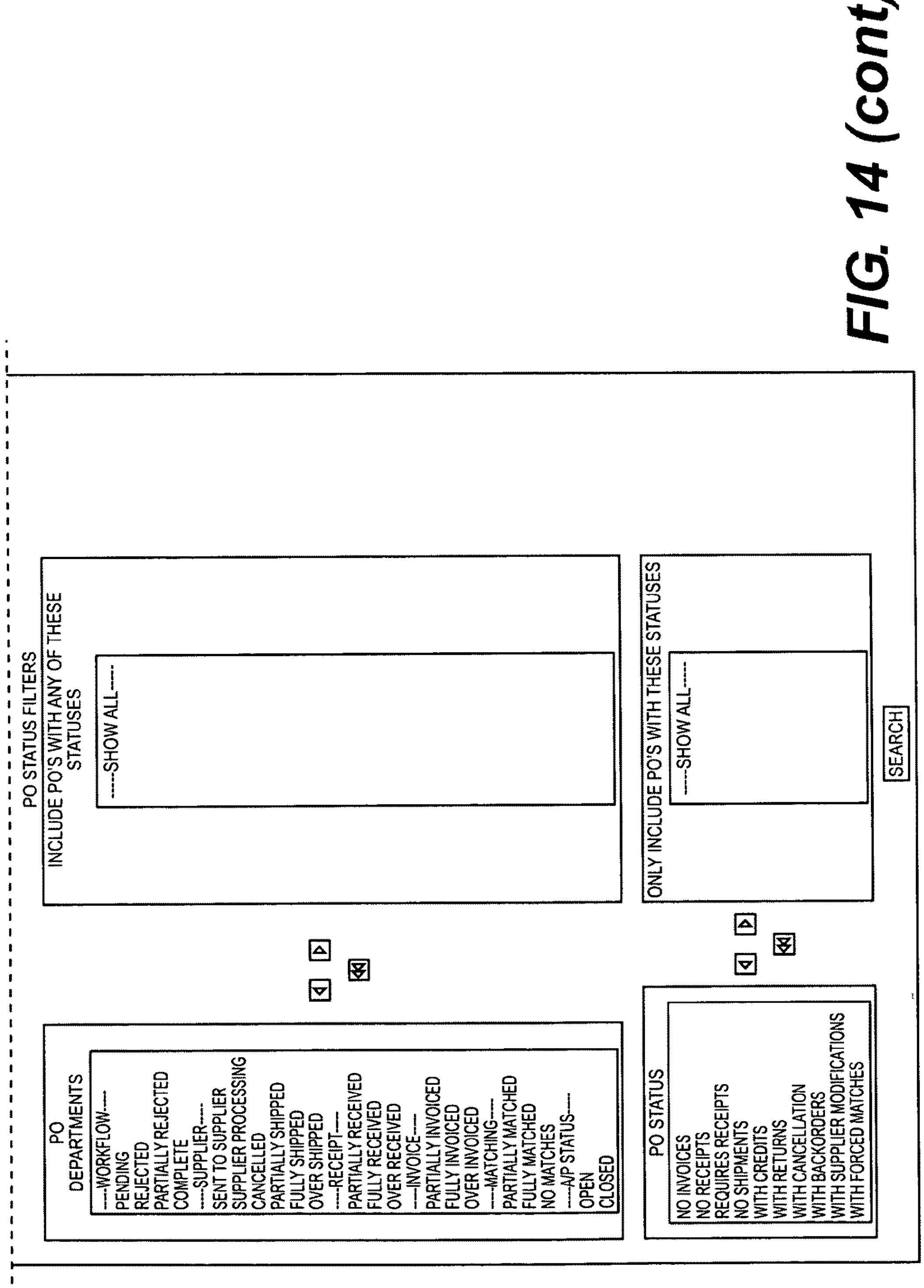

FIG. 14 illustrates an exemplary history tool in accordance with the present invention. The eProcurement system in accordance with the present invention keeps a history of all requests, purchase orders, receipts, invoices, and actions (e.g., edits to parameters) made in the system that may be searched and reviewed. History tool 1400, for example, includes a tool to search for purchase order histories, purchase request histories, receipt histories, and invoice histories. The searches may be made by purchase order number, by requisition, by supplier/SKU numbers, by receipts, by invoices, and by contracts. These parameters may be filtered by dates, users, as well as other specifics of the history being sought.

Finally, a supplier configuration feature may be implemented. This feature allows for the capability to have a supplier master that hosts multiple fulfillment centers. Also, this feature allows for an order processing feature with multiple payment/currency methods for each fulfillment center, the execution of shipping and handling rules, and order distribution features. The order distribution features can include such features as facsimile or email confirmation, as well as other delivery methods, organized hierarchically to ensure purchase order delivery.

Figure 15:
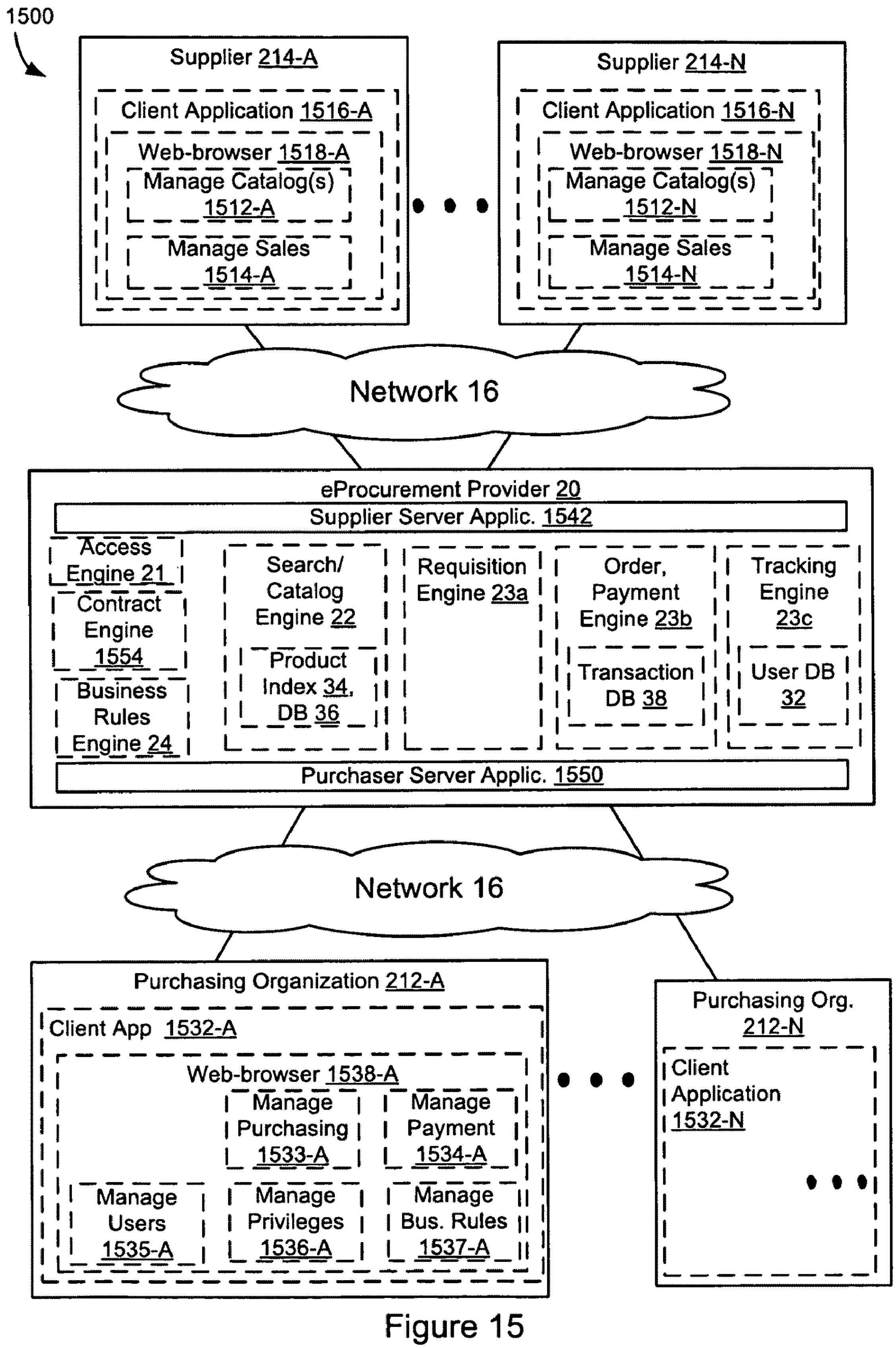
FIG. 15 illustrates the electronic procurement system communicating over a network with suppliers and purchasing organizations.

FIG. 15 is a block diagram 1500 of the electronic procurement system 20 communicating over a network 16 with suppliers 214-A (to 214-N) and purchasing organizations 212-A (to 212-N). The electronic procurement system 20 generally includes a supplier server application 1542 and purchaser server application 1550, which may interface with the access engine 21, contract engine 1554, search/catalog engine 22, requisition engine 23*a*, order/payment engine 23*b*, tracking engine 23*c*, and business rules engine 24.

As described, business rules describe and control the relationships between end users and suppliers based, in part, on contractual terms or other arrangements, as processed according to the price and file management feature. For example, supplier user-side business rules may, for example, designate preferences regarding delivery terms (e.g., restrictions against odd lot sales, FOB preference, carrier preference, etc.), and price and insurance terms (e.g., CIF preference, applicable sales tax, etc.). Similarly, end user-side business rules may, for example, designate preferences regarding preferred suppliers, delivery terms (e.g., FOB preference, default quantity, carrier preference, etc.), and price and insurance terms (e.g., CIF preference, applicable sales tax, etc.). At least one advantage of implementing end user-side and supplier user-side business rules is the capability to be able to generate customized purchase orders, in accordance with contractual or default business rules.

Non-limiting examples of business rules may include:

If the extended price of any line item exceeds the limit set in a user's profile, route to the user's financial approver.

If the total value of the requisition exceeds the limit set in a user's profile, route to the user's financial approver.

If a requisition sent to a user for financial approval exceeds the user's approval authority set in the user's profile, route the requisition to the user's financial approver.

If the requisition contains suppliers classified by a user's organization as "IT Vendors," send the requisition to the CIO.

Requisitions for the Math Department over $10,000 are routed to the Vice Chancellor of Liberal Arts.

If any item on the PO is radioactive, route the PO to the environmental health and safety (EH&S) Department for review and approval.

If any item on the PO is classified as hazardous, notify the EH&S Department. No approval is required.

If the account code for a line item on the requisition has a budget, and the requisition will exceed the budget, route the requisition to the Budget Manager.

If the user adds a non-catalog item to their requisition, route it to the Purchasing Department to validate the information entered.

If a requisition is marked for expediting, skip all rules and route directly to the Purchasing Department.

All the above examples of business rules are exemplary and not intended as limiting.

The supplier server application 1542 and purchaser server application 1550 may also interface with the transaction engine 23, which may include the requisition module 23*a*, order/payment engine 23*b*, and the tracking engine 23*c*. Moreover, the supplier server application 1542 and purchaser server application 1550 may send and receive data from the data repository 30, which includes the user database 32, the product index database 34, the product database 36, and the transaction database 38. The engines may communicate via function/method calls, file libraries, and database queries. The contract engine 1554 executes the necessary functions for implementing the contract management feature, which manages and links new or existing procurement contracts, formed between buyer organizations and supplier organization, with a group. For example, a new or existing contract is initially stored in the contracts database 3200 (as described in FIG. 32) and may routinely be updated in accordance with amendments (e.g., extensions, additions of agreed upon terms, assignments, or the like) or other contractual events (e.g., the expenditure of quantity/time/spending limits (i.e., tiers), price fluctuations—e.g., rebates or price reductions, item changes or additions, etc.); at such time intervals as determined by the contract engine 1554, the group is updated accordingly. The group includes, for example, buyer users, supplier users, the business rules engine 24, items, forms, purchase requisitions/orders, sales orders/invoices, and buyer invoices. Furthermore, the contract engine 1554 also supports contract searching (as described in FIG. 10) based on specific user-specified criteria like, for example, contract number, contract keyword, or supplier/catalog name.

The supplier server application 1542 communicates with a supplier 214-A (to (214-N) over network 16 and the purchaser server application 1550 communicates with a buyer 212-A (also referred to herein as a purchasing organization) over network 16. A supplier user would use a client application 1516-A (to 1516-N) to communicate with, generally, the electronic procurement provider 20 and, specifically, the supplier server application 1542. The client application 1516-A (to 1516-N) may be a web-browser 1518-A (to 1518-N) for the supplier user to use, or may be a standalone application. The web-browser 1518-A or standalone application may display features to manage catalog(s) 1512-A (to 1512-N) and manage sales 1514-A (to 1514-N), which may be communicated via the supplier server application 1542 and displayed to the supplier user. A buyer user would use a client application 1532-A (to 1532-N) to communicate with, generally, the electronic procurement provider 20 and, specifically, the purchaser server application 1550. The client application 1532-A (to 1532-N) may contain a web-browser 1538-A (to 1538-N) for the buyer user to use, or may be a standalone application. The web-browser 1538-A or standalone application may display features to manage purchasing 1533-A (to 1533-N), manage payment 1534-A (to 1534-N), manage users 1535-A (to 1535-N), manage privileges 1536-A (to 1536-N), and/or manage business rules 1537-A (to 1537-N), which may be communicated via the purchaser server application 1550 and displayed to a buyer user. For example, a user that sends a request to the system 20 that is outside the scope of that user's privileges would receive an appropriate denial response from the system 20 and, more specifically, for example, from the manage privileges 1536-A feature.

Figure 16:
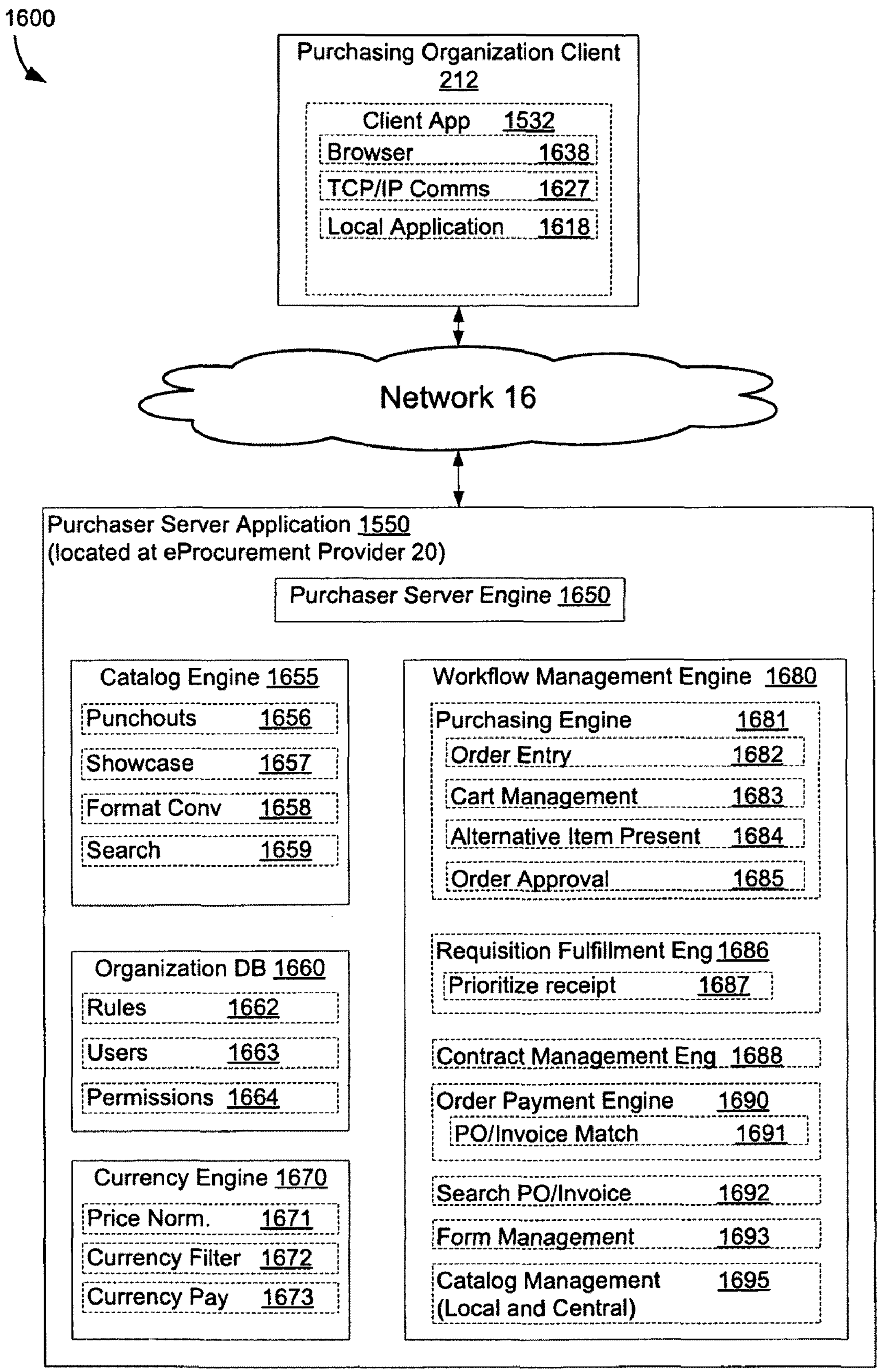
FIG. 16 illustrates the purchasing organization client communicating over a network with the purchaser server application to access the engines of the purchaser server application.

FIG. 16 is a block diagram 1600 of the buyer 212 communicating with the purchaser server application 1550, located at the electronic procurement provider 20, over a network 16, using a client app 1532 such as a browser 1638, TCP/IP communications 1627, and/or a local application 1618. The purchaser server engine 1650 may interface with or include the following modules, or a subset thereof:

a catalog engine 1655 for managing each supplier catalog by implementing features for uploading catalog data, linking to the proper punch-out catalog(s) (1656) via the punch-out module 22*a* and back to the buyer, managing supplier showcase promotions and overlays (1657), converting supplier catalog data into a common data format (1658), search (1659), and interfacing with the search engine 22 for searching the master product database or other accessible database of the electronic procurement system 20;

an organization database 1660 for storing organization specific information like, for example, business rules (1662), user-related data (1663), or permissions (1664);

a currency engine 1670 for implementing multi-currency features like, for example, normalizing a plurality of currency data (1671) into a default or preferred currency, interfacing with the search engine 22 to return item search results to a buyer user who sent a request to organize/filter the search results (1672) according to a specific currency, or determining the default or preferred currency with which a supplier requests or requires payment (1673); or a workflow management engine 1680 for managing the flow of purchase requisitions to the appropriate approver (via the requisition fulfillment engine 1686) (which may be prioritized via the prioritize receipt feature 1687 based on user hierarchy, privileges, or business rules), sending the approved requisition back to the appropriate buyer user (via the requisition fulfillment engine 1686), interfacing with the search engine 22 to locate an appropriate requisition and/or purchase order (via the search PO/Invoice feature 1692), forwarding a purchase order to the appropriate supplier (via the requisition fulfillment engine 1686), forwarding a sales order and/or invoice from the supplier to the appropriate buyer user (via the order payment engine 1690 and using the PO/Invoice match feature 1691 for linking a purchase order on the buyer user side with an incoming invoice from the supplier), or sending event updates to the contract engine 1554 (via the contract management engine 1688).

Moreover, the workflow management engine 1680 may also interface with a purchasing engine 1681 that receives orders (via an order entry feature 1682), manage the items a buyer user places in a cart or moves/assigns to a new cart (via a cart management feature 1683), present alternative items to a buyer in lieu of items chosen for requisitioning that are not available according to privileges, inventory or a contractual agreement (via an alternative item present feature 1684), or approve an order if approved by the appropriate approver user (via an order approval feature 1685). In addition, the workflow management engine 1680 may also interface with a form management engine 1693 for receiving requisitions and orders via user-created custom forms stored in a forms database 2300. Once received, the requisitions and orders are then routed to approvers and suppliers, respectively, according to workflow business rules. And, the workflow management engine 1680 also interfaces with the catalog management feature 1695 for retrieving item data related to the items present in the requisitions, orders, or invoices being processed by the workflow management engine 1680.

Figure 17:
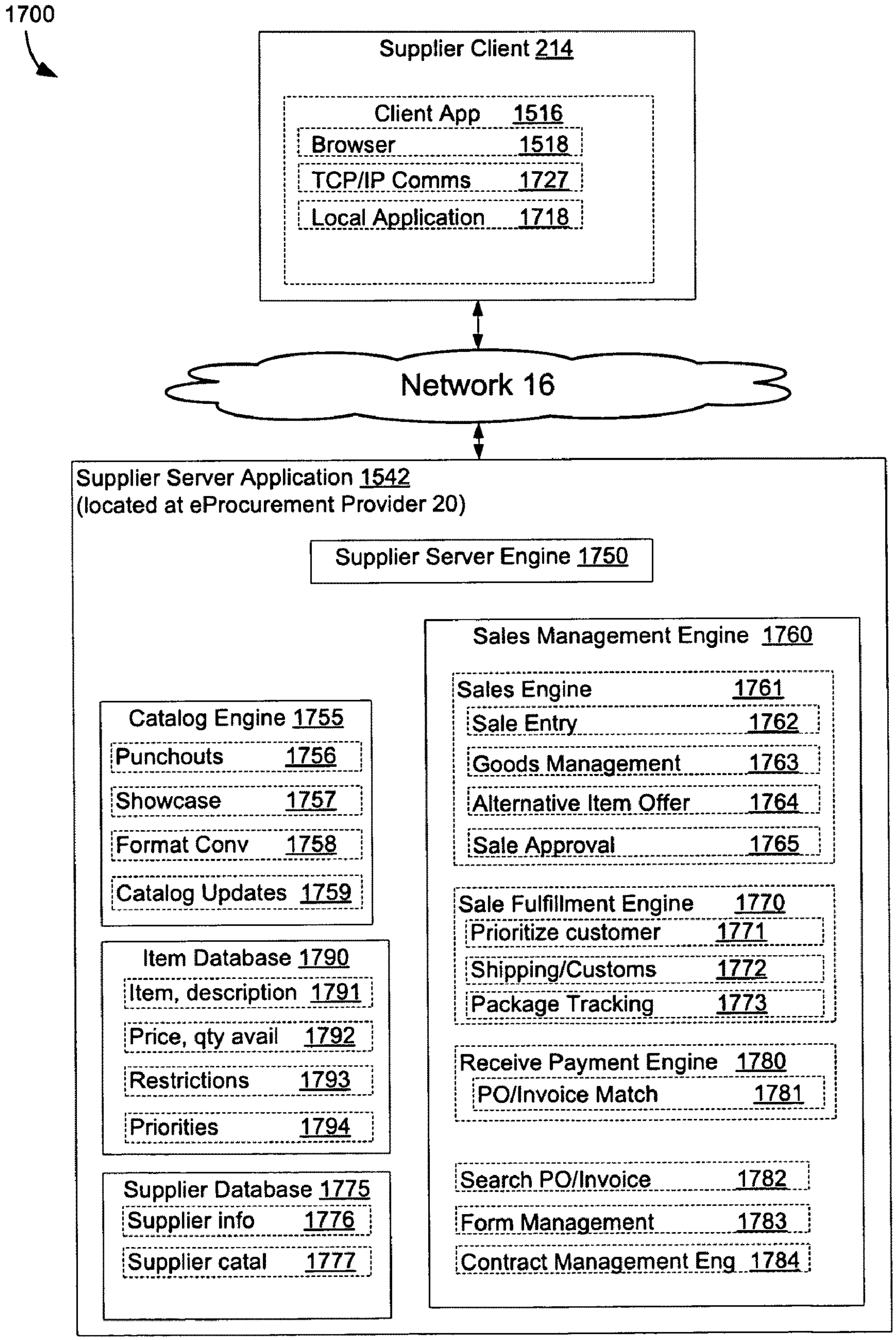
FIG. 17 illustrates the supplier client communicating over a network with the supplier server application to access the engines of the supplier server application.

FIG. 17 is a block diagram 1700 of the supplier 214 communicating with the supplier server application 1542, located at the electronic procurement provider 20, over a network 16, using a client app 1516 such as a browser 1518, TCP/IP communications 1727, and/or a local application 1718. The supplier server engine 1750 may interface with or include the following modules, or a subset thereof:

a catalog engine 1755 for managing each supplier catalog by implementing features for uploading catalog data, linking to the proper punch-out catalog(s) (1756) via the punch-out module 22*a* and back to the buyer, managing supplier showcase promotions and overlays (1757), converting supplier catalog data into a common data format (1758), and interfacing (1759) with the catalog management feature 1695 for updating the master product database or other accessible supplier-related database of the electronic procurement system 20;

an item database 1790 for storing item specific information like, for example, item description (1791), price and quantity available (1792), restrictions (1793), or priorities (1794);

a supplier database 1775 for storing supplier specific information like, for example, detailed supplier data (1776), or supplier catalog data (1777); or a sales management engine 1760 for managing the flow of sales orders and sales invoices from the appropriate buyer to the appropriate supplier (via the sale fulfillment engine 1770) (which may be prioritized (via the prioritize customer feature 1771) based on buyer/user hierarchy, privileges, or business rules), shipping (1772) and tracking (1773) the ordered item(s) to the appropriate buyer, interfacing with the search engine 22 to locate an appropriate purchase order and/or invoice (via the search PO/Invoice feature 1782), forwarding an invoice to the appropriate buyer (via the sale fulfillment engine 1770), receiving payment on an invoice from a buyer to the appropriate supplier (via the receive payment engine 1780 and using the PO/Invoice match feature 1781 for linking a sales order on the supplier user side with an outgoing invoice from the supplier), or sending event updates to the contract engine 1554 (via the contract management engine 1784).

Moreover, the sales management engine 1760 may also interface with a sales engine 1761 that receives sales orders (via an sale entry feature 1762), manage the items (e.g., goods and/or services) a buyer user requested via the sales order (via a goods management feature 1763), present alternative items to a buyer in lieu of items chosen for ordering that are not available according to inventory or business rules like a contractual agreement (via an alternative item present feature 1764), or approve a sales order if the item(s) is available and complies with business rules (via a sale approval feature 1765). In addition, the workflow management engine 1680 may also interface with a form management engine 1783 for receiving sales orders via user-created custom forms stored in a forms database 2300. Once received, the sales orders are then routed to the appropriate supplier user(s), respectively, according to workflow business rules. Then, the process of fulfilling the order is initiated and managed by the sales fulfillment engine 1770.

Figure 18:
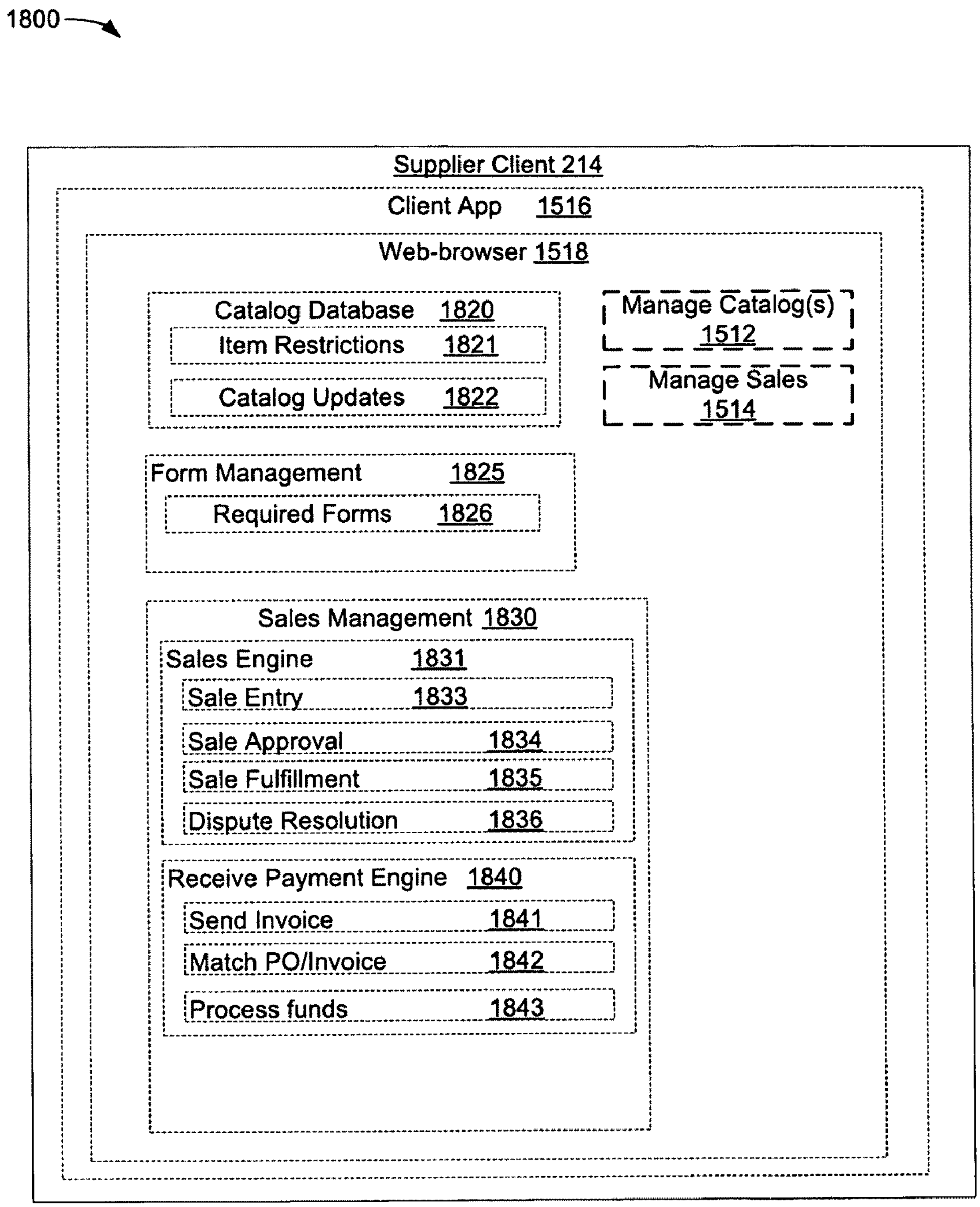
FIG. 18 illustrates the features and database accessible via the supplier client.

FIG. 18 is a block diagram 1800 of a supplier client 214. The client application 1516 may be a web-browser 1518 for the supplier user to use, or may be a standalone application. The web-browser 1518 or standalone application may display features for:

managing catalog(s) 1512;

managing sales 1514;

interfacing with the catalog database 1820 to, for example, input or view item restrictions 1821, or to make catalog updates 1822;

managing forms 1825 by, for example, customizing required forms 1826;

managing sales 1830 (e.g., via a sales engine 1831) by, for example, entering sales data 1833, approving sales 1834, fulfilling sales orders 1835, and addressing disputes that may arise 1836; or processing invoices and payments 1840 by, for example, sending invoices 1841, matching purchase orders to invoices 1842, or processing funds 1843.

Figure 19:
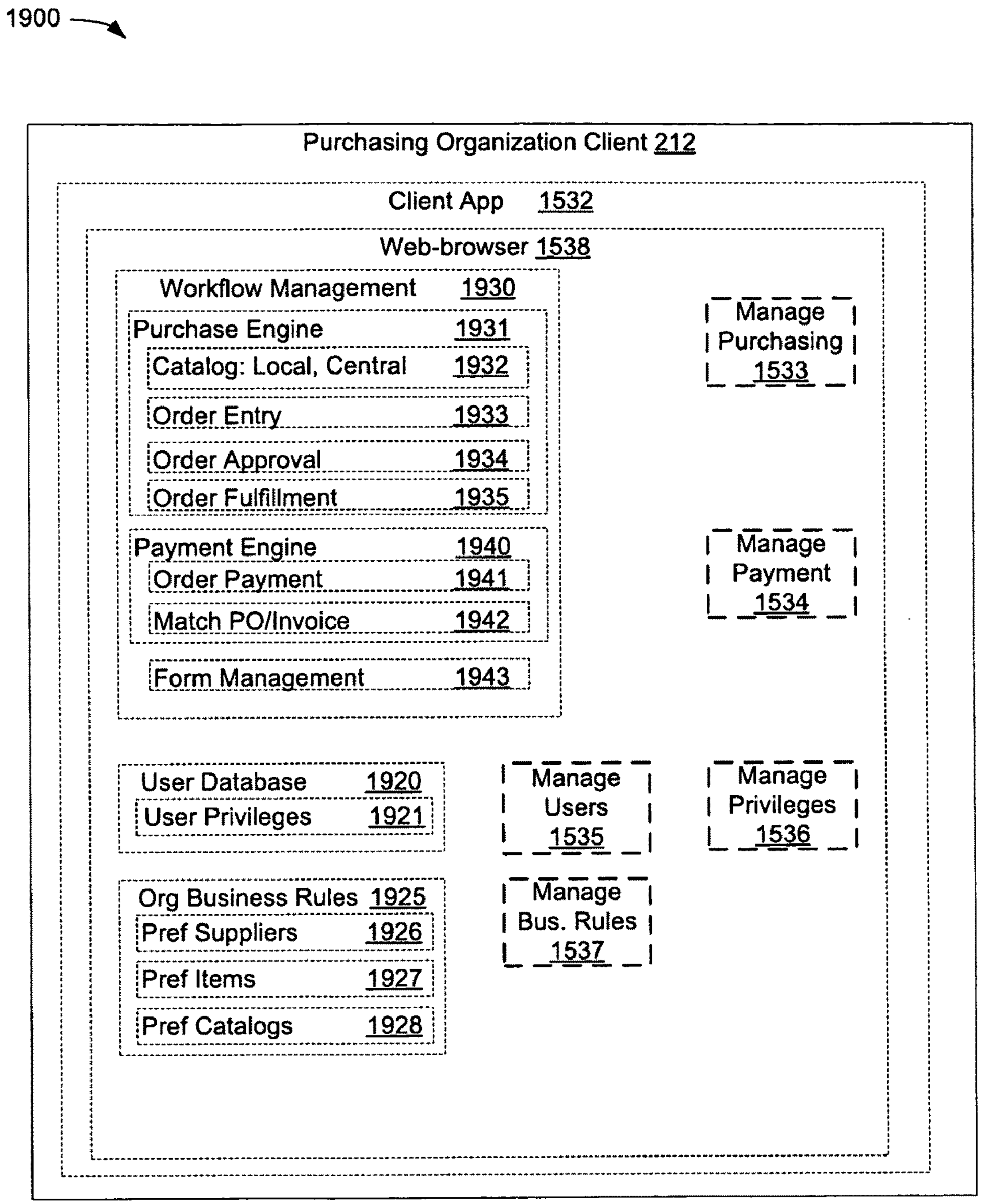
FIG. 19 illustrates the features and database accessible via the purchasing organization client.

FIG. 19 is a block diagram 1900 of a purchasing organization client 212. The client application 1532 may be a web-browser 1538 for the buyer user to use, or may be a standalone application. The web-browser 1538 or standalone application may display features to manage purchasing 1533, manage payment 1534, manage users 1535, manage privileges 1536, or manage business rules 1537. In addition, the web-browser 1538 or standalone application may also display features for:

- interfacing with the user database 1920 to, for example, access or define user privileges 1921;
- managing a buyer organization's business rules 1925 to, for example, define preferred suppliers 1926, items 1927, or catalogs 1928;
- managing workflows 1930 like, for example:
  - the flow of purchase requisitions within the buyer organization,
  - access to catalogs 1932 as may be necessary (via a purchase engine 1931) for forwarding a purchase requisition or order appropriately for approval,
  - order entry 1933, order approval 1934, order fulfillment 1935 (all via a purchase engine 1931), or
  - forwarding a sales order and/or invoice from the supplier to the appropriate buyer user (via the payment engine 1940 and using the PO/Invoice match feature 1942 for linking a purchase order on the buyer user side with an incoming invoice from the supplier), processing payment on the order's invoice 1941 (via the payment engine 1940), or forwarding of a user-customized form in accordance with business rules (via form management 1943).

Figure 20:
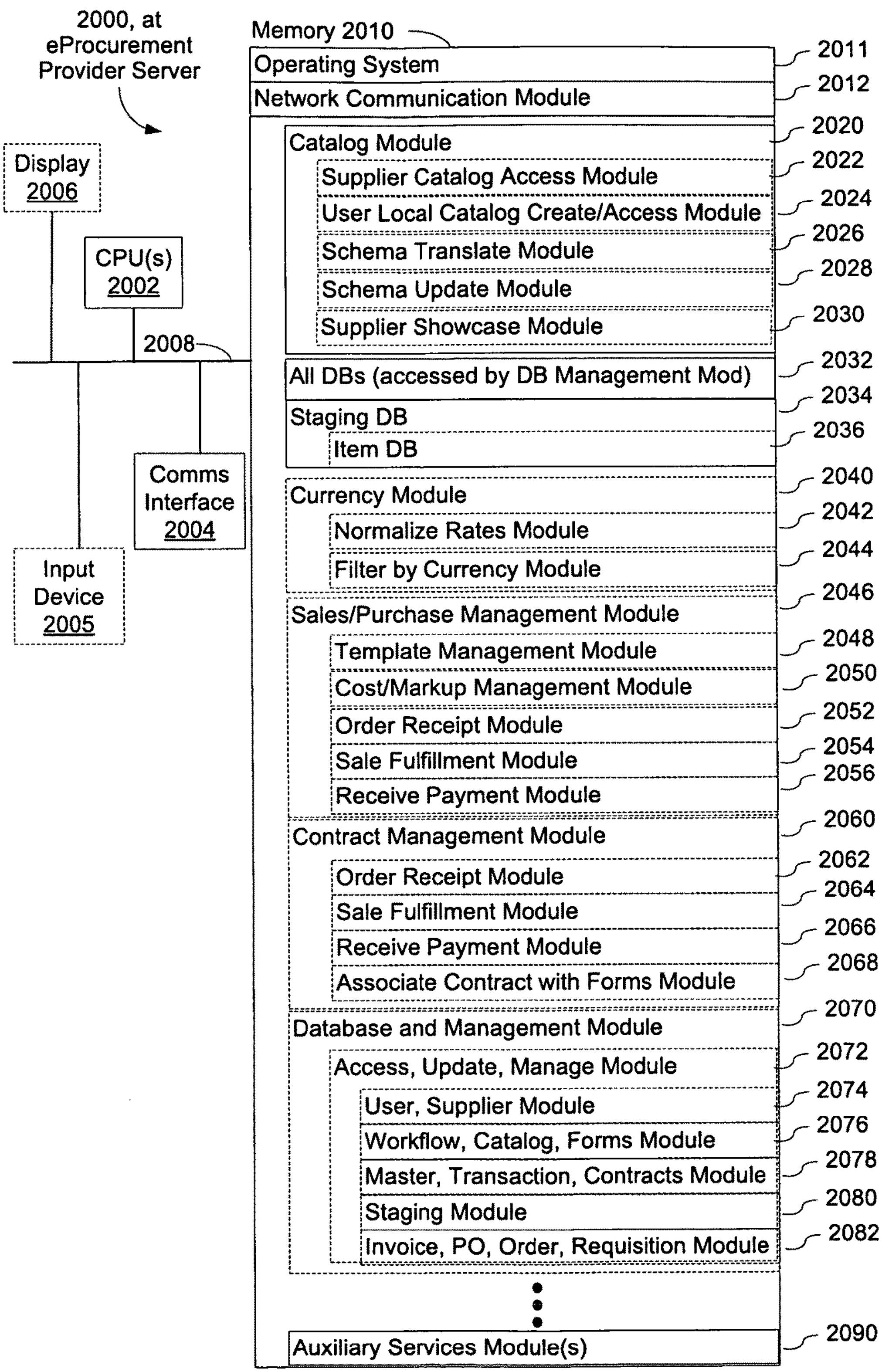
FIG. 20 illustrates a server system hosting an electronic procurement system running on the server.

FIG. 20 is a block diagram of a server system 2000. The server system 2000 generally includes one or more processing units (CPU's) 2002, one or more network or other communications interfaces 2004, memory 2010, and one or more communication buses 2008 for interconnecting these components. The communication buses 2008 may include circuitry (sometimes called a chipset) that interconnects and controls communications between system components. The server system 2000 may optionally include a user interface, for instance a display 2006 and an input device 2005. Memory 2010 may include high speed random access memory and may also include non-volatile memory, such as one or more magnetic disk storage devices. Memory 2010 may include mass storage that is remotely located from the central processing unit(s) 2002. Memory 2010 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices.

In some embodiments, memory 2010 stores the following programs, modules and data structures, or a subset thereof:

- an operating system 2011 that includes procedures for handling various basic system services and for performing hardware dependent tasks;
- a network communication module 2012 that is used for connecting the server system 2000 to other computers via the one or more communication network interfaces 2004 (wired or wireless) and one or more communication networks, such as the Internet, other wide area networks, local area networks, metropolitan area networks, and so on;
- a catalog module 2020 that provides information and prices about products in hosted supplier product catalogs;
- databases 2032;
- a staging database 2034;
- a currency module 2040;
- a sales/purchase management module 2046;
- a contract management module 2060;
- a database and management module 2070; and
- auxiliary services modules 2090.

The catalog module 2020 may include the following modules, or a subset thereof:

- supplier catalog access module 2022 for providing suppliers with access to their respective hosted supplier product catalogs;
- a user local catalog create/access module 2024 for providing users (purchasing organizations) with local catalogs, in one embodiment generated by the respective users, from which the users can order products from suppliers who are not associated with hosted supplier product catalogs. In one embodiment, a supplier in the local catalogs is a local service provider (e.g. catering or a limousine service) from which a user wants to order products and services using the electronic procurement system;
- a schema translate module 2026 for translating catalog data provided by suppliers or purchasing data provided by users into a common format associated with the electronic procurement system;
- a schema update module 2028 for updating data in the common format associated with the electronic procurement system in response to changes in the respective catalog data or purchasing data; and
- a supplier showcase module 2030 for promoting certain suppliers to users of a purchasing organization, which in an embodiment may be performed according to business rules.

The databases 2032 may include all databases used by the system. These databases may in one embodiment be stored as logical partitions in a memory. These databases may in another embodiment be stored as tables in a larger database. These databases may in yet another embodiment be stored in separate memory or storage devices.

The staging database 2034 may comprise a catalog development environment (i.e., a staging area) for catalogs associated with suppliers. The data in the staging area may include complete catalogs, incomplete catalogs in development, partially uploaded catalogs, etc. A supplier can choose to make any or all portions of their respective catalog(s) in the staging database 'live' by syndicating the respective portions. A live catalog is one from which a user or purchasing organization may order items. The item database 2036, which may be a subset of the staging database 2034, contains descriptions, characteristics, price, pictures and other pertinent information for items listed in the catalogs.

The currency module 2040 may include the following modules, or a subset thereof:

- a normalize rates module 2042 for normalizing currency rates visible by a purchaser of goods and/or services, purchasing from suppliers using different currencies to that of the purchaser, or by a supplier of goods and services selling to purchasers using different currencies to the supplier; and
- a filter by currency module for allowing purchasers to filter suppliers according to currencies they do business in, or allowing suppliers to filter purchasers similarly.

The sales/purchase management module 2046 may include the following modules, or a subset thereof:

- a template management module 2048, for managing templates used by suppliers or purchasers of the system in placing orders for goods or services;
- a cost/markup management module 2050 for determining characteristics (e.g., average cost) of inventory and managing the inventory based on the characteristics and a markup rate;
- order receipt module 2052 for determining that an order has been received, and preparing to fulfill the order;

sale fulfillment module 2054 for fulfilling the order, including invoicing and shipping goods to the purchaser; and a receive payment module 2056 for receiving payment associated with an order (both for fulfilled and unfulfilled orders).

The contract management module 2060 may include the following modules, or a subset thereof:

order receipt module for 2062 for determining that an order has been received and matching the order to a contract;

sale fulfillment module 2064 for associating fulfillment of an order with a contract and verifying that the received order complies with the contract;

receive payment module 2066 for associating payments with a contract and verifying that appropriate discounts and terms of the contract are reflected in the payment; and associate contract with forms module 2068 for associating the contract with forms used by a supplier or purchaser, such that terms of the contract apply to the form.

The database and management module 2070 may include the following modules, or a subset thereof:

Access, update and manage database module 2072 for accessing, updating and managing databases in the system, including:

user (purchaser) and supplier module 2074, for managing user database 32 as described, which is accessed by a buyer user 12 or supplier user 14 through access module 21 as described;

workflow, catalog and forms module 2076, for managing workflow database 3000, catalog database 2400, and forms database 2300 as described;

master, transaction and contracts module 2078, for managing master database 236, transaction database 238 ad contracts database 3200 as described;

staging module 2080, for managing staging database 3100 as described; and invoice, purchase order, order, and requisition module 2082, for managing invoice databases 3300 and 3400, order database 2900 and 2500, requisition database 2700 as described.

The auxiliary services module may include additional features or services related to operation, management, security, authentication, maintenance or other aspects of the electronic procurement system.

Figure 21:
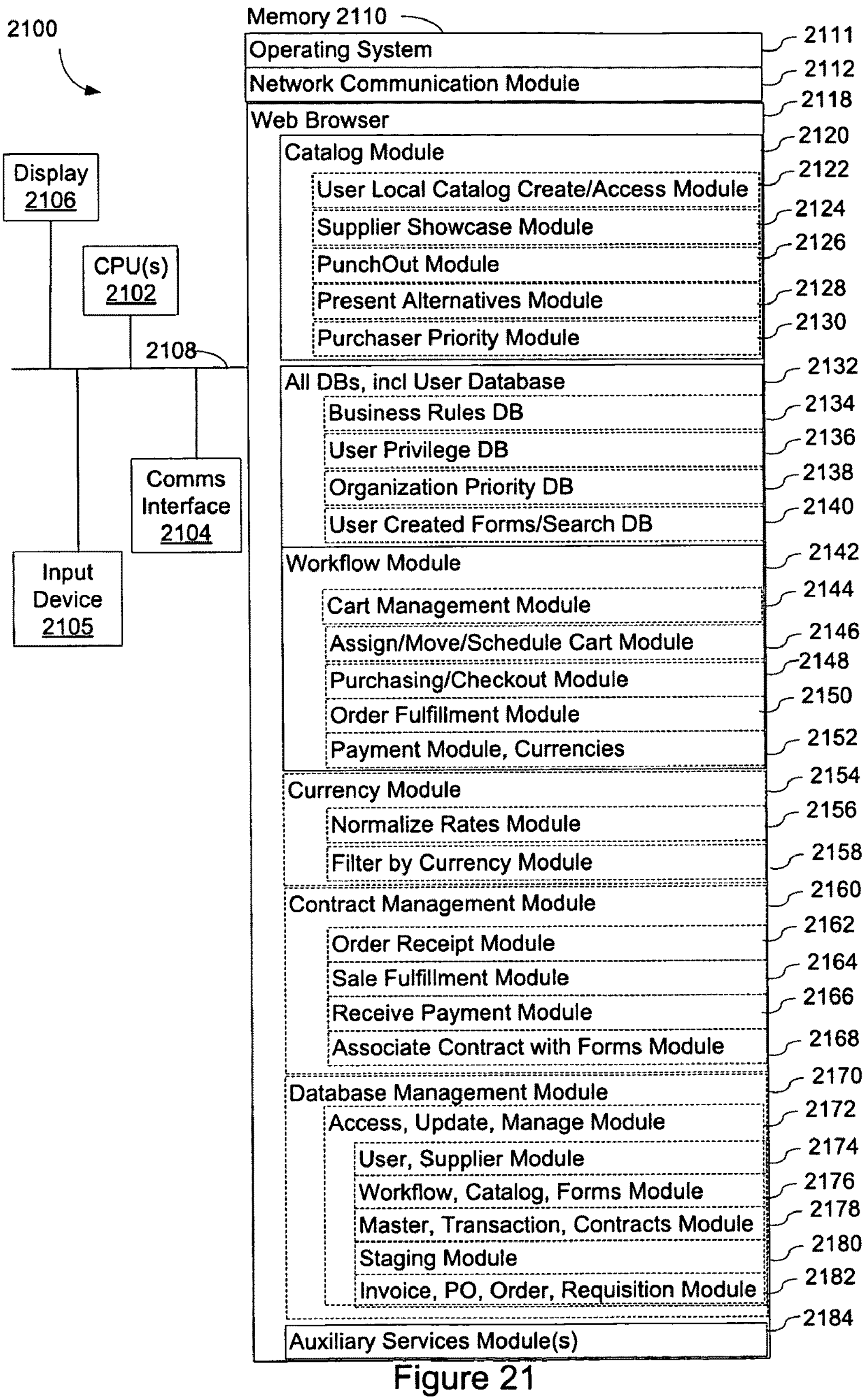
FIG. 21 illustrates a client system providing access to an electronic procurement system running on a server.

FIG. 21 is a block diagram of a server system 2100. The server system 2100 generally includes one or more processing units (CPU's) 2102, one or more network or other communications interfaces 2104, memory 2110, and one or more communication buses 2108 for interconnecting these components. The communication buses 2108 may include circuitry (sometimes called a chipset) that interconnects and controls communications between system components. The system 2100 may optionally include a user interface, for instance a display 2106 and an input device 2105. Memory 2110 may include high speed random access memory and may also include non-volatile memory, such as one or more magnetic, optical, or solid state disk storage devices. Memory 2110 may include mass storage that is remotely located from the central processing unit(s) 2102. Memory 2110 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices.

In some embodiments, memory 2110 stores the following programs, modules and data structures, or a subset thereof:

an operating system 2111 that includes procedures for handling various basic system services and for performing hardware dependent tasks;

a network communication module 2112 that is used for connecting the server 2000 to other computers via the one or more communication network interfaces 2004 (wired or wireless) and one or more communication networks, such as the Internet, other wide area networks, local area networks, metropolitan area networks, and so on;

a web browser 2118 or other tool for providing client access and visibility to the electronic procurement system, where in some embodiments some or all of the operations of the electronic procurement system are performed at a server, and in some embodiments some of the operations of the electronic procurement system are performed at the client;

a catalog module 2120 that provides information and prices about products in hosted supplier product catalogs;

databases 2132;

a workflow module 2142;

a currency module 2154;

a contract management module 2160;

a database management module 2170; and auxiliary services modules 2184.

The catalog module 2120 may include the following modules, or a subset thereof:

a user local catalog create/access module 2122, in some embodiments similar to module 2024, for providing users (purchasing organizations) with local catalogs, in one embodiment generated by the respective users, from which the users can order products from suppliers who are not associated with hosted supplier product catalogs. In one embodiment, a supplier in the local catalogs is a local service provider (e.g. catering) from which a user wants to order products and services using the electronic procurement system;

a supplier showcase module 2124, in some embodiments similar to module 2030, for promoting certain suppliers to users of a purchasing organization, which in an embodiment may be performed according to business rules;

a Punch Out module 2126 for providing access to a catalog or website separate from the hosted supplier product catalogs, and allowing a purchaser to purchase an item from that catalog or website, and process the purchase through the electronic purchasing system;

a present alternatives module 2128, for presenting alternative items to a prospective purchaser upon determining that an item requested by the purchaser cannot be fulfilled or that a better item might be available; and a purchaser priority module 2130 for prioritizing purchasers or purchaser orders associated with a user or purchasing organization.

The databases 2132 may include all databases used by the system, both on the server side and client side. These databases may in one embodiment be stored as logical partitions in a memory. These databases may in another embodiment be stored as tables in a larger database. These databases may in yet another embodiment be stored in separate memory or storage devices. The databases may include the following databases or modules, or a subset thereof:

business rules database 2134 for storing business rules associated with a user, purchasing organization or supplier, wherein in some embodiments the business rules may be set by a super-user or administrator associated with an organization;

user privilege database 2136 for storing privileges associated with users, such as purchasing privileges, approval privileges, etc.;

organization priority database 2138 for storing priority information associated with users or purchasing organizations in the electronic procurement system; and user created forms/search database 2140 for storing forms, search queries, etc associated with a user or purchasing organization, or associated with a supplier.

The workflow module 2142 may include the following modules, or a subset thereof:

cart management module 2144 for allowing a user or organization to manage a shopping cart associated with the purchase of items;

assign/move/schedule cart module 2146 for allowing a user or organization to assign a cart to another user, to move items from one cart to another (including a new) cart, and to schedule a cart for purchasing;

purchasing/checkout module 2148 for allowing a user to checkout one or more carts and purchase the items in the one or more carts;

order fulfillment module 2150 for verifying that an order has been received and processed for fulfillment, wherein in some embodiments this may be similar to sale fulfillment module 2054 for fulfilling the order; and payment module/currencies 2152 for processing payment for an order, including converting currencies if necessary.

The currency module 2154 may include the following modules, or a subset thereof:

a normalize rates module 2156 (in some embodiments similar to module 2042) for normalizing currency rates visible by a purchaser of goods and/or services, purchasing from suppliers using different currencies to that of the purchaser, or by a supplier of goods and services selling to purchasers using different currencies to the supplier; and a filter by currency module 2158 (in some embodiments similar to module 2044) for allowing a purchasers to filter suppliers according to currencies they do business in, or allowing suppliers to filter purchasers similarly.

The contract management module 2160 may include the following modules, or a subset thereof:

an order receipt module 2162 (in some embodiments similar to module 2062) for determining that an order has been received and matching the order to a contract;

a sale fulfillment module 2164 (in some embodiments similar to module 2064) for associating fulfillment of an order with a contract and verifying that the received order complies with the contract;

a receive payment module 2166 (in some embodiments similar to module 2066) for associating payments with a contract and verifying that appropriate discounts and terms of the contract are reflected in the payment; and an associate contract with forms module 2168 (in some embodiments similar to module 2068) for associating the contract with forms used by a supplier or purchaser, such that terms of the contract apply to the form.

The database management module 2170 may include the following modules, or a subset thereof:

Access, update and manage database module 2172 (in some embodiments similar to module 2072) for accessing, updating and managing databases in the system, including:

user (purchaser) and supplier module 2174 for managing user database 32 as described, which is accessed by a buyer user 12 or supplier user 14 through access module 21 as described;

workflow, catalog and forms module 2176 for managing workflow database 3000, catalog database 2400, and forms database 2300 as described;

master, transaction and contracts module 2178 for managing master database 236, transaction database 238 ad contracts database 3200 as described;

staging module 2180 for managing staging database 3100 as described; and an invoice, purchase order, order, requisition module 2182 for managing invoice databases 3300 and 3400, order database 2900 and 2500, requisition database 2700 as described.

The auxiliary services modules 2184 (in some embodiments similar to module 2090) may include additional features or services related to operation, management, security, authentication, maintenance or other aspects of the electronic procurement system.

Figure 22:
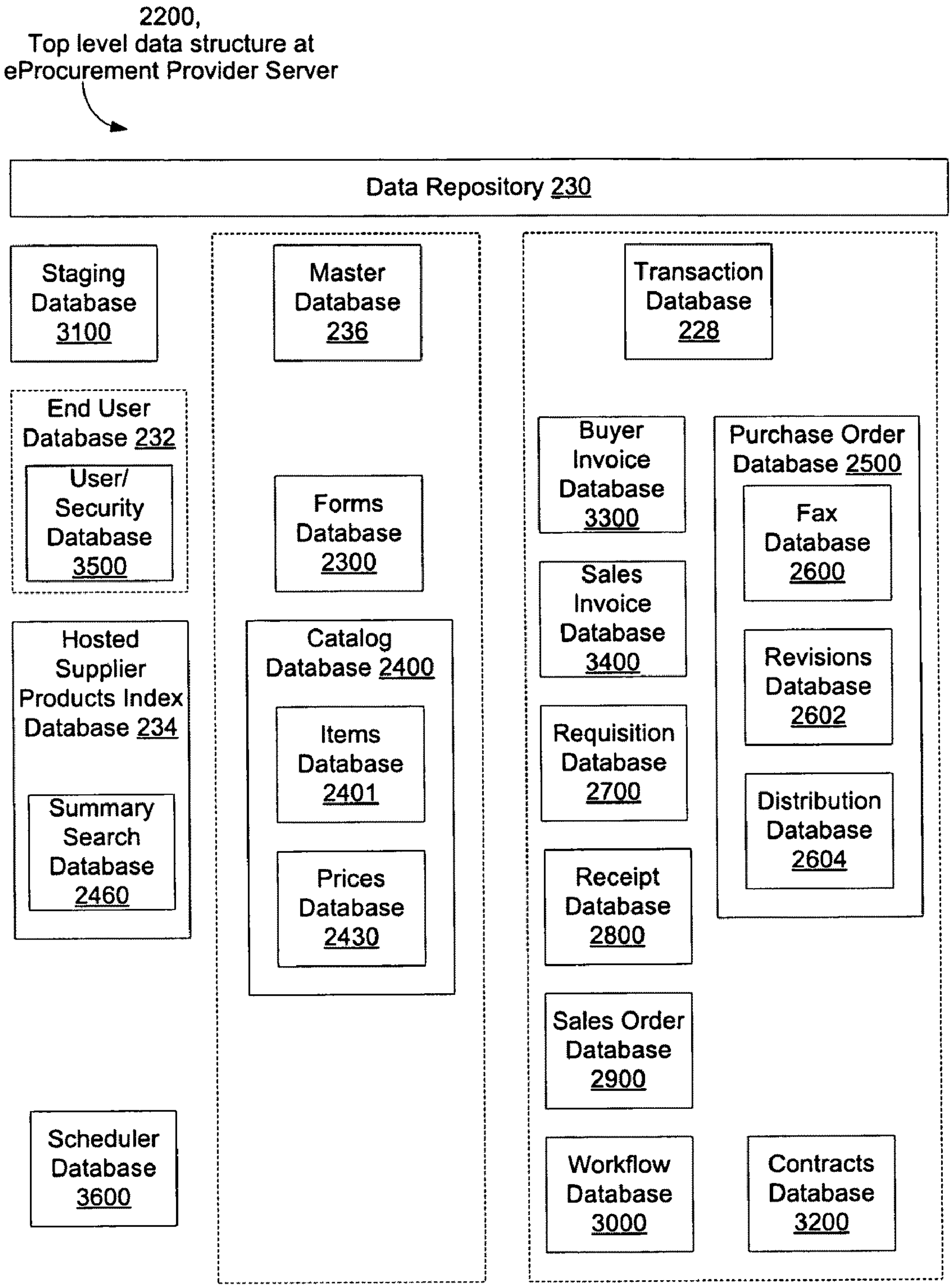
FIG. 22 illustrates a top-level data structure for electronic procurement system.

FIG. 22 shows a top level data structure 2200 at an electronic procurement provider server. The data structure includes data repository 230, end user database 232, hosted supplier product index 234, master product database 236, and transaction database 238. The end user database 232 may in an embodiment include user/security database 3500. The hosted product index 234 may in an embodiment include summary search database 2460. The data structure further includes staging database 3100, and scheduler database 3600.

The master database is associated with (and may in some embodiments include one or more of) a forms database 2300 and a catalog database 2400, which in an embodiment includes items database 2401 and prices database 2430.

The transaction database is associated with (and may in some embodiments include one or more of) buyer invoice database 3300, sales invoice database 3400, requisition database 2700, receipt database 2800, sales order database 2900, workflow database 3000, contracts database 3200, and purchase order database 2500. The purchase order database 2500 may in an embodiment include the fax database 2600, revisions database 2602, and distribution database 2604.

Figure 23:
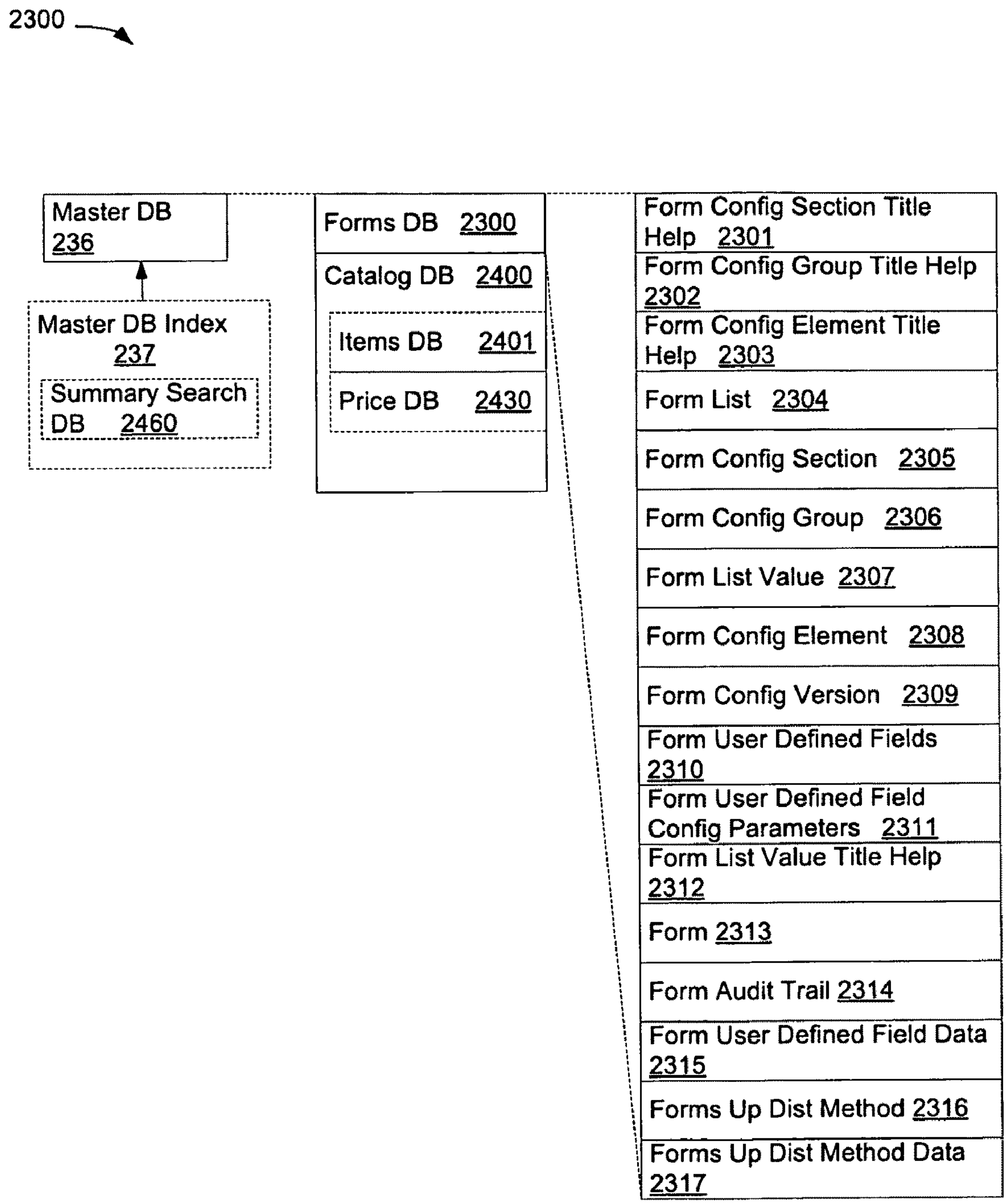
FIG. 23 illustrates a data structure for a master database, showing contents of a forms database.

FIG. 23 shows a database diagram 2300 including the master database 236, with master database index 237 indexing into the master database. Master database index 237 includes summary search database 2460.

In an embodiment, forms database 2300 includes one or more of:

Form Config Section Title Help 2301, in some embodiments help information for configuring a form section title;

Form Config Group Title Help 2302, in some embodiments help information for configuring a form group title;

Form Config Element Title Help 2303, in some embodiments help information for configuring a form element;

Form List 2304, in some embodiments a list of forms;

Form Config Section 2305, in some embodiments configuration of a form section;

Form Config Group 2306, in some embodiments configuration of a form group;

Form List Value 2307;

Form Config Element 2308, in some embodiments configuration of a form element;

Form Config Version 2309, in some embodiments configuration of a form version;

Form User Defined Fields 2310, in some embodiments user defined fields in a form;

Form User Defined Field Config Parameters 2311, in some embodiments parameters for configuring user defined fields in a form;

Form List Value Title Help 2312;

Form 2313;

Form Audit Trail 2314, in some embodiments a list of changes to a form for auditing purposes;

Forms User Defined Field Data 2315;

Forms Up Dist Method 2316, in some embodiments forms update distribution method details; and Forms Up Dist Method Data 2317, in some embodiments forms update distribution method data.

Figure 24:
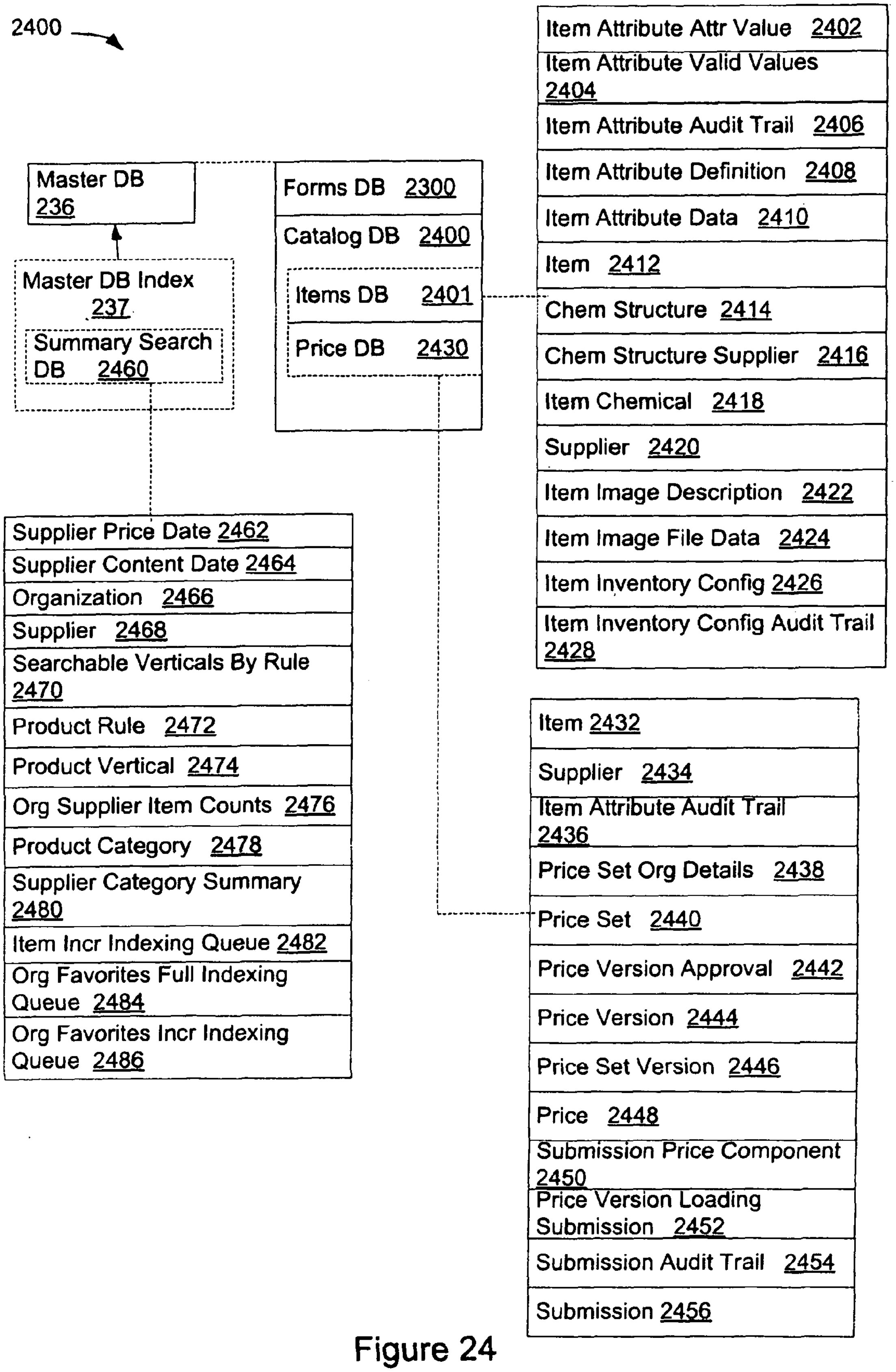
FIG. 24 illustrates a data structure for a master database, showing contents of a catalog database and search database for indexing the master database.

FIG. 24 shows a database diagram 2400 including the master database 236, with master database index 237 indexing into the master database. Master database index 237 includes summary search database 2460.

As described, the search architecture is based upon an indexed, tokenized-type implementation. This search architecture may include a search engine and a tokenization feature, both of which are invoked via processing modules executed on the custom database servers. Product elements such as the product name, industry, price, and availability, among others, are primarily used to generate a product search index (e.g., a token). The process of generating a product search index/token is called "tokenization" and may be executed by a tokenization feature invoked via a processing module. The indices/tokens generated as a result of the tokenization feature, which relate to various products of a multitude of suppliers, may be stored within and executed on the hosted supplier products catalog. Searching is actually executed against what are termed as "verticals." A vertical is designed similar to a drill-down menu architecture that consists of root nodes and leaf nodes, which are children of their respective roots.

The forms database 2300, and catalog database 2400 are associated with the master database. The catalog database includes items database 2401 and price database 2430.

In an embodiment, items database 2401 includes one or more of the following:

Item Attribute Attr Value 2402, in some embodiments a value for an item attribute;

Item Attribute Valid Values 2404, in some embodiments valid values value for an item attribute;

Item Attribute Audit Trail 2406, in some embodiments a list of changes to an item attribute for auditing purposes;

Item Attribute Definition 2408;

Item Attribute Data 2410;

Item 2412;

Chem Structure 2414, in some embodiments a description of a chemical structure that may be ordered through the procurement system;

Chem Structure Supplier 2416, in some embodiments a supplier of a chemical structure;

Item Chemical 2418, in some embodiments a commercial item of a chemical structure, e.g., a container of a certain chemical structure.

Supplier 2420;

Item Image Description 2422, in some embodiments a description of an image or picture associated with an item;

Item Image File Data 2424, in some embodiments an image data file (e.g., a JPEG image or GIF image, as commonly used in web applications);

Item Inventory Config 2426, in some embodiments data for configuring inventory of an item; and Item Inventory Config Audit Trail 2428, in some embodiments a list of changes to data for configuring inventory of an item.

In an embodiment price database 2430 includes one or more of the following:

Item 2432, in some embodiments an item for which a price is stored in the price database;

Supplier 2434, in some embodiments a supplier associated with the item;

Item Attribute Audit Trail 2436, in some embodiments a list of changes to an attribute associated with an item, for which a price is stored in the price database;

Price Set Org Details 2438, in some embodiments details of an organization price;

Price Set 2440, in some embodiments a price for the item;

Price Version Approval 2442, in some embodiments approval for a version of a price associated with the item;

Price Version 2444, in some embodiments a version of a price associated with the item;

Price Set Version 2446;

Price 2448, in some embodiments a price for the item;

Submission Price Component 2450;

Price Version Loading Submission 2452;

Submission Audit Trail 2454, in some embodiments for auditing submissions; and Submission 2456.

In an embodiment summary search database 2460 includes one or more of the following:

Supplier Price Date 2462, in some embodiments a date associated with a supplier price;

Supplier Content Date 2464, in some embodiments a date associated with supplier content (e.g., description);

Organization 2466;

Supplier 2468, in some embodiments a supplier of an item;

Searchable Verticals By Rule 2470, in some embodiments supporting rule-based searching;

Product Rule 2472, in some embodiments a rule related to a product;

Product Vertical 2474, in some embodiments supporting product-based searching;

Org Supplier Item Counts 2476, in some embodiments a count of items stored at an organization supplier;

Product Category 2478, in some embodiments a category related to a product;

Supplier Category Summary 2480, in some embodiments a summary of a supplier category;

Item Incr Indexing Queue 2482, in some embodiments a queue for incrementally indexing items;

Org Favorites Full Indexing Queue 2484, in some embodiments a full-indexing queue for organizational favorites; and Org Favorites Incr Indexing Queue 2486, in some embodiments an incremental-indexing queue for organizational favorites.

Figure 25:
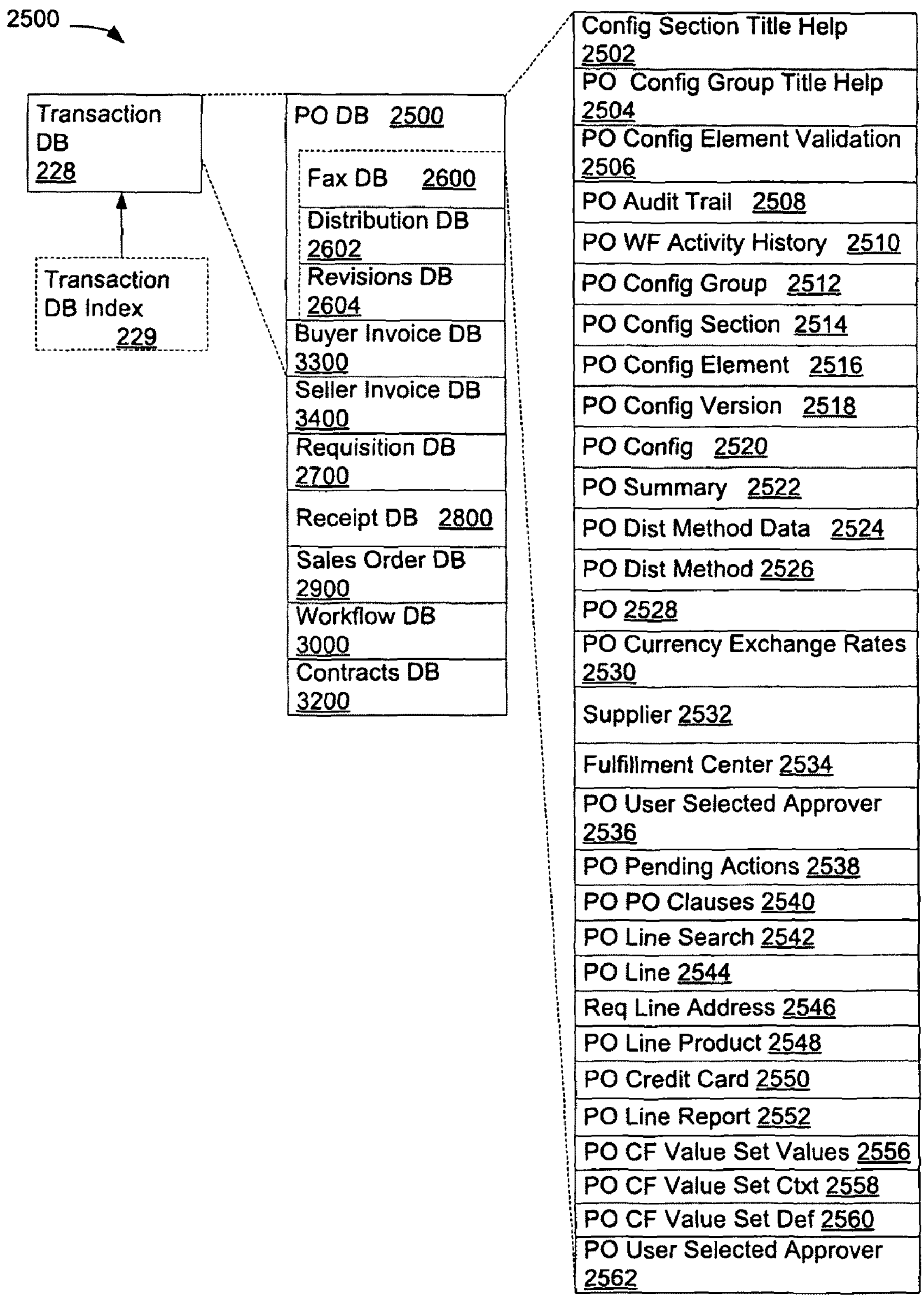
FIG. 25 illustrates a data structure for a transaction database, showing contents of a purchase order database.

FIG. 25 shows a database diagram 2500 including the transaction database 228, with transaction database index 229 indexing into the transaction database 228. Transaction database 228 is associated with (and in some embodiments includes one or more of) the following databases:

Purchase Order (PO) DB 2500, in some embodiments a database of purchase orders;

Fax DB 2600, in some embodiments a database of faxes;

Distribution DB 2602, in some embodiments for storing order distributions, where the order distribution features can include such features as facsimile or email confirmation, as well as other delivery methods, organized hierarchically to ensure purchase order delivery, as described;

Revisions DB 2604, in some embodiments for storing revisions to sales or purchase documents;

Buyer Invoice DB 3300, in some embodiments for storing buyer invoices;

Seller Invoice DB 3400, in some embodiments for storing seller invoices;

Requisition DB 2700, in some embodiments for storing purchase requisitions;

Receipt DB 2800, in some embodiments for storing receipts;

Sales Order DB 2900, in some embodiments for storing sales orders;

Workflow DB 3000, in some embodiments for storing workflow data relating to sales, purchases and transactions, etc.; and Contracts DB 3200, in some embodiments for storing contracts.

In an embodiment, Purchase Order (PO) DB 2500 includes one or more of:

Config Section Title Help 2502, in some embodiments help information for configuring a section title;

PO Config Group Title Help 2504, in some embodiments help information for configuring a purchase order group title;

PO Config Element Validation 2506, in some embodiments validation information for configuring a purchase order element;

PO Audit Trail 2508, in some embodiments a purchase order audit trail;

PO WF Activity History 2510, in some embodiments a purchase order workflow activity history;

PO Config Group 2512, in some embodiments configuration of a purchase order group;

PO Config Section 2514, in some embodiments configuration of a purchase order section;

PO Config Element 2516, in some embodiments configuration of a purchase order element;

PO Config Version 2518, in some embodiments configuration of a purchase order version;

PO Config 2520, in some embodiments configuration of a purchase order;

PO Summary 2522, in some embodiments a purchase order summary;

PO Dist Method Data 2524, in some embodiments data for a purchase order distribution method;

PO Dist Method 2526, in some embodiments a purchase order distribution method;

PO 2528, in some embodiments a purchase order;

PO Currency Exchange Rates 2530;

Supplier 2532;

Fulfillment Center 2534;

PO User Selected Approver 2536, in some embodiments a user-selected approver for a purchase order;

PO Pending Actions 2538, in some embodiments pending actions relating to a purchase order;

PO PO Clauses 2540, in some embodiments clauses relating to a purchase order;

PO Line Search 2542, in some embodiments line search details relating to a purchase order;

PO Line 2544, in some embodiments a line of a purchase order;

Req Line Address 2546, in some embodiments an address line relating to a purchase requisition;

PO Line Product 2548, in some embodiments a product line relating to a purchase order;

PO Credit Card 2550, in some embodiments a credit card associated with a purchase order;

PO Line Report 2552, in some embodiments a report line relating to a purchase order;

PO CF Value Set Values 2556, in some embodiments to set the value of a custom field value in a purchase order;

PO CF Value Set Ctxt 2558, in some embodiments to set the context of a custom field value in a purchase order;

PO CF Value Set Def 2560, in some embodiments to set the definition of a custom field value in a purchase order; and PO User Selected Approver 2562, in some embodiments a user-selected approver of the purchase order.

Figure 26:
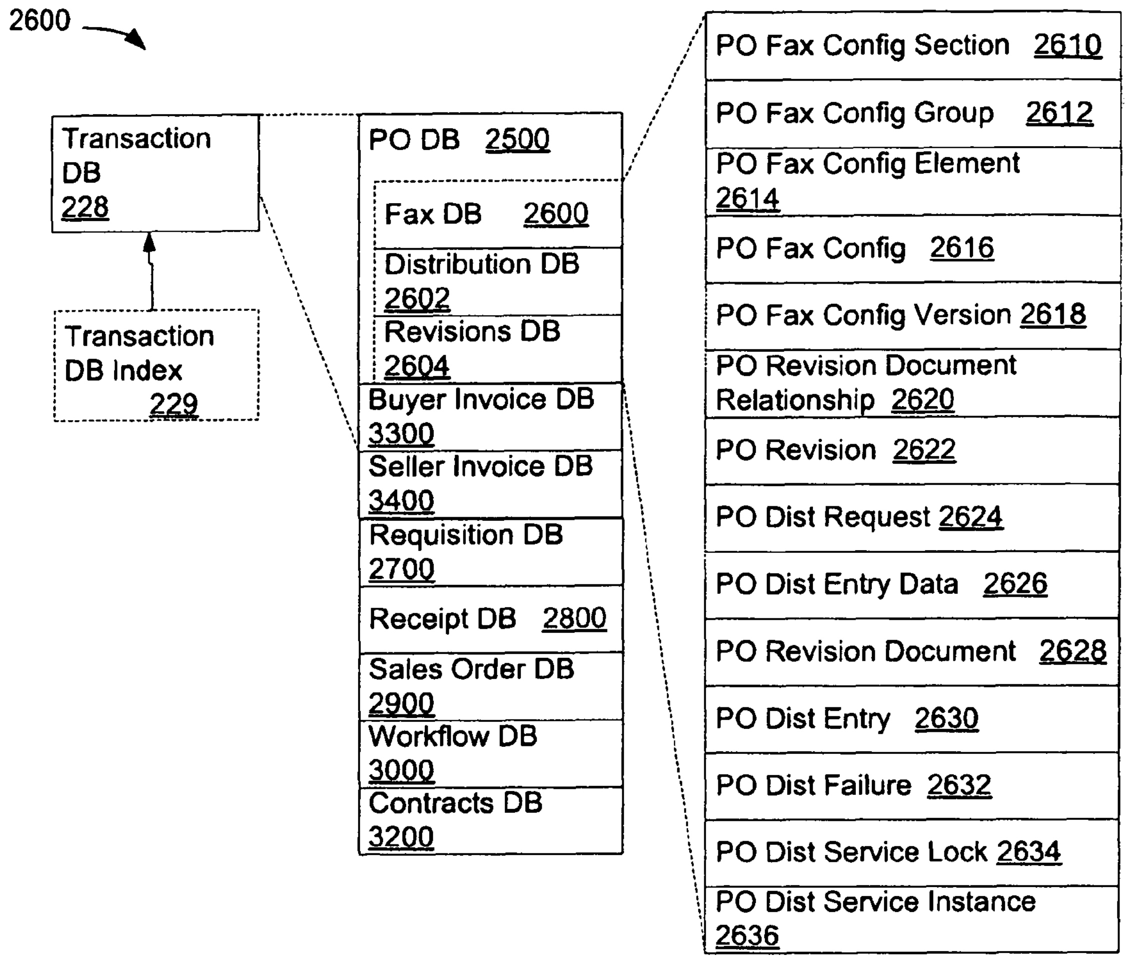
FIG. 26 illustrates a data structure for a transaction database, showing contents of a fax, distribution and revisions databases.

FIG. 26 shows a database diagram 2600 including the transaction database 228, with transaction database index 229 indexing into the transaction database. The fax database 2600, distribution database 2602 and revisions database 2604 are associated with the transactions database 228.

In an embodiment, the fax database 2600, distribution database 2602 and revisions database 2604 include one or more of:

PO Fax Config Section 2610, in some embodiments configuration of a purchase order fax section;

PO Fax Config Group 2612, in some embodiments configuration of a purchase order fax group;

PO Fax Config Element 2614, in some embodiments configuration of a purchase order fax element;

PO Fax Config 2616, in some embodiments configuration of a purchase order fax;

PO Fax Config Version 2618, in some embodiments configuration version of a purchase order fax;

PO Revision Document Relationship 2620, in some embodiments a document relationship of a purchase order revision PO Revision 2622, in some embodiments a purchase order revision;

PO Dist Request 2624, in some embodiments a purchase order distribution request;

PO Dist Entry Data 2626, in some embodiments purchase order entry data;

PO Revision Document 2628, in some embodiments a purchase order document revision;

PO Dist Entry 2630, in some embodiments entry of a purchase order distribution;

PO Dist Failure 2632, in some embodiments failure of a purchase order distribution;

PO Dist Service Lock 2634, in some embodiments locking of a purchase order distribution service; and PO Dist Service Instance 2636, in some embodiments an instance of a purchase order distribution service.

Figure 27:
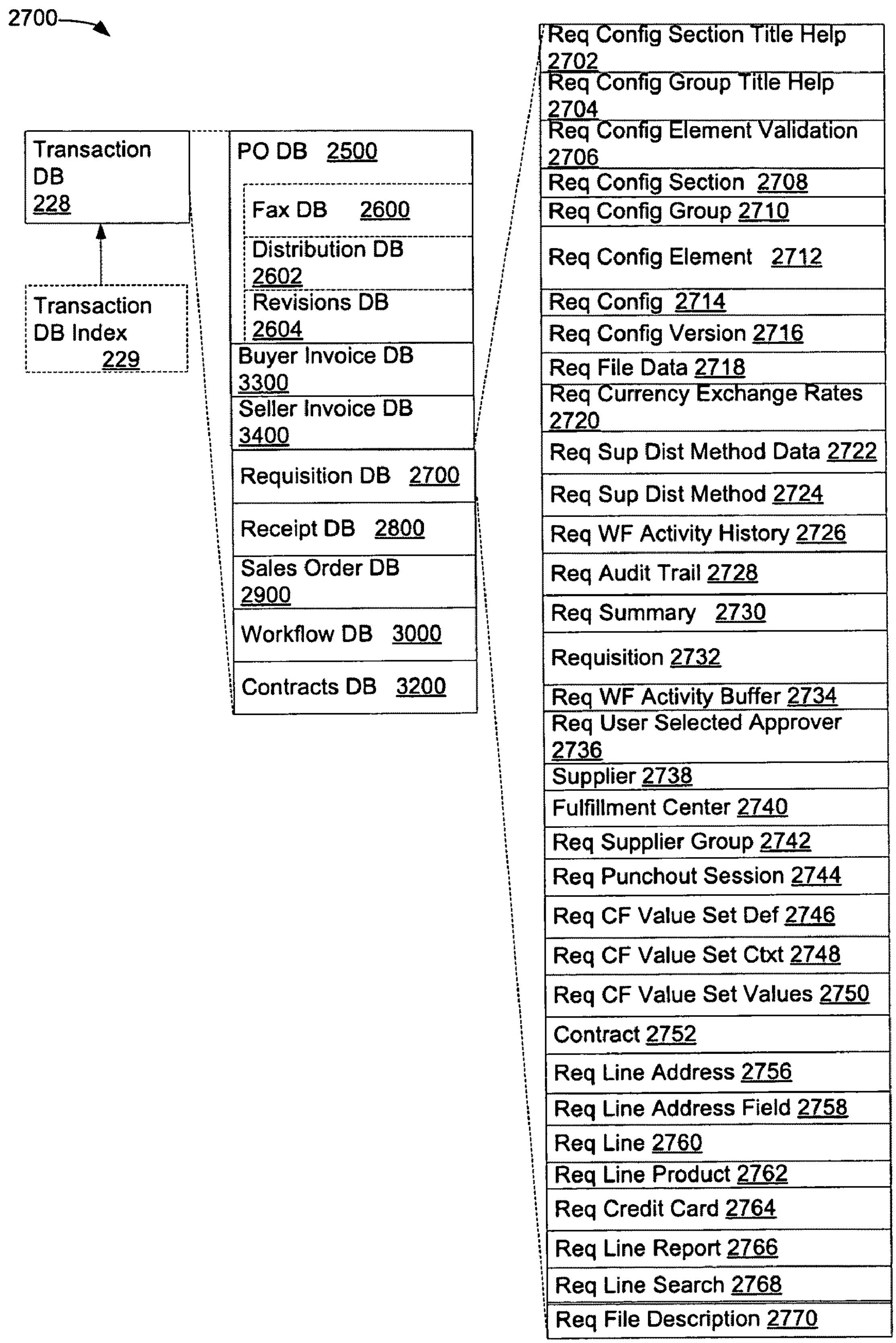
FIG. 27 illustrates a data structure for a transaction database, showing contents of a requisition database.

FIG. 27 shows a database diagram 2700 including the transaction database 228, and requisition database 2700 associated with the transaction database.

In an embodiment, requisition database 2700 includes one or more of:

Req Config Section Title Help 2702, in some embodiments help information for configuring a purchase requisition section title;

Req Config Group Title Help 2704, in some embodiments help information for configuring a purchase requisition group title;

Req Config Element Validation 2706, in some embodiments help information for configuring a purchase requisition element validation;

- Req Config Section 2708, in some embodiments configuration of a purchase requisition section;
- Req Config Group 2710, in some embodiments configuration of a purchase requisition group;
- Req Config Element 2712, in some embodiments configuration of a purchase requisition section element;
- Req Config 2714, in some embodiments configuration of a purchase requisition;
- Req Config Version 2716, in some embodiments configuration of a purchase requisition version;
- Req File Data 2718, in some embodiments purchase requisition file data;
- Req Currency Exchange Rates 2720, in some embodiments purchase requisition currency exchange rates;
- Req Sup Dist Method Data 2722, in some embodiments data for a purchase requisition distribution method;
- Req Sup Dist Method 2724, in some embodiments a purchase requisition distribution method;
- Req WF Activity History 2726, in some embodiments purchase requisition workflow activity history;
- Req Audit Trail 2728, in some embodiments changes to a purchase requisition for auditing purposes;
- Req Summary 2730, in some embodiments a summary of a purchase requisition;
- Requisition 2732;
- Req WF Activity Buffer 2734, in some embodiments a purchase requisition workflow activity buffer;
- Req User Selected Approver 2736, in some embodiments a purchase requisition user-selected approver;
- Supplier 2738;
- Fulfillment Center 2740, in some embodiments a fulfillment center for a purchase requisition;
- Req Supplier Group 2742, in some embodiments a supplier group for a purchase requisition;
- Req Punchout Session 2744, in some embodiments a punchout session for a purchase requisition;
- Req CF Value Set Def 2746, in some embodiments for setting a definition of a purchase requisition custom field value;
- Req CF Value Set Ctxt 2748, in some embodiments for setting a context of a purchase requisition custom field value;
- Req CF Value Set Values 2750, in some embodiments for setting a value of a purchase requisition custom field value;
- Contract 2752;
- Req Line Address 2756, in some embodiments an address line for a purchase requisition;
- Req Line Address Field 2758, in some embodiments an address field line for a purchase requisition;
- Req Line 2760, in some embodiments a line for a purchase requisition;
- Req Line Product 2762, in some embodiments a product line for a purchase requisition;
- Req Credit Card 2764, in some embodiments a credit card for a purchase requisition;
- Req Line Report 2766, in some embodiments a report line for a purchase requisition;
- Req Line Search 2768; in some embodiments a search line for a purchase requisition; and
- Req File Description 2770, in some embodiments a file description for a purchase requisition.

Figure 28:
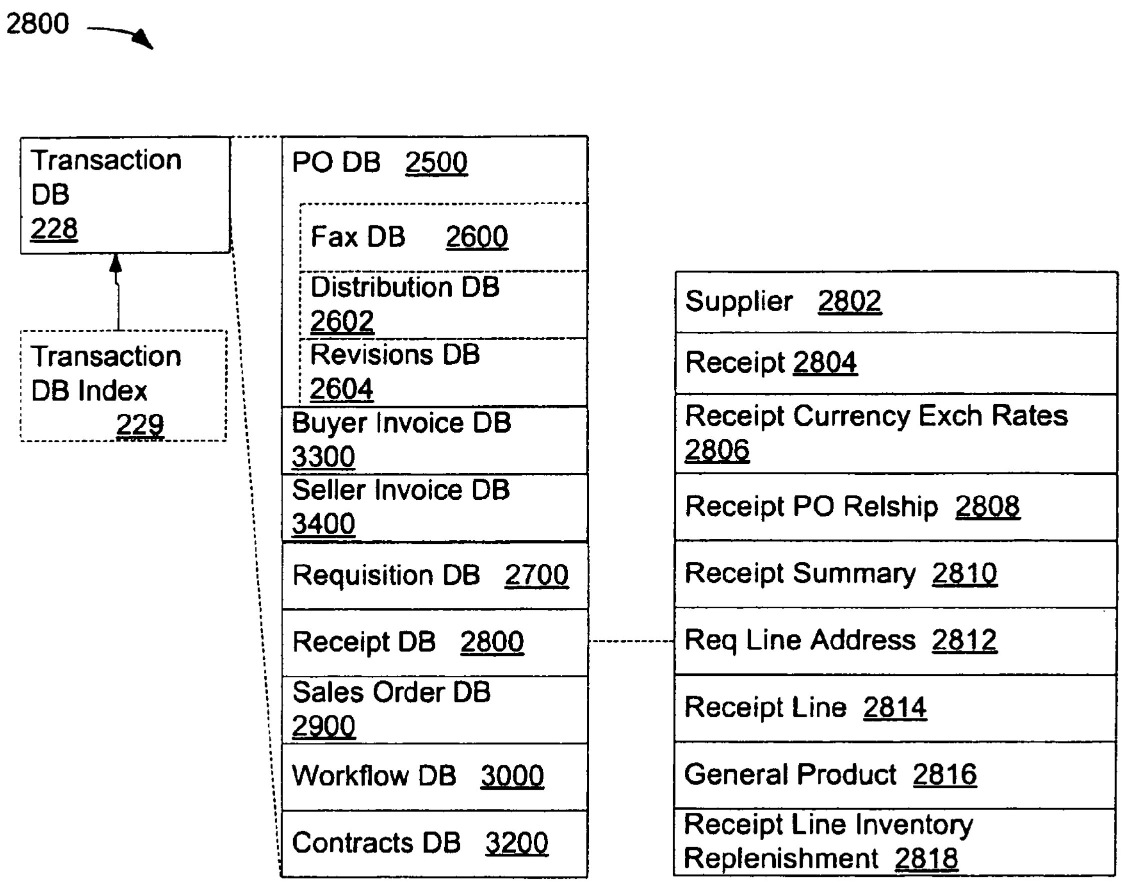
FIG. 28 illustrates a data structure for a transaction database, showing contents of a receipt database.

FIG. 28 shows a database diagram 2800 including the transaction database 228, and receipt database 2800 associated with the transaction database.

In an embodiment, receipt database 2800 includes one or more of:

- Supplier 2802, in some embodiments a supplier for a receipt;
- Receipt 2804;
- Receipt Currency Exch Rates 2806, in some embodiments currency exchange rates associated with a receipt;
- Receipt PO Relship 2808, in some embodiments a relationship between a purchase order and a receipt;
- Receipt Summary 2810, in some embodiments a summary of a receipt;
- Req Line Address 2812, in some embodiments an address line for a purchase requisition;
- Receipt Line 2814;
- General Product 2816; and
- Receipt Line Inventory Replenishment 2818, in some embodiments an inventory replenishment line for a receipt.

Figure 29:
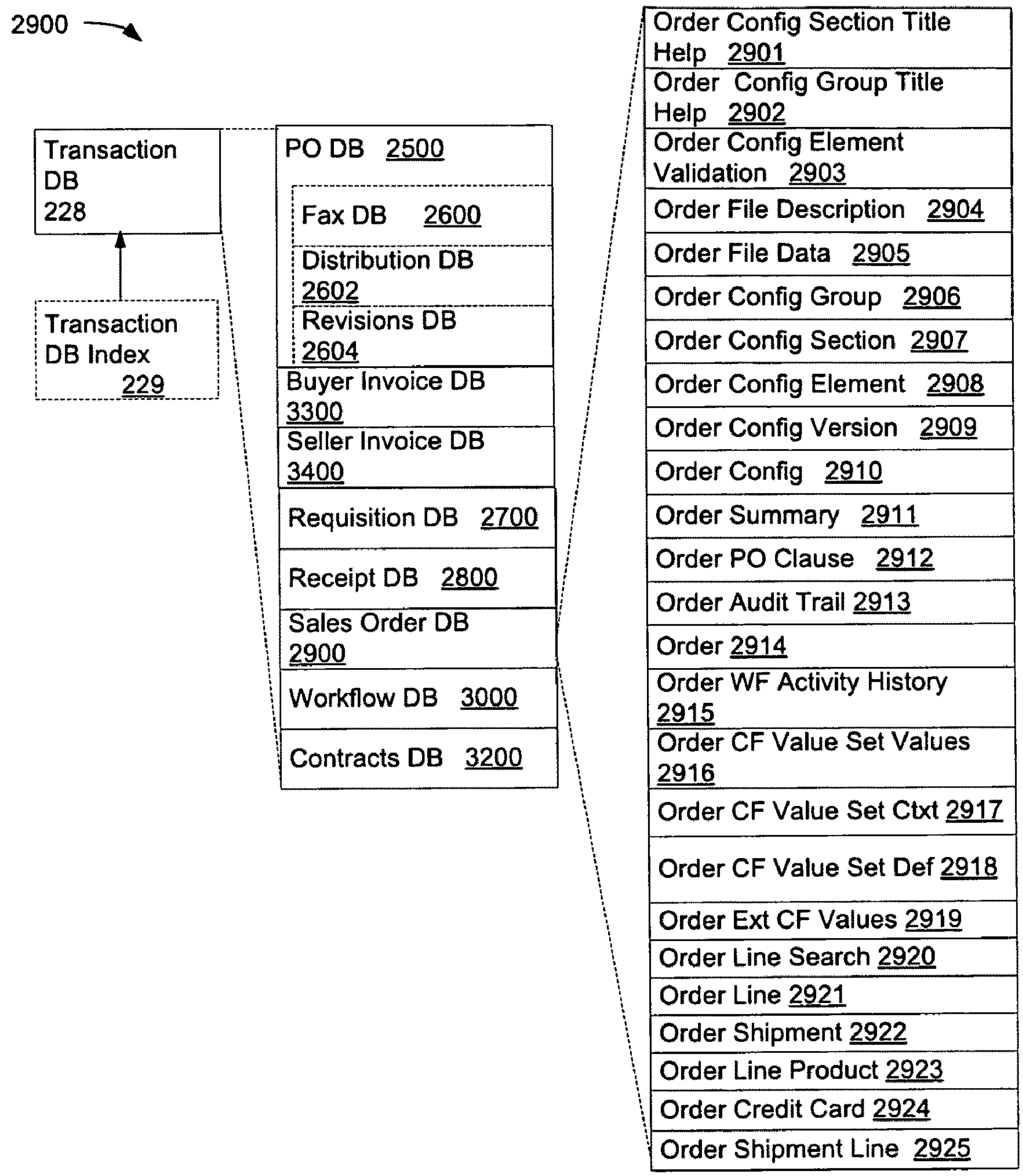
FIG. 29 illustrates a data structure for a transaction database, showing contents of a sales order database.

FIG. 29 shows a database diagram 2900 including the transaction database 228, and sales order database 2900 associated with the transaction database.

In some embodiments, the transaction database 228 and sales order database 2900 are accessed by transaction processing servers 223 and middleware/web methods servers 224.

In an embodiment, sales order database 2900 includes one or more of:

- Order Config Section Title Help 2901, in some embodiments help information for configuring a sales order section title;
- Order Config Group Title Help 2902, in some embodiments help information for configuring a sales order group title;
- Order Config Element Validation 2903, in some embodiments validation for configuring a sales order element;
- Order File Description 2904;
- Order File Data 2905;
- Order Config Group 2906, in some embodiments configuration of a sales order group;
- Order Config Section 2907, in some embodiments configuration of a sales order section;
- Order Config Element 2908, in some embodiments configuration of a sales order element;
- Order Config Version 2909, in some embodiments configuration of a sales order version;
- Order Config 2910;
- Order Summary 2911;
- Order PO Clause 2912, in some embodiments a purchase order clause;
- Order Audit Trail 2913, in some embodiments changes for auditing a sales order;
- Order 2914;
- Order WF Activity History 2915, in some workflow activity history for a sales order;
- Order CF Value Set Values 2916, in some embodiments values for a sales order custom field;
- Order CF Value Set Ctxt 2917, in some embodiments context for a sales order custom field;
- Order CF Value Set Def 2918, in some embodiments definition for a sales order custom field;
- Order Ext CF Values 2919;
- Order Line Search 2920, in some embodiments a search line for a sales order;
- Order Line 2921;
- Order Shipment 2922, in some embodiments a shipment for a sales order;
- Order Line Product 2923, in some embodiments a product for a sales order;

Order Credit Card 2924, in some embodiments a credit card for a sales order; and Order Shipment Line 2925, in some embodiments a shipment line for a sales order.

Figure 30:
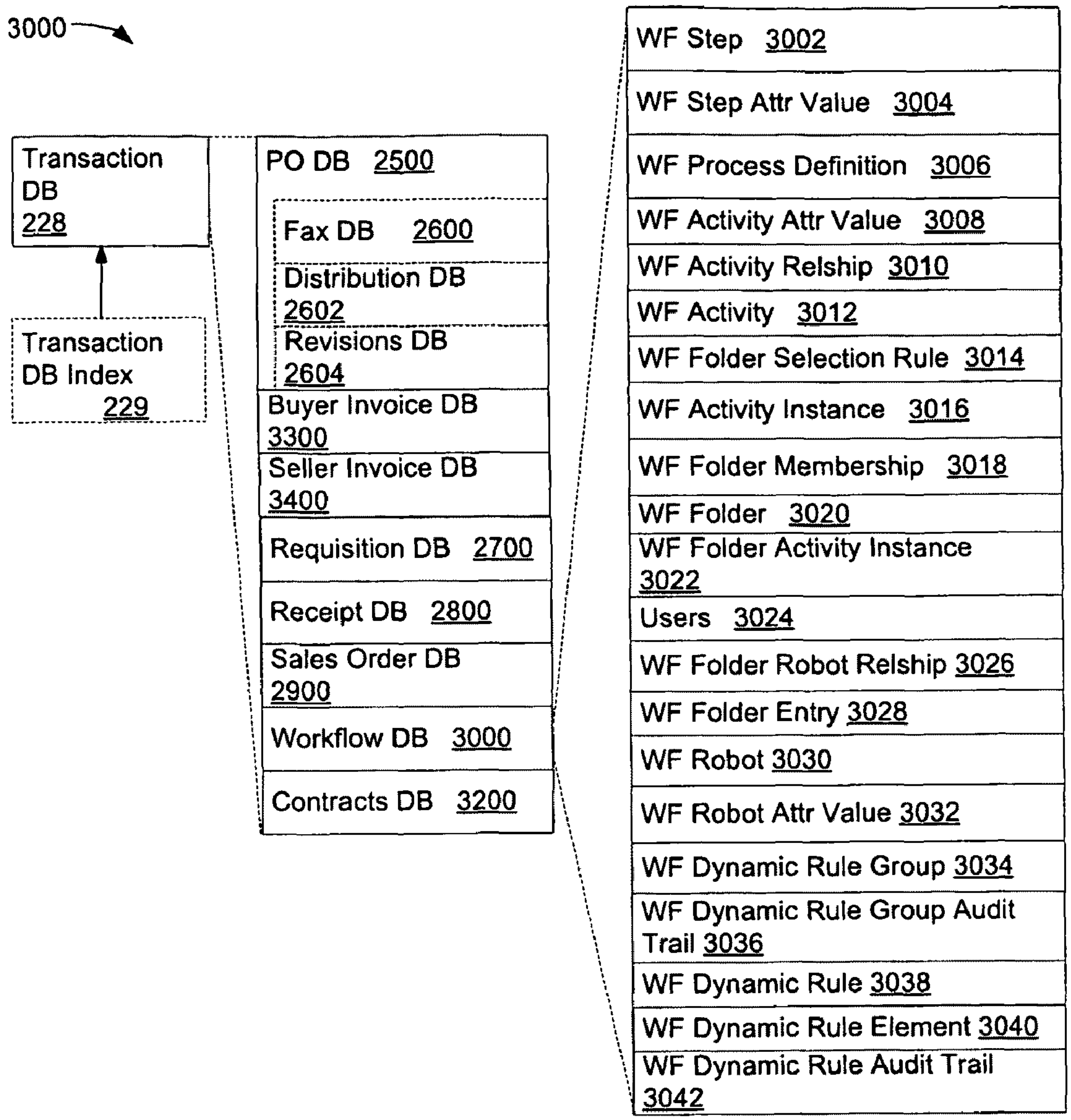
FIG. 30 illustrates a data structure for a transaction database, showing contents of a workflow database.

FIG. 30 shows a database diagram 3000 including the transaction database 228, and workflow database 3000 associated with the transaction database. In some embodiments, the transaction database 228 and workflow database 3000 are accessed by transaction processing servers 223 and middleware/web methods servers 224.

As described, supplier users can access the catalog via the middleware/web methods servers 224, which then forward the supplier access request to the custom database servers 222 and processing modules for execution, in order, for example, to update their own supplier data. End users may be able to search multiple suppliers within the catalog via the end user interface 212, subject to access rules set by the super user. End users may search the catalog for specific end user product requirements via the middleware/web methods servers 224, which forward the end user search request to custom database servers 222 and processing modules for execution. Subsequently, the end user may then invoke requisition and purchase orders via the middleware/web methods servers 224, which forward the end user order to the transaction processing servers 223 for execution.

In an embodiment, workflow database 3000 includes one or more of:

Workflow Step 3002;

Workflow Step Attr Value 3004, in some embodiments an attribute value for a workflow step;

Workflow Process Definition 3006;

Workflow Activity Attr Value 3008, in some embodiments an attribute value for a workflow activity;

Workflow Activity Relship 3010, in some embodiments an relationship for a workflow activity;

Workflow Activity 3012;

Workflow Folder Selection Rule 3014, in some embodiments a selection rule for a workflow folder;

Workflow Activity Instance 3016, in some embodiments an instance of workflow activity;

Workflow Folder Membership 3018, in some embodiments membership of a workflow folder;

Workflow Folder 3020;

Workflow Folder Activity Instance 3022, in some embodiments an activity instance for a workflow folder;

Users 3024;

Workflow Folder Robot Relship 3026;

Workflow Folder Entry 3028;

Workflow Robot 3030;

Workflow Robot Attr Value 3032;

Workflow Dynamic Rule Group 3034, in some embodiments an dynamic rule group associated with the workflow;

Workflow Dynamic Rule Group Audit Trail 3036, in some embodiments an audit trail for a dynamic rule group associated with the workflow;

Workflow Dynamic Rule 3038;

Workflow Dynamic Rule Element 3040, in some embodiments an element of a dynamic rule associated with the workflow; and Workflow Dynamic Rule Audit Trail 3042, in some embodiments an audit trail for a dynamic rule associated with the workflow.

Figure 31:
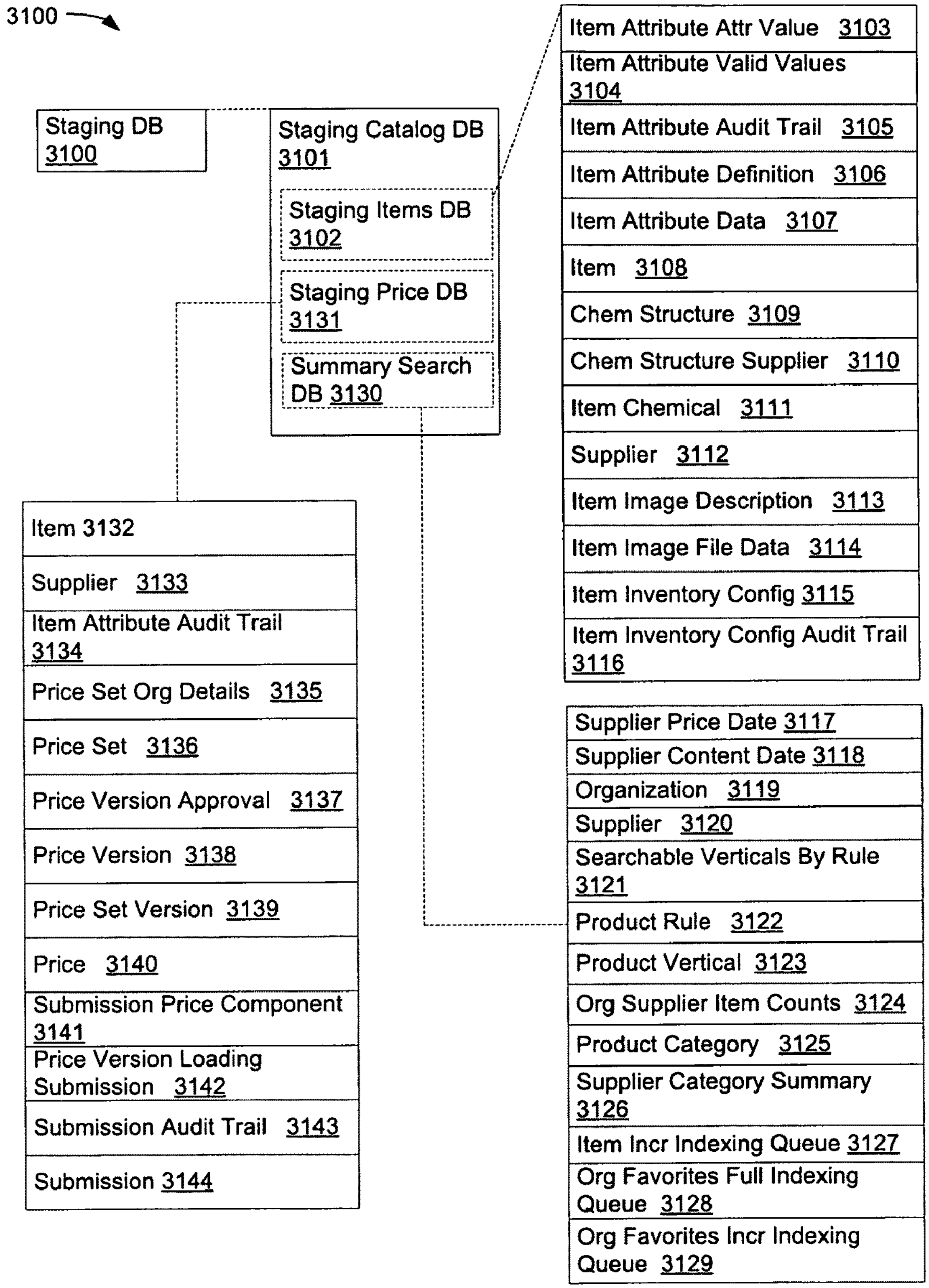
FIG. 31 illustrates a data structure for a staging database, showing contents of a staging catalog database.

FIG. 31 shows a database diagram 3100 including the staging database 3100, and staging catalog database 3101, associated with the staging database 3100.

In an embodiment, the staging catalog database 3101 includes one or more of a staging items database 3102, a staging price database 3131, and a summary search database 3130.

In an embodiment, staging items database 3102 includes one or more of:

Item Attribute Attr Value 3103, in some embodiments a value for an item attribute;

Item Attribute Valid Values 3104, in some embodiments a set of valid values for an item attribute;

Item Attribute Audit Trail 3105, in some embodiments an audit trail for an item attribute;

Item Attribute Definition 3106, in some embodiments a definition for an item attribute;

Item Attribute Data 3107, in some embodiments data for an item attribute;

Item 3108;

Chem Structure 3109, in some embodiments a description of a chemical structure that may be ordered through the procurement system;

Chem Structure Supplier 3110, in some embodiments a supplier of a chemical structure;

Item Chemical 3111 in some embodiments a commercial item of a chemical structure e.g., a container of a certain chemical structure;

Supplier 3112;

Item Image Description 3113, in some embodiments a description of an image or picture associated with an item;

Item Image File Data 3114, in some embodiments an image data file (e.g., a JPEG image or GIF image, as commonly used in web applications);

Item Inventory Config 3115, in some embodiments data for configuring inventory of an item; and Item Inventory Config Audi Trail 3116, in some embodiments a list of changes to data or an audit trail for configuring inventory of an item.

In an embodiment, staging price database 3131 includes one or more of:

Items 3132;

Supplier 3133;

Item Attribute Audit Trail 3134, in some embodiments a list of changes to data or an audit trail for an item attribute;

Price Set Org Details 3135, in some embodiments details of a price setting organization;

Price Set 3136, in some embodiments a set price;

Price Version Approval 3137, in some embodiments approval for a price version;

Price Version 3138;

Price Set Version 3139;

Price 3140;

Submission Price Component 3141;

Price Version Loading Submission 3142;

Submission Audit Trail 3143, in some embodiments a list of changes to data or an audit trail for a submission; and Submission 3144.

In an embodiment, summary search database 3130 includes one or more of:

Supplier Price Date 3117, in some embodiments a data associated with a supplier price;

Supplier Content Date 3118;

Organization 3119;

Supplier 3120;

Searchable Verticals by Rule 3121, in some embodiments supporting rule-based searching;

Product Rule 3122, in some embodiments a rule related to a product;

Product Vertical 3123, in some embodiments supporting product-based searching;

Org Supplier Item Counts 3124, in some embodiments a count of items stored at an organization supplier;

Product Category 3125, in some embodiments a category related to a product;

Supplier Category Summary 3126, in some embodiments a summary of a supplier category;

Item Incr Indexing Queue 3127, in some embodiments a queue for incrementally indexing items;

Org Favorites Full Indexing Queue 3128, in some embodiments a full-indexing queue for organizational favorites; and Org Favorites Incr Indexing Queue 3129, in some embodiments an incremental-indexing queue for organizational favorites.

Figure 32:
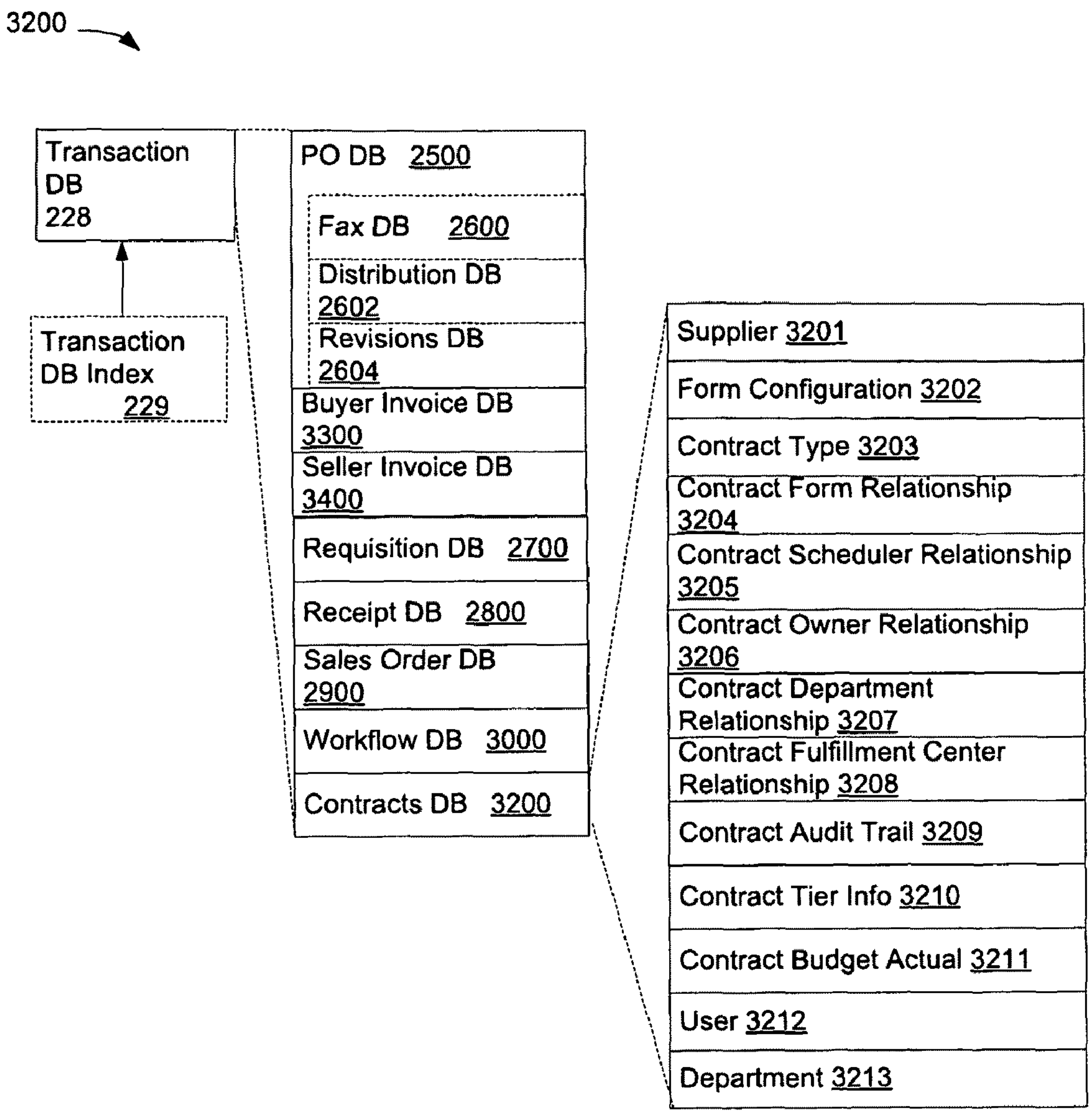
FIG. 32 illustrates a data structure for a transaction database, showing contents of a contracts database.

FIG. 32 shows a database diagram 3200 including the transaction database 228, PO database 2500, buyer invoice database 3300, seller invoice database 3400, requisition database 2700, receipt database 2800, sales order database 2900, workflow database 3000, and contracts database 3200, associated with the transaction database 228.

In an embodiment, the contracts database 3200 includes one or more of:

Supplier 3201;

Form Configuration 3202;

Contract Type 3203;

Contract Form Relationship 3204, in some embodiments an relationship between a contract and a form;

Contract Scheduler Relationship 3205, in some embodiments an relationship between a contract and a scheduler;

Contract Owner Relationship 3206, in some embodiments an relationship between a contract and an owner;

Contract Department Relationship 3207, in some embodiments an relationship between a contract and a department;

Contract Fulfillment Center Relationship 3208, in some embodiments an relationship between a contract and a fulfillment center;

Contract Audi Trail 3209, in some embodiments a list of changes to data or an audit trail for a contract;

Contract Tier Info 3210, in some embodiments tier information for a contract;

Contract Budget Actual 3211, in some embodiments an actual budget for a contract;

User 3212; and

Department 3213.

Figure 33:
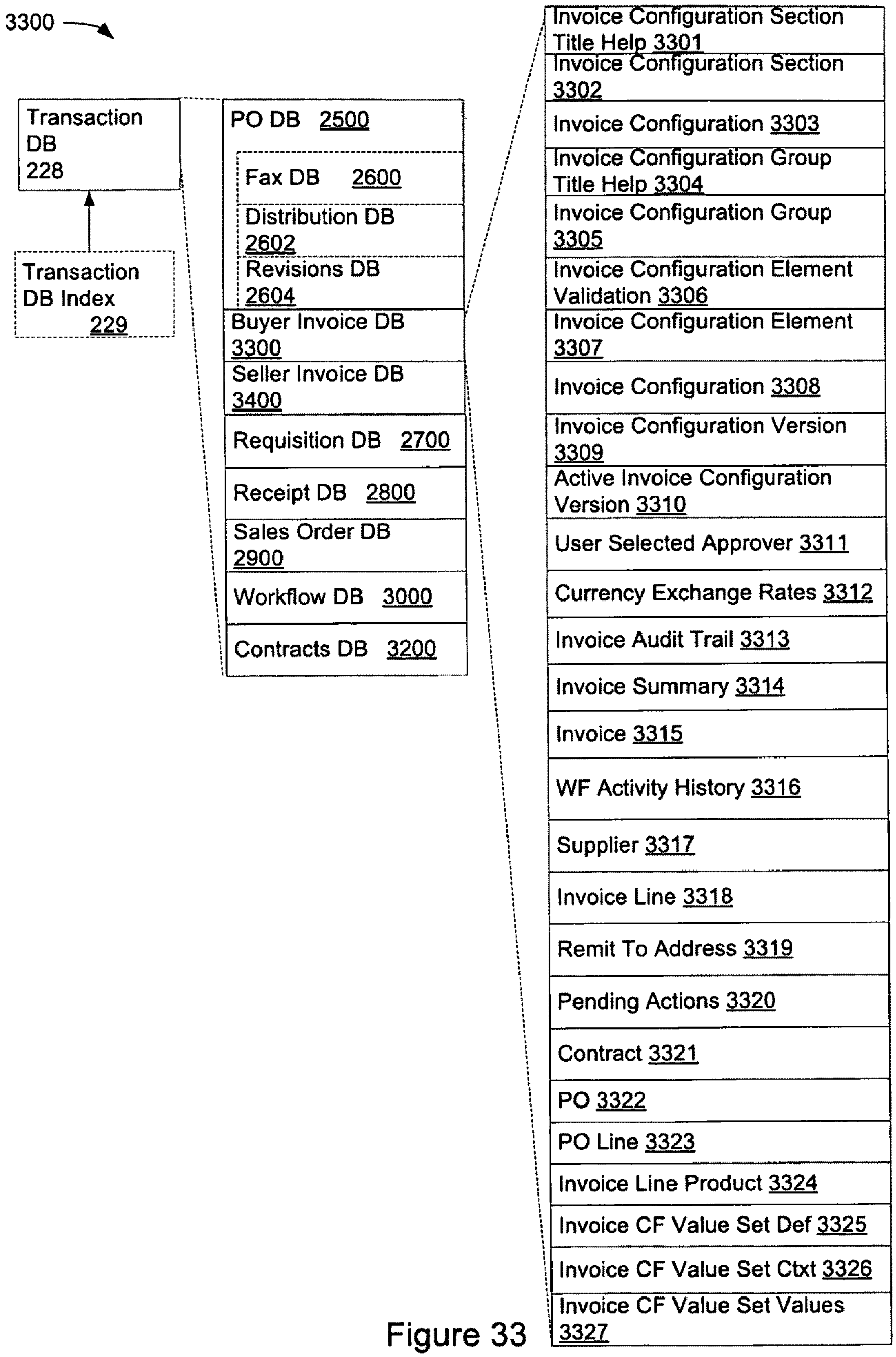
FIG. 33 illustrates a data structure for a transaction database, showing contents of a buyer invoice database.

FIG. 33 shows a database diagram 3300 including the transaction database 228, PO database 2500, buyer invoice database 3300, seller invoice database 3400, requisition database 2700, receipt database 2800, sales order database 2900, workflow database 3000, and contracts database 3200, associated with the transaction database 228.

In an embodiment, the buyer invoice database 3300 includes one or more of:

Invoice Configuration Section Title Help 3301, in some embodiments help information for configuring an invoice section title;

Invoice Configuration Section 3202, in some embodiments configuration of a invoice section;

Invoice Configuration 3203;

Invoice Configuration Group Title Help 3304, in some embodiments help information for configuring an invoice group title;

Invoice Configuration Group 3305, in some embodiments configuration of an invoice group;

Invoice Configuration Element Validation 3306;

Invoice Configuration Element 3307, in some embodiments configuration of an invoice element;

Invoice Configuration 3308;

Invoice Configuration Version 3309;

Active Invoice Configuration Version 3310;

User Selected Approver 3311;

Currency Exchange Rates 3312;

Invoice Audit Trail 3313, in some embodiments a list of changes (audit trail) to an item attribute for auditing purposes;

Invoice Summary 3314;

Invoice 3315;

Workflow Activity History 3316;

Supplier 3317;

Invoice Line 3318;

Remit to Address 3319;

Pending Actions 3320, in some embodiments pending actions relating to an invoice;

Contract 3321;

PO 3322, in some embodiments a purchase order;

PO Line 3323, in some embodiments a purchase order line;

Invoice Line Product 3324, some embodiments a product line relating to an invoice;

Invoice CF Value Set Def 3325, in some embodiments to set the definition of a custom field value in an invoice;

Invoice CF Value Set Ctxt 3326, in some embodiments to set the context of a custom field value in an invoice; and Invoice CF Value Set Value 3327, in some embodiments to set the value of a custom field value in an invoice.

Figure 34:
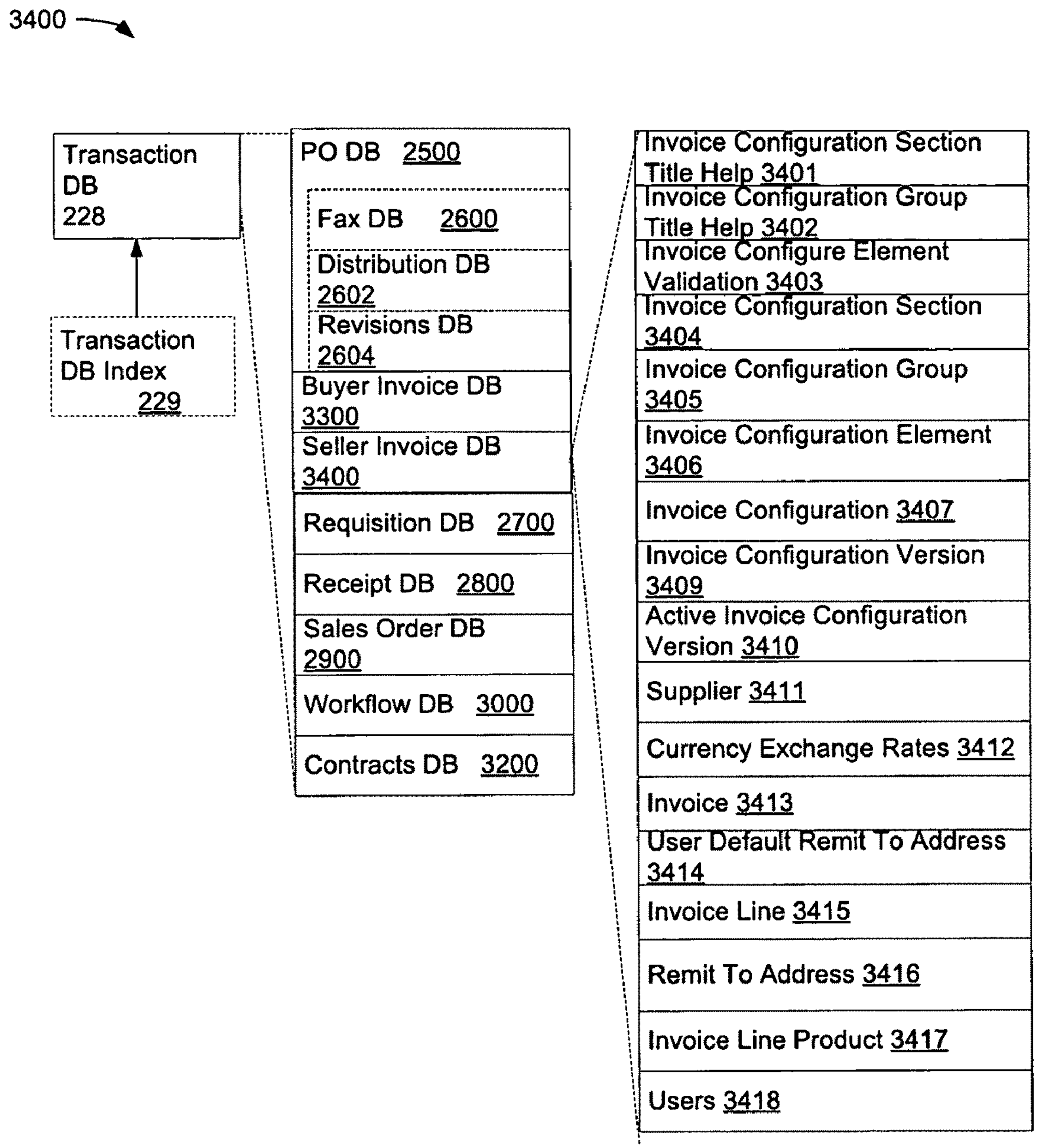
FIG. 34 illustrates a data structure for a transaction database, showing contents of a seller invoice database.

FIG. 34 shows a database diagram 3400 including the transaction database 228, PO database 2500, buyer invoice database 3300, seller invoice database 3400, requisition database 2700, receipt database 2800, sales order database 2900, workflow database 3000, and contracts database 3200, associated with the transaction database 228.

In an embodiment, the seller invoice database 3400 includes one or more of:

Invoice Configuration Section Title Help 3401, in some embodiments help information for configuring an invoice section title;

Invoice Configuration Group Title Help 3402, in some embodiments help information for configuring an invoice group title;

Invoice Configure Element Validation 3403;

Invoice Configuration Section 3404, in some embodiments configuration of an invoice section;

Invoice Configuration Group 3405, in some embodiments configuration of an invoice group;

Invoice Configuration Element 3406, in some embodiments configuration of an invoice element;

Invoice Configuration 3407, in some embodiments configuration of an invoice;

Invoice Configuration Version 3409, in some embodiments configuration version of an invoice;

Active Invoice Configuration Version 3410, in some embodiments configuration of an active invoice;

Supplier 3411;

Currency Exchange Rates 3412, in some embodiments currency exchange rates associated with an invoice;

Invoice 3413;

User Default Remit To Address 3414, in some embodiments a default remit-to address for a user associated with an invoice;

Invoice Line 3415;

Remit To Address 3416, in some embodiments a remit-to address associated with an invoice;
Invoice Line Product 3417; and
User 3418.

Figure 35:
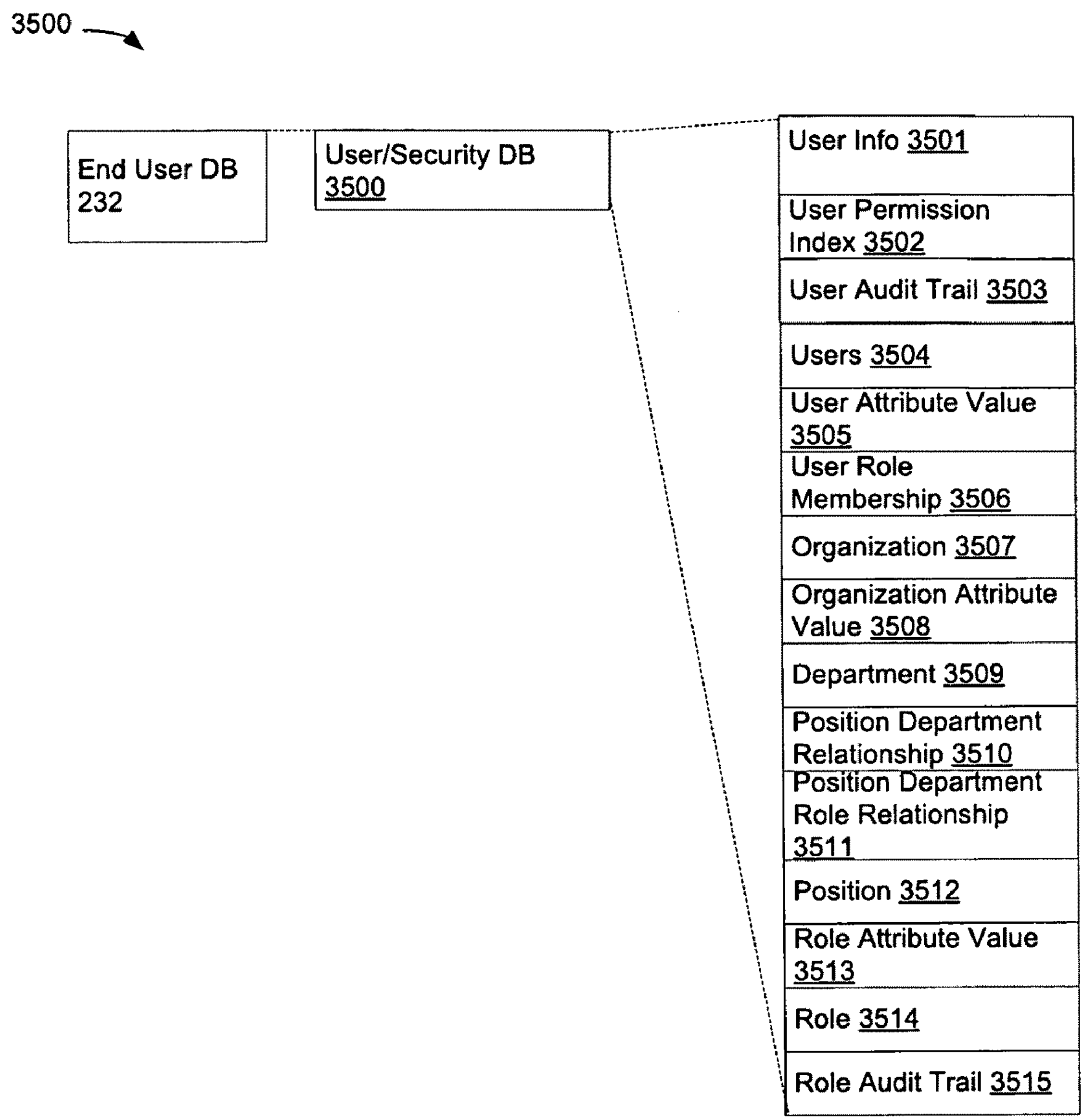
FIG. 35 illustrates a data structure for an end user database, showing contents of a user/security database.

FIG. 35 shows a database diagram 3500 including the end user database 232, associated with the user/security database 3500. In an embodiment, the user/security database 3500 includes one or more of:

User Info 3501, in some embodiments information relating to a user;
User Permission Index 3502, in some embodiments an index of permissions relating to a user;
User Audit Trail 3503, in some embodiments a list of changes (audit trail) for a user for auditing purposes;
Users 3504;
User Attribute Value 3505, in some embodiments the value of an attribute associated with a user;
User Role Membership 3506, in some embodiments membership associated with a user role;
Organization 3507;
Organization Attribute Value 3508, in some embodiments a value of an attribute associated with an organization;
Department 3509;
Position Department Relationship 3510, in some embodiments a relationship between a position and a department;
Position Department Role Relationship 3511, in some embodiments a relationship between a position and a department role;
Position 3512;
Role Attribute Value 3513, in some embodiments the value of an attribute associated with a role;
Role 3514; and
Role Audit Trail 3515, in some embodiments a list of changes (audit trail) for a role for auditing purposes.

Figure 36:
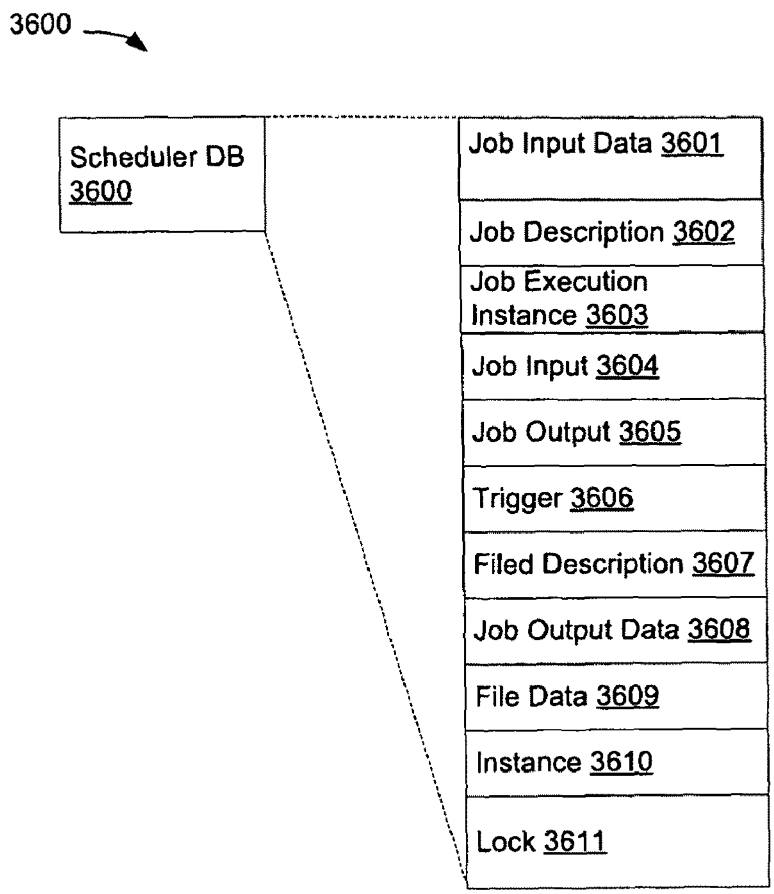
FIG. 36 illustrates a data structure for a scheduler database, showing contents of the scheduler database.

FIG. 36 shows a database diagram 3600 including the scheduler database 3600. In an embodiment, the scheduler database 3600 includes one or more of:

Job Input Data 3601, in some embodiments data relating to a job input;
Job Description 3602, in some embodiments a description relating to a job;
Job Execution Instance 3603, in some embodiments an execution instance relating to a job;
Job Input 3604;
Job Output 3605;
Trigger 3606;
Filed Description 3607;
Job Output Data 3608, in some embodiments data relating to a job output;
File Data 3609;
Instance 3610; and
Lock 3611.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 2010 and 2110 may store a subset of the modules and data structures identified above. Furthermore, memory 2010 and 2110 may store additional modules and data structures not described above.

Figure 37:
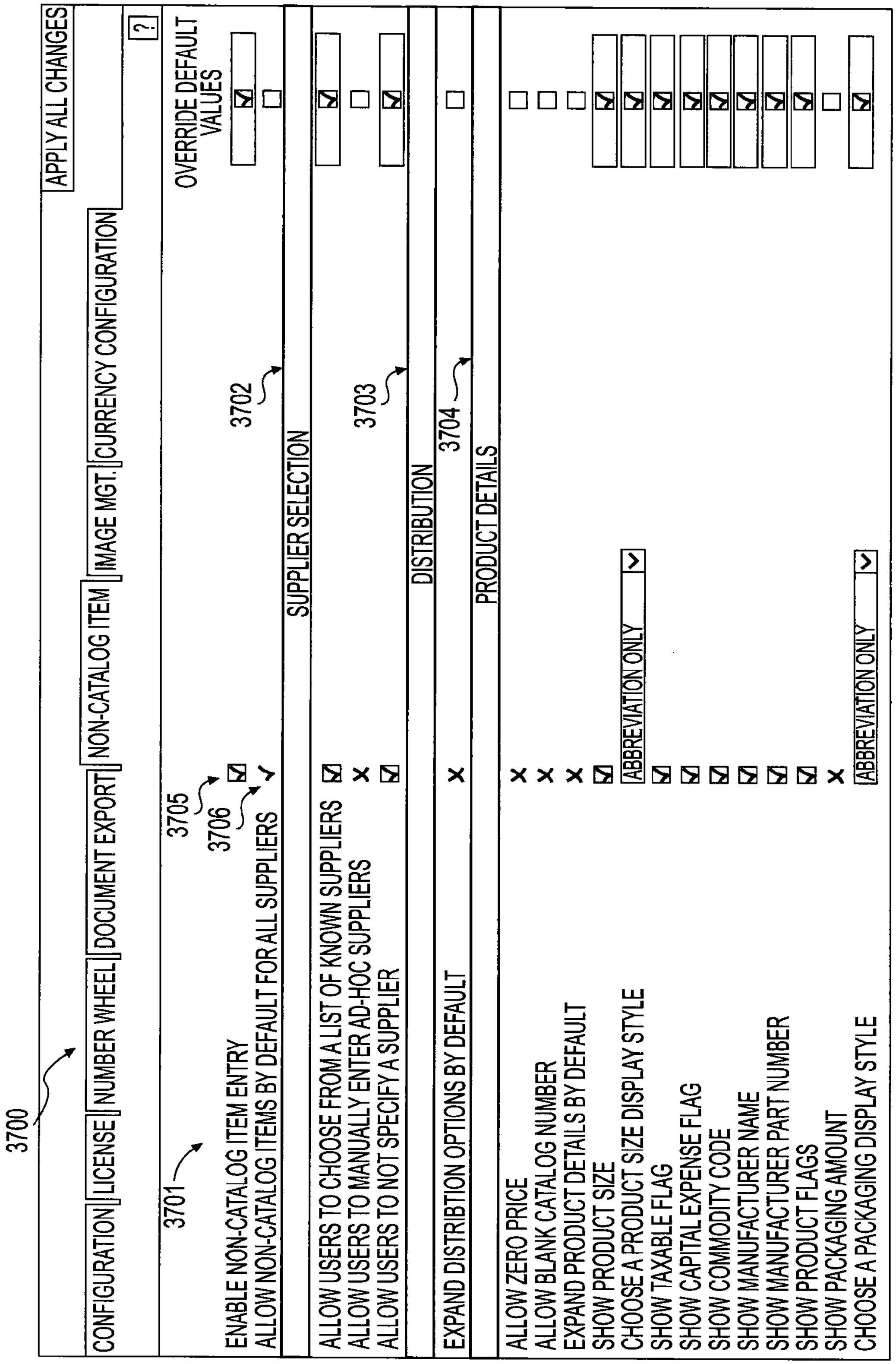
FIG. 37 illustrates an exemplary new/non-catalog item administrative setup tool in accordance with the present invention.

FIG. 37 illustrates an exemplary new/non-catalog item administrative setup tool in accordance with the present invention. The tool 3700 may be used to configure the administrative preferences or options 3701 for the new/non-catalog item feature that allows, for example, buyer users of an organization with the capability of accessing the electronic procurement system 20 (via the purchaser server application 1550 on the system side and a client application 1532 on the buyer side) to configure and add a new item (e.g., a good or service) to the master product database 236. The new item may be stored, more specifically, for example, in the items database 2401 of the catalog database 2400. The preferences or options 3701 of the tool 3700 may include, for example, supplier selection 3702, distribution 3703, or product details 3704. In addition, there may also be, for example, an option for enabling a non-catalog item entry 3705 or allowing non-catalog items by default for all suppliers 3706. The preferences or options of the supplier selection 3702 may, for example, include: allowing users to choose from a list of known suppliers to associate with a new item; allowing users to manually enter ad-hoc suppliers to associate with a new item; or allowing users to not specify a supplier. Further, the preferences or options of distribution 3703 may, for example, include permitting the expansion of distribution options by default. And, the preferences or options of product details 3704 may, for example, include: allowing a zero price for a new item(s); allowing a blank catalog number for a new item; expanding the product details information by default; showing a product size for the user; choosing a style associated with the display of the product size to the user; showing a flag to permit the user to designate the item as taxable; showing a flag to permit the user to designate the item as a capital expense; showing a commodity code to permit the user to designate a commodity code for the new item; showing a manufacturer name to permit the user to designate a manufacturer name for the new item; showing a manufacturer part number to permit the user to designate a manufacturer part number for the new item; showing an item flag to permit the user to designate specific item flags (e.g., additional descriptors) for the new item; showing a packaging amount to permit the user to designate a packaging amount for the new item; or showing a packaging display style to permit the user to designate a packaging display style for the new item.

Figure 38:
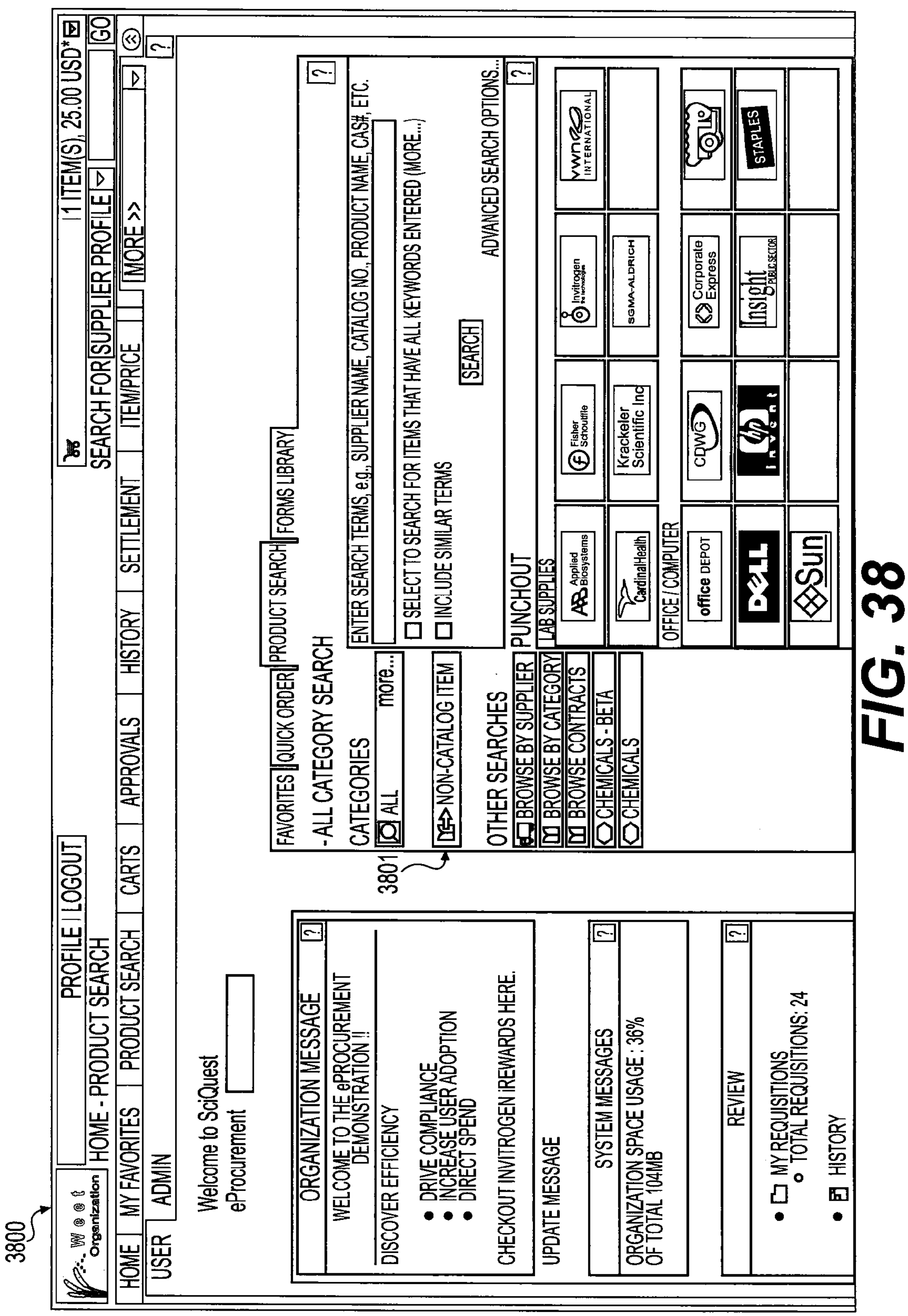
FIG. 38 illustrates an exemplary new/non-catalog item access tool in accordance with the present invention.

FIG. 38 illustrates an exemplary new/non-catalog item access tool in accordance with the present invention. The tool 3800 and its non-catalog item option 3801 may be used to access the new/non-catalog item creation tool illustrated in the exemplary embodiment of FIG. 39. In addition to the tool 3800, other tools of the system may also present an option the same or similar to non-catalog option 3801 (e.g., a user may select the non-catalog option 3801 to indicate that they want to add an item that may not be stored in a catalog of, for example, the master database 236 or, more specifically, for example, the catalog database 2400; moreover, for example, a non-catalog item may be from a small/local supplier that may not be a supplier using the features of the electronic procurement system 20).

Figure 39:
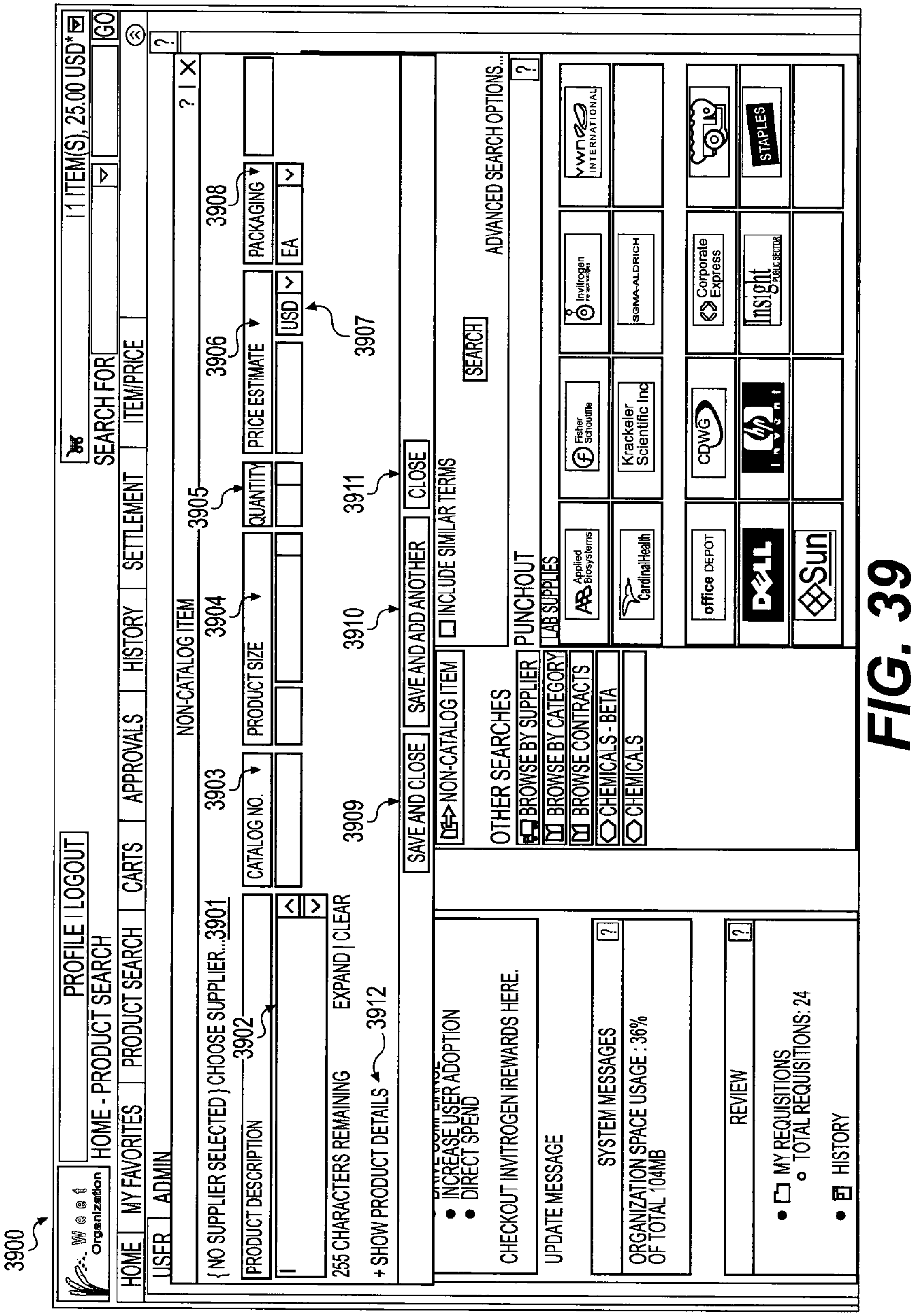
FIG. 39 illustrates an exemplary new/non-catalog item creation tool in accordance with the present invention.

FIG. 39 illustrates an exemplary new/non-catalog item creation tool in accordance with the present invention. The tool 3900, 3901 may be used by users with appropriate privileges (as may be enforced by manage privileges 1536; FIG. 15, 1536-A; FIG. 16, 1660, 1664) to describe and configure the new item that is to be added/stored to the master product database 236 and, more specifically, may be stored in, for example, the items database 2401 of the catalog database 2400; each of these databases is accessible to all users with appropriate privileges within the same organization, as well as potentially by all users with appropriate privileges within an organization different from the one to which the user who added the new item belongs (users may search for the new item via at least the search engine 22, and in accordance with business rules (e.g., based on cost, product type, or supplier; FIGS. 8A-8D)). In some embodiments, the new item may be stored in a database local to the user who added the item. Before the new item is stored in a database, a check is made to determine whether the new item is already stored in a database. If the new item is already stored in a database, then the user is notified via the tool 3900, 3901 by an appropriate message. The user may then reinitiate the process of adding the new item with a different configuration, or disregarding that new item as it already exists in a database. The tool 3901 may include, for example, a field for: describing the new item 3902, entering a catalog number to assign to the new item 3903, entering or choosing a product size 3904, entering a quantity for requisitioning/ordering 3905, entering a price estimate 3906, entering a currency type (e.g., USD, EURO, YEN, etc.) for the price estimate 3907, and entering or choosing a packaging type (e.g., EA) 3908. The user may then choose to invoke a save and close feature 3909, a save and add another feature 3910, or a close feature 3911. The action of saving (3909 or 3910) transfers the entered field data to the master product database 236 and, more specifically, for example, the items database 2401 of the catalog database 2400. The action of closing (3911) would not save the entered field data. In another exemplary embodiment, the tool 3901 may further include, for example, a field for: a brand, a delivery date or time, a reorder flag, supplier data, or shipping data. The user configuring the options for the new item may choose to view and associate product details 3912 with the new item. In addition, the user may or may not choose to associate a supplier with the new item 3903. If the user chooses to associate a supplier with the new item, the user may associate either an existing or new supplier (FIG. 17; data on existing suppliers is stored in the supplier database 1775); the user may also be presented with an alternative supplier to the one chosen by the user to associate with the new item. If the user does not associate a supplier with the new item, then a user with appropriate privileges (e.g., approver-level user, super user, or other similar user) in the organization will be tasked and queried by the system to associate a supplier with the new item during the workflow process as the new item proceeds to an approver, or before that time, in accordance with business rules. A user may create a new item and quickly add another new item for the same supplier without having to search for the same supplier again, once a supplier has been associated with a new item. Also, a user may choose to not enter a catalog number 3903 (e.g., SKU) and force a search on the master product database 236 (the search may, for example, be run on the catalog database 2400). Further, a new item that is searched for and added to a cart by a user with appropriate privileges, via the search engine 22 and cart and requisition tool 1100, respectively, is flagged as a new item for the purpose of routing the new item appropriately, via the workflow management engine 1680 (FIG. 16), during the workflow process of a purchase requisition/order to an appropriate approver and beyond in accordance with business rules. If the item is approved for purchasing and a sales order is sent to the appropriate supplier(s), then similar routing patterns are followed for a workflow related to routing the sales invoice with the new item back to the appropriate user. At that time, the user may pay the amount due on the invoice via, for example, the order/payment engine 1690 (FIG. 16) for the new item and other items that may also appear on the invoice. The appropriate supplier may then receive the payment via, for example, the receive payment engine 1780 (FIG. 17), and may then initiate the process of fulfilling the order via, for example, the sale fulfillment engine 1770 and accordingly packaging the new item(s) (based on the preferences specified in packaging 3908) and shipping the item(s) 1772.

The exemplary tools of FIGS. 37-39 may operate in the same or a similar manner and be used to allow a user to configure and add a new supplier to the supplier database 1775. Moreover, like the process described for associating a new, existing, or alternative supplier with a new item (see above), a new supplier may also be associated with either an existing or new item. If a new supplier is added, the new supplier data may then be stored accordingly in the supplier database 1775 or other appropriate database.

Further to the configure and add new item feature(s) of the present invention is a feature for creating, defining, and assigning custom item attributes to any preexisting or new items, suppliers, and/or catalogs. This feature allows multi-constituents (e.g., users) to attribute one or more catalogs by first creating a custom item attribute, then defining the custom item attribute according to one or more sub-attributes, and then assigning the defined custom item attribute to one or more items, suppliers, and/or catalogs (e.g., hosted or punch-out). This feature (described below) may be implemented via, for example, the catalog engine 1655. An advantage of this feature is that it provides users with the ability to exhibit a level of user-customization to a supplier's catalog which they otherwise would not have because supplier catalogs (which may be stored, for example, in the master database 236 or, more specifically, for example, the catalog database 2400; or, further more specifically, the items database 2401 and/or prices database 2430) may be setup and managed by supplier users; buyer users were not involved in the process of setting up and managing supplier catalogs. Once custom item attributes are created, defined, and assigned appropriately, they may be used during searching (implemented via, for example, search engine 22), for promoting specific items (via, for example, user interface 212), for passing data to other systems besides the electronic procurement system (via, for example, supplier server application 1542 or, more generally, eProcurement Provider 20 over, for example, network 16), or for driving processes/workflows on the client and/or server side systems (implemented via, for example, workflow management engine 1680 or sales management engine 1760). For example, a buyer user's organization, such as a hospital, may attribute one or more supplier catalogs with the hospital's own ERP item master ID data. The advantage of this capability is that when one or more items are purchased through the system of the present invention, the hospital's own ERP item master ID for the purchased item could be passed back to the hospital's own ERP in order to drive inventory management, patient billing, and other systems and/or process that may use this information. Another example is that of an organization with a need to highlight or promote so-called "Green" items (e.g., environmentally friendly items, which may or may not be actually green in color). A sub-attribute of a custom item attribute may be created and designated as "Green," defined appropriately (via, for example, the user interface 212 with the catalog engine 1655 and/or currency engine 1670), and associated with one or more items of one or more supplier catalogs (via, for example, the user interface 212 with the catalog engine 1655 and/or currency engine 1670). In another example, an organization may have a need to tag items according to their possible association with local, state, or federal regulatory/government bodies, which may have specific, demanding requirements for items. Again, a sub-attribute of a custom item attribute may be created and designated with a "regulatory" identifier, defined appropriately, and associated with one or more items of one or more supplier catalogs. In yet another example, an organization may want to assign a contract number to one or more items in one or more supplier catalogs. Yet again, a sub-attribute of a custom item attribute may be created and designated with a "contract number," defined appropriately, and associated with one or more items of one or more supplier catalogs. In yet another example, an organization may want to promote one or more items in one or more supplier catalogs. Yet again, a sub-attribute of a custom item attribute may be created and designated with a "promotional item" identifier or other identifier, defined appropriately, and associated with one or more items of one or more supplier catalogs. One of ordinary skill in the art would interpret these examples as merely exemplary and other examples for the use of this feature may be implemented without departing from the scope of the present invention.

Supplier users may or may not, according to business rules (implemented via, for example, the business rules engine 24), have access to the multi-constituents' custom item attributes. Moreover, users from organizations different from the organization with which the user creating the custom item attribute is associated, may or may not, according to business rules (implemented via, for example, the business rules engine 24), have access to the multi-constituents' custom item attributes. For example, a subsidiary of a parent corporation, both of which have users associated with the system of the present invention, may choose to configure business rules that permit certain or all of their users to cross-access each other's custom item attributes. But, for example, competitor organizations, both of which have users associated with the system of the present invention may, according to business rules, choose to not implement such sharing of custom item attributes.

Creating a custom item attribute may be executed directly, step-by-step through a user interface 212 and/or through electronic integration (e.g., pre-creating and configuring an appropriately formatted file like a CSV, XML, TEXT, or other compatible file format) via a user interface 212 (or in both instances, more specifically, for example, via web browser 1538, 2118 and/or auxiliary services module 2090, 2184).

Defining the custom item attribute is the next step that may be taken after creating the custom item attribute. Like the creation of a custom item attribute, defining the custom item attribute may be executed directly, step-by-step through a user interface 212 and/or through electronic integration (e.g., pre-creating and configuring an appropriately formatted file like a CSV, XML, TEXT, or other compatible file format) via a user interface 212 (or in both instances, more specifically, for example, via web browser 1538, 2118 and/or auxiliary services module 2090, 2184). The custom item attribute may be defined through one or more sub-attributes like, for example, green item, hazardous item, high priority item, ERP item master identifier, item regulatory identifier, contract number identifier, promotional item identifier, or other identifier (stored in, for example, the master database 236 or, more specifically, for example, the catalog database 2400). If the custom item attribute is defined step-by-step through a user interface 212, the sub-attributes may be chosen via, for example, the following graphical user interface components: Boolean, text, single-select predefined, or multi-select predefined. Other user interface components known to one of ordinary skill in the art may also be used without departing from the scope of the present invention. Any of these graphical user interface components may contain pre-defined values for defining the custom item attribute, or may prompt the user to enter the appropriate value(s).

Assigning the custom item attribute is the next step that may be taken after defining the custom item attribute. An auto synchronization tool is available (implemented via, for example, the catalog engine 1655 and/or catalog module 2020, 2120), according to the present invention, for simplifying the initial/subsequent implementation of what could amount to be tens, hundreds, or thousands of custom item attributes. Through the auto synchronization tool a user may submit the ERP data, of the organization with which the user is associated, via one or more electronic files for subsequent processing (implemented via, for example, web browser 1538, 2118 and/or auxiliary services module 2090, 2184). Then, the auto synchronization tool receives the submitted data, performs a so-called data cleansing/sanity process whereby the submitted data is compared to one or more supplier catalogs (which, for example, may be designated by default, according to business rules, or dynamically by the user). During the data comparison process, for every single exact match between the submitted data and the item(s) of one or more supplier catalogs, the tool automatically attributes each respective item(s) of the one or more supplier catalogs with the corresponding custom item attribute from the submitted data. If multiple matches occur, the user is notified and offered several options. The user may, for example, (1) choose to select one or more matching items from one or more supplier catalogs, (2) decline to choose any items, or (3) manually perform the matching operation for that respective custom item attribute and one or more items in one or more supplier catalogs. Moreover, if no matches occur, the user is notified and is again offered several options. The user may, for example, (1) decline to choose any items, or (2) manually perform the matching operation for that respective custom item attribute and one or more items in one or more supplier catalogs. Not all supplier catalogs may be attributable, but some may be, in accordance with business rules, set to not permit their attribution.

Furthermore, an indirect attribution feature for custom item attributes is also available for non-hosted catalogs (e.g., punch-out catalogs) as well as for new/non-catalog item. The indirect attribution feature utilizes a mapping table that is created directly, step-by-step through a user interface 212 and/or through electronic integration (e.g., pre-creating and configuring an appropriately formatted file like a CSV, XML, TEXT, or other compatible file format) via a user interface 212. Here, the mapping table stores a user's custom item attributes and corresponding sub-attribute data, as well as the one or more supplier product identifiers like, for example, item SKU (i.e., stock keeping unit (catalog number)), item size, item UOM (unit of measure), and/or item color. Once a product is returned from one or more suppliers' punch-out catalogs (or, created by a user using the new/non-catalog item features, see FIGS. 37-39) to the system of the present invention, it is matched with a corresponding item according to the mapping table. If an exact match is made and the item is later added to one or more shopping carts, the corresponding custom item attributes are associated with the item. If a close match exists, the user may be prompted to verify or choose among multiple possible matches. If no match could possible exist, the user may be notified to choose a course of action (e.g., assign another custom item attribute, or skip the item), or the user may choose to not match the item with any custom item attributes.

The custom item attributes may be used for searching a catalog in accordance with business rules. The search engine 22 (discussed in more detail above) may be used for executing search queries entered via, for example, a search interface (e.g., FIG. 46). Search queries may then be executed according to whether the user entering the search queries with one or more custom item attributes (also, for example, in combination with other search criteria) is of an organization with which the one or more custom item attributes may be associated. Subsequently, once the search engine 22 processes the search criteria of what may be one or more search queries, the search results are returned (and, may be displayed, for example, using the end user interfaces 212) and may be prioritized, for example, according to the one or more custom item attributes.

The custom item attributes may also be used for promoting one or more items according to one or more custom item attributes. Items associated with the custom item attribute for promoting items may, for example, appear at the top of search results, and may be highlighted as preferred (e.g., according to a specific icon, highlight, and/or other designation). Moreover, a custom item attribute itself may be used for promoting one or more items, catalogs, and/or suppliers. In addition, one or more sub-attribute of one or more custom item attributes may also be used for promoting one or more items, catalogs, and/or suppliers. These and other features of the custom item attributes feature may be customized by users, in accordance with business rules, via, for example, the end user interfaces 212 and/or electronic integration (as described more fully above).

Figure 40:
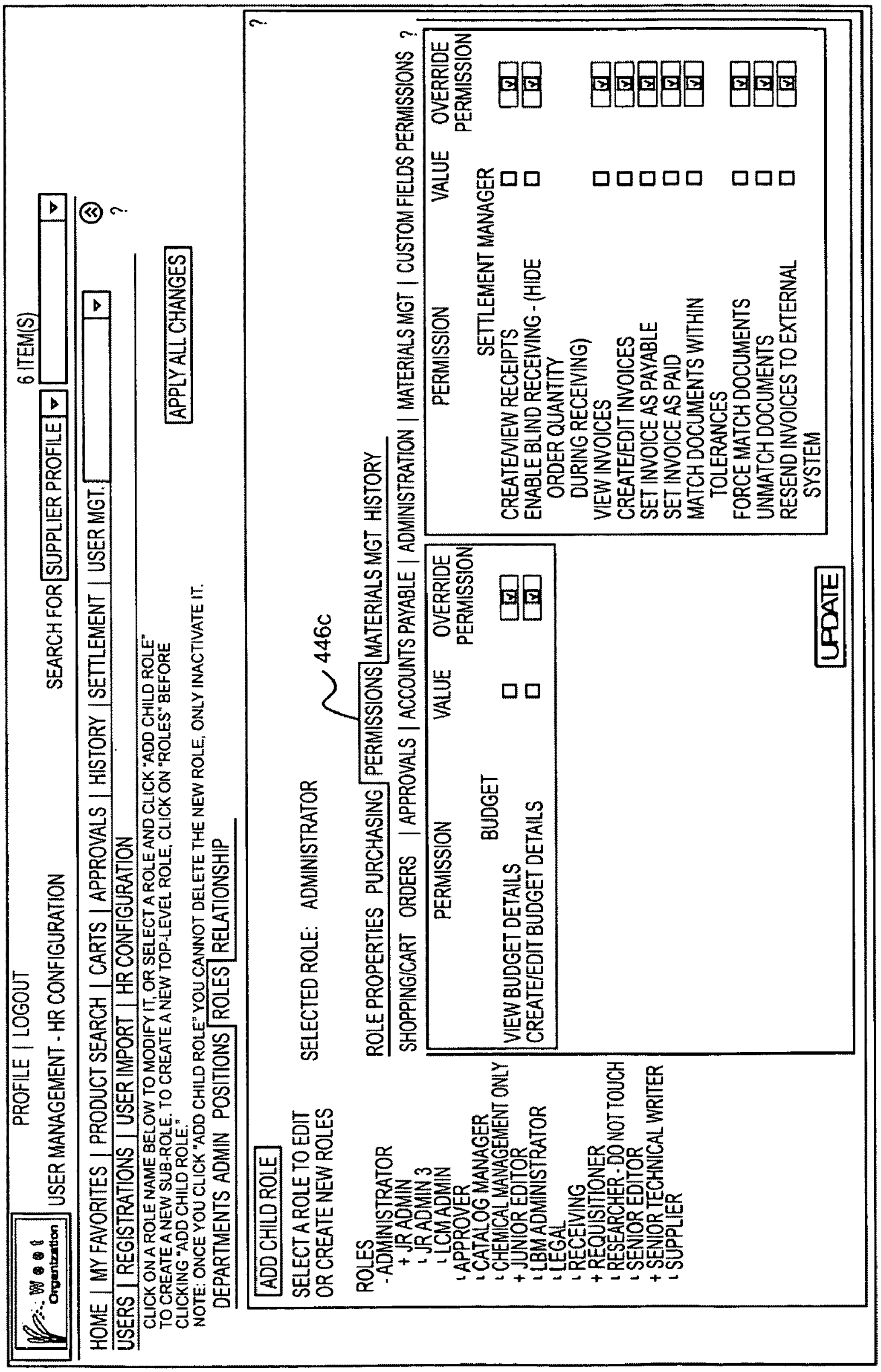
FIG. 40 illustrates an exemplary form layout configuration tool in accordance with the present invention.

FIG. 40 illustrates an exemplary form layout configuration tool in accordance with the present invention. The tool 4000 and its forms configuration feature 4001 may be used to design and/or configure the layout 4002 and elements 4003-4008 of a new or existing form. The forms configuration feature 4001 may also be used to build a new form by invoking the build new form feature 4009. Once an existing form is configured or a new form is created, the preview form feature 4010 may be invoked to view how the form is currently configured. Moreover, all of the existing forms (e.g., a form library) associated with the user or the user organization may be displayed in the tree-like frame 4011 for the user to choose from for further editing or configuration. The existing forms may be displayed in accordance with user privileges, organization privileges, or business rules, such that only the appropriate forms are displayed in the frame 4011. Moreover, layout details may be configured via the layout details tool 4002. The layout details tool 4002 may include, for example, the following elements for configuration and layout on a new or existing form: instructions 4003, supplier information 4004, order information 4005, personal information 4006, sample 4007, or field views 4008. Order information 4005 may include, for example, item, item information, service, service information, quantity, price, currency, order date, delivery date, shipping date, priority, menu, privilege level, order size, or order type. Similarly, order information 4005 may further include, for example, a title and help text section 4015 to accompany the new or existing form. Also, field views 4008 may include, for example, unassigned form fields 4012, user defined form fields 4013, or all fields 4014. Unassigned form fields 4012 may include, for example, the elements: capital expense, catalog number, commodity code, contract, external attachments, form type, health and safety, internal attachments, manufacturer name, manufacturer part number, packaging, product description, product size, taxable, or UN/SPSC. Similarly, user defined form fields 4013 may include, for example, the elements: text box, numeric text box, unit price, check box, dropdown list, tab, frame, tree, multimedia component, scroll menu, check box, text area, radio button group, date, HTML area, link, image, or item list. Further, all fields 4014 may include, for example, the elements of unassigned form fields 4012 and user defined form fields 4013. All of these elements may be customized for placement on a new or existing form in accordance with the user's preferences; moreover, the elements may be pre-defined.

A user may first request to create a custom form for ordering an item(s) or searching for an item(s) via the build a new form feature 4009. Only users with appropriate privileges will be permitted to create a custom form; the user privileges may be enforced by manage privileges 1536. In either case, the appropriate database will be accessed and the form will either be stored there, in the case of a new form, or a search query may run on the database based on the form, and search results returned to the user. When a new form is created (or, an existing form is edited) at least the forms database 2300 may be accessed; the master database 236 and, more specifically, for example, the catalog database 2400 may also be accessed, including the items database 2401 or the prices database 2430. Once invoked, the build a new form feature 4009 may present the user with the layout details tool 4002 for customizing and configuring the new form per the user's preferences (or, the organizations' preferences as well). For example, the user may choose to provide instructions 4003 along with the form, in order to guide a user using the form on how to place orders using the form or, similarly, how to invoke searches also using the form. In addition, a user may also provide supplier information 4004 to accompany the form like, for example, a supplier: name, address, telephone number, ordering preferences, payment preferences, shipping preferences, or contractual preferences. Furthermore, a user may also provide order information 4005 to accompany the form like, for example, an order: quantity, size, or type. A user may also provide personal information 4006 to accompany a form like, for example, name, title, department, address, telephone number, email, payment preferences, delivery preferences, or contractual preferences. Moreover, a user may also provide a sample of an item associated with the form via the sample 4007 element. All of the elements 4003-4008 of layout details 4002, or other elements not necessarily shown in this exemplary embodiment, may be customized for placement on the new or existing form in accordance with a user's preference.

Once included, all of these form elements (above) may be filled-out or completed upon the creation of an instance of the form by a user with appropriate privileges, in accordance with business rules, who wishes to place an order or search a database via the new or existing form.

Figure 40:
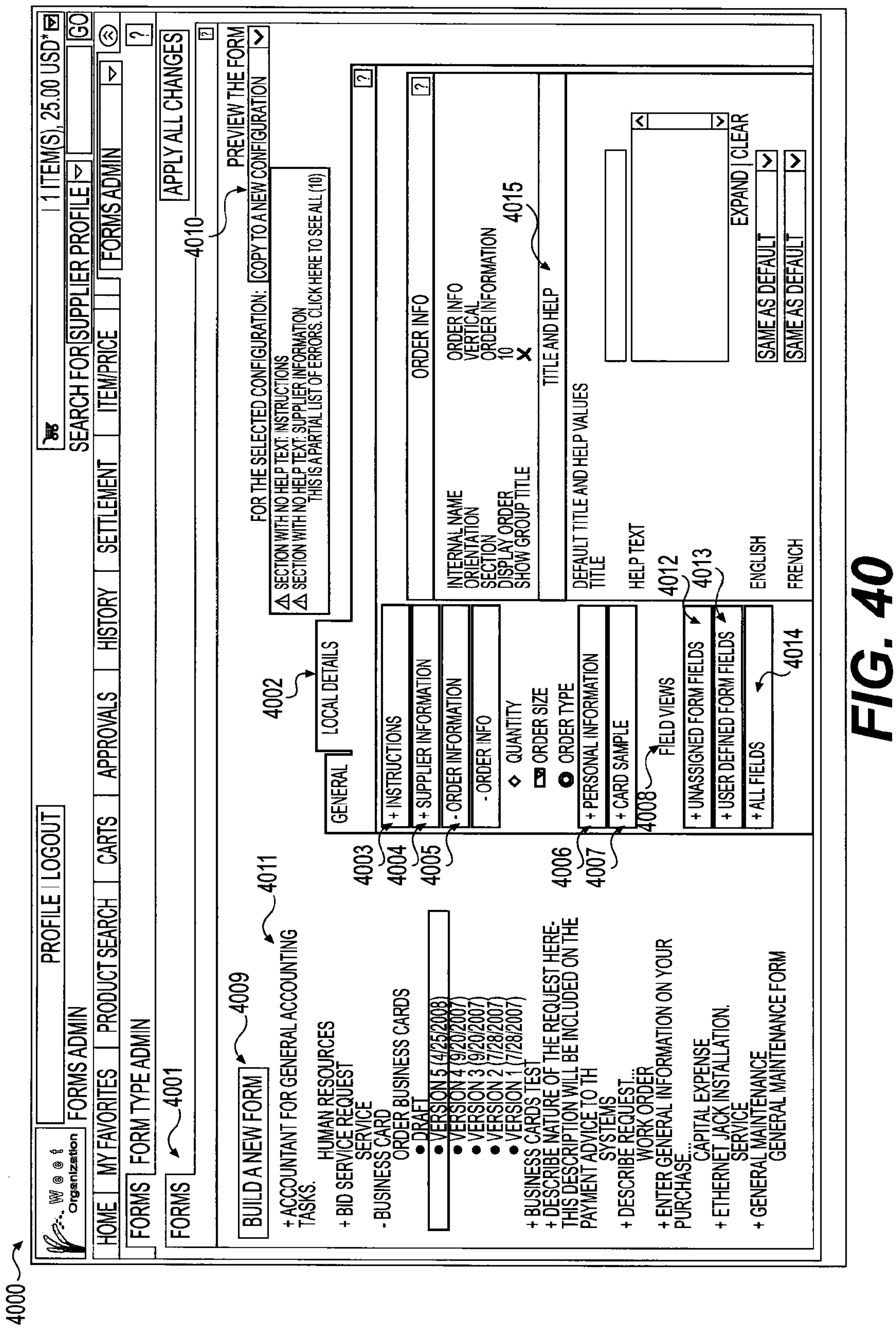
Figure 40A:
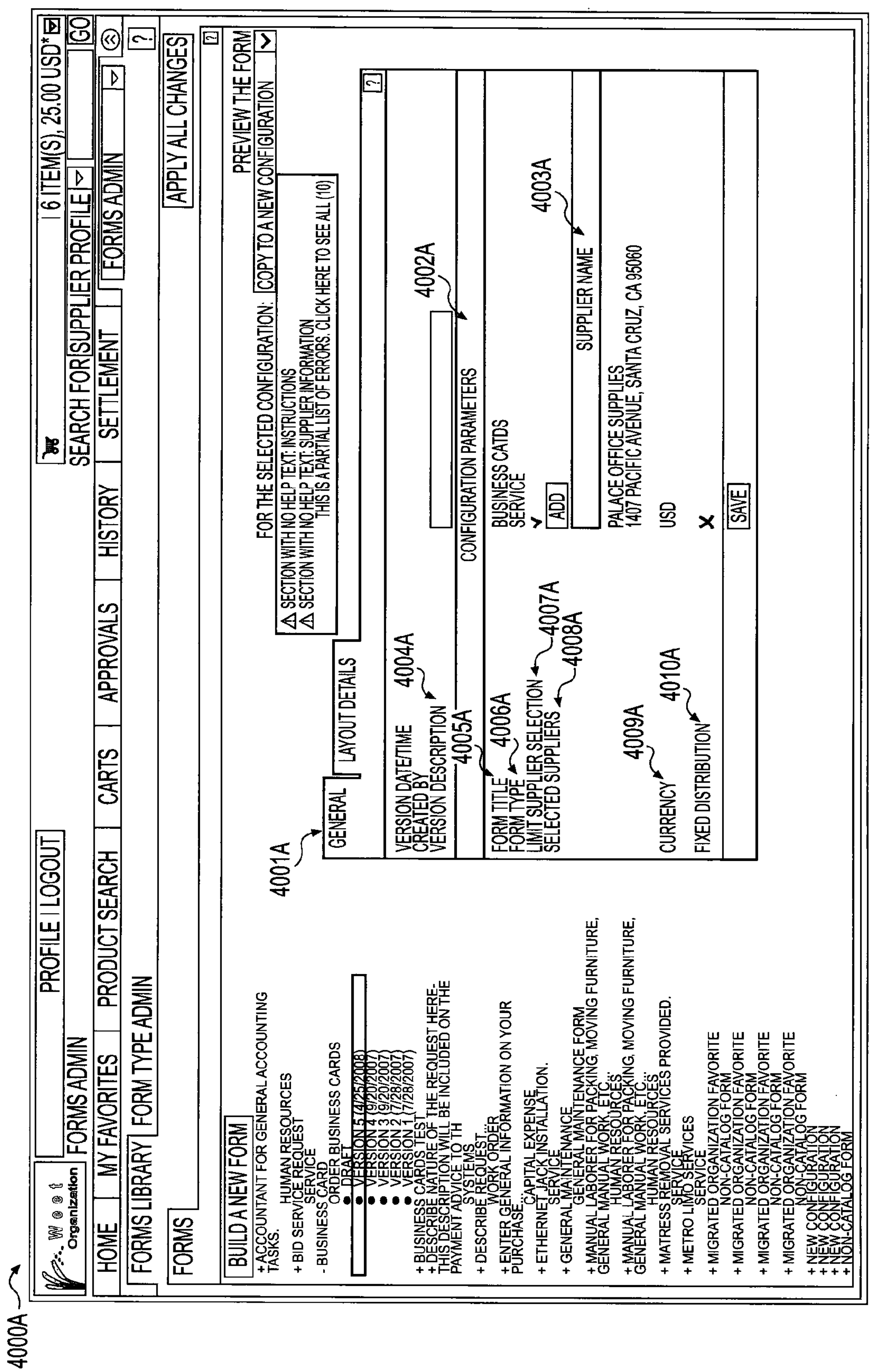
FIG. 40A illustrates an exemplary form general configuration tool in accordance with the present invention.

FIG. 40A illustrates an exemplary form general configuration tool in accordance with the present invention. The tool 4000A and its form general configuration feature 4001A may be used to configure the general features of a new or existing form. The feature 4001A may display a version date/time or a created by field. The user may input a version description 4004A, or, if one is already available, then it would already be displayed. The tool 4001A may also include a configuration parameters feature 4002A, which may further include, for example, the elements: form title 4005A, form type 4006A, limit supplier selection option 4007A, selected suppliers feature 4008A, currency 4009A, OF fixed distribution 4010A, or supplier name 4003A. The selected suppliers feature 4008A allows the addition of suppliers to associate (or, add) with the new or existing form. Once added, the supplier(s) name and other relevant information, like, for example, address or telephone number are shown; a user may choose to only associate a limited set of suppliers. Similarly, a selected contracts feature (not shown) may also allow the addition of a contract(s) to associate (or, add) with the new or existing form. In parallel, with the contract management feature (discussed below), an appropriate contract may either be created or an existing contract may be updated accordingly (e.g., tiers may be enforced, or special pricing may be available, etc.); this may be done via the contact management engine 1688, 1784 and contracts database 3200. Then, the configured form that has been edited or created by the user may, for example, be stored in the forms database 2300 and may, for example, be managed by form management 1693, 1783, or 1943, accordingly.

Figure 41:
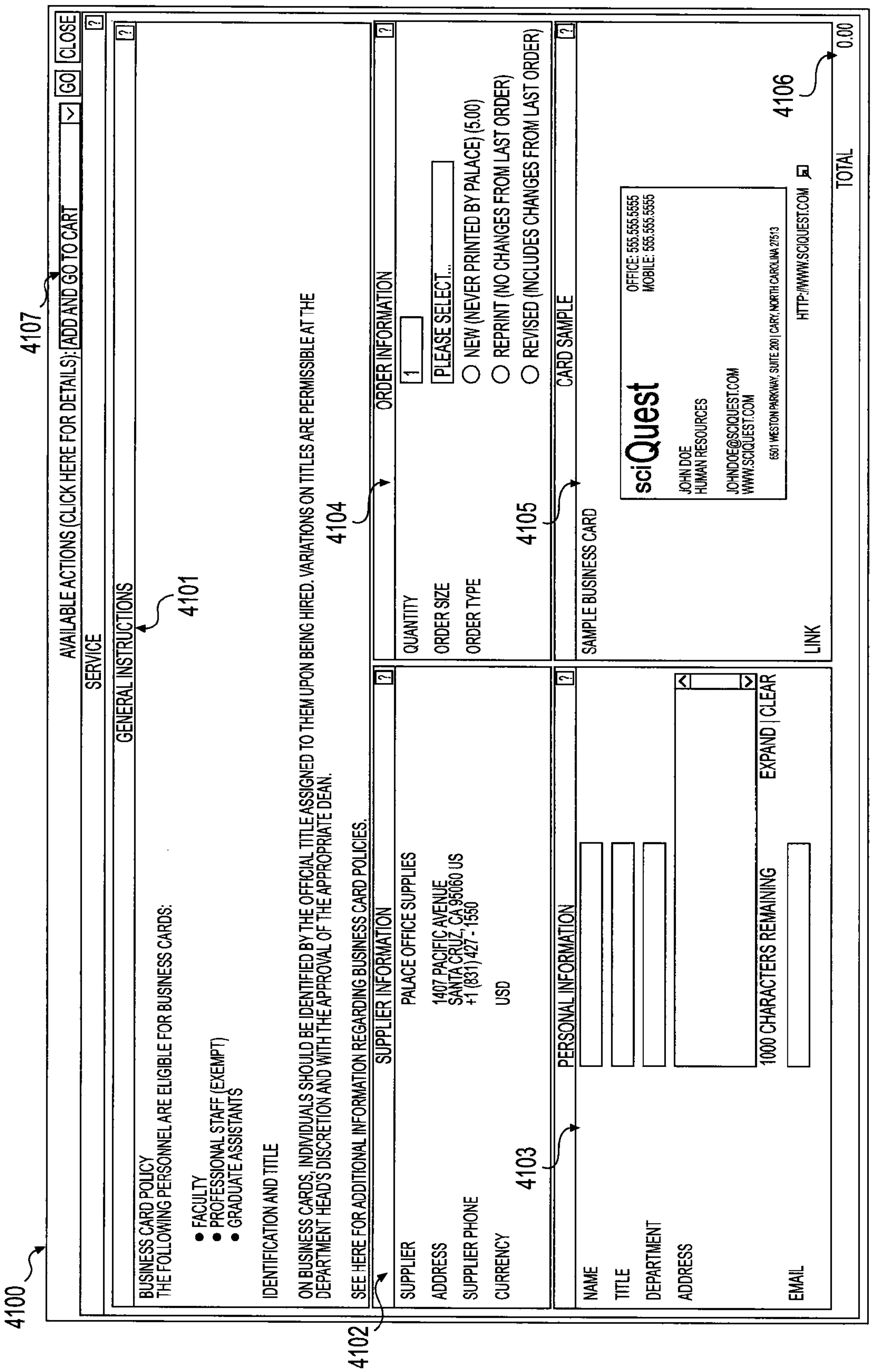
FIG. 41 illustrates an exemplary form user interface in accordance with the present invention.

FIG. 41 illustrates an exemplary form user interface in accordance with the present invention. The form user interface 4100 shown in the exemplary embodiment is actually an instance of a form configured using the features and elements described (see above) for the form layout configuration tool 4000. The form user interface 4100 may include, for example, a general instructions 4101 section, a supplier information 4102 section, a personal information 4103 section, an order information 4104 section, a sample 4105 section, or a total 4106 for the items. The general instructions 4101 section may include, for example, the list of personnel eligible for ordering or searching for the item (e.g., business cards) for which the form is customized (the list may be in accordance with user privileges or business rules, as well). The section may also include, for example, a note regarding the item (e.g., the identification and title of individuals on business cards). Furthermore, the supplier information 4102 section may include, for example, the supplier name, address, telephone number, and currency. The personal information 4103 section may include, for example, a name, title, department, street address, or email address. Moreover, the order information 4104 section may include, for example, a quantity, order size, order type (e.g., new order, reorder of a previous order, or revised reorder of a previous order). Finally, the sample 4105 section may, for example, display an image (e.g., logo or trademark) or other media-type (e.g., movie, sound, slideshow, or other compatible media-type) regarding the item being ordered or searched for. The sample may also display a dynamically updated version of the actual item, as customized for a user (e.g., a business card with the user's custom information). For example, a user may enter information into the form via the form user interface 4100, which may then submit the information to, for example, form management 1693 for processing; once processed by form management 1693, the information may accordingly be submitted to the client application 1532 or, more specifically, for example, the web-browser 1538, for presentation to the user in the sample 4105 section of the form user interface 4100. The form user interface 4100 may be coded/programmed for dynamic component display over the web-browser 1538, such that the sample 4105 section of the form user interface 4100 may be updated with the version of the actual item, as customized for a user; in other embodiments, other components of the form user interface 4100 may or may not be updated accordingly for display via the client application 1532 or, more specifically, for example, via the web-browser 1538. On the form user interface 4100, the required fields (as customized by a user using the form layout configuration tool 4000 or other similar tool of the system) are bolded or emphasized in some other way. Once the user is finished completing/populating the form instance as displayed on the form user interface 4100, or if the form attributes are pre-defined, the user may proceed by (4107), for example, adding the form item(s) to a cart and: going to a cart, moving on to another form, customizing a new form, or searching for a new form. Alternatively, the user may proceed by (4107), for example, storing the form item as a favorite for future use, such that the user does not have to re-populate the form (e.g., the attributes). The populated form may, for example, be stored in the forms database 2300 and may, for example, be managed by form management 1693, 1783, or 1943, accordingly.

Figure 42:
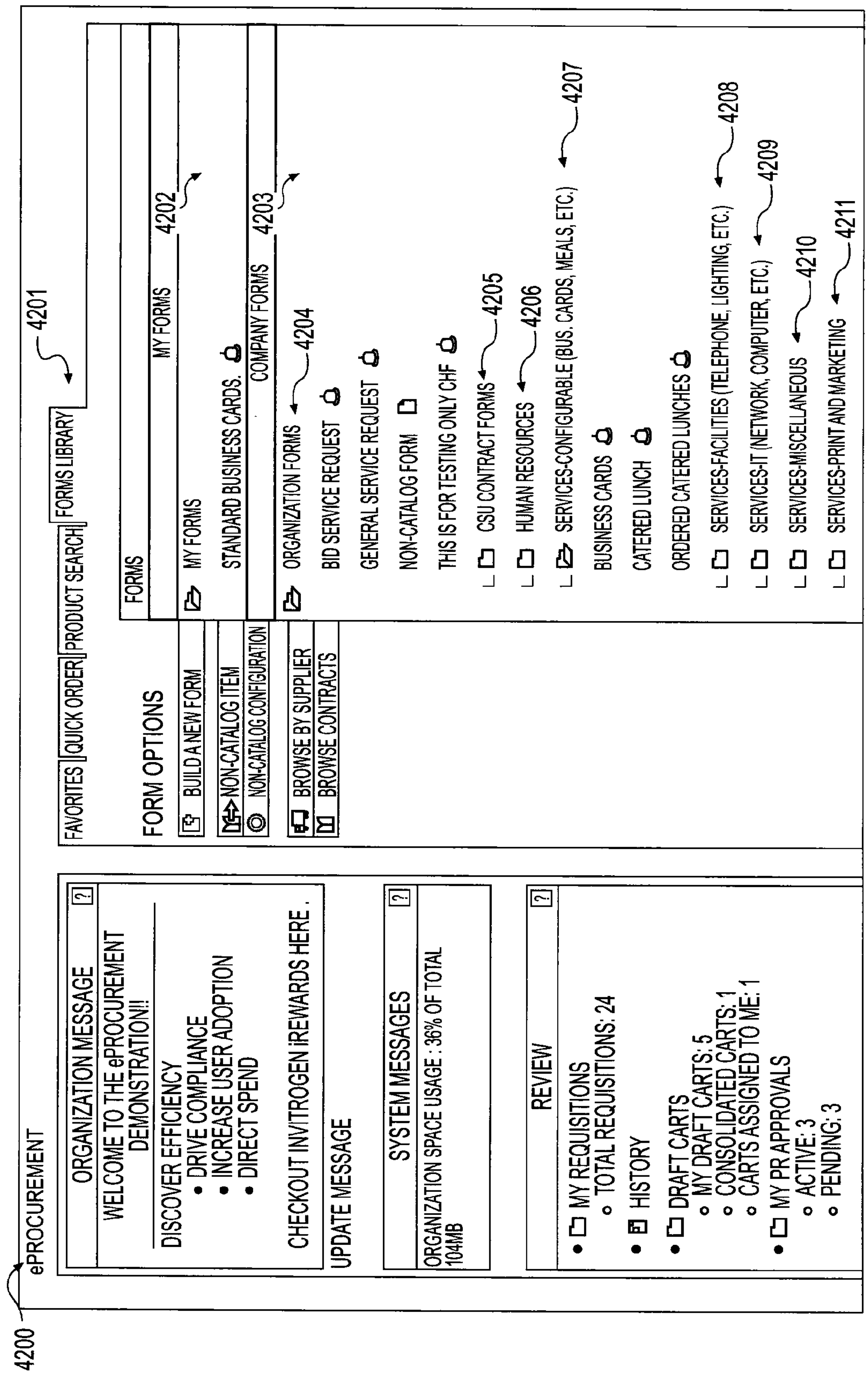
FIG. 42 illustrates an exemplary form library interface in accordance with the present invention.

FIG. 42 illustrates an exemplary form library interface in accordance with the present invention. The form library interface 4200 and its forms library feature 4201 may present for display and customizing the user's own forms 4202, user organization's forms 4203, or another user's or organization's forms (not shown). The forms library feature 4201 may in conjunction with the forms database 2300 and form management 1693, 1783, or 1943 logically link new or existing forms for organized storage and user/organization access. For example, if an organization is a subsidiary or a parent corporation, partnership, or other business entity, it may wish to share forms with its related business entities. Similarly, organization with close business relationships may wish to do the same; and, users within the same department, group, or local office may also wish to share forms. The forms library (or, logically linked forms) may be organized hierarchically (e.g., based on a designated form type). Forms may include, for example, organization forms 4204 (e.g., a bid service request, a general service request, or a non-catalog item form), contract forms 4205, human resources forms 4206, services-configurable forms 4207 (e.g., business cards, catered lunch, or ordering catered lunch), services-facilities 4208 (e.g., telephone, lighting, etc.), services-IT 4209 (network, computer, etc.), services miscellaneous 4210, or services-print and marketing 4211. Other designated form types may also be created and may be associated with the user's or organization's business rules, as well as those business rules associated with the item(s) or supplier(s) associated with the form. Similarly, the workflow management engine 1680, 1930 may interface with form management 1693, 1783, 1943 to associate one or more workflows with a form or designated form type. Such workflows may also include dynamic workflows (FIG. 30) accessible via the workflow database 3000.

Figure 43:
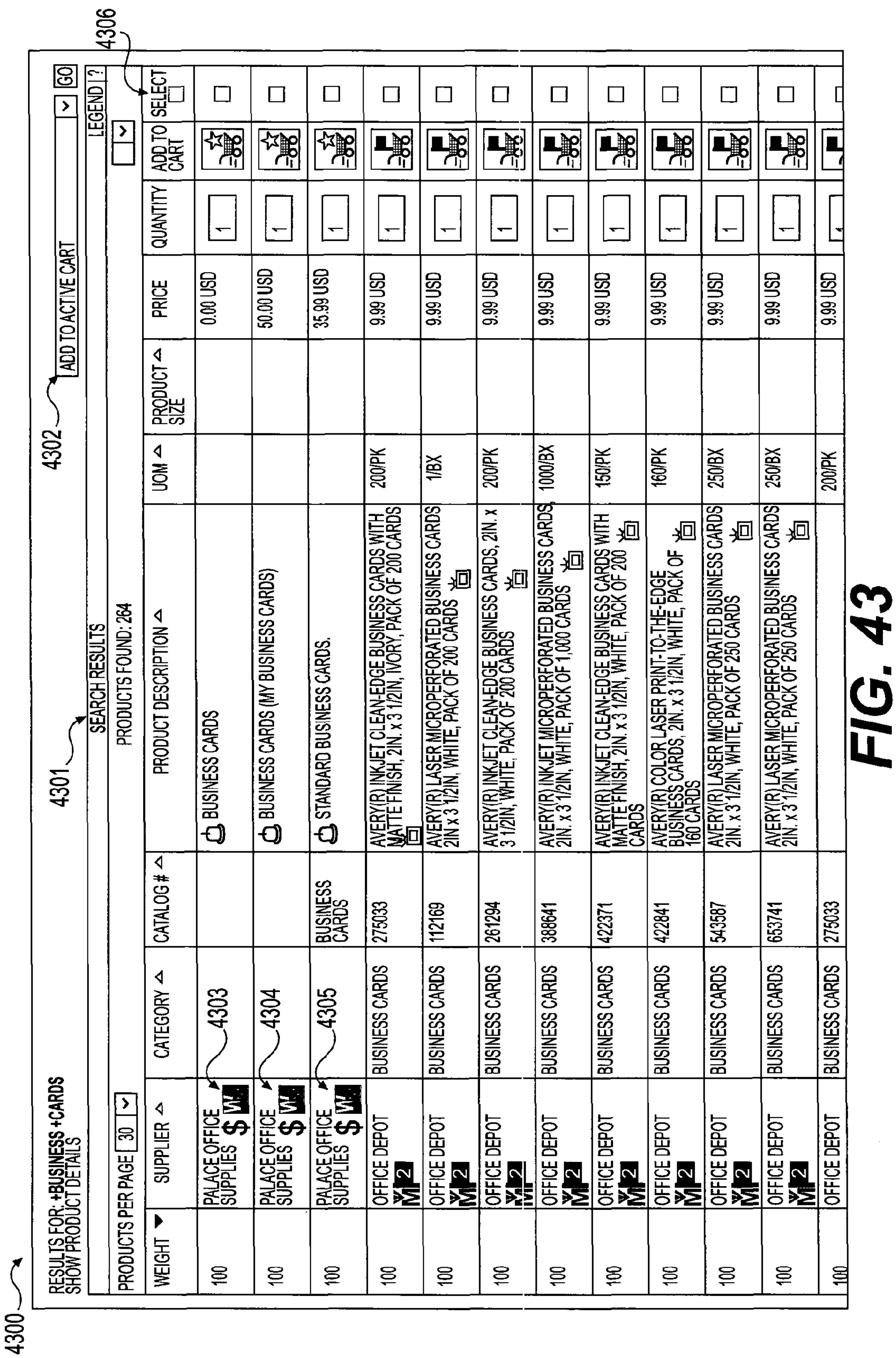
FIG. 43 illustrates an exemplary forms search results interface in accordance with the present invention.

FIG. 43 illustrates an exemplary forms search results interface in accordance with the present invention. The forms search results interface 4300 and its search results feature 4301 may present search results for display and selection by the user. Forms may be found in search results (e.g., a search for business cards) 4303-4305 along with other items not associated with forms. Forms may be assigned searchable keywords for the search engine 22 to better be able to locate those forms. A user may select 4306 forms only, forms in addition to other search results, or just other search results. Once selected, the user may add the form(s) or other search result(s) to a new or existing cart 4302 (implemented via, for example, workflow management 1680, 1930, 2142, sales/purchase management 2046 or, more specifically, for example, cart management 1683, 2144) for the purpose of, for example, separating forms from other item search results or for further ordering or checkout; a user may also choose, for example, to compare two or more selections 4302.

Figure 44:
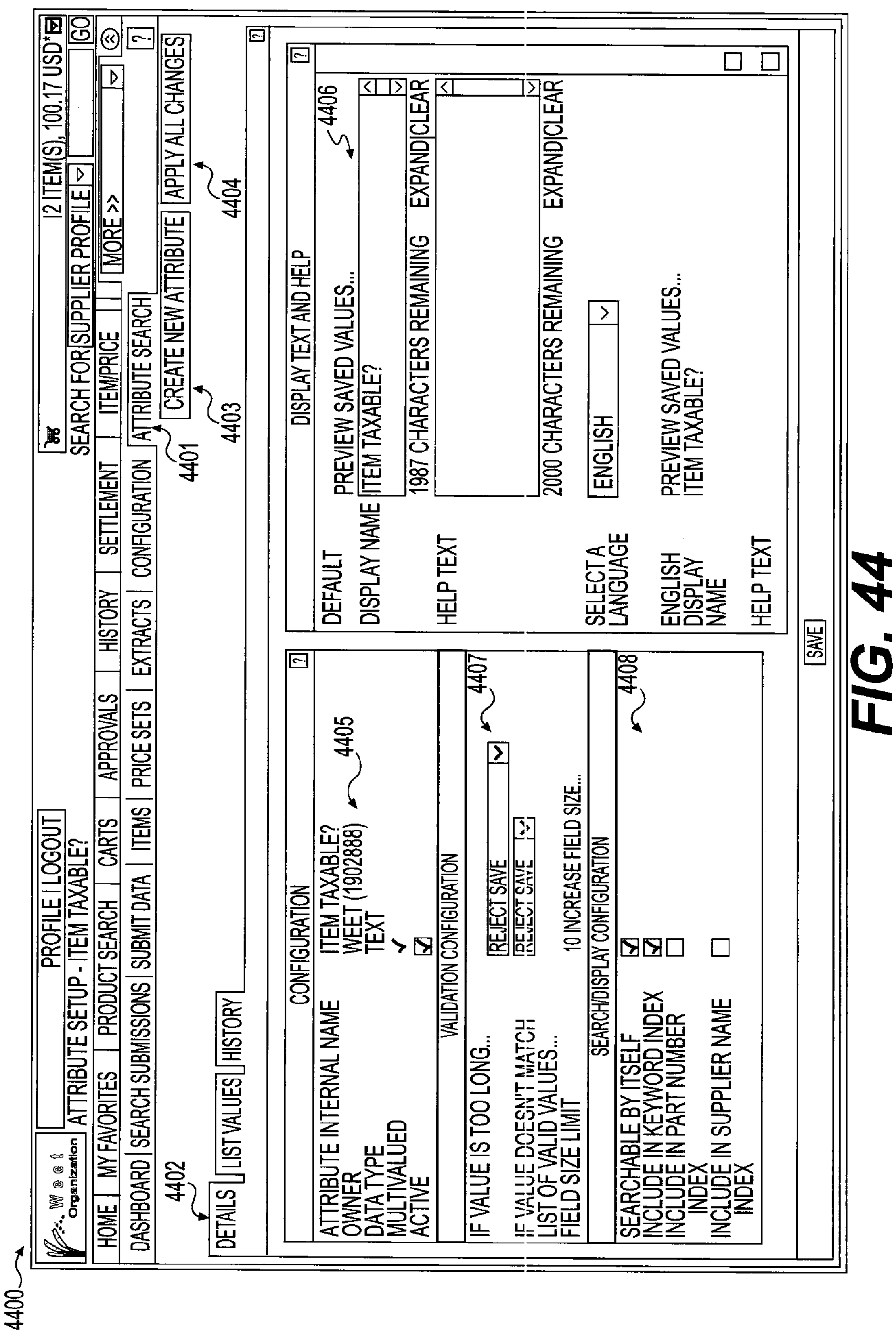
FIG. 44 illustrates an exemplary user-defined searchable attributes configuration interface in accordance with the present invention.

FIG. 44 illustrates an exemplary user-defined searchable attributes configuration interface in accordance with the present invention. The user-defined searchable attributes configuration tool 4400 may include an attribute search 4401 tool for defining the detailed configuration of the custom search field or attribute to be added by a user (implemented via, for example, the catalog engine 1655, 1755, 2020, 2120 or, more specifically, search 1659, catalog updates 1759, 1822, or user local catalog create/access module 2024, 2122). The added or edited custom search field or attribute may be accessible via the master database 236, catalog database 2400 and, more specifically, for example, via the forms database 2300, items database 2401 or prices database 2430; the custom search field or attribute may also be accessible via the transaction database 228 and, more specifically, for example, via the purchase order database 2500 (including, for example, the fax database 2600, revisions database 2602, or distribution database 2604), requisition database 2700, receipt database 2800, buyer invoice database 3300, sales invoice database 3400, sales order database 2900, workflow database 3000, or contracts database 3200. Moreover, the added or edited custom search field or attribute may be accessed and managed by, for example, the search engine 22. For example, the search engine 22 may run a search query against the catalog database 2400 and, more specifically, for example, against the items database 2401 or prices database 2430 when a user inputs a specific value in the added or edited custom search field. The search results are then returned and displayed to the user via a search results interface (e.g., FIG. 43).

The attribute search 4401 tool for defining the detailed configuration of the custom search field or attribute to be added by a user with appropriate privileges (as may be enforced by manage privileges 1536; FIG. 15, 1536-A; FIG. 16, 1660, 1664) include, for example, a create new attribute feature 4403 for creating and defining new searchable field or attributes, an apply all changes feature 4404 for applying any changes made to a searchable field or attribute, a details feature 4402 for defining the detailed configuration 4405, validation configuration 4407, search/display configuration 4408, or display text and help configuration 4406, of the searchable field or attribute. The detailed configuration 4405 may allow a user to define, for example, the internal name of the field or attribute (e.g., keyword), the organization (e.g., "owner") that has control over the field or attribute, an associated catalog (e.g., via a catalog name or number), the data type associated with the field or attribute (e.g., text, whole number, floating point number, Boolean, multi-select, etc.), whether the field or attribute may be multi-valued, or whether the field or attribute is active or inactive. Furthermore, the validation configuration 4405 may allow a user to define, for example, what to do if the value entered is too long (e.g., accept save, reject save, notify user, etc.), what to do if the value does not match the list of field values (e.g., accept save, reject save, notify user, etc.), or the present field size limit (which can be increased or decreased accordingly). The search/display configuration 4408 may include, for example, an option for whether the field or attribute is: searchable by itself (via its own search field), included in the keyword index (for searching via the keyword index field), included in the part number index (for searching via the part number field), or included in the supplier name index (for searching via the supplier name index field); the field or attribute may be searchable via all three of these options. The display text and help configuration 4406 of the searchable field or attribute may include, for example, a feature for using a default text and help configuration, a display name for the searchable field or attribute (i.e., how it appears to a user via a search interface or otherwise via another interface of the system), help text associated with using the searchable field or attribute, a language to display the searchable field or attribute in accordance with (e.g., English, Japanese, Dutch, German, Arabic, Italian, Greek, French, or other supported language), and a feature for enabling or disabling each of display name, help text, or language.

Figure 45:
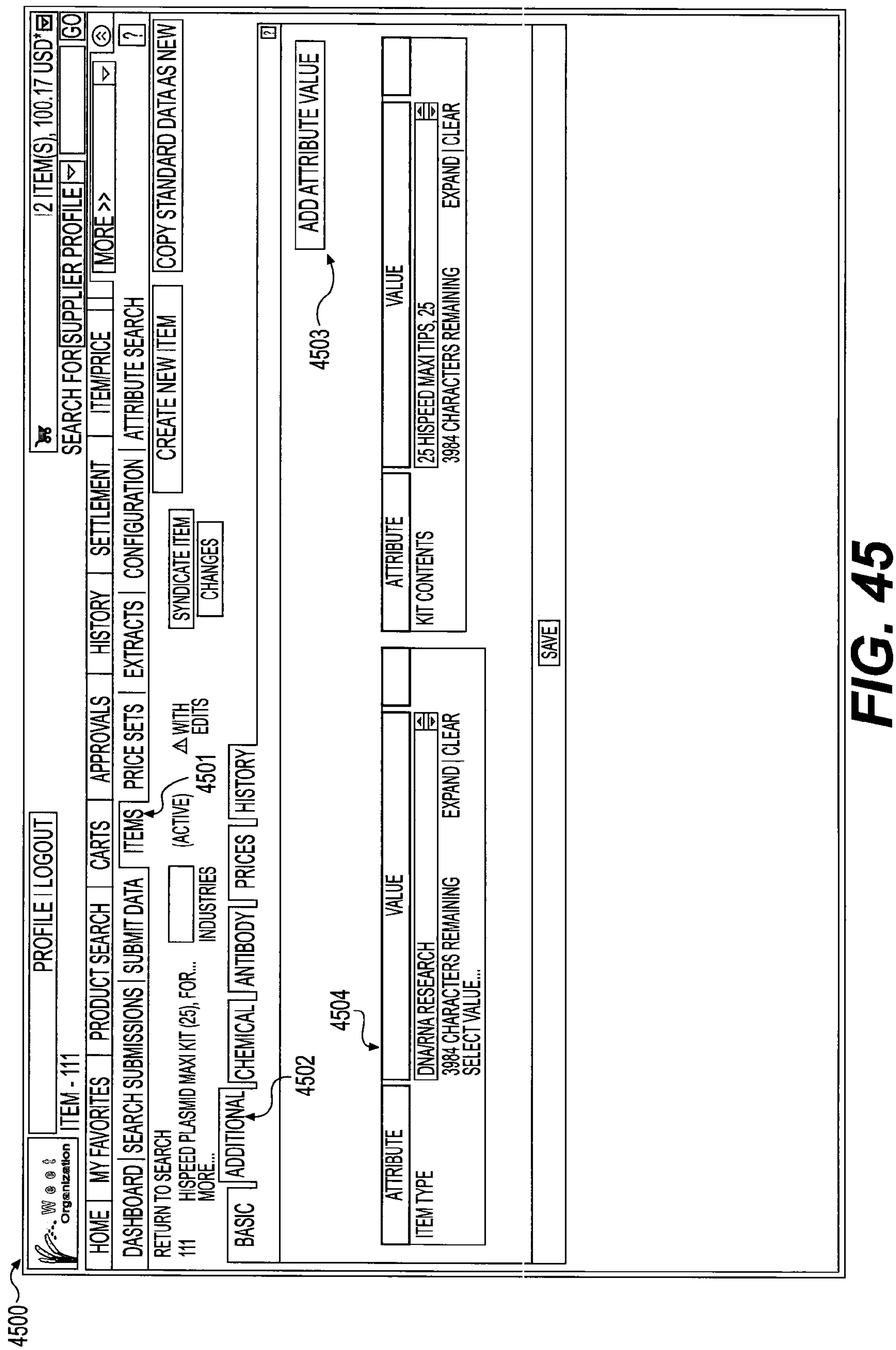
FIG. 45 illustrates an exemplary user-defined searchable attributes item assignment interface in accordance with the present invention.

FIG. 45 illustrates an exemplary user-defined searchable attributes item assignment interface in accordance with the present invention. The user-defined search attributes item assignment interface tool 4500 and its corresponding item assignment feature 4501 may be used to assign (or associate) 4502 a searchable field or attribute to a specific item(s) (or, in an alternative embodiment, a user, organization, supplier, or purchase/sale). That is, once assigned (4503, 4504) and provided with one or more values, the searchable field or attribute may be used by the search engine 22 to search the appropriate database(s) (or, database index) (described above) for more efficiently retrieving the specific item(s) (or, in an alternative embodiment, a user, organization, supplier, or purchase/sale) according to the searchable field or attribute.

Figure 46:
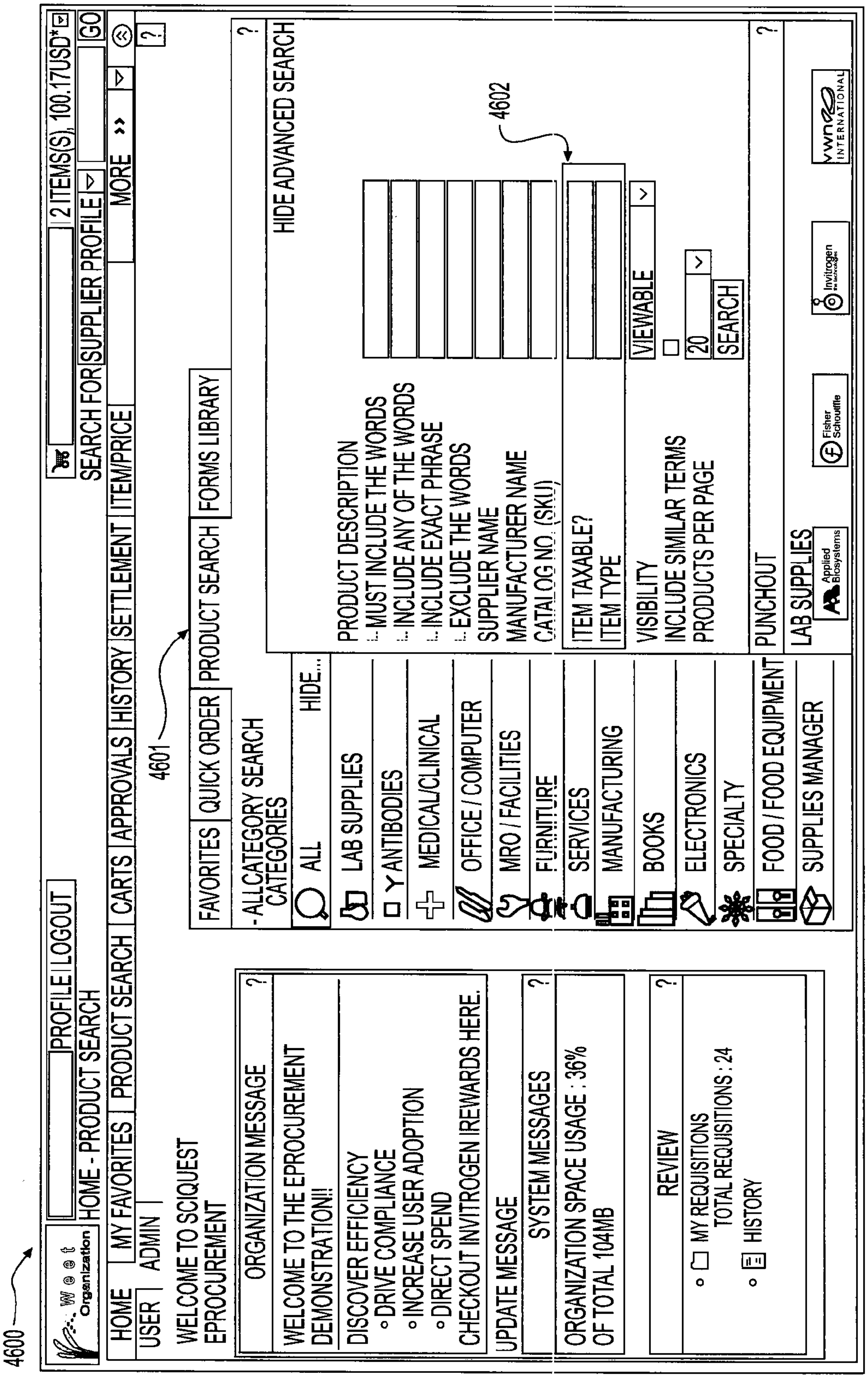
FIG. 46 illustrates an exemplary search interface with user-defined searchable attributes in accordance with the present invention.

FIG. 46 illustrates an exemplary search interface with user-defined searchable attributes in accordance with the present invention. The search interface with user-defined searchable attribute tool 4600 may include, for example, a product (or, item—e.g., good or service) interface 4601. The interface 4601 may display the searchable field(s) or attribute(s) 4602 such that a user may input a value to be used by the search engine 22 for searching against the appropriate database(s) (described above). Whether a searchable field or attribute 4602 appears on the interface 4601 depends on whether the appropriate option was selected during the configuration of the search/display 4408 (e.g., searchable by itself) and the detailed configuration 4405 (e.g., active or inactive); these options may be edited initially when the searchable field or attribute is configured 4401, 4402 or dynamically at a later time.

Figure 47:
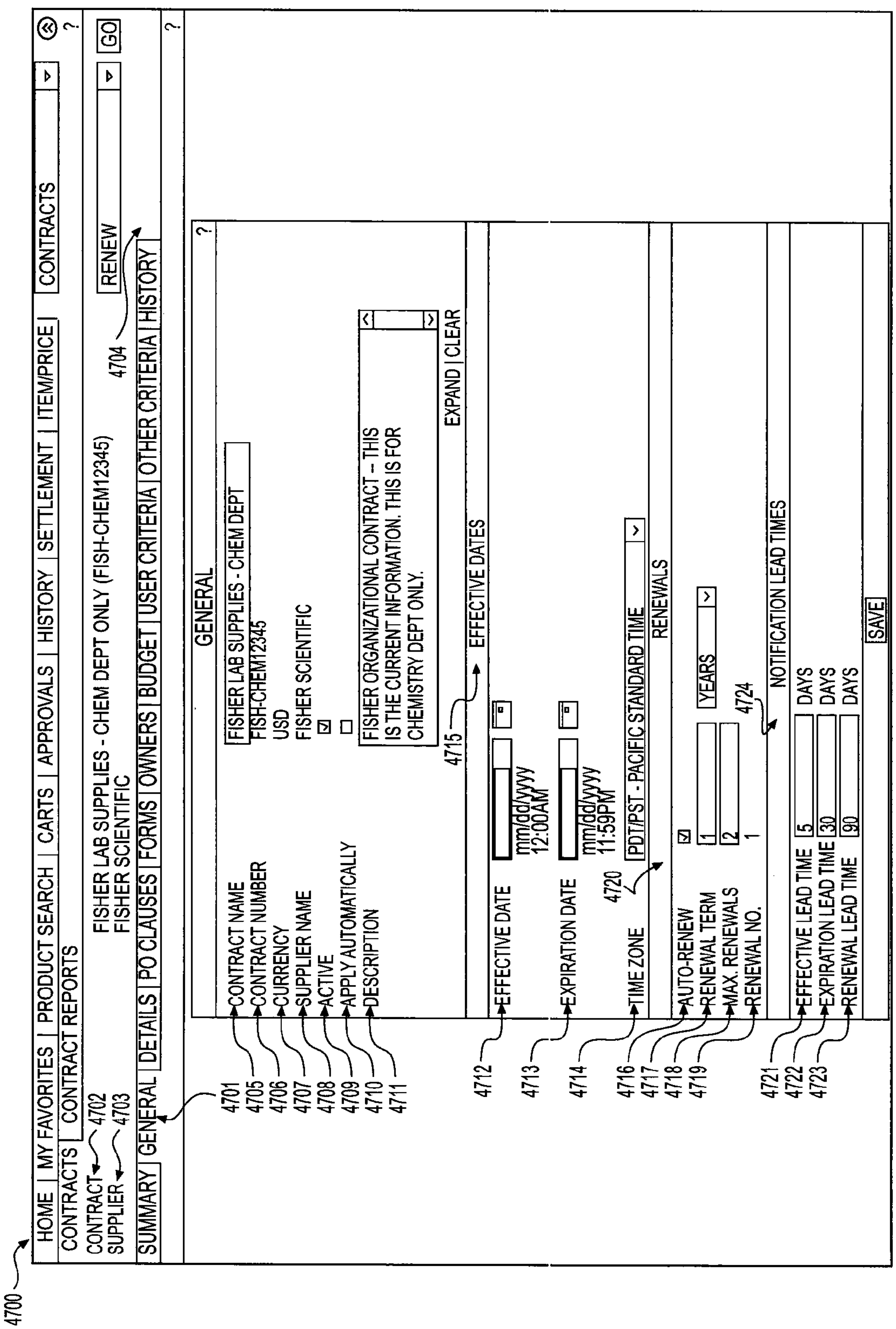
FIG. 47 illustrates an exemplary contract general setup interface in accordance with the present invention.

FIG. 47 illustrates an exemplary contract general setup interface in accordance with the present invention. The contract general setup interface 4700 may include, for example, a contract general setup tool 4701, a display of the contract identifier 4702, or a display of the contract supplier 4703. The contact management engine 1688, 1784 implements the features of the contract general setup interface 4700 and may access the contracts database 3200 (which may contain many contracts or, possibly, no qualified contracts) during the implementation/execution of these features embodied. The contract general setup tool 4701 may be used for entering the most relevant and necessary information regarding a contract between one or more buyer/purchasing organization and one or more supplier/selling organization. After the information is entered, it may be saved for future access by users; moreover, an existing contract's information may be updated via the tool 4701 and renewed 4704. The contract general setup interface tool 4701 may include, for example, the following contract general setup features, elements, or options: a contract name 4705, a contract number 4706, a currency 4707, a supplier name 4708, an active option 4709, an apply automatically option 4710, a description 4711, an effective dates feature 4715, an effective date 4712, an expiration date 4713, a time zone 4714, a delivery date, a priority level, a billing/shipping address, a billing method, a renewals feature 4720, an auto-renew option 4716, a renewal term 4717, a maximum renewals 4718, a renewal number 4719, a notification lead times feature 4724, an effective lead time 4721, an expiration lead time 4722, or a renewal lead time 4723. For example, a contract name 4705, contract number 4706, currency 4707, or supplier name 4708 are used to describe important elements of a contract stored, or to be stored, in the contract database 3200; such a contract may later be assigned to a form (see above) or may be updated in accordance with amendments or contractual events (e.g., termination/expiration, escalation terms, meeting one or more tier(s) level—then, e.g., offering rebates or price reductions, assignment, unenforceability, material breach, etc.) that might occur throughout the term of the contract. Moreover, for example: the active option 4709 may denote whether the contract is active or inactive; the apply automatically option 4710 may denote whether changes/updates to the contract (or, related ones) should be applied automatically; the description 4711 may provide a description related to the contract; the effective dates feature 4715 may be used to designate an effective date 4712 and an expiration date 4713, and the time zone 4714 may relate to the effective dates feature 4715 for accurate determination of the effective 4712 and expiration 4713 dates; the renewals feature 4720 may be used to denote terms associated with contract renewal like, for example, whether the contract should be automatically renewed upon expiration (via the auto-renew option 4716), what the renewal term 4717 should be (e.g., 1 year, 1 month, 1 week, 1 day, etc.), the maximum renewals 4718 permitted, and which renewal number 4719 the contract is currently in; the notification lead times feature 4724 may be used to provide an effective date lead time 4721 value (e.g., hours, days, weeks, months, or years) for notification (via, for example, email, telephone, facsimile, text message, multimedia message, mail, carrier, or other method of communication) of the effective date to those users, organizations, or suppliers associated with a contract (similarly, an expiration lead time 4722 value or a renewal lead time 4723 value for notification may be specified via the notification lead times feature 4724).

Figure 48:
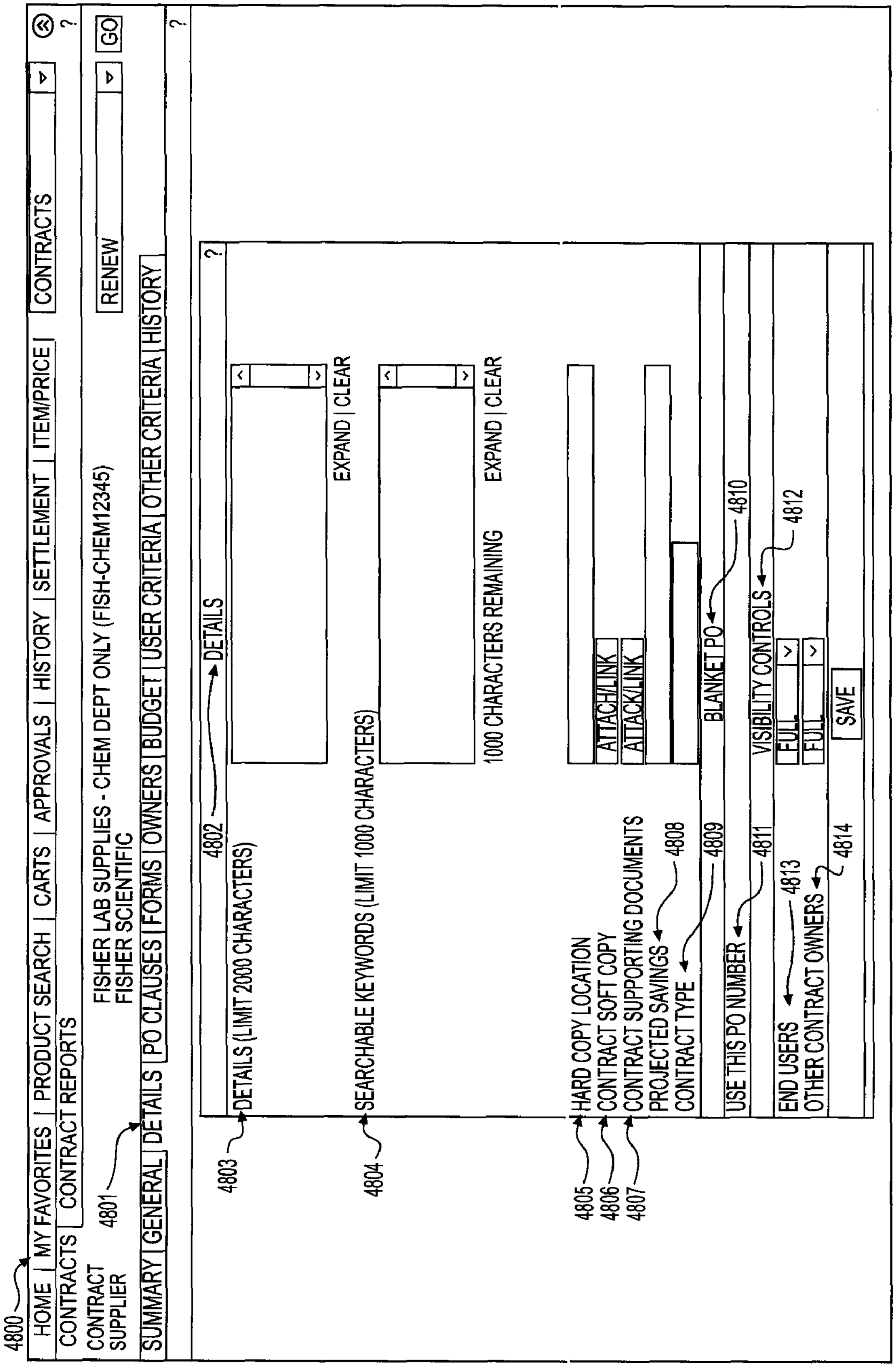
FIG. 48 illustrates an exemplary contract details setup interface in accordance with the present invention.

FIG. 48 illustrates an exemplary contract details setup interface in accordance with the present invention. The contract details setup interface 4800 may include, for example, a contract details setup tool 4801. The contract details setup tool 4801 may include, for example, a details feature 4802 for entering contract information for reference. The details feature 4802 may include, for example, a details text section 4803, searchable keywords 4804 (e.g., for locating a contract in searches, as applied to a general search or contact specific search), a designation of the hard copy location 4805 of the contract, a feature for attaching/linking and uploading/downloading (e.g., importing/exporting) a copy (or, URL—Uniform Resource Locator—or other address) of the contract (e.g., soft copy) 4806, a feature for attaching/linking and uploading a copy (or, URL, or other address) of a contract's supporting documentation (e.g., soft copy) 4807, the projected savings associated with the contract 4808, the contract type (e.g., requirements contract) 4809, a designation of a blanket purchase order 4810 to be applied to the contract, a purchase order number 4811 associated with the contract, a visibility controls feature 4812, an end user visibility type 4813 for designating the end user type(s) (e.g., buyer, supplier, or organization) for which the contract is visible/accessible, or a contract owners type 4814 for designating the other contract owner(s) (e.g., buyer, supplier, or organization) for which the contract is visible/accessible and editable according to the user status as an owner with, presumably, higher privileges.

Figure 49:
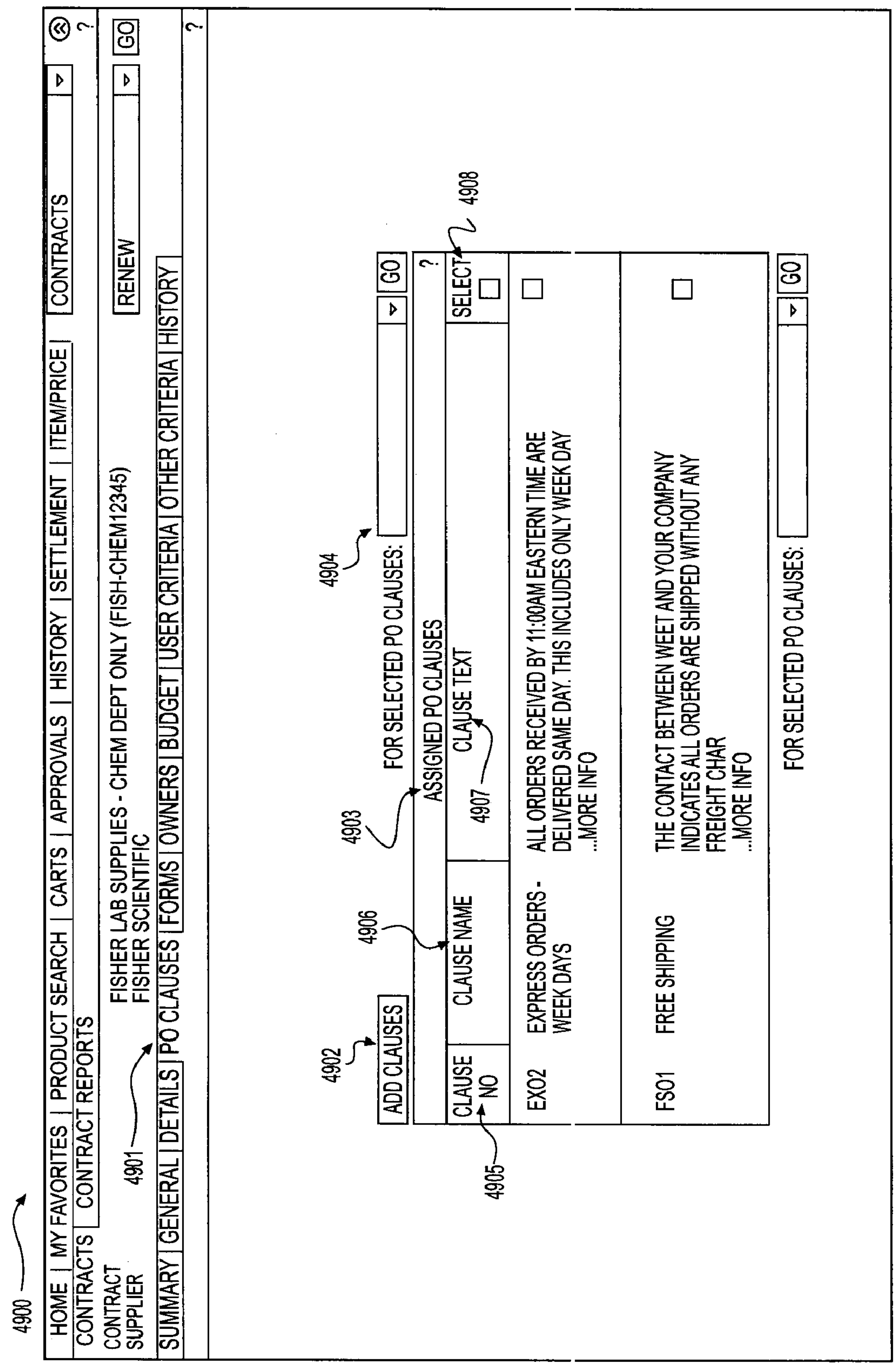
FIG. 49 illustrates an exemplary purchase order-to-contract association interface in accordance with the present invention.

FIG. 49 illustrates an exemplary purchase order-to-contract association interface in accordance with the present invention. The purchase order-to-contract association interface 4900 may include a purchase order (PO) clauses tool 4901 that allows, for example, adding clauses, defining the added clauses, and assigning/associating the clauses to one or more contracts that could be sent with each PO to a supplier with which the contract(s) may be associated. The PO clauses tool 4901 may include, for example, an add clauses feature 4902 for adding clauses, an assigned PO clauses feature 4903 for displaying and accessing the purchase order clauses that may be assigned to a contract(s), or a feature for acting on selected PO clauses 4904 (e.g., by adding, deleting, or editing selected clauses). The assigned PO clauses feature 4903 may include, for example, a clause number 4905, a clause name 4906, a clause text 4907, or a select clause option 4908. The features of tool 4901 may be leveraged for purchase requisitions, sales orders, sales invoices, or buyer invoices, as well as purchase orders, if necessary (this may hold true for the other contract-related features described herein).

Figure 50:
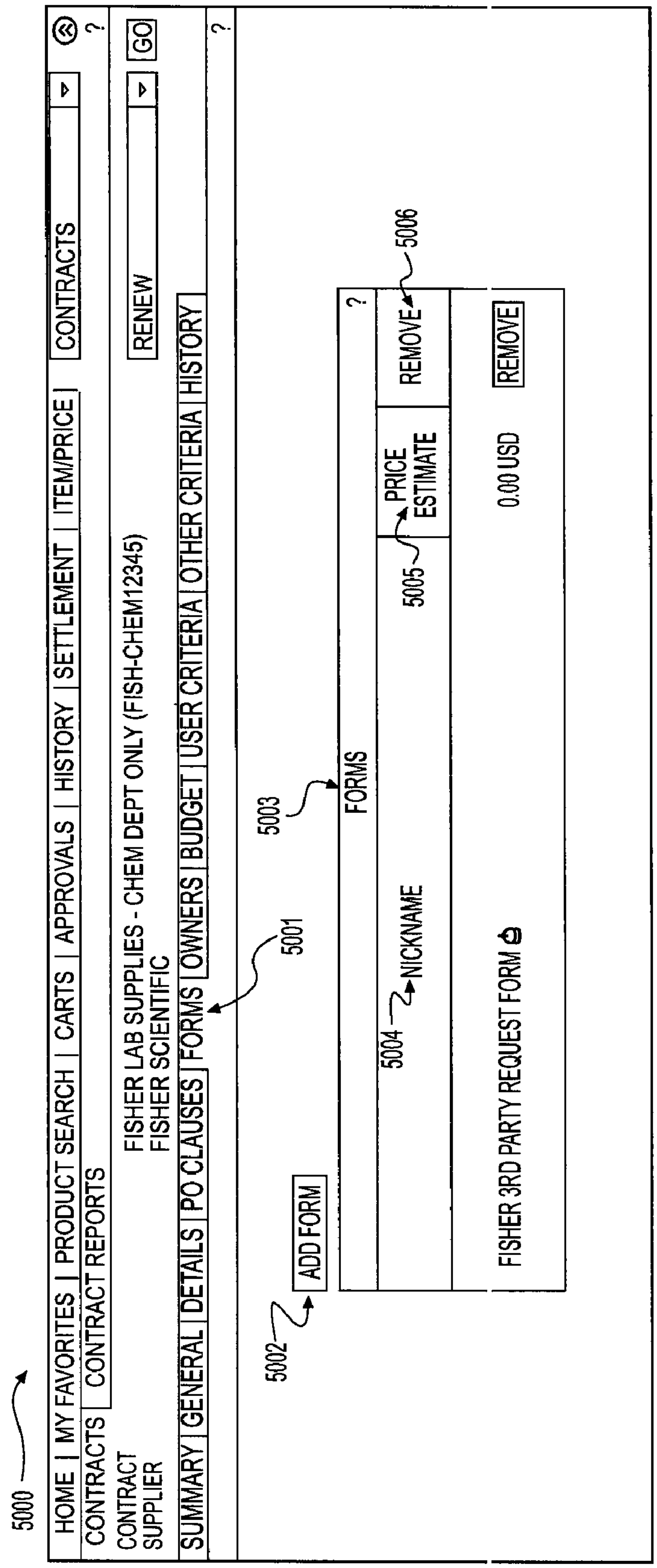
FIG. 50 illustrates an exemplary forms-to-contract association interface in accordance with the present invention.

FIG. 50 illustrates an exemplary forms-to-contract association interface in accordance with the present invention. The forms-to-contract association interface 5000 may include, for example, a forms-to-contract association tool 5001 for associating a form (e.g., item form, supplier form, etc.) to one or more contracts via the contract engine 1554 (or, specifically, for example, the contract management engine 1688, 1784, 2060, 2160 and, more specifically, via the associate contract with forms module 2068, 2168). Once a form (e.g., custom to a specific supplier or generic to one or more suppliers) is associated with one or more contracts, the form may be accessed when the contract is viewed either in a contract search interface (FIG. 57) or, alternatively, when a supplier contract pop-up (or, other type of window or interface) is invoked for viewing one or more contracts associated with a supplier 4703. Moreover, using the search engine 22, and displayed, for example, via a search results interface 4300, one or more forms may be shown in search results according to keyword attributes (e.g., search criteria) that may be associated with one or more contracts or forms; that is, the association of a contract and a form may permeate the search feature, or other features of the system, for example, for seamless integration and association. To implement these features, the forms-to-contract association tool 5001 may include, for example, an add form feature 5002 for adding a new or existing form to associate with one or more contracts, a view/list forms feature 5003 for viewing/listing the added forms for associating with one or more contracts, a nickname 5004 element for viewing the available forms for association by a nickname, a price estimate 5005 element for viewing the price estimate (in U.S. Dollars (USD), or other currency) that may correspond to an available form, or a remove form feature 5006 for removing an added form from the list of available forms.

Figure 51:
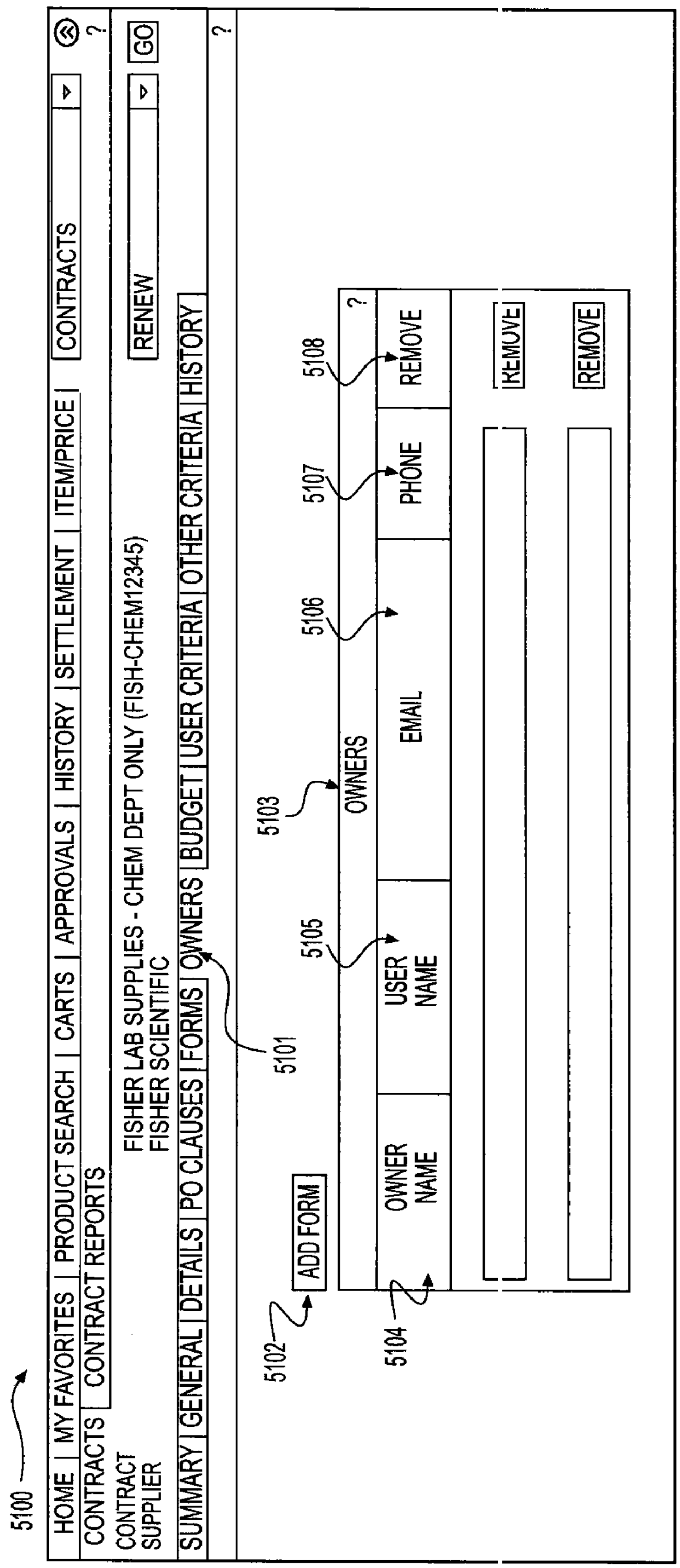
FIG. 51 illustrates an exemplary contract owners interface in accordance with the present invention.

FIG. 51 illustrates an exemplary contract owner's interface in accordance with the present invention. The contract owner's interface 5100 may include, for example, a contract owner's tool 5101 for associating one or more contract owners to one or more contracts via the contract engine 1554 (or, more specifically, for example, the contract management engine 1688, 1784). A contract owner associated with one or more contracts may, for example, edit or manage the contract, or receive notifications (via, for example, email, telephone, facsimile, text message, multimedia message, mail, carrier, or other method of communication) related to the contract (e.g., when amendments are made or contractual events occur). The contract owner's tool 5101 may, for example, include an add owner feature 5102 for adding one or more owners as owners associated with one or more contracts, a view/list owners feature 5103 for viewing/listing the added owners for associating with one or more contracts, an owner name element 5104 for viewing the associated owners by name, a username 5105 element for viewing the associated owners by nickname, an email 5106 element for viewing the email of the associated owners, a telephone number 5107 for viewing the telephone number of the associated owners, and a remove feature 5108 for removing one or more associated owners from being associated with one or more contracts.

Figure 52:
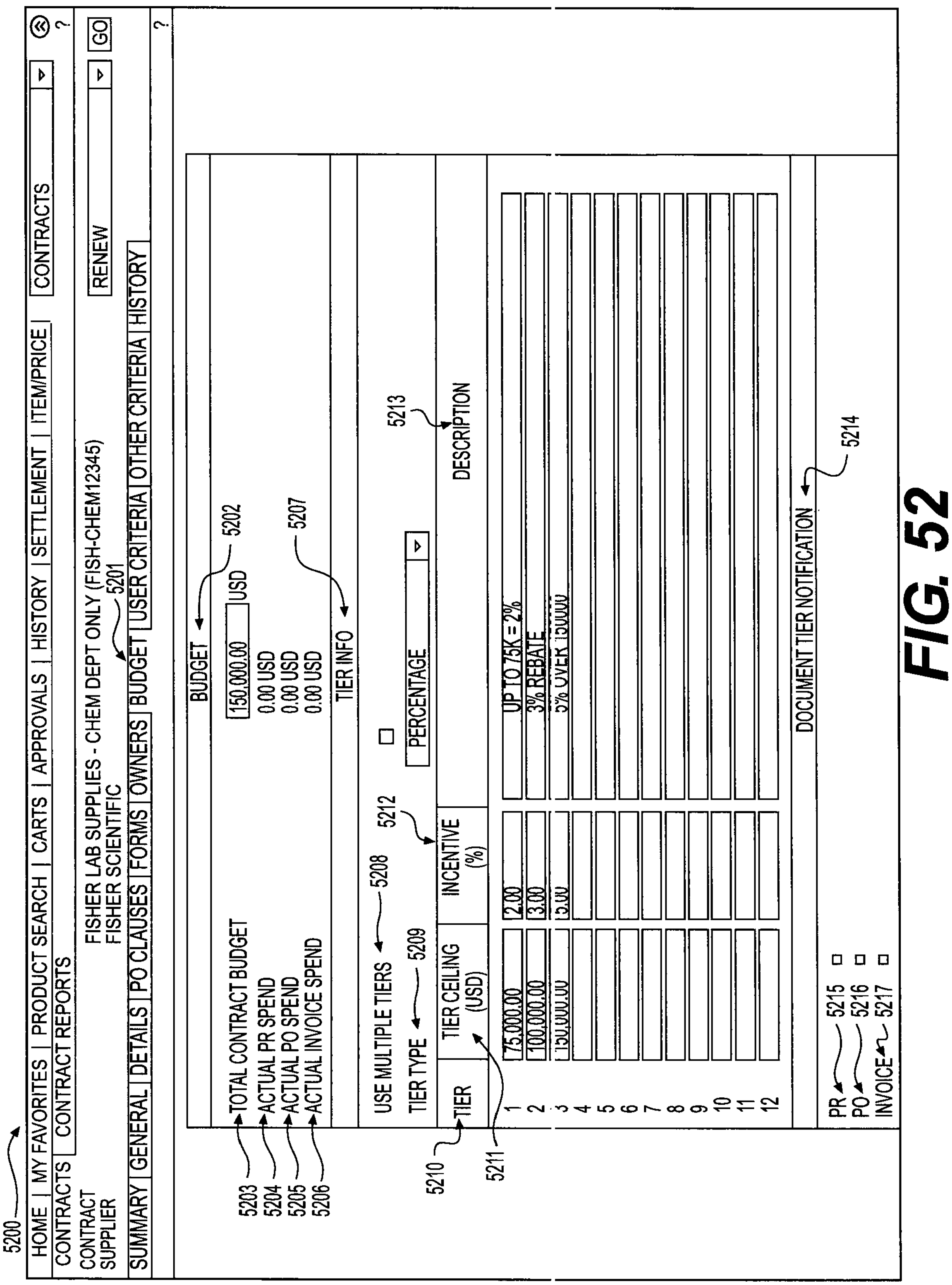
FIG. 52 illustrates an exemplary contract budget interface in accordance with the present invention.

FIG. 52 illustrates an exemplary contract budget interface in accordance with the present invention. The contract budget interface 5200 may include, for example, a contract budget tool 5201 for setting contract budgets, limits, spending tiers to trigger contractual events (e.g., rebates or price reductions), or document types (e.g., purchase requisition (PR), purchase order (PO), or invoice) associated with receiving notifications of tier or budget achievements. The contract budget tool 5201 may be implemented via the contract engine 1554 (or, more specifically, for example, the contract management engine 1688, 1784). Furthermore, the contract budget tool 5201 may include, for example, a contract budget feature 5202 for configuring the contract budget elements and for implementing features of the contract budget tool 5201. The contact budget feature 5202 may include, for example, a total current budget element 5203 for setting a total current budget associated with a contract, an actual PR spend element 5204 for presenting the actual purchase requisition amounts (e.g., spent, to be spent, etc.), an actual PO spend element 5205 for presenting the actual purchase order amounts (e.g., spent, to be spent, etc.), an actual invoice spend element 5206 for presenting the actual invoice amounts (e.g., spent, to be spent, etc.), a tier information feature 5207 for configuring tiers (e.g., spending threshold triggers for rebates, price fluctuations, price reductions, etc.), a use multiple tiers feature 5208 for denoting whether to use one or more tiers, a tier type feature 5209 for denoting the tier type (e.g., percentage, whole number/dollar, etc.) associated with one or more tiers, a tier element 5210 for presenting the present (or, past or future) tiers, a tier ceiling element 5211 for setting a tier ceiling/limit (for example, a dollar amount, possibly based on one or more currencies; or, for example, a quantity or time limit/period), an incentive element 5212 (in, for example, a percentage or dollar amount, possibly based on one or more currencies), a description element 5213 for describing a tier ceiling/limit and the incentive that may be associated with a tier, a document tier notification feature 5214 for configuring which documents (PR, PO, or invoice) tier/budget notifications may apply to, a PR document notification element 5215 for sending notifications associated with purchase requisitions, a PO document notification element 5216 for sending notifications associated with purchase orders, an invoice document notification element 5217 for sending notifications associated with invoices.

Figure 53:
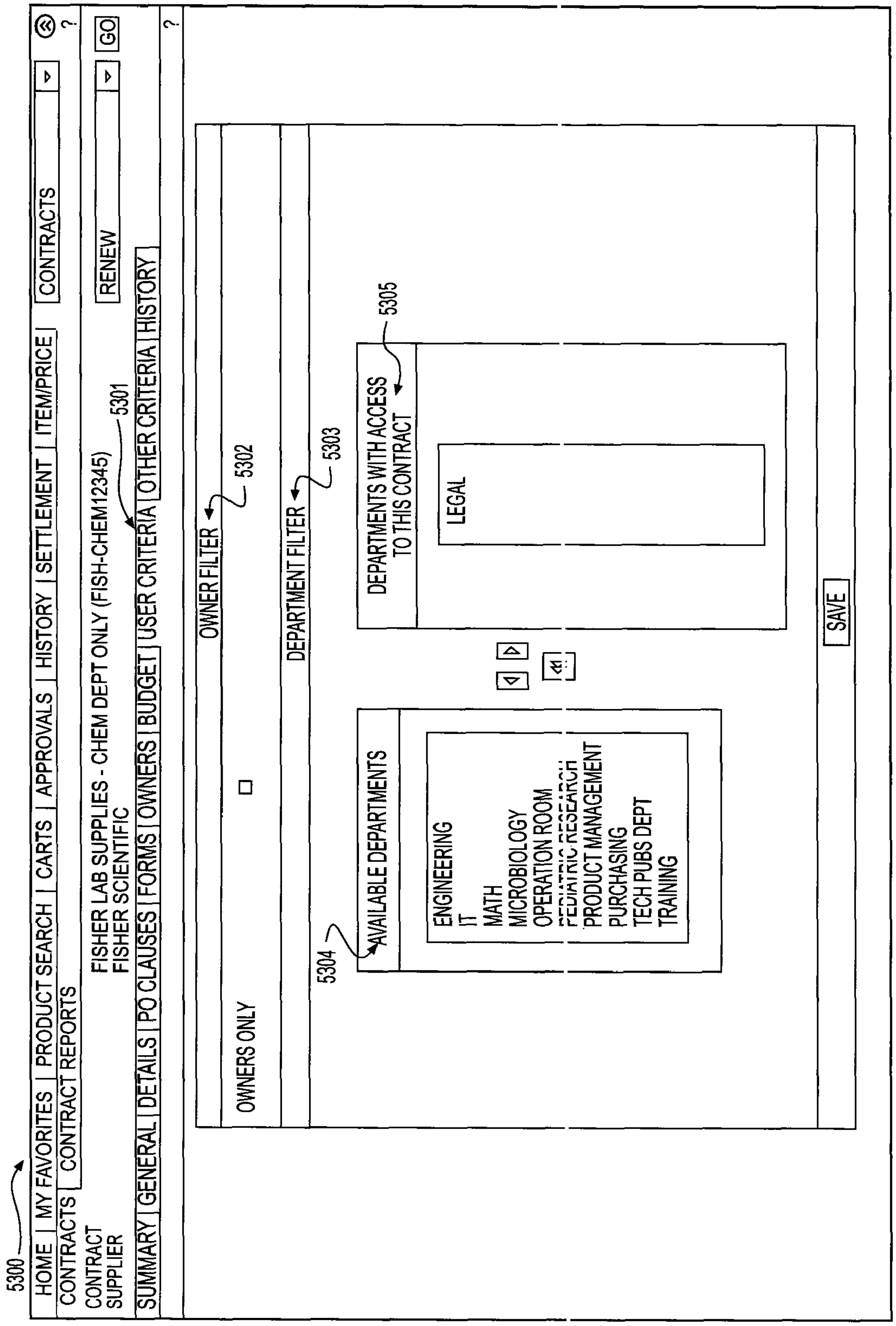
FIG. 53 illustrates an exemplary contract user criteria interface in accordance with the present invention.

FIG. 53 illustrates an exemplary contract user criteria interface in accordance with the present invention. The contract user criteria interface 5300 may include, for example, a contract user criteria feature 5301 for configuring which user(s) within an organization may access or use one or more contracts. The contract user criteria feature 5301 may be implemented via the contract engine 1554 (or, more specifically, for example, the contract management engine 1688, 1784). Moreover, the contract user criteria feature 5301 may include, for example, an owner filter feature 5302 for designating that only owners may access a contract, a department filter feature 5303 for designating whether one or more available departments 5304 may access a contract 5305. The contract user criteria feature 5301 may be used for designating that an entire organization, a specific department, contract owners, individual users, or any combination of these organizations/departments/owners/user, may have access to a contract.

Figure 54:
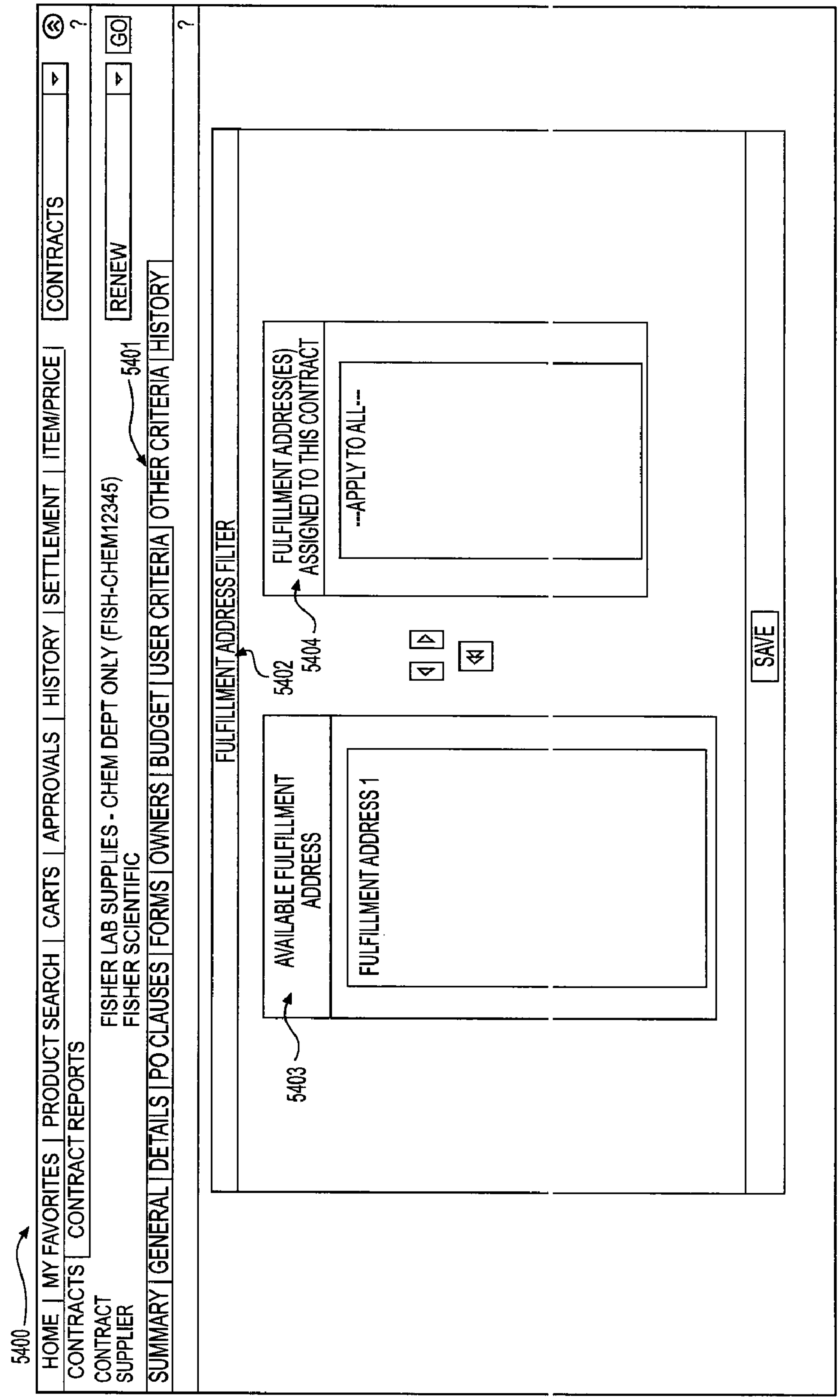
FIG. 54 illustrates an exemplary contract other criteria interface in accordance with the present invention.

FIG. 54 illustrates an exemplary contract other criteria interface in accordance with the present invention. The contract other criteria interface 5400 may include, for example, a contract other criteria feature 5401 for configuring which users of an available fulfillment address may access or use one or more contracts. The contract other criteria feature 5401 may be implemented via the contract engine 1554 (or, more specifically, for example, the contract management engine 1688, 1784). Moreover, the contract other criteria feature 5401 may include, for example, a fulfillment address filter feature 5402 for designating that only users at one or more available fulfillment addresses 5403 may access a contract 5404.

Figure 55:
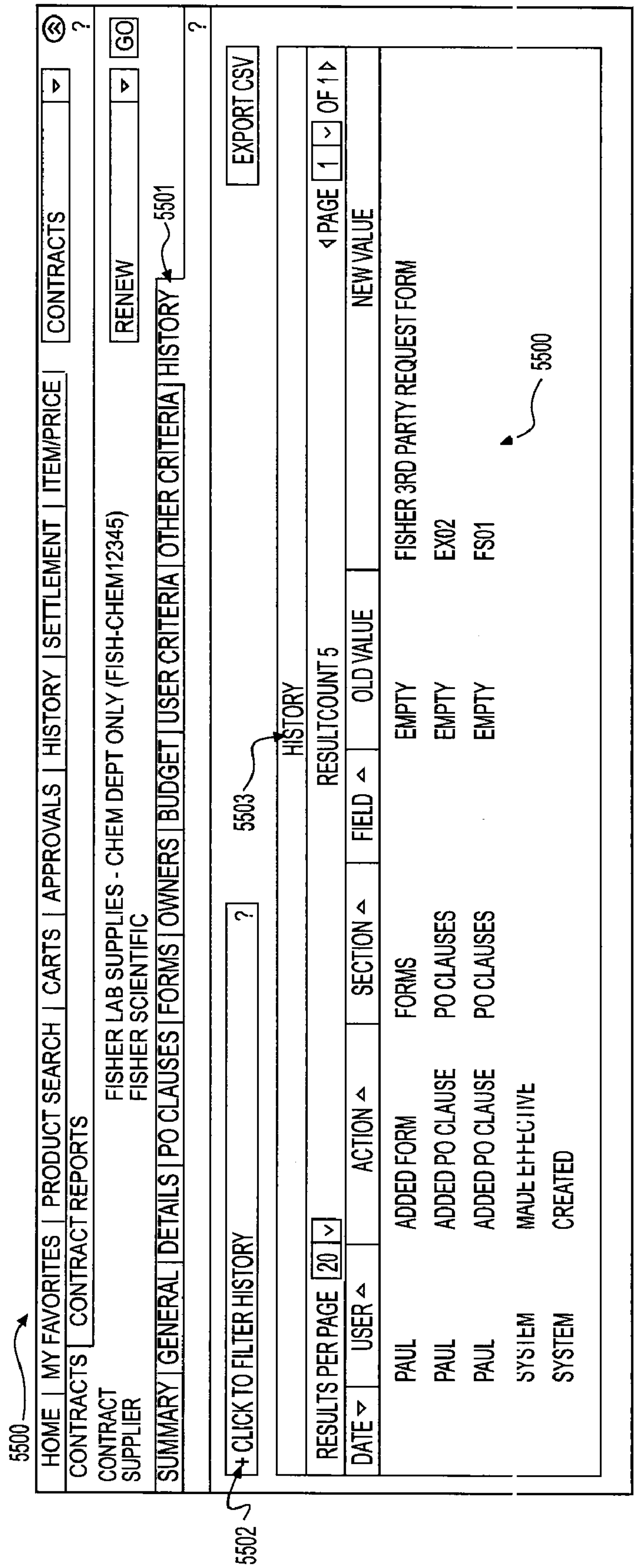
FIG. 55 illustrates an exemplary contract history interface in accordance with the present invention.

FIG. 55 illustrates an exemplary contract history interface in accordance with the present invention. The contract history interface 5500 may include, for example, a contract history tool 5501 for tracking and viewing contractual amendments or events. The contract history tool 5501 may be implemented via the contract engine 1554 (or, more specifically, for example, the contract management engine 1688, 1784). A user or organization may use the contract history tool 5501 for historical tracking or auditing purposes. The contract history tool 5001 may include, for example, a contract history feature 5503 for actual viewing or access to the contractual amendment or events associated with one or more contracts 5504. The tool 5001 may also be used for exporting (e.g., downloading or transmitting via other electronic communication means) contract history(ies) for tracking or auditing purposes. Moreover, a contract history search tool 5502 may be used to search for contracts based on type, date, user, organization, supplier, effective/expiration date(s), tier(s), ceiling(s)/limit(s), or item(s). Once the search engine 22 receives the appropriate search query from the contract history tool 5502, contract history search results may be presented via the interface 5500.

Figure 56:
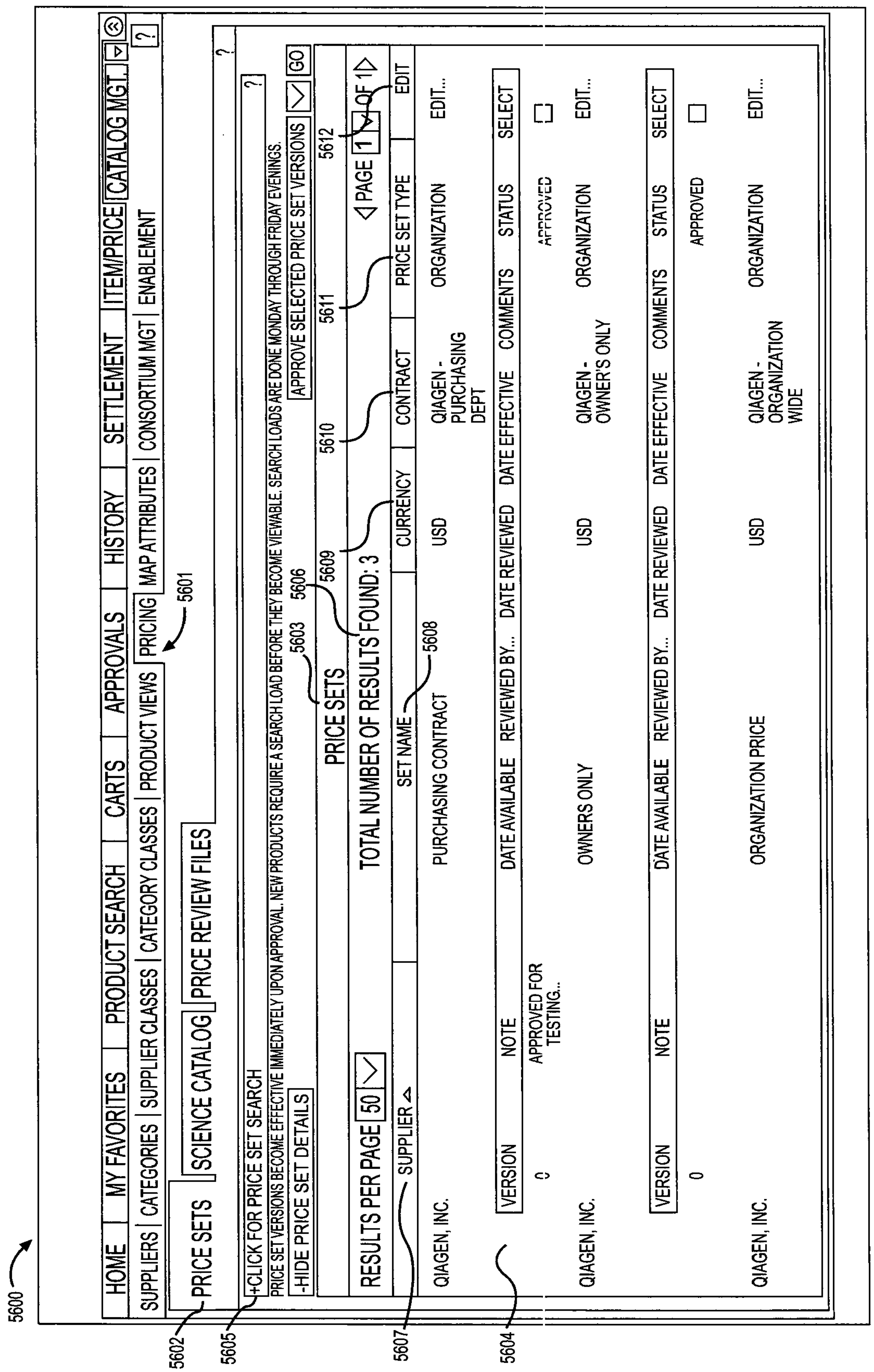
FIG. 56 illustrates an exemplary contract price sets interface in accordance with the present invention.

FIG. 56 illustrates an exemplary contract price sets interface in accordance with the present invention. The contract price sets interface 5600 may include, for example, a pricing tool 5601, which may further include a contract price sets tool 5602 for assigning one or more price sets to one or more contracts, in accordance with access to the one or more contracts (see above; FIGS. 53-54). The contract price sets tool 5502 may be implemented via the contract engine 1554 (or, more specifically, for example, the contract management engine 1688, 1784). Furthermore, the contract price sets tool 5602 may include, for example, a price sets feature 5603 for presenting available price sets that may be assigned to one or more contracts. The available price sets are searchable (via search engine 22 receiving queries from price set search tool 5605); search results received from search engine 22 may then be displayed via a price sets search results interface 5604. The price sets search results interface 5604 may include, for example, a total number of results found 5606, a supplier associated with a price set 5607, a price set name 5608, a currency associated with a price set 5609, a contract name/nickname associated with a price set 5610, a price set type associated with a price set 5611, or an edit price sets feature for editing a price set 5612.

Figure 57:
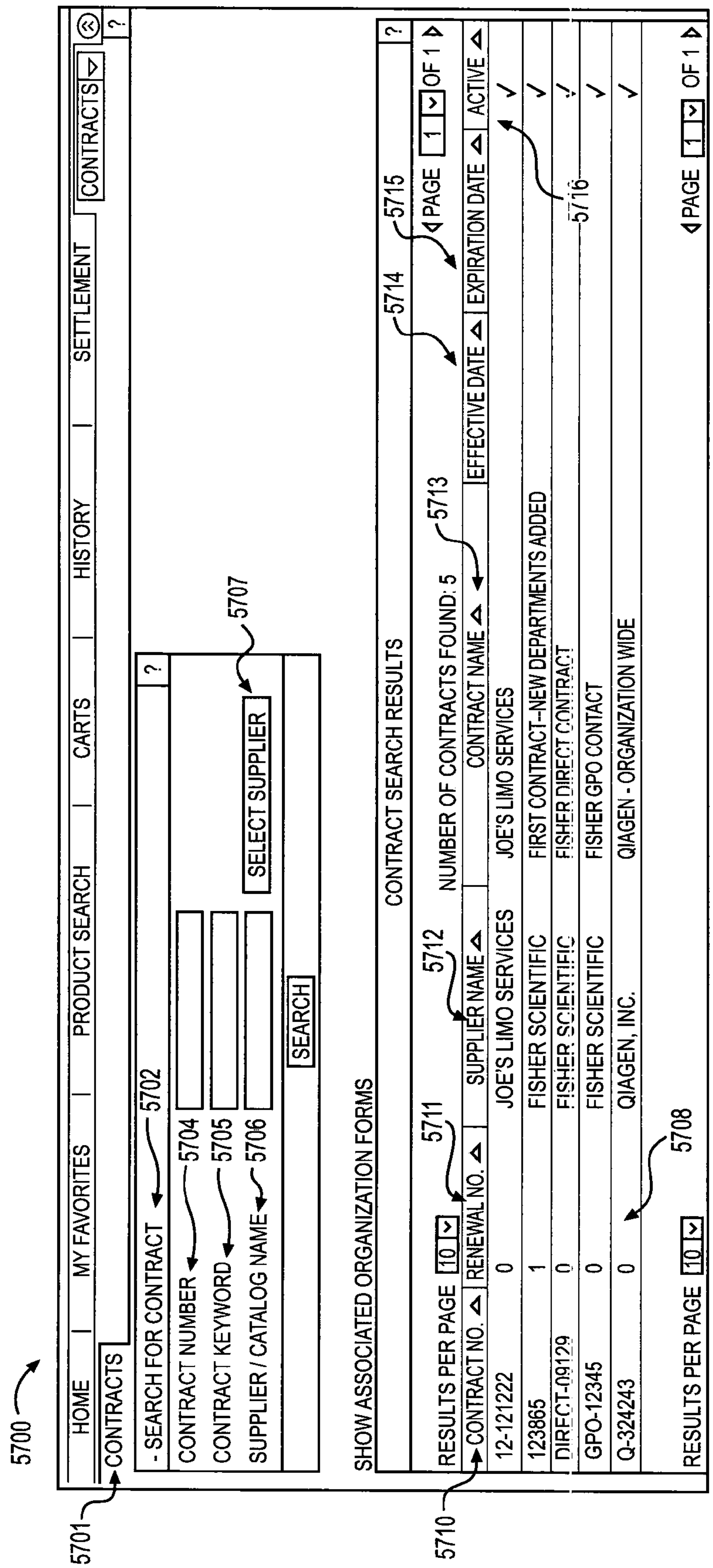
FIG. 57 illustrates an exemplary contract search interface in accordance with the present invention.

FIG. 57 illustrates an exemplary contract search interface in accordance with the present invention. The contract search interface 5700 may include, for example, a contract search tool 5701 for searching for one or more contracts according to one or more search criteria 5702. The contract search tool 5701 may be implemented via the contract engine 1554 (or, more specifically, for example, the contract management engine 1688, 1784). The search criteria 5702 (e.g., contract number 5704, contract keyword 5705, or supplier/catalog name 5706) may be transformed into one or more search queries for processing by the search engine 22. Some or all of the search criteria may be selected from within the several respective databases of the system (described above); for example, the search criteria 5702 may include, for example, a select supplier feature 5707 for selecting one or more suppliers from the supplier database 1775 (or, another database of the system) for searching. Users may be able to search for or view the contracts to which they may have access (see above; FIGS. 53-54). After searching/processing, the search engine 22 may return the search results to the contract search tool 5701, which may include a contract search results interface 5703 for displaying the one or more contract search results 5708. The contract search results interface 5703 may include, for example, a number of contracts found 5709, a contract number for each search result 5710, a renewal number for each search result 5711, a supplier name associated with a contract for each search result 5712, a contract name for each search result 5713, an effective date for each search result 5714, an expiration date for each search result 5715, or an active/inactive indicator for each search result 5716.

Figure 58:
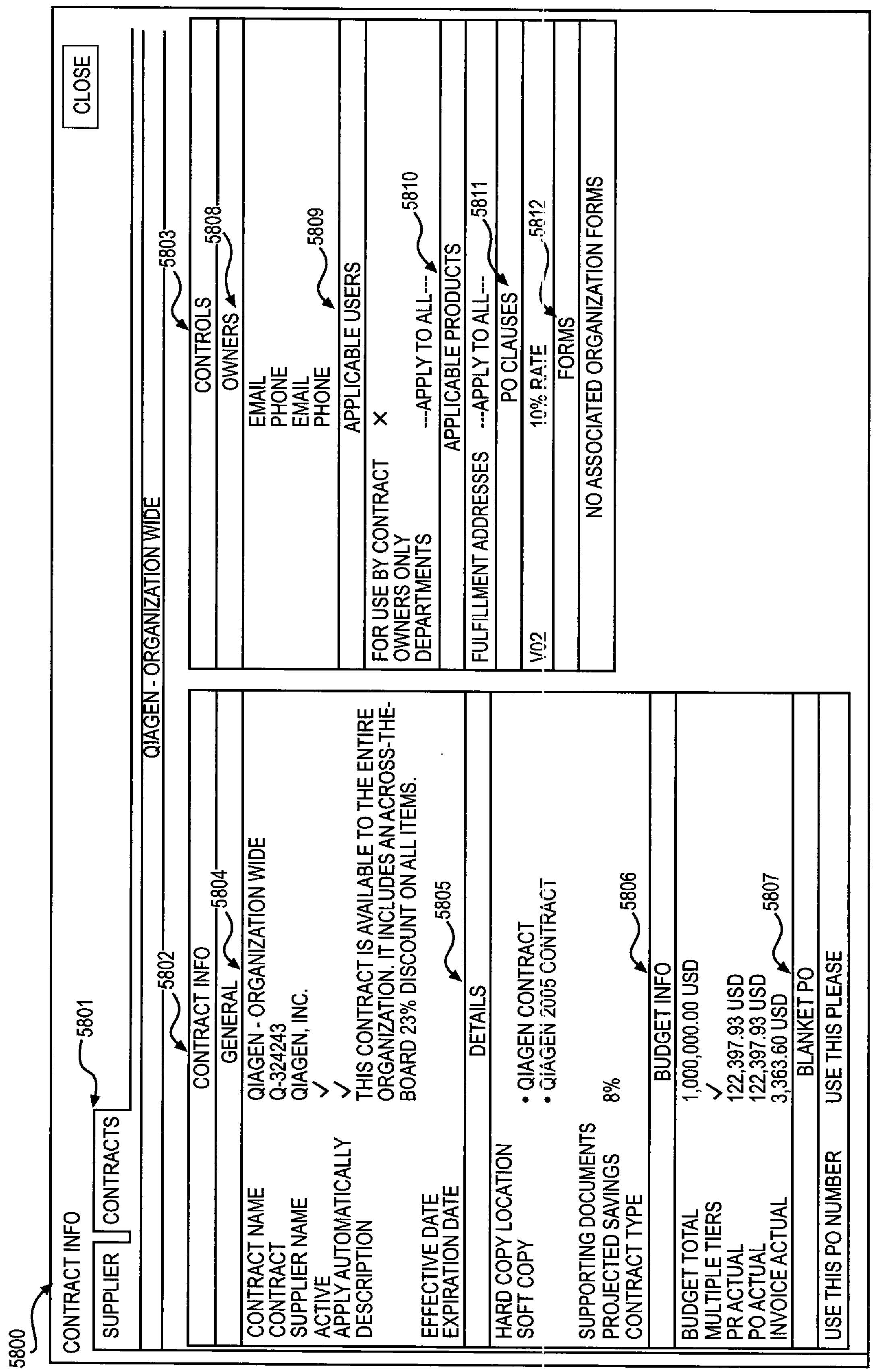
FIG. 58 illustrates an exemplary contract view interface in accordance with the present invention.

FIG. 58 illustrates an exemplary contract view interface in accordance with the present invention. The contract view interface 5800 may include, for example, a contract view tool 5801 for viewing detailed information regarding a contract. The contract view tool 5801 may be implemented via the contract engine 1554 (or, more specifically, for example, the contract management engine 1688, 1784); a contract viewed using the contract view tool 5801 may be stored in the transactions database 228 and, more specifically, the contracts database 3200. The contract view tool 5801 may include, for example, a contract information feature 5802 or also a contract controls feature 5803. The contract information feature 5802 may include, for example, a general information feature 5804 for displaying general information elements like, for example, a contract name, a contract number, a supplier name associated with the contract, an active/inactive flag for indicating whether a contract is currently in an active or inactive state, an apply automatically flag for indicating whether amendments or contractual events associated with the contract are applied automatically, a description of the contract, or an effective and expiration date associated with the contract; the contract information feature 5802 may also include, for example, a detailed information feature 5805 for displaying detailed information (see above; FIG. 40) like, for example, a hard copy location of a contract, a soft copy location of a contract, any supporting documents associated with the contract, a projected savings percentage/amount associated with the contract, or a contract type associated with the contract; the contract information feature 5802 may further include, for example, a budget information feature 5806 for displaying budget information (see above; FIG. 52) like, for example, a budget total amount, whether the contract has multiple tiers, an actual purchase requisitions amount associated with the contract, an actual purchase order amount associated with the contract, or an invoice actual amount associated with the contract; or, the contract information feature 5802 may further include, for example, a blanket purchase order (PO) information feature 5807 for displaying blanket PO information like, for example, a blanket PO number to use for a contract. Moreover, the contract controls feature 5803 (see above; FIG. 51) may provide information related to who may exercise some level of control over a contract. The contract controls feature 5803 may include, for example, a contracts owners information feature 5808 for displaying information associated with who the contract owners may be, an applicable users feature 5809 for displaying elements indicating whether the contract may be used only by owners (or, other as well) and whether/which departments (see above; FIG. 53) may access the contract, an applicable products feature 5810 for displaying a fulfillment address (see above; FIG. 54) that may be associated with products associated with the contract, a PO clauses feature 5811 for displaying any applicable PO clauses (see above; FIG. 49) that may be associated with the contract, or a forms feature 5812 for displaying any forms that may be associated with the contract (see above; FIG. 50).

Figure 59:
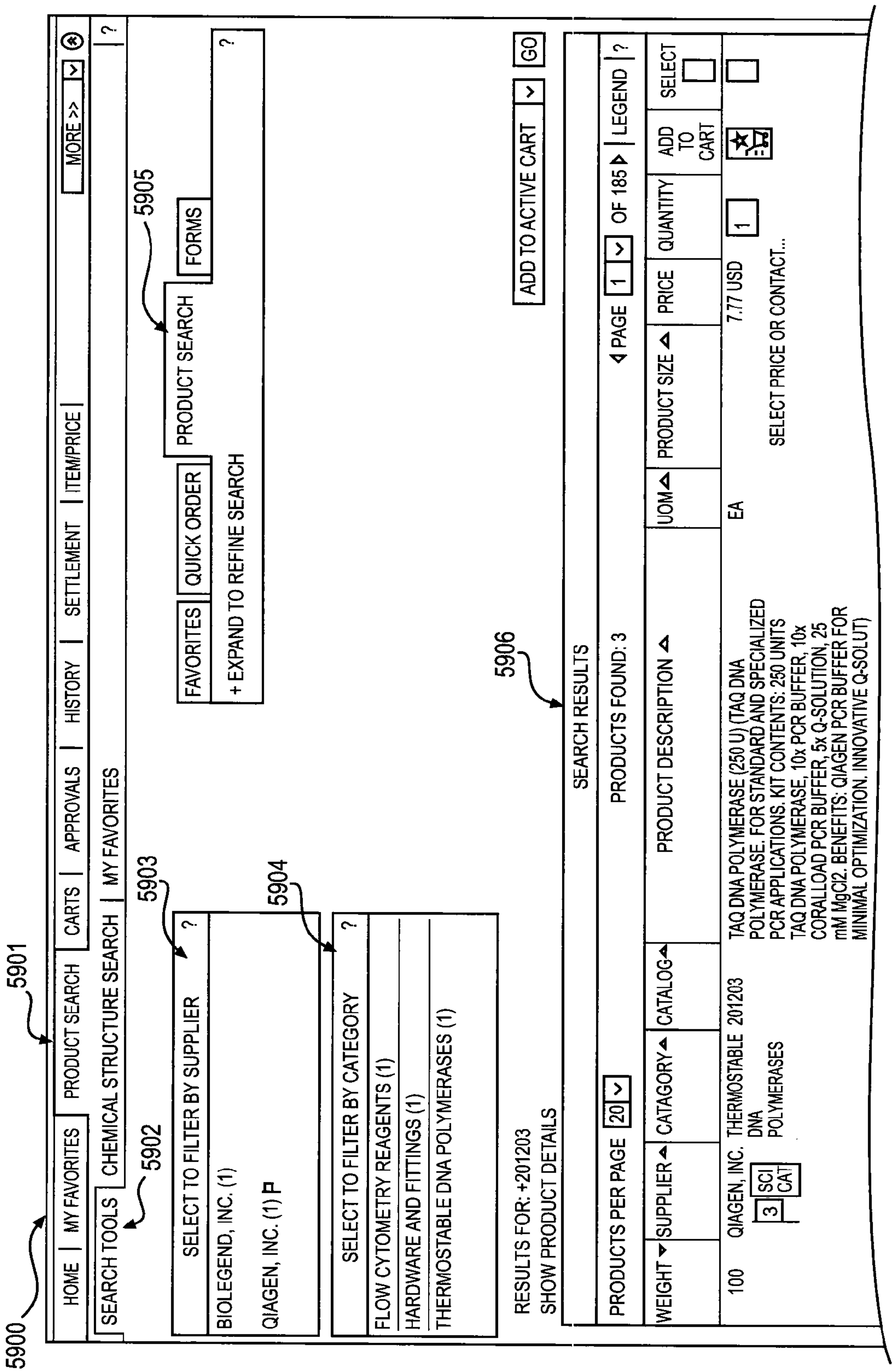
FIG. 59 illustrates an exemplary contract pricing interface in accordance with the present invention.
Figure 59:
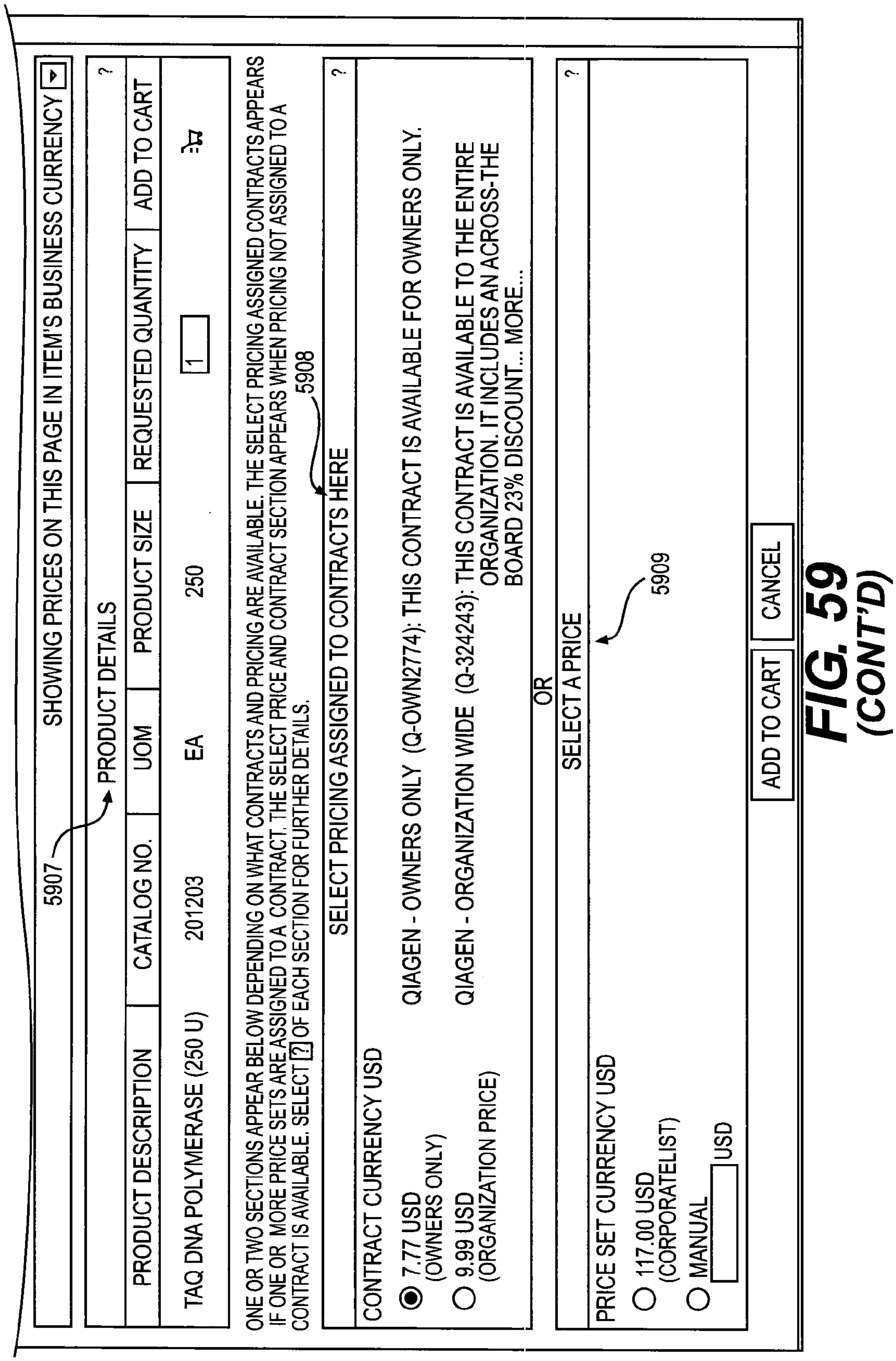

FIG. 59 illustrates an exemplary contract pricing interface in accordance with the present invention. The contract pricing interface 5900 may include, for example, a contract pricing tool 5907. The contract pricing tool 5907 may be implemented via the contract engine 1554 (or, more specifically, for example, the contract management engine 1688, 1784). Furthermore, the contract pricing tool 5907 may display, for one or more selected items/products, the pricing available to a specific user/organization. To access the contract pricing tool 5907 associated with one or more items/products, a user may first search for the item/product via a product search tool 5901 that may present the user with additional search tools 5902; the product search tool 5901 and its additional search tools 5902 may send search queries (e.g., filtering by supplier 5903, filtering by item/product category 5904, and/or product searching 5905) to the search engine 22 for the search engine to execute against one or more respective databases (e.g., master product database 236, transaction database 228, or more specific databases); search results 5906 are then returned and presented; by default, the lowest price for each item/product may be displayed in search results. Once a user has selected one or more items/products and invoked a select price or contract feature, then the user may access the contract pricing tool 5907. Like the search results 5906, by default, the contract pricing tool 5907 may display the lowest price for one or more items/products selected and available 5908 to a user (the tool 5907 may also display any discounts related to a price set); available prices may be organized according to owner price, department price, organization price, corporate list price, or an option for setting a manual price (in an appropriate currency) 5909. Thus, one or more prices may be assigned to the same contract but may be available to various levels of users, departments, organizations (may include a corporate list price), or may be manually set by each in accordance with user privileges or business rules. A user may select a specific price and proceed to checkout via the cart feature; the price selected for the item/product of a contract may further be applied to the user, department or organization in accordance with user privileges or business rules.

FIG. 59 illustrates an exemplary contract pricing interface in accordance with the present invention. The contract pricing interface 5900 may include, for example, a contract pricing tool 5907. The contract pricing tool 5901 may be implemented via the contract engine 1554 (or, more specifically, for example, the contract management engine 1688, 1784). Furthermore, the contract pricing tool 5907 may display, for one or more selected items/products, the pricing available to a specific user/organization. To access the contract pricing tool 5907 associated with one or more items/products, a user may first search for the item/product via a product search tool 5901 that may present the user with additional search tools 5902; the product search tool 5901 and its additional search tools 5902 may send search queries to the search engine 22 for the search engine to execute against one or more respective databases (e.g., master product database 236, transaction database 228, or more specific databases); search results 5906 are then returned and presented; by default, the lowest price for each item/product may be displayed in search results. Once a user has selected one or more items/products and invoked a select price or contract feature, then the user may access the contract pricing tool 5907. Like the search results 5906, by default, the contract pricing tool 5907 may display the lowest price for one or more items/products selected and available 5908 to a user (the tool 5907 may also display any discounts related to a price set); available prices may be organized according to owner price, department price, organization price, corporate list price, or an option for setting a manual price (in an appropriate currency) 5909. Thus, one or more prices may be assigned to the same contract but may be available to various levels of users, departments, organizations (may include a corporate list price), or may be manually set by each in accordance with user privileges or business rules. A user may select a specific price and proceed to checkout via the cart feature; the price selected for the item/product of a contract may further be applied to the user, department or organization in accordance with user privileges or business rules.

Figure 60:
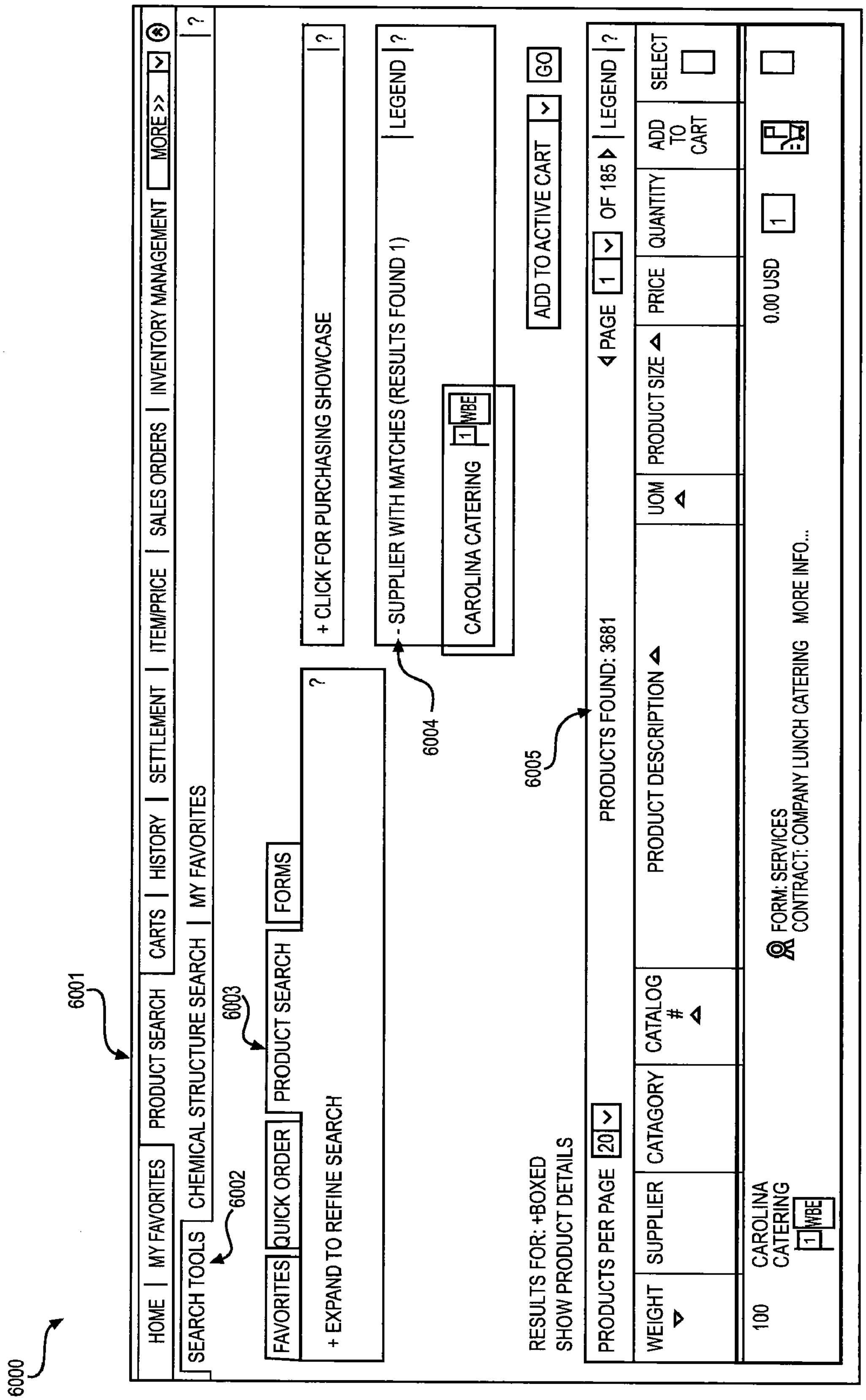
FIG. 60 illustrates an exemplary contract search interface in accordance with the present invention.

FIG. 60 illustrates an exemplary contract search interface in accordance with the present invention. The contract search interface 6000 may include, for example, a contract search interface 6001, which may further include additional search tools 6002, 6003 for locating one or more contracts stored in the transactions database 228 (or, more specifically, for example, the contracts database 3200) via the search engine 22. The contract search tool 6001 may be implemented via the contract engine 1554 (or, more specifically, for example, the contract management engine 1688, 1784 and the search engine 22). A user may input a search query with keywords or criteria that may be associated with one or more contracts for which the user would like to locate. The search engine 22 may then receive a search query from the search tools 6002, 6003 to execute against the appropriate database(s) (see above) and return one or more matches 6004, 6005 via the contract search interface 6000, 6001. Forms associated with a contract may also be searched for using the interface 6000, 6001, in addition to the forms search interface (discussed above). A user may then choose to select one or more contracts displayed in the interface 6000, 6001 for further access to the details of the one or more contracts as implemented via the contract view tool 5801, pricing via the contract pricing tool 5901, or other available feature of the system.

Figure 61:
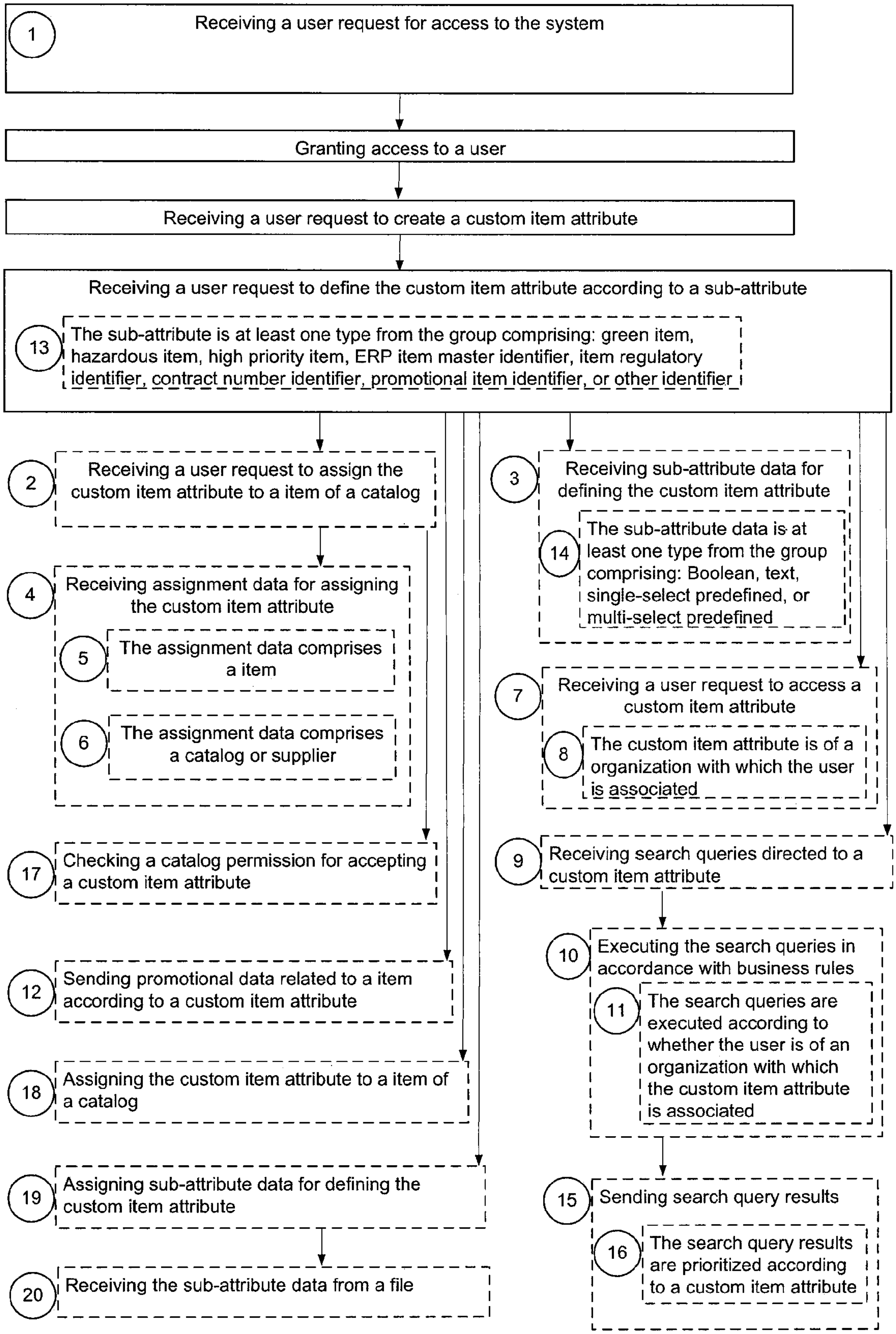
FIG. 61 is a flowchart representing a server method for custom item attributes.

FIG. 61 is a flowchart representing a server method for custom item attributes. For example, the flowchart illustrates the computer-implemented steps of, at a server system hosting an electronic procurement system: receiving a user request for access to the system; granting access to a user; receiving a user request to create a custom item attribute; and receiving a user request to define the custom item attribute according to a sub-attribute.

Figure 62:
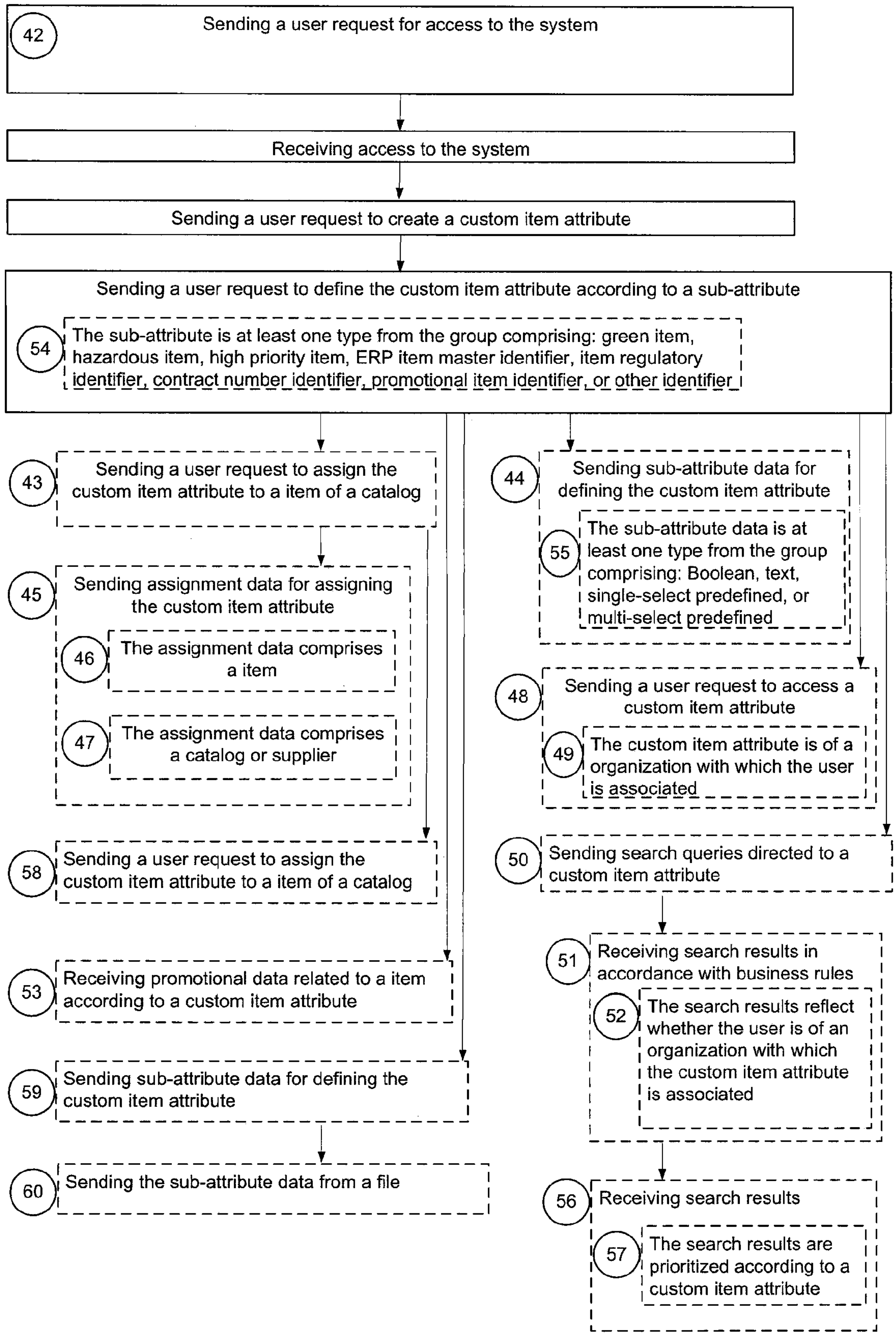
FIG. 62 is a flowchart representing a client method for custom item attributes.

FIG. 62 is a flowchart representing a client method for custom item attributes. For example, the flowchart illustrates the computer-implemented steps of, at a client system communicating with an electronic procurement system: sending a user request for access to the system; receiving access to the system; sending a user request to create a custom item attribute; and sending a user request to define the custom item attribute according to a sub-attribute.

Figure 63:
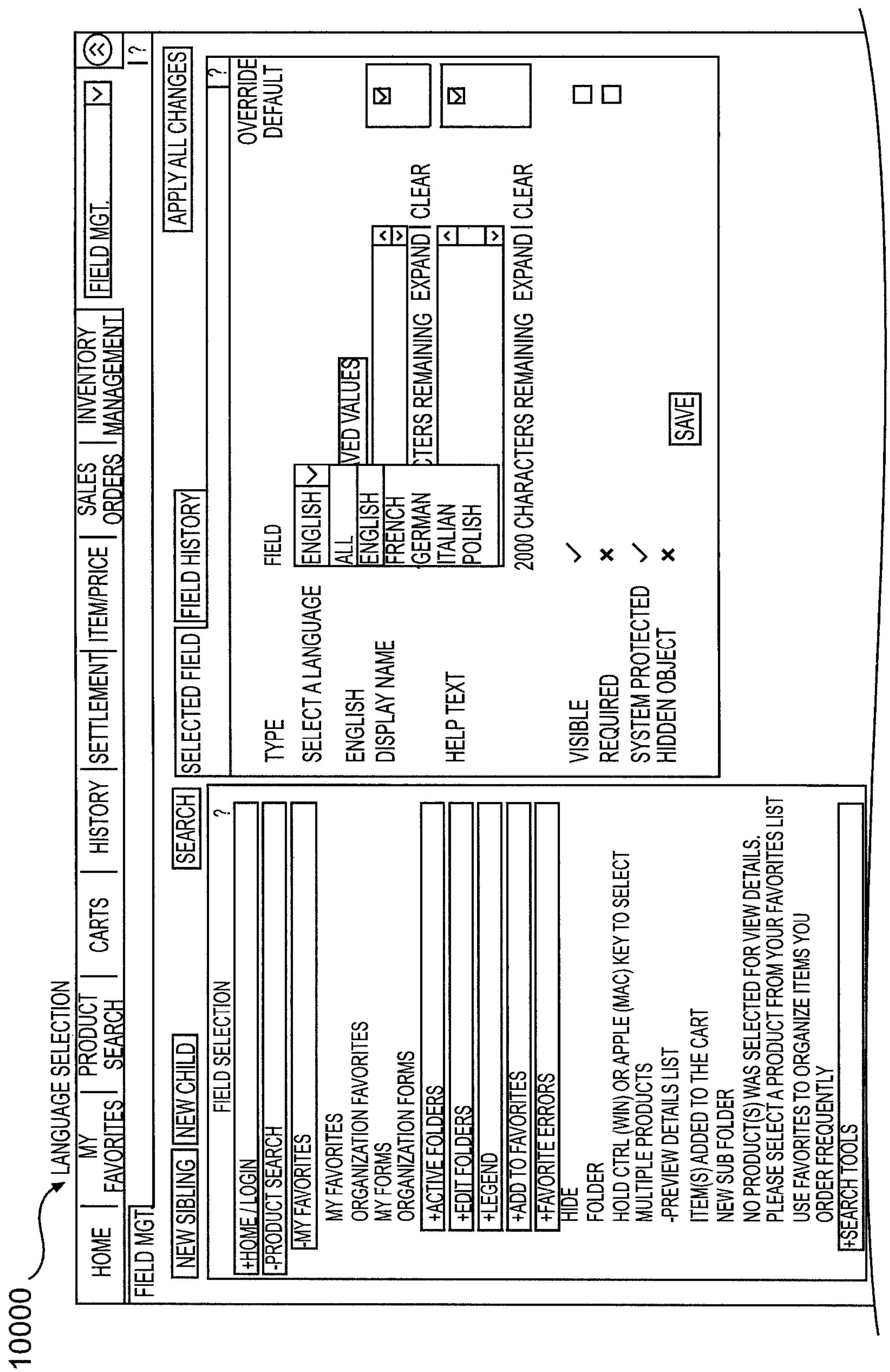
FIG. 63 illustrates an exemplary field management interface in accordance with the present invention.
Figure 63:
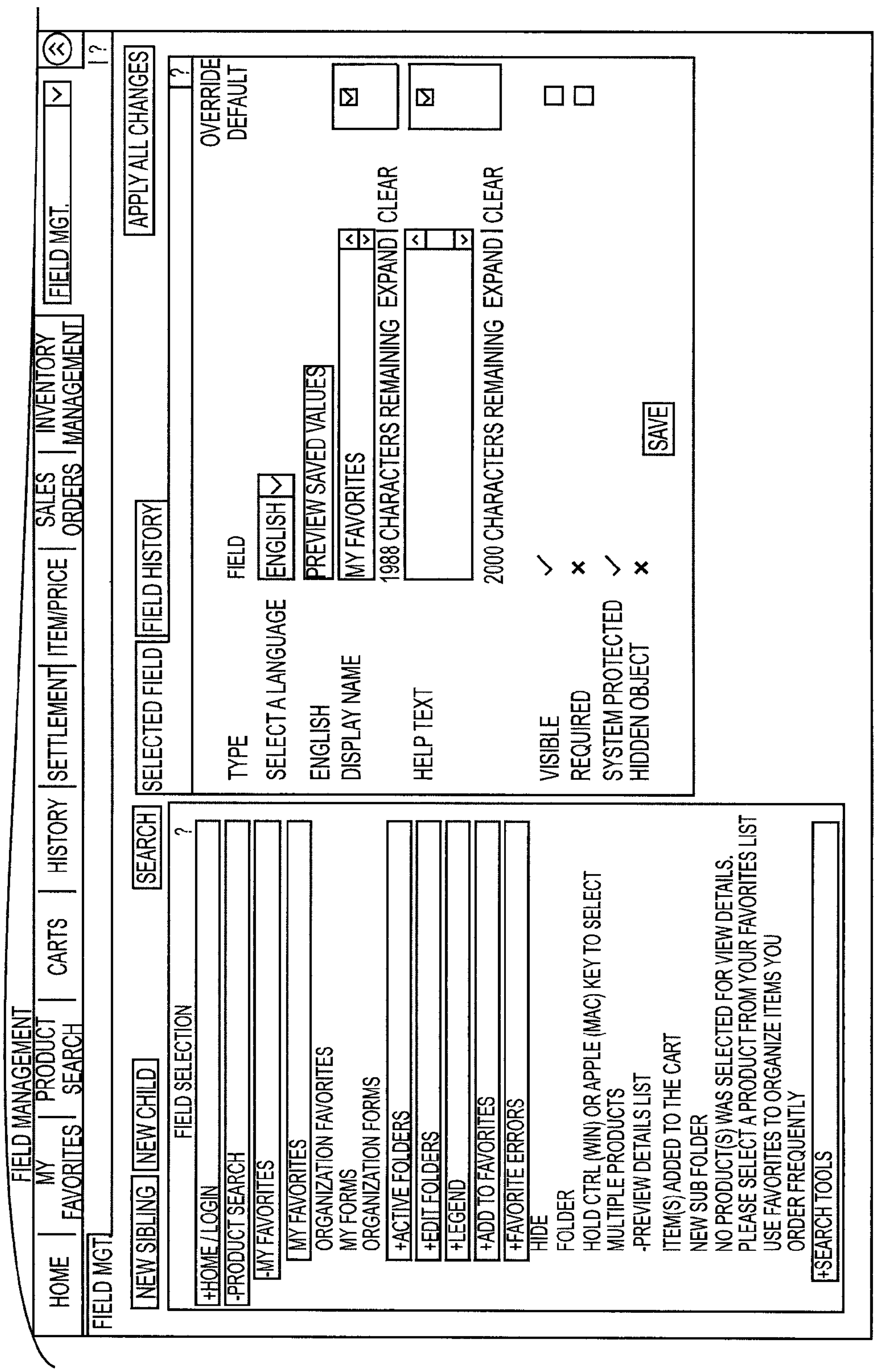

FIG. 63 illustrates an exemplary field management interface 10000 in accordance with the present invention, as described. A. Language Selection is illustrated, including a 'select a language' option for selecting a language for use in the electronic procurement system. A Field Management selection is illustrated, allowing a user to select fields from a field selection menu, showing a field history, and showing options for creating a new sibling or a new child. A 'save option' and an 'apply all changes' option is shown also.

FIG. 64 illustrates an exemplary update favorite(s) process flow 10100 in accordance with the present invention, as described. An option is provided for a user to select a favorite description, which may be applied to a product, and which may be placed in a favorites menu.

Figure 65:
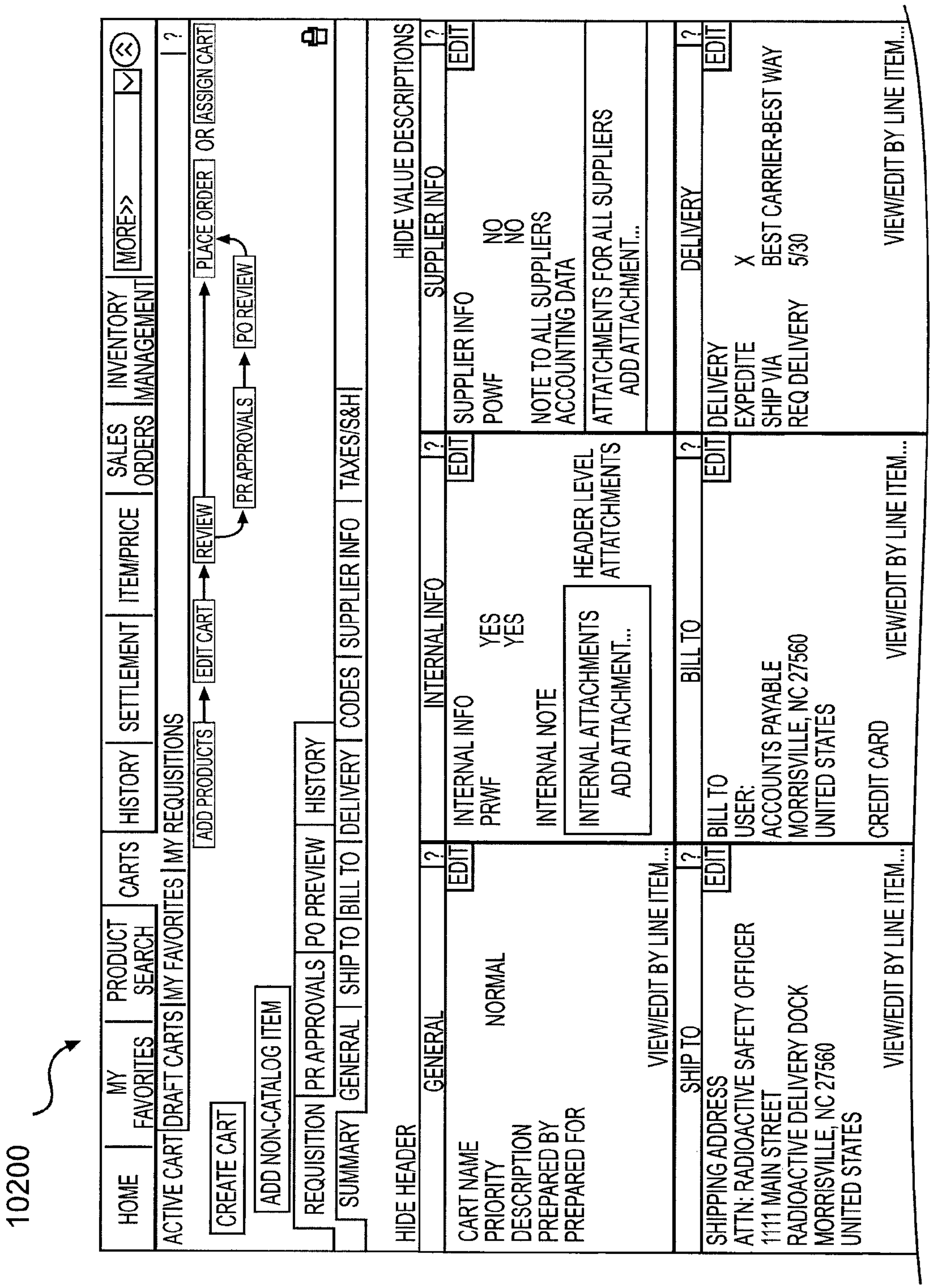
FIG. 65 illustrates an exemplary document attachment and setup interface in accordance with the present invention.
Figure 65:
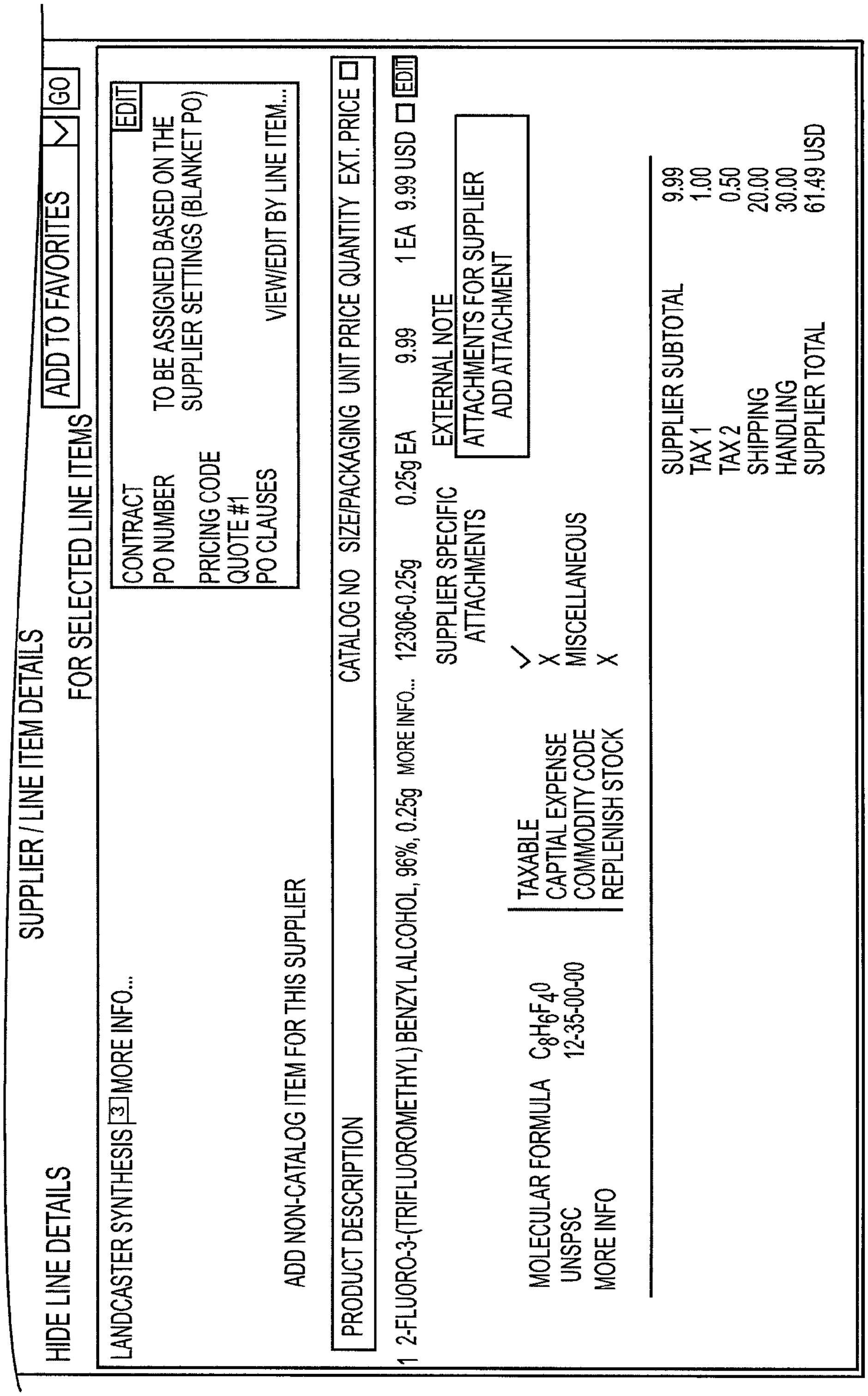

FIG. 65 illustrates an exemplary document setup interface 10200 in accordance with the present invention, as described. An option to add internal attachments is shown. An option to add attachments for all suppliers is shown.

Figure 66:
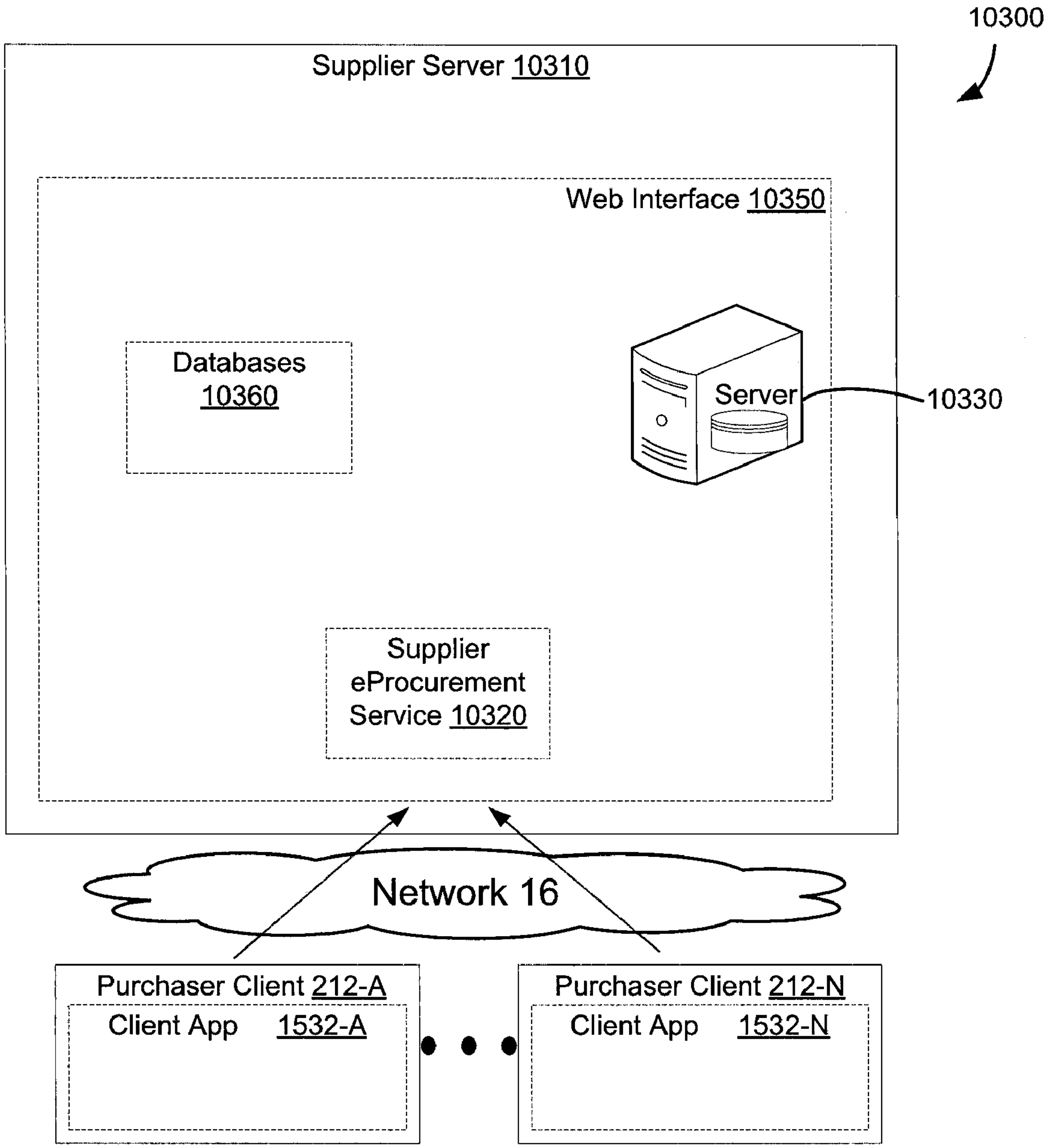
FIG. 66 illustrates an electronic procurement system hosted at a supplier server.

FIG. 66 illustrates a system 10300 hosted at a supplier server 10310, which interacts over a network 16 with a plurality of purchaser clients 212, both as described earlier. The purchaser clients run client applications 1532. This application may include a web-browser interface or a stand alone application, for accessing the supplier electronic procurement service 10320 and server 10330. The server 10330 may provide a web interface 10350 as described earlier. The electronic procurement provider 10320 hosts a plurality of databases 10360, including databases 2200 as described earlier.

Figure 67:
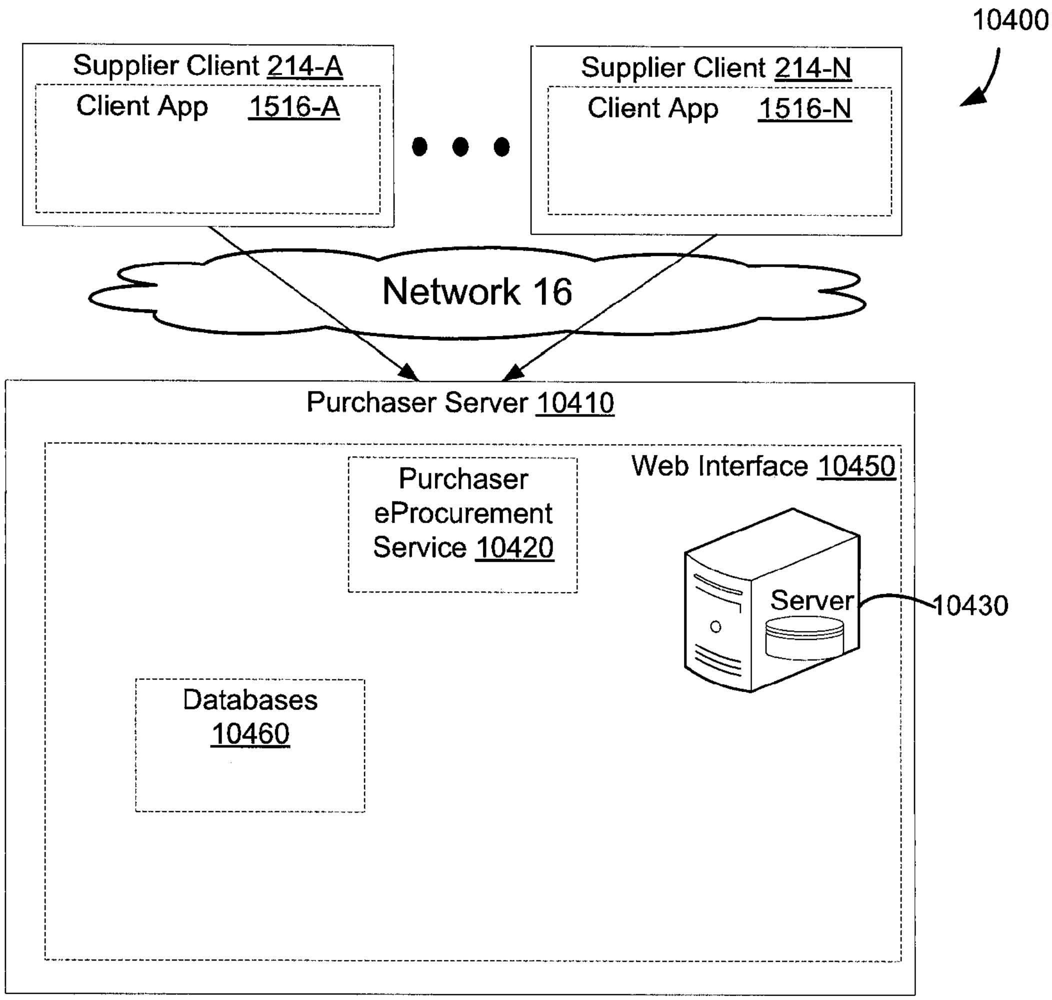
FIG. 67 illustrates an electronic procurement system hosted at a purchaser server.

FIG. 67 illustrates a system 10400 hosted at a purchaser server 10410, which interacts over a network 16 with a plurality of supplier clients 214, both as described earlier. The supplier clients run client applications 1516. This application may include a web-browser interface or a stand alone application, for accessing the purchaser electronic procurement service 10420 and server 10430. The server 10430 may provide a web interface 10450 as described earlier. The electronic procurement provider 10420 hosts a plurality of databases 10460, including databases 2200 as described earlier.

In some embodiments, the electronic procurement system 20 is a single instance multi-tenant system. In some embodiments the electronic procurement system 20 is a web-based system.

In some embodiments the electronic procurement system 20 is located independently from suppliers and purchasers of the electronic procurement system. In some embodiments the electronic procurement system 20 is located at a supplier of the electronic procurement system. In some embodiments the electronic procurement system 20 is located at a purchaser of the electronic procurement system.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

We claim:

1. A computer-implemented method, comprising:

at a server system hosting an electronic procurement system:

- receiving a user request for access to the system;
- granting access to a user of a first contracting buyer organization;
- receiving a request from the user to create a custom item attribute;
- receiving a request from the user to define the custom item attribute according to a sub-attribute;
- receiving a request from the user to assign the custom item attribute to an item of a catalog, the catalog being associated with a first supplier organization and being accessible by at least users of the first contracting buyer organization and users of a second and different contracting buyer organization; and
- assigning the custom item attribute to the item of the catalog, the item being accessible by users of at least the first contracting buyer organization and users of the second contracting buyer organization.

2. The method of claim 1, further comprising the step of: receiving sub-attribute data for defining the custom item attribute.

3. The method of claim 2, wherein the sub-attribute data is at least one type from the group comprising: Boolean, text, single-select predefined, or multi-select predefined.

4. The method of claim 1, further comprising the step of: receiving assignment data for assigning the custom item attribute.

5. The method of claim 4, wherein the assignment data comprises an item.

6. The method of claim 4, wherein the assignment data comprises a catalog or supplier.

7. The method of claim 1, further comprising the step of: receiving a user request to access a custom item attribute.

8. The method of claim 7, wherein the custom item attribute is of an organization with which the user is associated.

9. The method of claim 1, further comprising the step of: receiving search queries directed to a custom item attribute.

10. The method of claim 9, further comprising the step of: executing the search queries in accordance with business rules.

11. The method of claim 10, wherein the search queries are executed according to whether the user is of an organization with which the custom item attribute is associated.

12. The method of claim 10, further comprising the step of: sending search query results.

13. The method of claim 12, wherein the search query results are prioritized according to a custom item attribute.

14. The method of claim 1, further comprising the step of: sending promotional data related to an item according to a custom item attribute.

15. The method of claim 1, wherein the sub-attribute is at least one type from the group comprising: green item, hazardous item, high priority item, ERP item master identifier, item regulatory identifier, contract number identifier, promotional item identifier, or other identifier.

16. The method of claim 1, further comprising the step of: checking a catalog permission for accepting a custom item attribute.

17. The method of claim 1, further comprising the step of: assigning sub-attribute data for defining the custom item attribute.

18. The method of claim 17, further comprising the step of: receiving the sub-attribute data from a file.

19. A server system, comprising:
one or more processors;
memory;
one or more programs stored in the memory, the one or more programs comprising instructions to:
at a server system hosting an electronic procurement system:
receive a user request for access to the system;
grant access to a user of a first contracting buyer organization;
receive a request from the user to create a custom item attribute;
receive a request from the user to define the custom item attribute according to a sub-attribute;
receive a request from the user to assign the custom item attribute to an item of a catalog, the catalog being associated with a first supplier organization and being accessible by at least users of the first contracting buyer organization and users of a second and different contracting buyer organization; and
assign the custom item attribute to the item of the catalog, the item being accessible by users of at least the first contracting buyer organization and users of the second contracting buyer organization.

20. The system of claim 19, further comprising the instruction to: receive sub-attribute data for defining the custom item attribute.

21. The system of claim 20, wherein the sub-attribute data is at least one type from the group comprising: Boolean, text, single-select predefined, or multi-select predefined.

22. The system of claim 19, further comprising the instruction to: receive assignment data for assigning the custom item attribute.

23. The system of claim 22, wherein the assignment data comprises an item.

24. The system of claim 22, wherein the assignment data comprises a catalog or supplier.

25. The system of claim 19, further comprising the instruction to: receive a user request to access a custom item attribute.

26. The system of claim 25, wherein the custom item attribute is of an organization with which the user is associated.

27. The system of claim 19, further comprising the instruction to: receive search queries directed to a custom item attribute.

28. The system of claim 27, further comprising the instruction to: execute the search queries in accordance with business rules.

29. The system of claim 28, wherein the search queries are executed according to whether the user is of an organization with which the custom item attribute is associated.

30. The system of claim 28, further comprising the instruction to: send search query results.

31. The system of claim 30, wherein the search query results are prioritized according to a custom item attribute.

32. The system of claim 19, further comprising the instruction to: send promotional data related to an item according to a custom item attribute.

33. The system of claim 19, wherein the sub-attribute is at least one type from the group comprising: green item, hazardous item, high priority item, ERP item master identifier, item regulatory identifier, contract number identifier, promotional item identifier, or other identifier.

34. The system of claim 19, further comprising the instruction to: check a catalog permission for accepting a custom item attribute.

35. The system of claim 19, further comprising the instruction to: assign sub-attribute data for defining the custom item attribute.

36. The system of claim 35, further comprising the instruction to: receive the sub-attribute data from a file.

37. A computer readable storage medium storing one or more programs configured for execution by a computer, the one or more programs comprising instructions to:
at a server system hosting an electronic procurement system:
receive a user request for access to the system;
grant access to a user of a first contracting buyer organization;
receive a request from the user to create a custom item attribute;
receive a request from the user to define the custom item attribute according to a sub-attribute;
receive a request from the user to assign the custom item attribute to an item of a catalog, the catalog being associated with a first supplier organization and being accessible by at least users of the first contracting buyer organization and users of a second and different contracting buyer organization; and
assign the custom item attribute to the item of the catalog, the item being accessible by users of at least the first contracting buyer organization and users of the second contracting buyer organization.

* * * * *